United States Patent [19]

Kirigaya et al.

[11] Patent Number: 5,754,894
[45] Date of Patent: May 19, 1998

[54] MOTOR DRIVEN ZOOM CAMERA

[75] Inventors: Tadayuki Kirigaya; Hiroyuki Takahashi; Masahiro Nakata; Hideaki Tsuji; Tetsuo Hosokawa, all of Tokyo, Japan

[73] Assignee: Asahi Kogaku Kogyo Kabushiki Kaisha, Tokyo, Japan

[21] Appl. No.: 895,564

[22] Filed: Jul. 16, 1997

Related U.S. Application Data

[60] Continuation of Ser. No. 461,963, Jun. 5, 1995, which is a division of Ser. No. 414,130, Mar. 30, 1995, Pat. No. 5,654,789, which is a continuation of Ser. No. 108,911, Aug. 19, 1993, abandoned.

[30] Foreign Application Priority Data

| Oct. 19, 1992 | [JP] | Japan | 4-306169 |
| Oct. 19, 1992 | [JP] | Japan | 4-306170 |
| Oct. 19, 1992 | [JP] | Japan | 4-306171 |
| Oct. 19, 1992 | [JP] | Japan | 4-306172 |
| Oct. 19, 1992 | [JP] | Japan | 4-306173 |
| Oct. 19, 1992 | [JP] | Japan | 4-306174 |
| Oct. 19, 1992 | [JP] | Japan | 4-306175 |
| Oct. 19, 1992 | [JP] | Japan | 4-306176 |
| Oct. 19, 1992 | [JP] | Japan | 4-306177 |
| Oct. 19, 1992 | [JP] | Japan | 4-306178 |

[51] Int. Cl.$^6$ ............................................ G03B 17/00
[52] U.S. Cl. ............................ 396/77; 396/72; 396/76; 396/85
[58] Field of Search ................................ 396/72, 76, 77, 396/85

[56] References Cited

U.S. PATENT DOCUMENTS

| 4,731,629 | 3/1988 | Aoshima et al. . |
| 4,816,860 | 3/1989 | Iida et al. . |
| 4,936,664 | 6/1990 | Haraguchi et al. . |
| 4,944,030 | 7/1990 | Haraguchi et al. . |
| 4,951,075 | 8/1990 | Tokumura et al. . |
| 5,012,273 | 4/1991 | Haraguchi et al. . |
| 5,016,032 | 5/1991 | Haraguchi et al. . |
| 5,134,432 | 7/1992 | Kohmoto et al. ............... 354/412 |

(List continued on next page.)

FOREIGN PATENT DOCUMENTS

| 0361512 | 4/1990 | European Pat. Off. . |
| 4212134 | 3/1992 | Japan . |
| 2196134 | 4/1988 | United Kingdom . |
| 2241073 | 8/1991 | United Kingdom . |
| 2241074 | 8/1991 | United Kingdom . |
| 2256062 | 11/1992 | United Kingdom . |

OTHER PUBLICATIONS

United Kingdom Search Reports (3).
United Kingdom Search Report dated Sep. 27, 1994 with respect to Claims 29–45 of counterpart United Kingdom Application No. 9315654.5.
United Kingdom Search Report dated Sep. 27, 1994 with respect to Claims 27 of counterpart United Kingdom Application No. 9315654.5.
United Kingdom Search Report dated Sep. 29, 1994 with respect to Claim 28 of counterpart United Kingdom Application No. 9315654.5.

(List continued on next page.)

Primary Examiner—Russell E. Adams
Attorney, Agent, or Firm—Greenblum & Bernstein, P.L.C.

[57] ABSTRACT

The present invention relates to an optical camera having a zoom function in which a focal length can be varied or the variation is actuated by a focal length changing member, and in particular to a camera in which a focal length is varied through a motor.

The optical camera has a zoom lens operable by a rotatable zoom ring for changing the focal length thereof. An automatic focusing operation is effected by a control means when the focal length is changed so that an image of an object viewed through a viewfinder remains in focus. The zoom lens can include a motor and an in-exposure zoom control means can be provided for controlling zooming movement of the lens during an exposure operation.

44 Claims, 101 Drawing Sheets

U.S. PATENT DOCUMENTS

| | | |
|---|---|---|
| 5,140,357 | 8/1992 | Suda et al. . |
| 5,142,315 | 8/1992 | Haraguchi et al. . |
| 5,146,259 | 9/1992 | Kobayashi et al. . |
| 5,148,199 | 9/1992 | Kohmoto et al. . |
| 5,150,144 | 9/1992 | Soshi et al. . |
| 5,150,145 | 9/1992 | Haraguchi et al. . |
| 5,157,429 | 10/1992 | Haraguchi et al. . |
| 5,162,831 | 11/1992 | Haraguchi et al. . |
| 5,166,717 | 11/1992 | Kawasaki et al. . |
| 5,182,591 | 1/1993 | Kawasaki et al. . |
| 5,192,965 | 3/1993 | Suzuki et al. . |
| 5,214,462 | 5/1993 | Haraguchi et al. . |
| 5,243,372 | 9/1993 | Suzuki et al. . |
| 5,264,885 | 11/1993 | Haraguchi et al. . |
| 5,276,475 | 1/1994 | Haraguchi et al. . |
| 5,280,317 | 1/1994 | Haraguchi et al. . |
| 5,315,345 | 5/1994 | Kawasaki et al. ............... 354/412 |
| 5,321,462 | 6/1994 | Haraguchi et al. . |
| 5,331,367 | 7/1994 | Kawasaki et al. ............... 354/484 |
| 5,363,165 | 11/1994 | Kawasaki et al. ............... 354/195.1 |
| 5,367,354 | 11/1994 | Kawasaki et al. ............... 354/400 |
| 5,396,306 | 3/1995 | Kawasaki et al. ............... 354/195.1 |
| 5,424,796 | 6/1995 | Kondoh . |
| 5,450,156 | 9/1995 | Kawasaki et al. ............... 354/400 |

OTHER PUBLICATIONS

United Kingdom Search Report dated Sep. 29, 1994 with respect to Claims 14–16, 25, and 26 of counterpart United Kingdom Application No. 9315654.5.

Preliminary Search Report.

Patent Abstracts of Japan, vol. 16, No. 555 (P–1454), Nov. 25, 1992.

United Kingdom Search Report.

(communication interruption routine)

MOTOR DRIVEN ZOOM CAMERA

This application is a continuation of application Ser. No. 08/461,963, filed Jun. 5, 1995, now abandoned, which is a divisional of application Ser. No. 08/414,130, filed Mar. 30, 1995, now U.S. Pat. No. 5,654,789, which is a continuation of application Ser. No. 08/108,911, filed Aug. 19, 1993, abandoned.

BACKGROUND OF THE INVENTION

1. Field of the Invention

The present invention relates to a camera having a zoom function in which a focal length can be varied or the variation is actuated by a focal length changing member, and in particular to a camera in which a focal length is varied through a motor.

The present invention also relates to a motor driven zoom lens camera having an image magnification selection mode, and also to a camera having a zoom clip mode in which a zoom lens is moved to a predetermined focal length.

2. Description of Related Art

A known zoom lens camera has a zoom ring as a focal length changing member, which can be rotated to vary the focal length. Also known is a camera having an automatic focusing function (AF function) in which an image of an object to be taken is automatically focused. In such a known AF camera having a zooming function, the AF function is performed when a shutter button is depressed halfway and a photometering switch is made ON.

Consequently, in the known camera, if a photographer attempts to change the framing by rotating the zoom ring to vary the focal length and at the same time observes an object through a view finder, unless the shutter button is depressed halfway, no AF function takes place so that a dimmed object image is seen in the view finder.

After effecting automatic focusing by pressing the shutter button halfway, the photographer fully presses the shutter button to actuate a release switch to thereby take a picture. A small or narrow focusing range is set so that a precise focusing can be realized. However, with a particularly small focusing range, if the focusing is carried out during zooming, it can take a long time before a precise focusing operation is completed or alternatively fine focusing adjustments are repeatedly effected so long as no object image is in focus. This can be disquieting to a photographer.

A recently developed and marketed zoom lens camera has a motor driven zoom lens in which the focal length is varied by a zoom motor. With such a camera, an image magnification (image size) of an object to be taken can be easily maintained constant whereas in conventional cameras having no motor-driven zoom function, image magnification has required a high level of photographing technique. To this end, it is necessary to set a desired image magnification in the camera body.

The image magnification referred to is determined based on the object distance and the current focal length. The object distance is determined in accordance with the position of the zoom lens which is moved during the focusing operation. Consequently, the image magnification can be set only after the focusing operation is completed.

As already noted, the focusing operation is carried out when a shutter button is depressed halfway to actuate a photometering switch. Therefore, upon setting an image magnification, it is necessary for a photographer to use one hand to actuate a zoom ring to obtain a desired focal length whilst using the other hand to press the shutter button down by a half step. This results in a troublesome operation.

In the above described camera having a motor driven zoom lens, it is easy to effect a so-called zoom clipping operation in which the zoom motor is automatically moved to a predetermined focal length, for example, by pressing a zoom set button. However, as is known from the conventional AF zoom lens camera, the focusing operation takes place when a shutter button is pressed down halfway to actuate a photometering switch.

Therefore, if a photographer attempts to effect zoom clipping operation while observing an object image through a view finder, the shutter button needs to be pressed to obtain the AF function function. Otherwise, the zoom clipped object image in the view finder is dimmed.

In the above described motor-driven zoom lens camera, it is also easy to effect zooming during exposure (referred to as an in-exposure zooming) so that the focal length is varied in the course of the exposure operation, whereas in conventional cameras having no motor driven zoom function, this has required a high level of photographing technique.

However, the direction of the in-exposure zooming in the known motor driven zoom lens camera is predetermined. Thus, if the zooming direction is predetermined to be for a telephoto direction, in the event that the detected current focal length is at a telephoto extremity, no zooming can be practically effected. Consequently, even if an in-exposure zooming mode has been set, no in-exposure zooming is practically carried out. Thus, there has been a long felt need for solving this problem.

In the known motor driven zoom lens camera for in-exposure zooming, the zooming speed, and the zooming direction, etc., are predetermined on the camera body side so that the in-exposure zooming takes place in accordance with predetermined conditions in the course of an automatic power zooming operation. Thus, a photographer can easily effect in-exposure zooming in accordance with the conditions preset in the camera body. However, if the photographer tries to effect in-exposure zooming in accordance with conditions different from those preset in the camera body, for example with a desired zooming speed or zooming direction, etc., the preset data must be changed in advance, which is troublesome. There has been a long felt need for an improvement.

As already noted, in the known motor driven zoom lens camera for in-exposure zooming, the zooming speed is predetermined in the camera body. Accordingly, for example, if the zooming speed is set high in spite of a low shutter speed, there can be two image cores from the in-exposure zooming, i.e., an image core before the completion of the zooming and an image core after the completion of the zooming. Thus, a defective picture results.

With the in-exposure zooming in known motor driven zoom lens cameras, once the shutter speed is set to the bulb mode (i.e., in an open position), a photographer cannot tell the exposure time, and accordingly, it is impossible to automatically carry out the power zooming, for example, for a time equal to half the exposure time. Namely, once the shutter speed is set to the bulb setting, no in-exposure zooming can be carried out with the conventional camera.

SUMMARY OF THE INVENTION

An object of the present invention is to eliminate the drawbacks mentioned above.

A particular object of the present invention is to provide an easily operable zoom lens camera in which focusing is automatically carried out when the focal length is varied without the necessary activation of a special switch or sensor, etc.

Another particular object of the present invention is to provide a camera having a motor driven zoom function in which the image magnification can be easily set.

Another particular object of the present invention is to provide a camera having a motor driven zoom function in which an in-focus object image can always be obtained even when a zoom clipping operation is effected.

Another particular object of the present invention is to provide a motor driven zoom lens camera in which an in-exposure zooming operation can be carried out regardless of the current focal length.

Another particular object of the present invention is to provide a motor driven zoom lens camera in which the in-exposure zooming operation can be easily carried out by a manual power zooming operation.

Another particular object of the present invention is to provide a motor driven zoom lens camera in which a clear picture having a single image core can be formed in the in-exposure zooming operation.

Another particular object of the present invention is to provide a motor driven zoom lens camera in which the in-exposure zooming operation can be effected even when the shutter speed is set to a bulb setting.

According to one aspect of the present invention there is provided an optical camera comprising:

a zoom lens operable by a focal length changing means for changing a focal length thereof;

an automatic focusing means actuable for effecting a focusing operation of said lens in relation to an object to be taken by the camera;

a viewfinder for viewing an image of said object through said lens;

control means for actuating said focusing operation when said focal length is changed.

In one embodiment, said control means actuates said focusing operation on commencement of changing said focal length.

In another embodiment, said control means actuates said focusing operation during changing said focal length.

In yet another embodiment, said control means actuates said focusing operation when the changing of the focal length of the zoom lens is stopped.

In this case, the camera further comprises:

means for obtaining distance data of said object from the camera;

means for detecting a neutral position of said focal length changing means, wherein said control means actuates the focusing operation when said neutral position is detected; and an image magnification calculation means for calculating a magnification of an object image in accordance with the object distance data and current focal length when the focusing operation is completed.

The camera may further comprise:

means for storing the calculation results of the image magnification calculation means.

In another embodiment of the invention, the camera includes a manually operable shutter button, wherein said focusing operation is actuated in response to an actuation of said shutter button.

Preferably, said control means actuates the focusing operation when said shutter button is actuated within a focusing range which is different from a focusing range of the focusing operation when said focal length is being changed.

Conveniently, said focusing range is smaller when said shutter button is actuated than the focusing range when said focal length is being changed.

It is preferred that the zoom lens comprises a motor driven zoom lens; and that a motor for driving the lens is located in a body portion of the lens.

The focal length changing means may be mounted to an outer peripheral surface of the lens so as to rotate about an optical axis to vary the focal length.

In this case, said focal length changing means comprises a zoom ring and is elastically biased to a neutral position so that when the zoom ring is rotated from the neutral position in a clockwise or counterclockwise direction the focal length is changed.

According to another aspect of the present invention, there is provided an optical camera comprising:

a motor driven zoom lens operable by a focal length changing means for changing the focal length thereof;

an automatic focusing means actuable for effecting a focusing operation of said lens in relation to an object to be taken by the camera;

a viewfinder for viewing an image of said object through said lens;

an actuating member;

control means for actuating the automatic focusing means when said actuating member has been actuated;

means for obtaining distance data of said object from the camera; and an image magnification calculation means for calculating a magnification of said image in accordance with the object distance data and current focal length when the focusing operation is completed.

Conveniently, the camera further comprises means for storing the calculation results of the image magnification means.

The actuating member may be provided on the zoom lens to be pressed down into the zoom lens.

According to another aspect of the present invention there is provided an optical camera comprising:

a motor driven zoom lens operable by a focal length changing means for changing the focal length thereof;

an automatic focusing means actuable for effecting a focusing operation of said lens in relation to an object to be taken by the camera;

a viewfinder for viewing an image of said object through said lens;

an actuating member; and control means for actuating said focusing operation when said member has been actuated; and wherein actuation of said member moves the zoom lens to a determined position.

Preferably, said focusing operation is commenced when the determined position is attained.

The camera further comprises means for storing a focal length corresponding to said determined position.

The store means can electronically store the determined position or mechanically store the determined position.

Conveniently, said determined position corresponds to a position on a display of the camera.

The actuating member may be provided on the zoom lens to be pressed down into the zoom lens.

It is preferred that said control means actuates the storing means to store a current focal length when the actuating member is pressed down in a set mode, and said control means moves the zoom lens to the stored focal length and commences the focusing operation when the actuating member is pressed down in an operation mode.

The control means can be mounted in the zoom lens; and the zoom lens can be detachably mounted to a body of the camera.

According to another aspect of the present invention there is provided a method of conducting a focusing operation in a camera, comprising the steps of:

a) conducting a searching operation to obtain an effective defocus value;

b) checking a focus state of the image; and c) expanding a focusing range and causing step a) to be skipped during a focusing operation when a predetermined member, other than a shutter button, is actuated.

According to another aspect of the present invention there is provided a method of providing an image magnification mode in a camera, comprising the steps of:

focusing a lens to produce an image of an object to be taken; and calculating a magnification of the image in accordance with a detected object distance and current focal length of the lens when focusing is completed.

According to another aspect of the present invention there is provided a camera comprising:

a motor driven zoom lens operable by a focal length changing means to effect power zooming;

means for detecting a current zoom lens focal length;

means for defining a zoom direction, the motor driven zoom lens on the basis of the currently detected zoom lens focal length; and in-exposure zoom control means for controlling zooming movement of the lens during an exposure operation in accordance with said defined zoom direction.

Preferably, the camera further comprises means for detecting a wide-angle extremity focal length and a telephoto extremity focal length of the lens.

In one case, said defined zoom direction is toward the wide-angle extremity when the detected current focal length corresponds to the telephoto extremity focal length and toward the telephoto extremity when the detected current focal length corresponds to the wide-angle extremity focal length.

In another case, said zoom direction defining means defines said zoom direction on the basis of differences between said current detected focal length and, respectively, the wide-angle extremity focal length and the telephoto extremity focal length.

Conveniently, said zoom direction defining means defines said zoom direction toward the telephoto or wide-angle extremity according to which gives a larger difference between said current focal length and the focal length at the wide-angle extremity or the telephoto extremity.

The defined zoom direction may be toward the telephoto extremity when the current focal length is between the wide-angle extremity and the telephoto extremity.

According to another aspect of the present invention there is provided a camera comprising:

a motor driven zoom lens operable by a focal length changing means to effect power zooming;

means for detecting a current zoom lens focal length;

means for detecting a current shutter speed;

means for detecting a zooming direction of an in-exposure zoom operation; and an in-exposure zoom control means for driving the lens to effect zooming during an exposure operation at a zooming speed determined on the basis of the current focal length, shutter speed and zooming direction.

It is preferred that said in-exposure zoom control means determines the zooming speed so that zooming is not completed prior to the expiration of an exposure time of the exposure operation.

In this case, the lens can be motor driven at different zooming speed values so that an optimum determined zooming speed can be selected from among the different zooming speeds.

According to another aspect of the present invention there is provided a camera comprising:

a motor driven zoom lens operable by a focal length changing means to effect power zooming;

an in-exposure zoom control means for driving the lens to effect zooming during an exposure operation; wherein during a shutter release, automatic power zooming is carried out when one of the focal length changing means is not operated or a manual power zooming is carried out when the focal length changing means is operated.

According to another aspect of the present invention there is provided a camera comprising:

a motor driven zoom lens operable by a focal length changing means to effect power zooming;

an in-exposure zoom control means for driving the lens to effect zooming during an exposure operation, wherein said in-exposure zoom control means carries out a manual power zooming for a predetermined time in a former half or latter half of an exposure time when the focal length changing means is actuated upon effecting in-exposure zooming.

Preferably, said predetermined time corresponds to one-half of the set exposure time.

According to another aspect of the present invention there is provided a camera comprising:

a motor driven zoom lens operable by a focal length changing means to effect power zooming;

an in-exposure zoom control means for driving the lens to effect zooming during an exposure operation; and, a bulb setting means for setting a shutter speed in a bulb state;

wherein said in-exposure zoom control means permits manual power zooming by the focal length changing means during an exposure operation in the bulb state.

It is preferred that said focal length changing means is mounted to an outer peripheral surface of the lens so as to rotate about an optical axis so that the zooming direction for manual power zooming is determined in accordance with the direction of rotation of the focal length changing means from a neutral position.

In this case, the zooming speed for manual power zooming is determined in accordance with the angular displacement of the focal length changing means from a neutral position.

The zoom lens may be detachably mounted to a body of the camera; and a motor for driving the zoom lens may be located in a body portion of the lens.

The present disclosure relates to subject matter contained in Japanese patent application Nos. HEI 04-306169, HEI 4-306170, HEI 4-306171, HEI 4-306172, HEI 4-306173, HEI 4-306174, HEI 4-306175, HEI 4-306176, HEI 4-306177 and HEI 4-306178 (all filed on Oct. 19, 1992) which are expressly incorporated herein by reference in its entirety.

BRIEF DESCRIPTION OF THE DRAWINGS

Examples of the present invention will now be described with reference to the accompanying drawings, in which.

DESCRIPTION OF THE PREFERRED EMBODIMENTS

Figure 1:
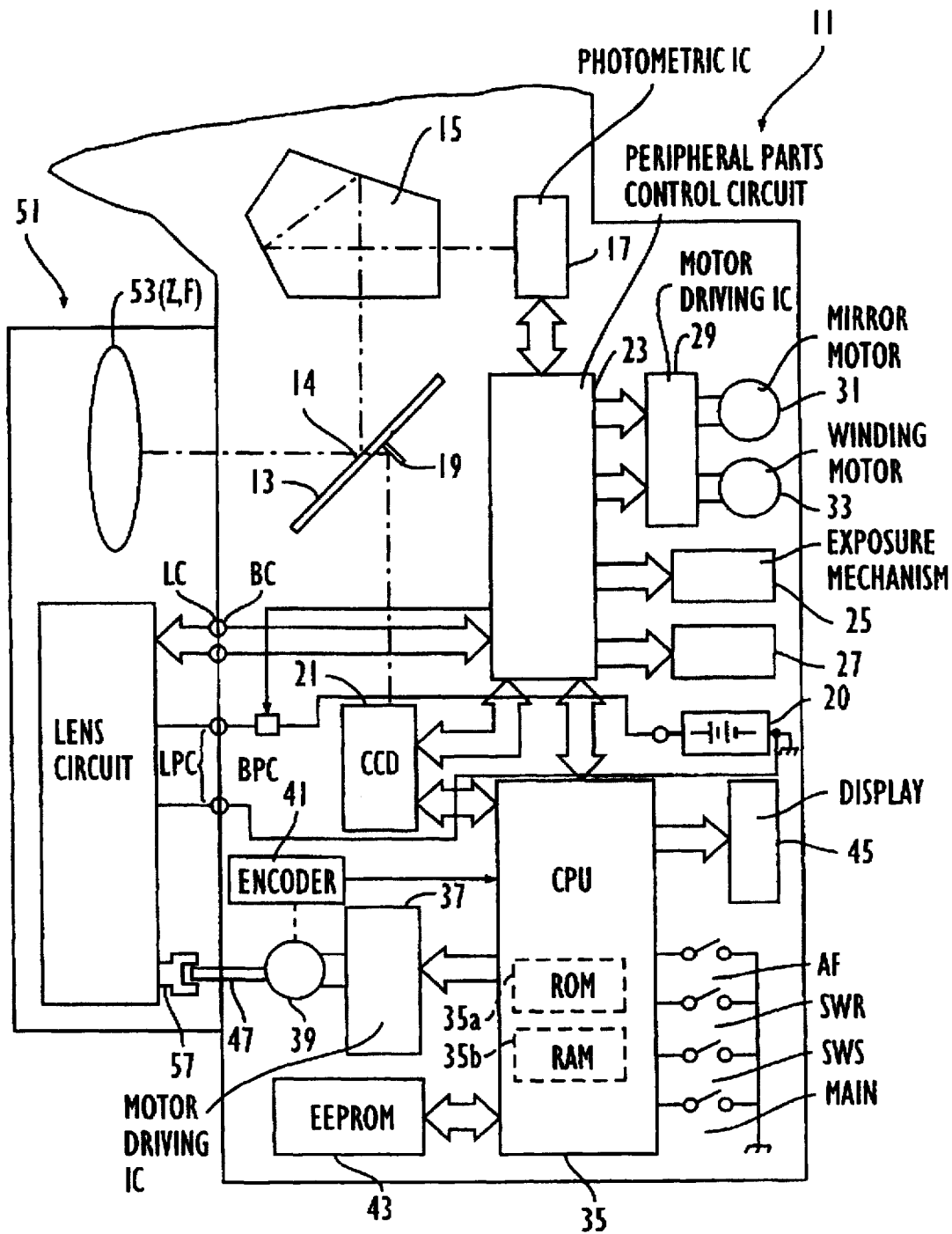
FIG. 1 is a block diagram showing an outline of one embodiment of a body of a single lens reflex camera to which the invention is applied.
Figure 2:
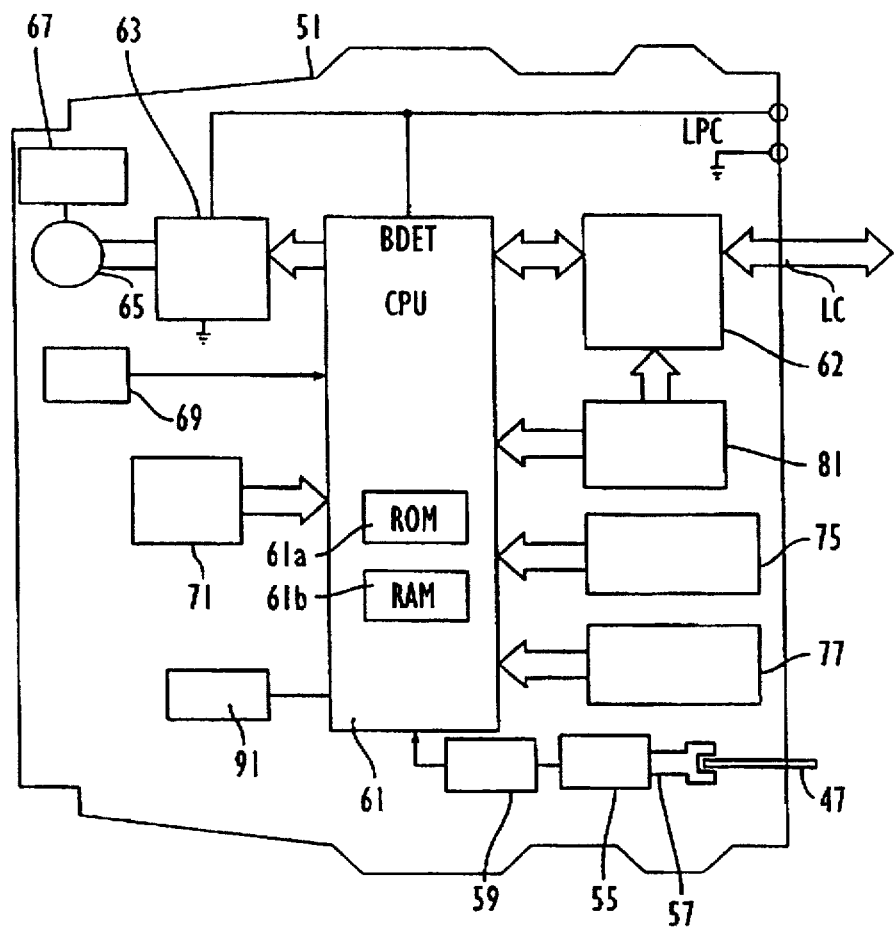
FIG. 2 is a block diagram showing an outline of one embodiment of a powered zoom lens for a single lens reflex camera to which the invention is applied.
Figure 3:
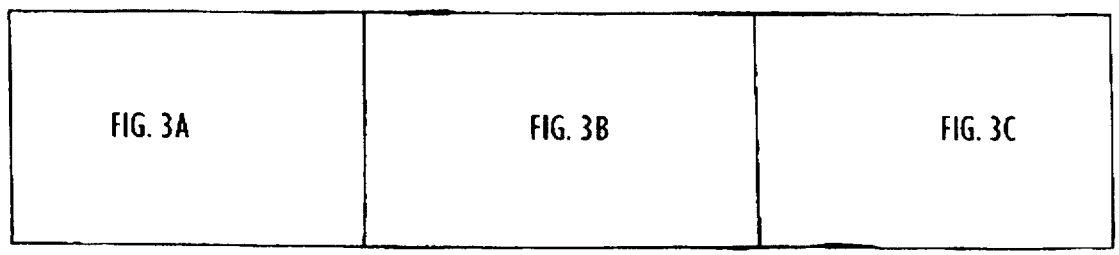
FIG. 3 is a block diagram illustrating one embodiment of a circuit construction for the powered zoom lens.
Figure 3A:
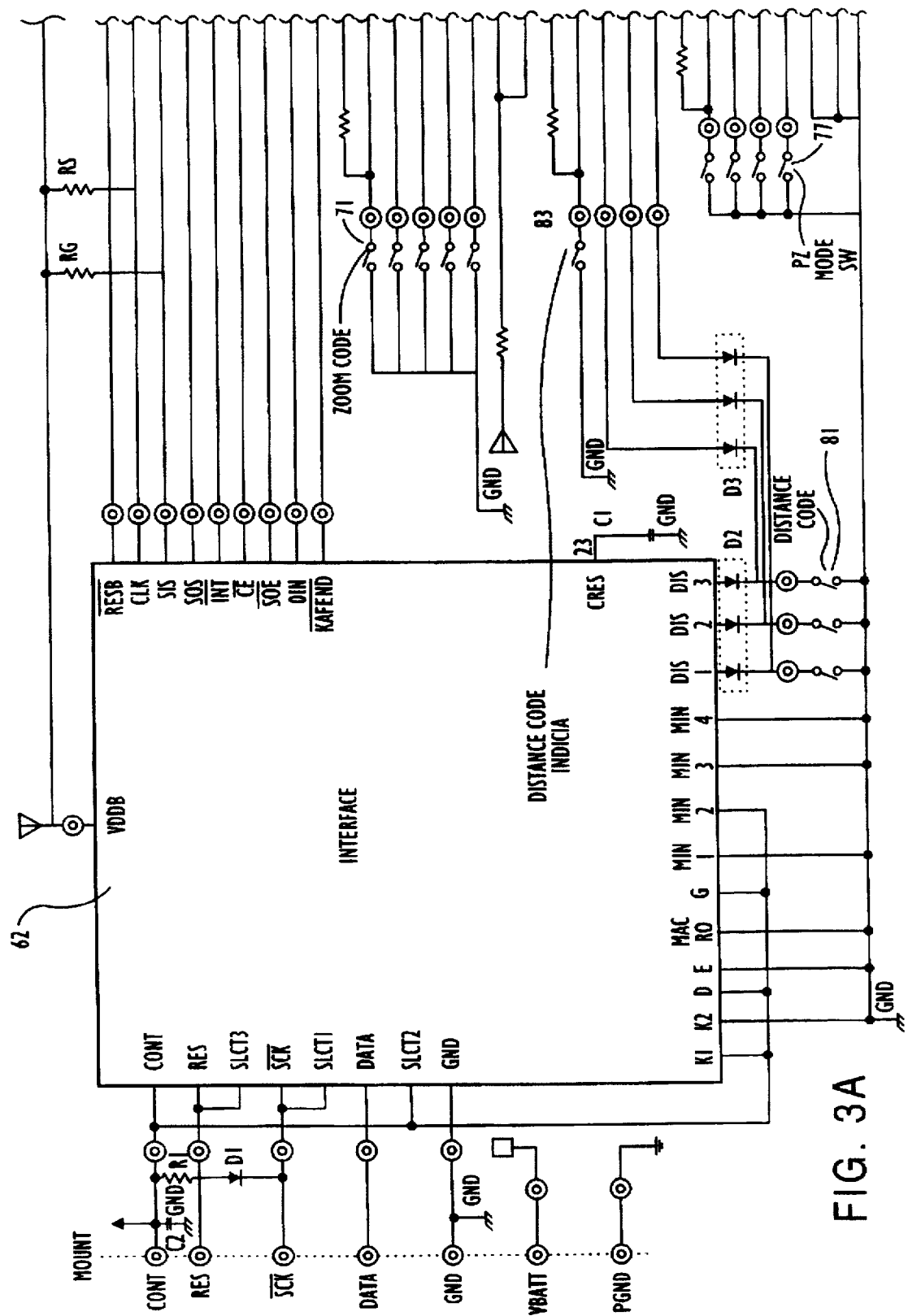
Figure 3B:
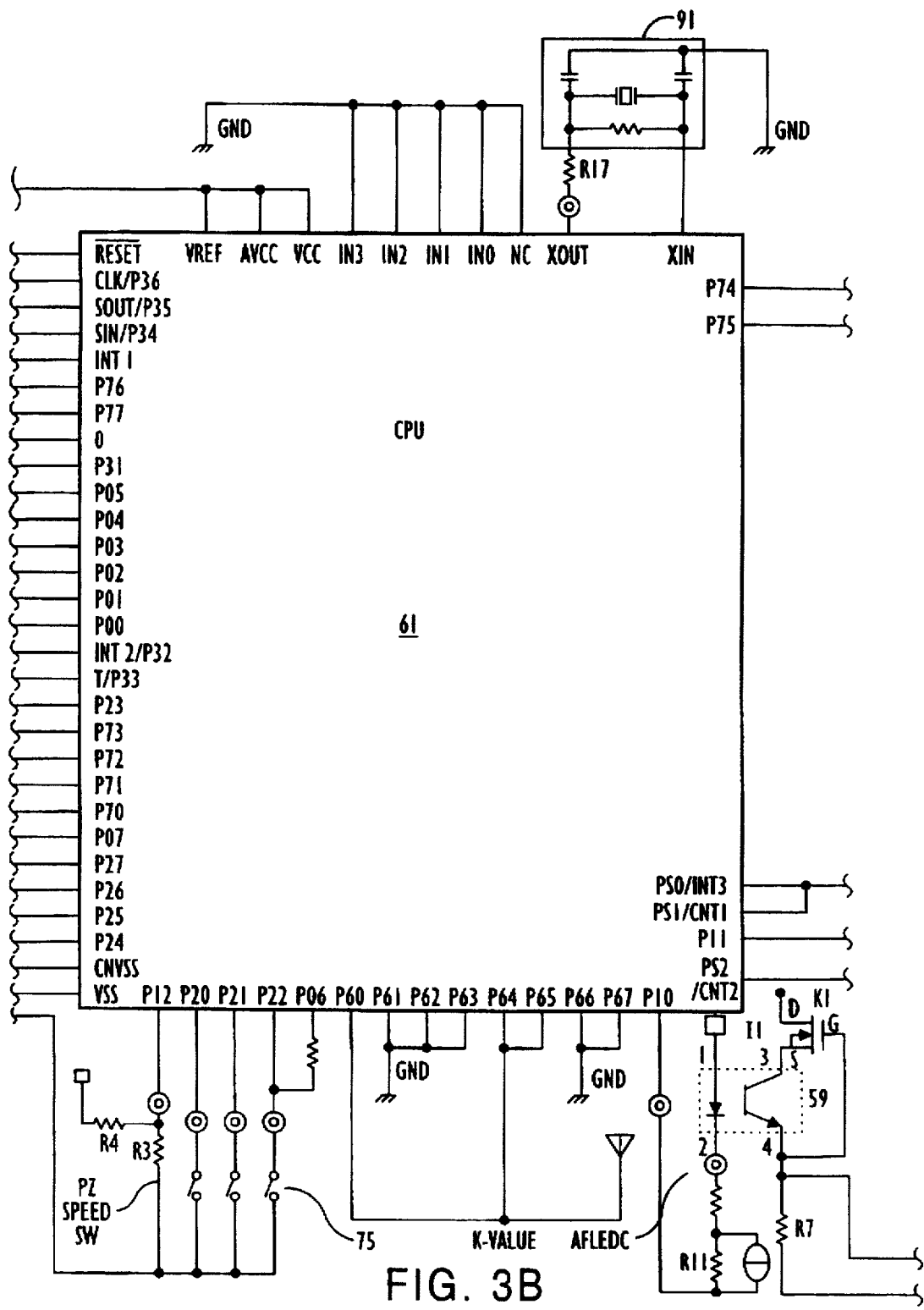
Figure 3C:
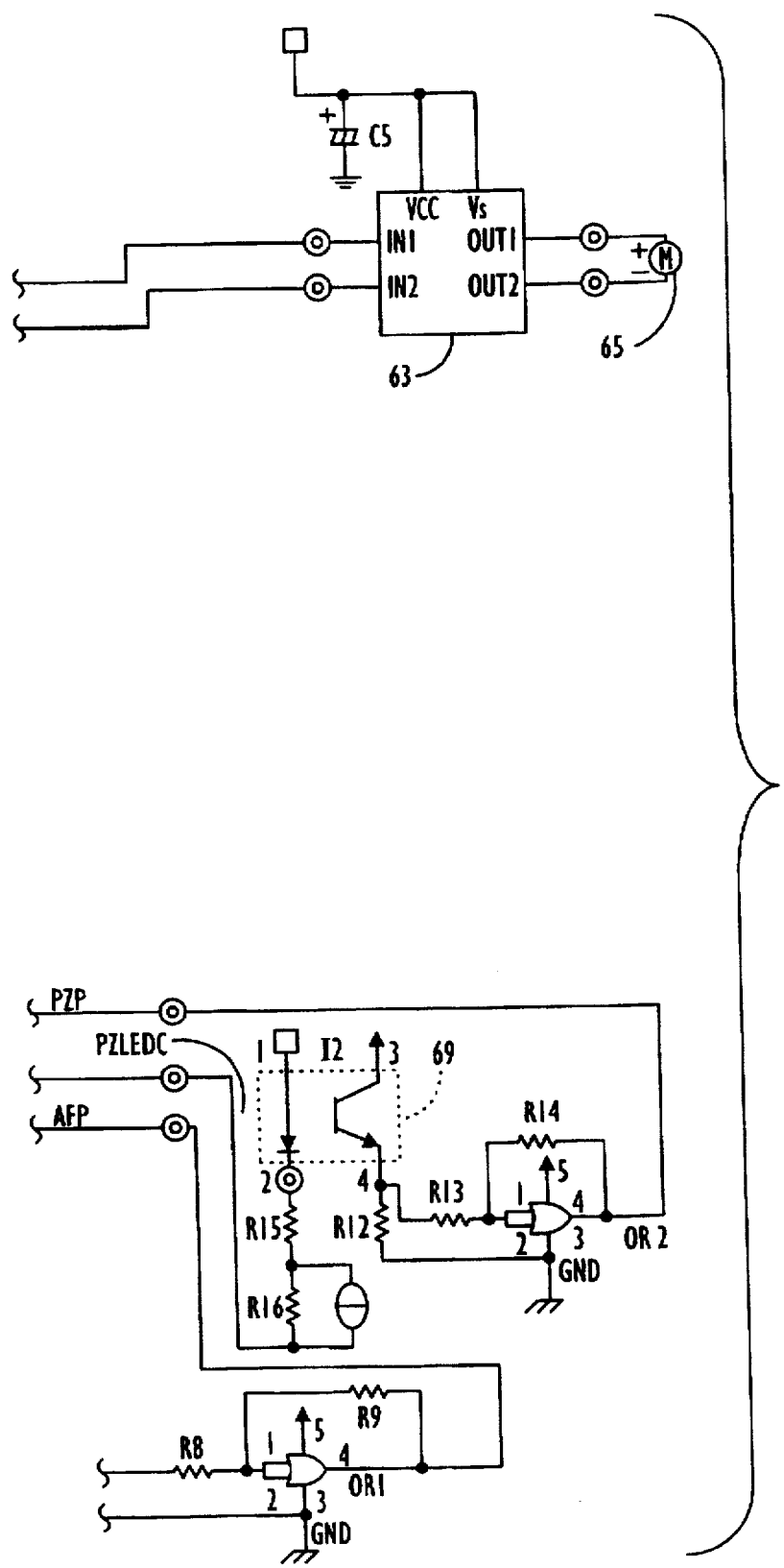

The invention will be explained below with reference to several embodiments illustrated in the drawings. In the drawings, FIG. 1 is a block diagram illustrating a main construction of a body portion of an autofocus (AF) single lens reflex camera to which the invention is applied. FIG. 2 is a block diagram illustrating a main construction of a powered zoom lens to which the invention is applied. FIG. 3 is a block diagram of the powered zoom lens circuitry to which the invention is applied.

The AF single lens reflex camera includes a camera body 11, and a photographing lens (powered zoom lens) 51 releasably attached to the camera body 11. Most of the luminous flux of an object to be taken (object flux) incident on the camera body 11 from a zooming optical system 53 of the photographing lens 51 is reflected by a main mirror 13 onto a pentaprism 15 constituting a finder optical system, and then a portion of the reflected light beam is directed to a light receiving element (not shown) of a photometric IC 17. A portion of the object flux, having been directed to the camera body 11 and made incident upon half mirrors 13 and 14, passes through the half mirrors and is reflected downwardly by a sub-mirror 19 to be directed onto a macrometric CCD sensor unit 21.

The photometric IC 17 includes a light receiving element for receiving the object flux. An electric signal generated by the light receiving element in accordance with the amount of light input into the light receiving element is subject to logarithmic compression and A/D conversion and is then outputted as a digital photometric signal to a main (body) CPU 35. The main CPU 35 performs a predetermined operation on the basis of information, including the photometric signal and film speed, so as to calculate an appropriate shutter speed and diaphragm value for exposure. An exposure mechanism (shutter mechanism) 25 and a diaphragm mechanism 27 are driven on the basis of the shutter speed and diaphragm value.

Macrometric CCD sensor unit 21 comprises a macrometric sensor of a conventional phase difference type (not shown). The sensor unit 21 includes a split optical system for splitting the object flux in half, and a CCD line sensor for receiving both of the split object flux so as to integrate them (i.e., storing photoelectric transfer and charges thereof). The macrometric CCD sensor unit 21 outputs the data integrated by the CCD line sensor to the main CPU 35. The macrometric CCD sensor unit 21 is driven by a control circuit for peripheral parts 23. The macrometric CCD sensor unit 21 includes a monitor element. The peripheral parts control circuit 23 detects luminance of the object (object luminance) through the monitor element, so as to change integration time, based on the detected results.

Peripheral parts control circuit 23 performs a predetermined exposure operation on the basis of the digital photometric signal and film speed information so as to calculate an appropriate shutter speed and diaphragm value for the exposure operation. The exposure mechanism (shutter mechanism) 25 and diaphragm mechanism 27 are driven on the basis of the shutter speed and diaphragm value so as to perform the exposure operation. The peripheral parts control circuit 23, upon release, drives a mirror motor 31 by means of a motor drive circuit (motor drive IC) 29 so as to perform an up/down operation of the main mirror 13, and then drives a winding motor 33 so as to wind a film after completion of exposure operation.

Main CPU 35 communicates with a lens CPU 61 so as to transmit data, command, etc. through a connection with the peripheral parts control circuit 23, a group of electric contacts BC mounted on the mount surface of the camera body, and a group of electric contacts LC mounted on the surface of the powered zoom lens 51. Main CPU 35 calculates a defocus amount by performing a predetermined operation (predictor operation) on the basis of the integrated data outputted from the macrometric CCD sensor unit 21, and calculates rotational direction and rotational speed (i.e., pulse number of an encoder 41) of an AF motor 39. The main CPU 35 drives the AF motor 39 by means of an AF motor drive circuit 37 on the basis of the above rotational direction and pulse number.

Main CPU 35 counts pulses outputted from the encoder 41 in accordance with rotation of the AF motor 39. When the count value reaches the above pulse number, the main CPU 35 stops the AF motor 39. The main CPU 35 quickly accelerates the AF motor 39 upon initial actuation thereof. Thereafter, the main CPU 35 activates a DC drive mode to decelerate the motor 39 so as to stop the AF motor 39 when it arrives at a target position. The main CPU 35 is capable of controlling the AF motor 39 at a constant speed in accordance with the time between pulses outputted from the encoder 41. Rotational movement of the AF motor 39 is transmitted to an AF drive mechanism 55 of the photographing lens 51 through a connection between an AF joint 47 mounted on the camera body 11 and an AF joint 57 mounted on the photographing lens 51. A group of focusing lenses 53F is driven by the AF drive mechanism 55.

Main CPU 35 has incorporated therein a ROM 35a for storing a program therein and a RAM 35b for storing predetermined data therein. An E²PROM 43 is connected to the main CPU 35 as an external memory means. The E²PROM 43 stores various functions and constants necessary for the operation or calculation of AF (autofocus) and PZ (power zoom), in addition to various constants inherent to the camera body 11.

Also connected to the main CPU 35 are photometric switch SWS, which is turned ON upon half-depression of a release button (not shown), and a release switch SWR, which is turned ON upon full-depression of the release button, an autofocus switch SWAF, a main switch SWM, which turns the electric supply to the main CPU 35 and peripheral equipment ON/OFF, and an up-down switch SWUP/DOWN. The set modes, such as AF mode, exposure mode and photographing mode, and exposure data, such as shutterspeed and diaphragm value, are displayed on a display device 45 by means of the main CPU 35. Usually, the display device 45 is provided at two points, i.e., at points on the outer surface of the camera body 11 and in the field of view of a finder.

A pair of electric pins BPC are provided for supplying electricity, obtained from a battery 20, to the photographing lens are provided adjacent to the mount of the camera body 11. A pair of electric pins LPC, which are electrically connected with the electric pins BPC upon mounting, is also provided on the powered zoom lens 51.

Powered zoom lens 51 includes, as a photographing optical system, the zooming optical system 53 which has the group of focusing lenses 53F and a group of zooming lenses 53Z.

The group of focusing lenses 53F is driven by the AF mechanism 55. The driving force of the AF motor 39 is transmitted to the AF mechanism 55 through the AF joints 57 and 47. AF pulses outputted from an AF pulser 59 in accordance with the rotation of the AF mechanism 55 are counted and measured by the lens CPU 61. The lens CPU 61 includes an AF pulse hardware counter for counting the AF pulses.

The group of zooming lenses 53Z is driven by a PZ (power zooming) mechanism 67. A zoom motor 65 for driving the PZ mechanism 67 is controlled by the lens CPU 61 via a motor drive IC 63. The amount of displacement of the group of zooming lenses 53Z is counted and measured by the lens CPU 61, which counts PZ pulses outputted from a PZ pulser 69 in accordance with the rotational movement of the zoom motor 65.

Pulsers 59 and 69 include a rotatable disk which has a plurality of slits extending in the radial direction thereof and spaced in the circumferential direction in an equidistant manner, for example. The pulsers 59 and 69 further include LEDs and photodiodes (photo-interrupter), each disposed at opposite sides of each of the slits. The rotatable disk of each of the pulsers 59 and 69 rotates sequentially with the rotation of the AF mechanism 55 and PZ mechanism 67. The LED of each of the pulsers 59 and 69 is controlled by the lens CPU 61 to be turned ON/OFF and the output (pulse) of the photodiode is input in the lens CPU 61.

Figure 4:
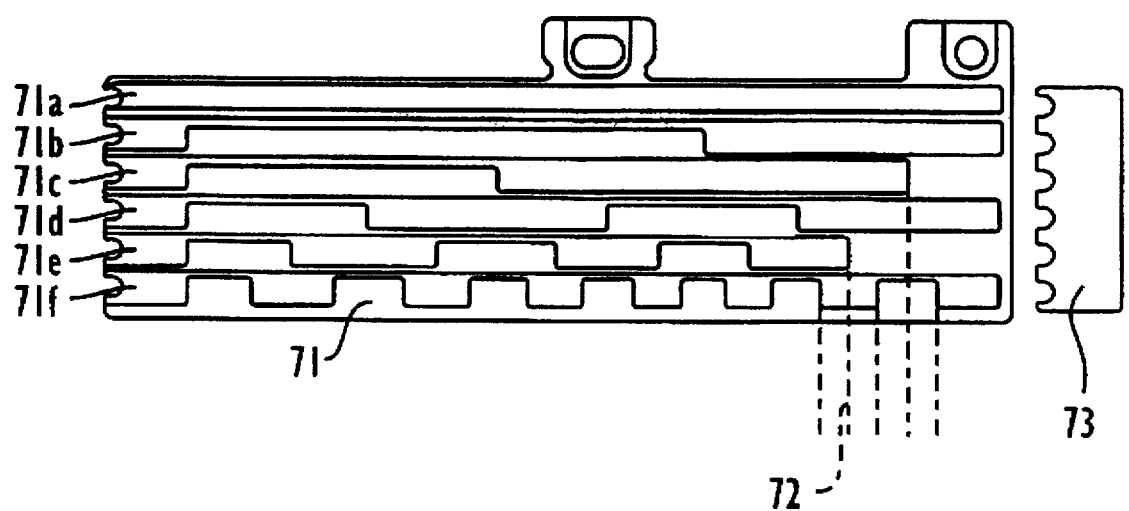
FIG. 4 is a developed plan view of a zoom code plate of the powered zoom lens.
Figure 5:
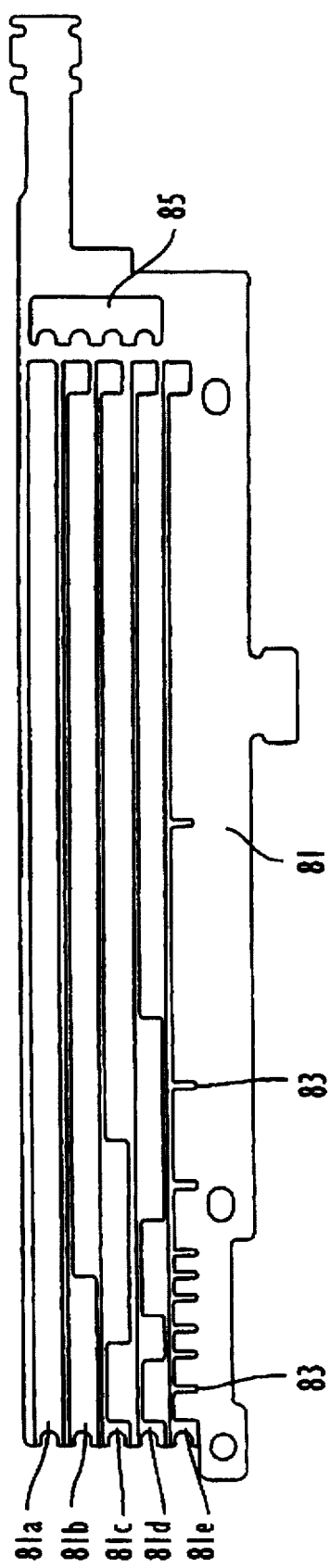
FIG. 5 is a developed plan view of a focal length code plate of the powered zoom lens.

The absolute position of the group of zooming lenses 53Z (i.e., focal length) and the absolute position of the group of focusing lenses 53F (i.e., object distance to be focused upon) are detected by a zoom code plate 71 and distance code plate 81, respectively. FIGS. 4 and 5 illustrate expanded views of the code plates 71 and 81, respectively. Brushes 73 and 85 slidably engage with an array of codes 71a–71f of the code plate 71 and an array of codes 81a–81e of the code plate 81, respectively.

Code 71a and code 81a of the code plates 71 and 81, respectively, are grounded. The plurality of codes 71b–71f and 81b–81e are connected to an input port of the lens CPU 61. The total range of displacement of the group of zooming lenses 53Z is divided by the zoom code plate 71 into 26 segments. Each of the segments is distinguished by absolute positional (i.e., focal length) information with 5 bits. The total range of displacement of the group of focusing lenses 53F is divided by the distance code plate 81 into 8 segments. Each segment is distinguished by absolute position (i.e., distance of object) information with 3 bits. The relative position in each divided segment is detected by counting pulse number outputted from the pulsers 69 and 59. Indicia 83 of the array of codes 81e of the distance code plate 81 are provided to detect a central position of each of the segments. A boundary position 72 of each segment of the code plate 71 and the indicia 83 of the code plate 81 are used as a critical position at which point a count value of each of the pulsers is corrected.

Powered zoom lens 51 includes, as actuation switches, a switch 75 for changing zoom speed, and a switch 77 for changing zoom mode. The zoom speed changing switch 75 includes a switch (the detail of which is not shown) which controls, in the powered zooming mode, tele-direction zooming and wide-direction zooming, and three zoom speed modes in each of the zooming directions. The zoom mode changing switch 77 includes a switch for changing between powered zooming and manual driven zooming (D/M), PA switch for changing between a manual powered zooming mode and a plurality of powered zooming modes performed under a constant control, and SL switch for storing actual focal length or the like during controlled, powered zooming mode (i.e., powered zooming mode under constant image magnification). Although not specifically shown in the drawings, the zoom speed changing switch 75 will be actuated sequentially with a zoom operating ring which is inserted into a lens barrel for rotation and displacement in the optical axis direction, and which is normally urged toward a neutral position with respect to the rotational direction. The zoom operating ring also includes a mechanism for mechanically changing between powered zooming and manual zooming.

The contacts of each of the above zoom speed changing switch 75 and zoom mode changing switch 77 are connected to the lens CPU 61. The lens CPU performs a control operation with respect to the powered zooming in response to actuation of the switches.

Lens CPU 61 is connected with the main CPU 35 through an interface 62, communication contacts LC and BC, and the peripheral parts control circuit 23 of the camera body, so as to perform bi-directional communication with the main CPU 35 of predetermined data. The data to be transmitted from the lens CPU 61 to the main CPU 35 includes, open diaphragm value AVMIN, maximum diaphragm value AVMAX, minimum and maximum focal length, actual focal length, actual distance of an object, K-value information, as well as, AF pulse number, PZ pulse number etc. "K-value" is intended to be pulse number data of the encoder 41 (AF pulser 59) necessary to displace the image surface, imaged by the zooming optical system 53, by a unit length (for example, 1 mm).

FIG. 3 is a block diagram illustrating the circuit of the powered zoom lens 51 in more detail. The group of electric contacts LC includes 5 terminals, i.e., CONT terminal connected to the interface 62, RES terminal, ¯SCK terminal, DATA terminal and GND terminal. Through the CONT terminal and GND terminal, a voltage necessary for the actuation of the lens CPU 61 is supplied from the camera body 11, and through the remaining terminals, i.e., RES terminal, ¯SCK terminal and DATA terminal, communication is performed. In principle, RES terminal is assigned to a reset signal, ¯SCK terminal to a clock, and DATA terminal to data communication such as predetermined information and commands. In this specification, the sign "¯" represents a top bar. It is noted that any elements which are denoted with this prefix correspond to an active-low or reversed signal. The electricity pin LPC includes a VBATT terminal and PGND terminal. Electric power necessary to drive the zoom motor 65 is supplied from the battery 20 in the camera body 11 through the VBATT and PGND terminals. The supply of electricity is controlled by the CPU 35 by means of the peripheral parts control circuit 23. In the drawings, reference numeral 91 designates a clock generation circuit. The VBATT terminal is connected both with the motor drive IC 63 and the port P12 of the lens CPU 61, which is for monitoring voltage, through a register R4.

MAIN OPERATION OF THE LENS CPU

Figure 6:
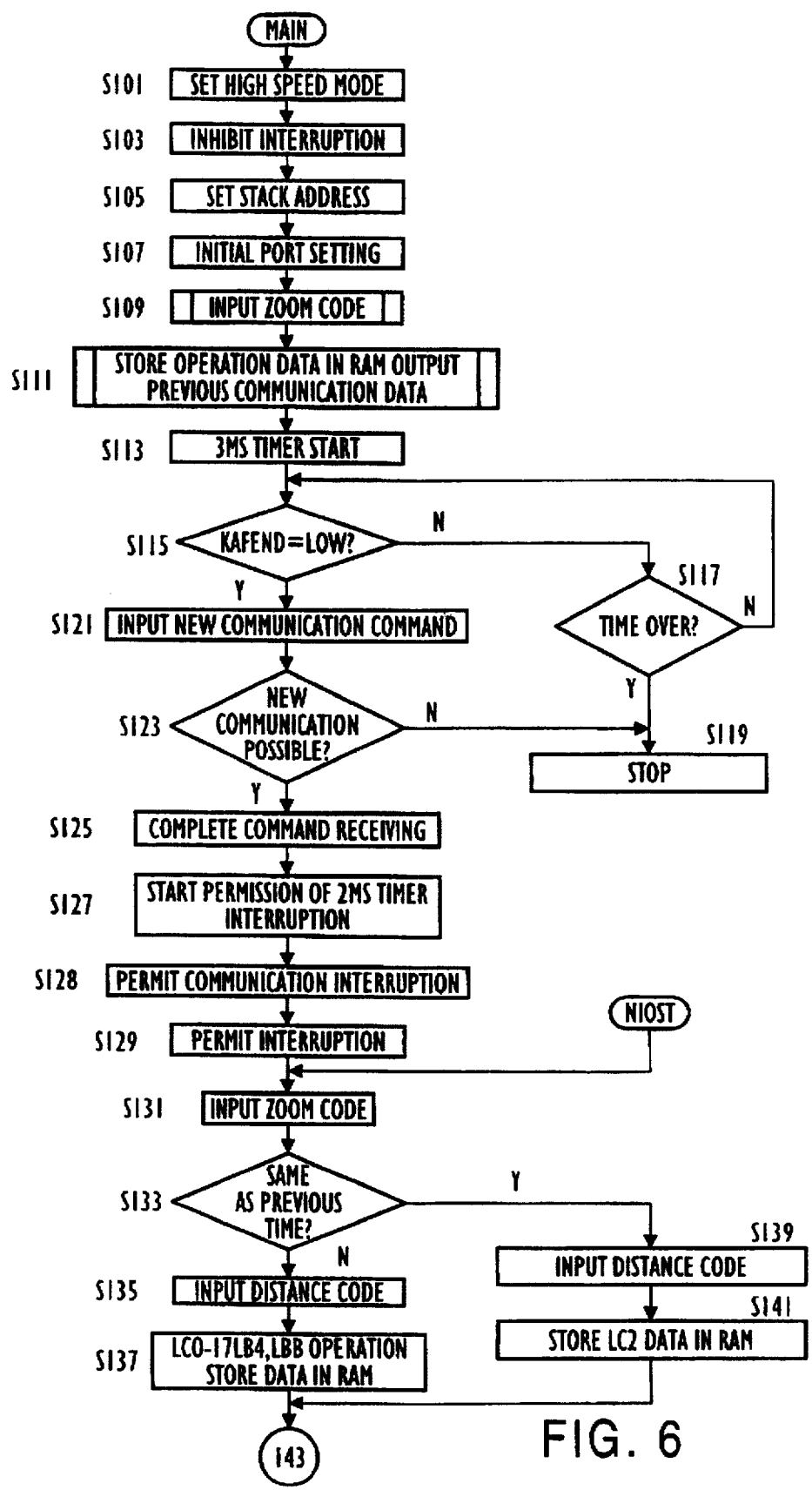
FIGS. 6 and 7 are a main flow chart of a lens CPU.
Figure 7:
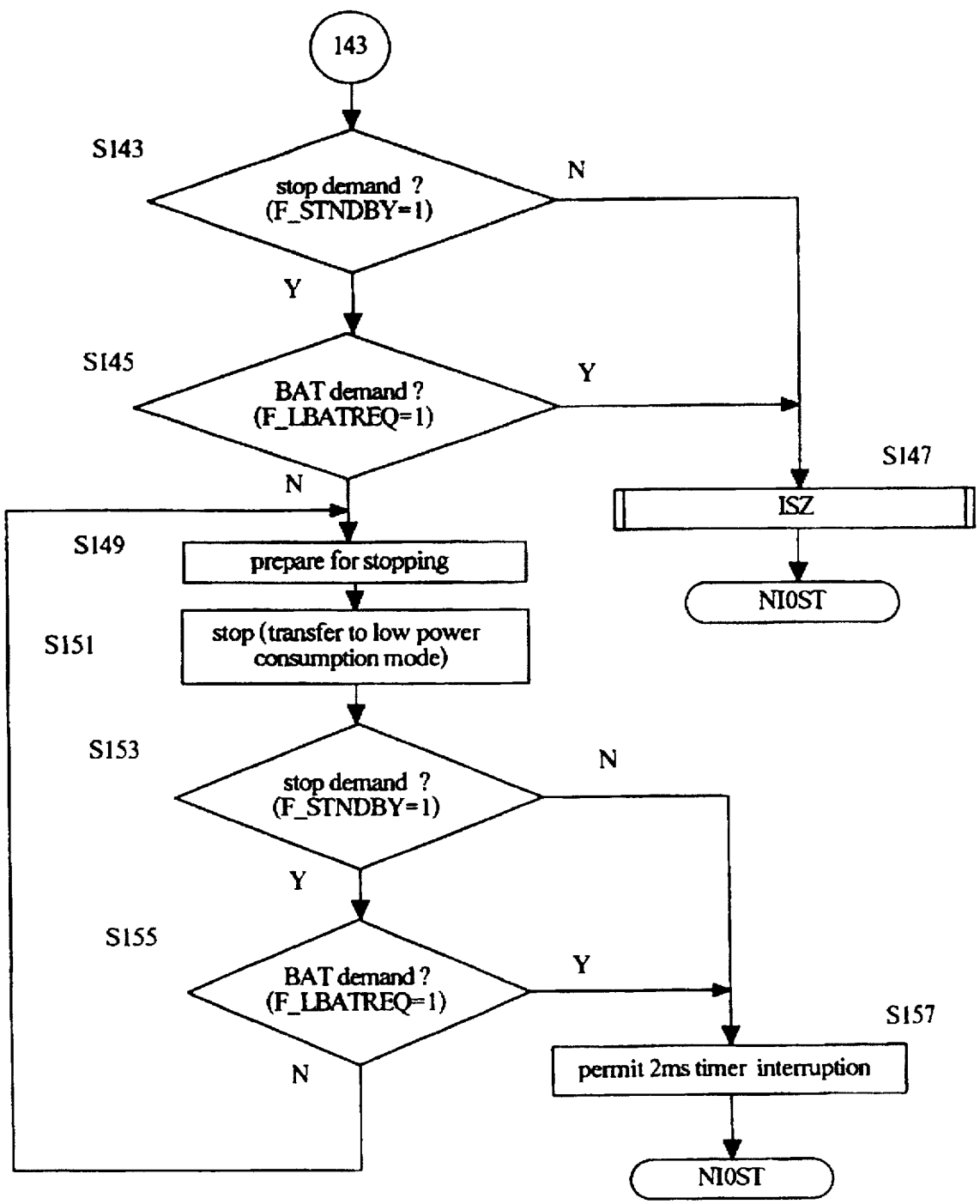

The main operation of the lens CPU 61 will be explained below with reference to FIGS. 6 and 7. Instruction commands are shown in Tables 1 and 2. Commands(data) utilized to transmit various camera body data from the camera body to the lens are shown in Table 3. Commands utilized to transmit various lens data from the lens to the camera body are shown in Table 4. A memory map of RAM 61b of the lens CPU 61 is shown in Tables 5 to 11.

Flags which are used in the description of the embodiments are shown in Tables 12 to 15.

In the main routine, the lens CPU 61 first sets a high-speed actuation mode (Step (hereinafter referred to as "S") 101). The lens CPU 61 performs an inhibition of interruption operation, sets stack address, and initializes the port P, and then inputs the present absolute zoom code from the zoom code plate 71 (S103–S109). Then, the data calculated based on the zoom code is stored in the RAM 61b, and a group of data (LC0–LC15 in Table 5) stored in the RAM 61b, by means of communication (former communication) in accordance with a clock signal of the camera body 11, is transmitted to the camera body (S111). After completion of communication, a 3-ms timer is started (S113).

When the former communication has been completed, KAFEND signal ("L" level) will be outputted from the interface 62 before 3 ms has passed in accordance with the 3 ms timer. However, if the former communication completion signal (KAFEND signal) is not outputted before 3 ms has passed in accordance with the 3 ms timer, a stop operation (stopping of clock 91) is performed to break the main routine (S115, S117, S119). When the KAFEND signal is outputted before 3 ms has passed, the operation has been performed in a normal manner. Accordingly, a command will now be received from the camera body 11 by means of communication. If the command received is not a new communication command, identifying the camera as one which is suitable for new communication, a stop operation is performed to prevent mis-communication with a camera body which is unsuitable for the new communication (S121, S123, S119). The "new communication" is defined in this specification as a state in which a bi-directional communication of commands and data is possible between the camera body and photographing lens in synchronization with the clock of the photographing lens.

When the new communication command is received, a command receipt completion signal is outputted to the camera body so as to start permission of a 2 ms timer interruption, to permit interruption of new communication, and to permit other possible interruptions (S123, S125, S127, S128, S129). Accordingly, an interruption operation of the 2 ms timer and interruption of new communication is made possible. The above operations are all initially performed when the main switch of the camera body 11 is turned on and electricity is supplied from the camera body 11. While the main switch is on, the following operations will be repeated.

A zoom code is inputted from the zoom code plate 71 (S131). If the zoom code is different from the previous one, distance code data is inputted and lens code data LC2, cluding the distance code data, is stored in RAM 61b (see FIG. 6. Then, an operation (or calculation) is performed on the basis of the data of zoom code, so as to store the calculated data in the lens RAM 61b as LC0–17 and LB4, LBB data (S133, S135, S137). If the zoom code is the same as previous one, distance code data is inputted from the camera body 11 and lens code data (LC2), including the distance code data, is stored in the lens RAM 61b at a predetermined address (S133, S139, S141).

It is then determined whether there was a stop demand during communication interruption from the camera body (i.e., whether or not flag F_STANDBY is set), or whether there was an electricity demand during interruption of the 2 ms timer (i.e., whether or not flag F_LBATREQ is set). When there is no stop demand, or when there is electricity demand, constant image magnification operation (ISZ) is performed, followed by NIOST operation (i.e., the process is returned to step S131 of the main routine so as to repeat the above operation). The above corresponds to steps S143, S145 and S147. It is to be noted that "electricity demand" is a demand which asks the camera body 11 (body CPU) to supply the powered zoom lens 51 with electricity from the battery 20 in order to drive the zoom motor 65 via electric source pins BPC and LPC.

When a stop demand exists and a battery or electricity demand does not exist, a stop operation is performed after making preparation for stopping (i.e., preparation for inhibition of the 2 ms timer interruption and cancellation of stop). The above corresponds to steps S143, S145, S149 and S151. The lens CPU 61 stops the clock 91 to enter a low power consumption mode (standby). The stopped state (low power consumption mode) can only be cancelled by, for example, communication interruption from the camera body, and the process returns to normal operation (clock 91 operation). When returning to the normal operation, the process returns to step S153 after completion of the communication interruption routine. When the stop demand is cancelled or electricity demand is generated in the communication interruption, the process returns to S131 after permitting the 2 ms timer interruption and starting the 2 ms timer. Otherwise, the process returns to step S149 to again enter the stop condition or the low power mode (S153, S155, S157).

INIT Operation

Figure 8:
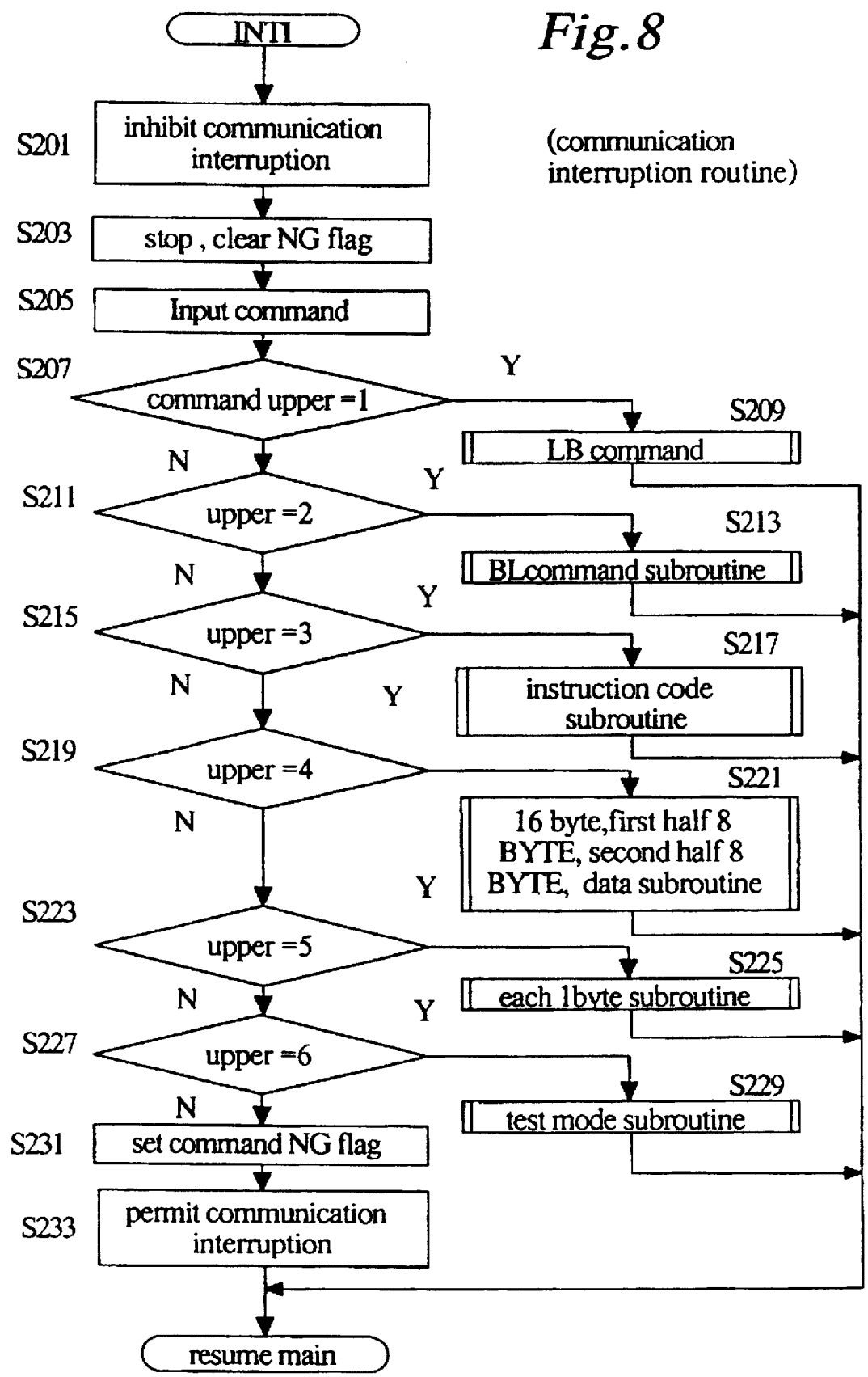
FIG. 8 is a flow chart regarding communication interruption routine of the lens CPU.

The communication interruption operation, shown in FIG. 8, is performed by the lens CPU 61 and will be explained below. An INTI operation is an operation to conduct communication interruption in which an operation is performed on the basis of the commands and data, etc. received during communication. This operation commences when the interruption signal output from interface 62 is inputted to the port INT1 of the lens CPU 61.

When the process enters the communication interruption, the communication interruption is inhibited and command is inputted from the camera body 11 after clearing stop flag (F_STNDBY) and NG flag (F_SCKNG, F_CMDNG) in steps S201, S203 and S205. The process checks the upper 4 bits of the command as inputted and proceeds to an appropriate subroutine depending on the upper bits (S207 and S229). In each of the subroutines, an appropriate operation is performed depending on the lower bits. In the illustrated embodiment, subroutines making identification from the upper 4 bits include a BL command subroutine, instruction code subroutine, a 16-byte (first half 8-byte data/second half 8-byte) data subroutine, byte by byte data subroutine, and a test mode subroutine (S209, S213, S217, S221, S225 and S229).

If the above 4 bits are not those set out above, the process sets command NG flag F_CMDNG and returns to the main routine after permitting communication interruption (S227, S231 and S233).

2 ms Timer Interruption Operation

Figure 9:
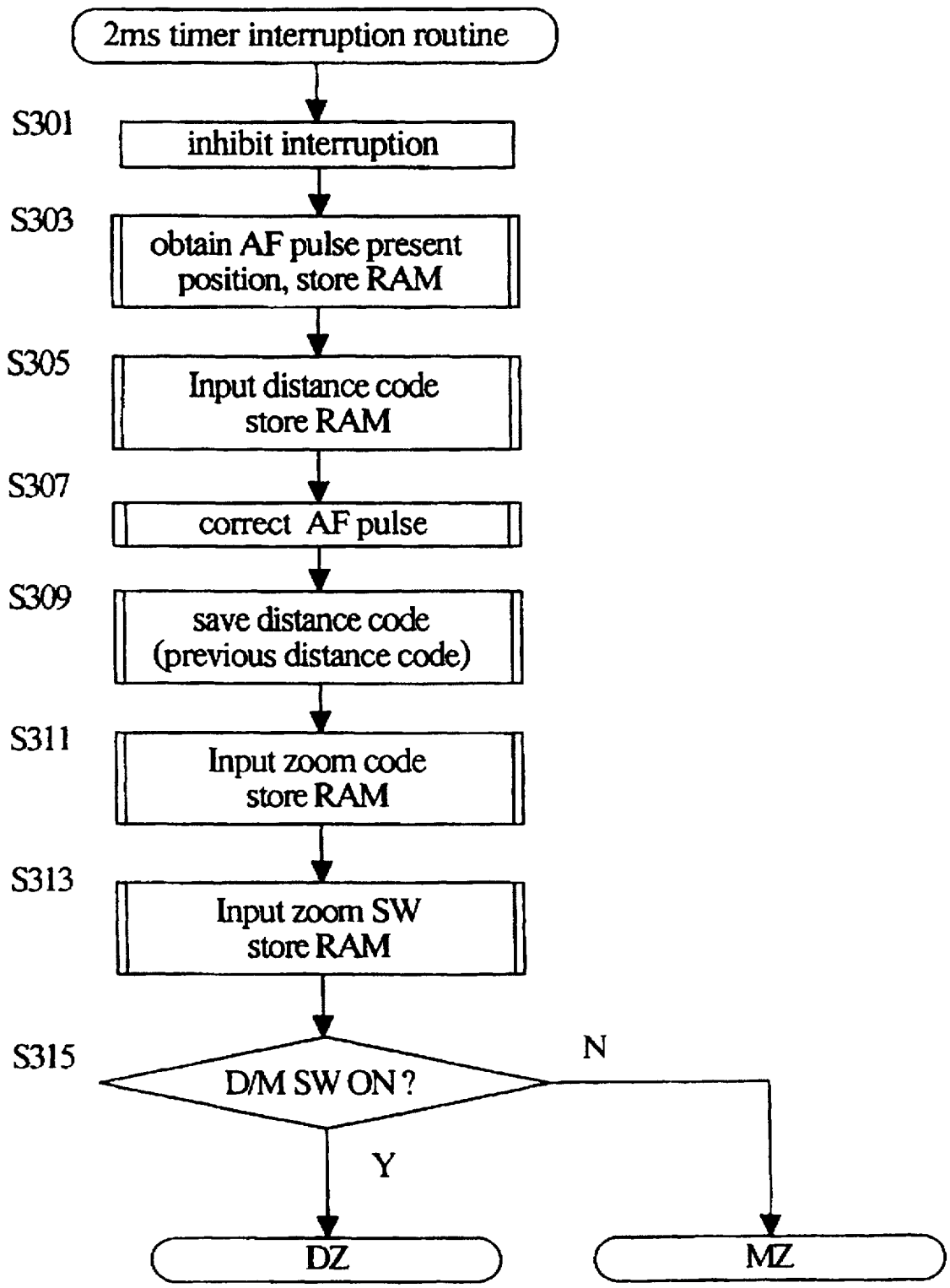
FIG. 9 is a flow chart regarding 2 ms timer interruption routine.

The operation of the lens CPU 61 when receiving interruption of the 2 ms timer will be explained below with reference to the 2 ms timer interruption flow chart shown in FIG. 9. The 2 ms timer is a hard timer incorporated in the lens CPU 61 for outputting interruption signals each 2 ms. The 2 ms timer interruption is a periodic interval operation which conducts an interruption operation upon the passing of the 2 ms interval of the 2 ms timer, provided that interruption is permitted.

In the 2 ms timer interruption operation, all other interruptions are inhibited. Then, a present value is inputted from the AF pulse counter to be stored in lens RAM 61b, and present distance code data is inputted from the distance code plate 81 to be stored in RAM 61b (S303, S305). If desired, the AF pulse number is corrected, and the present distance code is stored in lens RAM 61b as previous distance code, at a different address, for the next 2 ms timer interruption operation (S307, S309).

The present zoom code is read from the zoom code plate 71 and stored in lens RAM 61b as a present zoom code. The process inputs the state of the zoom mode changing switch 77 and the state of the zoom speed changing switch 75 (S311, S313). The process proceeds to the DZ operation when the powered zoom mode is selected, and to the MZ operation when the manual zoom mode is selected (S315).

DZ Operation

Figure 10:
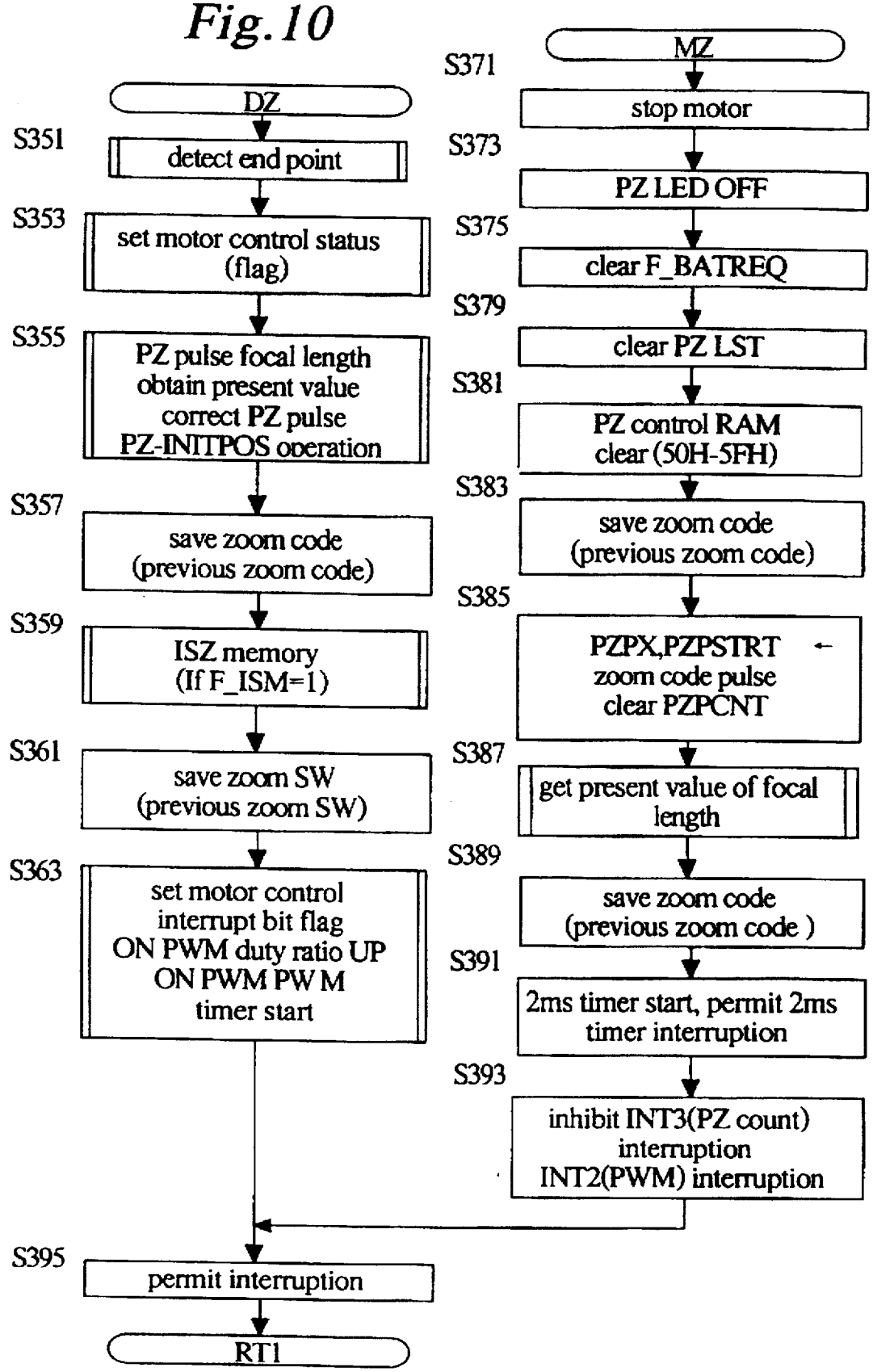
FIG. 10 is a flow chart of a powered zoom/manual zoom operation.

The DZ operation and MZ operation shown in FIG. 10 are flowcharts regarding an electrically driven (powered) zoom operation and manual (hand operated) zoom operation, respectively. These operations are performed by the lens CPU 61.

In powered zoom (DZ) operation, an end point detection operation to identify if the group of zooming lenses 53Z has reached the end point thereof is performed (S351).

The flags for controlling the motor, etc. are set depending upon the zoom speed changing switch 75 and control flags, such as flag F_MOVTRG, F_MOV, etc. PZ pulse, and present value of the focal length are inputted to be stored in the RAM. 61b. If desired, PZ pulse is corrected. When the present position of the group of zooming lenses 53Z is unknown, a position initializing operation (PZ-INITPOS) for the group of zooming lenses 53Z is performed, and the zoom code is stored at a different address as a previous zoom code in preparation for the next 2 ms timer interruption operation (S353, S355, S357).

If the constant image magnification zoom mode (F_ISM= 1, i.e., ISZ operation) is selected, ISZ memory operation is performed and the state of zoom switches 75 and 77 are stored in preparation for the next 2 ms timer interruption operation (S357–S361). According to the flag set in step S353, drive control for the zoom motor 65, set-up of interruption bit-flag, duty ratio up operation for PWM control are performed. If PWM control is conducted, the PWM timer is started (S363). Then, the process permits interruption and returns to the step concerned (S395).

In the manual zoom (MZ) subroutine, the zoom motor 65 is first stopped, the LED of the PZ pulser 69 is turned off, the battery request (electricity demand) flag F_LBATREQ is cleared, and the bit of each of the PZ lens state PZ_LST data is cleared (S371, S373, S375, S379).

Data regarding PZ control stored in lens RAM 61b at a given address is cleared, and zoom code is stored in preparation for the next 2 ms timer interruption operation. PZ pulse number, roughly detected from the zoom code, is stored in the lens RAM 61b as the present value of PZ pulse (PZPX), and a start value of PZ pulse (PZPSTRT) and PZ pulse counter (PZPCNT) are cleared. The present value of PZ pulse, as roughly detected, is converted into a present focal length (rough data) to be stored in the memory (S383, S385, S387).

The state of zoom switches 75 and 77 is stored in preparation for the next 2 ms timer interruption operation. Then, the 2 ms timer is started to allow 2 ms timer interruption and to inhibit interruption of INT3 (PZ pulse count) and INT 2 (PWM) in steps S389 through S393. The process permits another interruption and returns to the step concerned (S395).

Method for Controlling PWM

Figure 11:
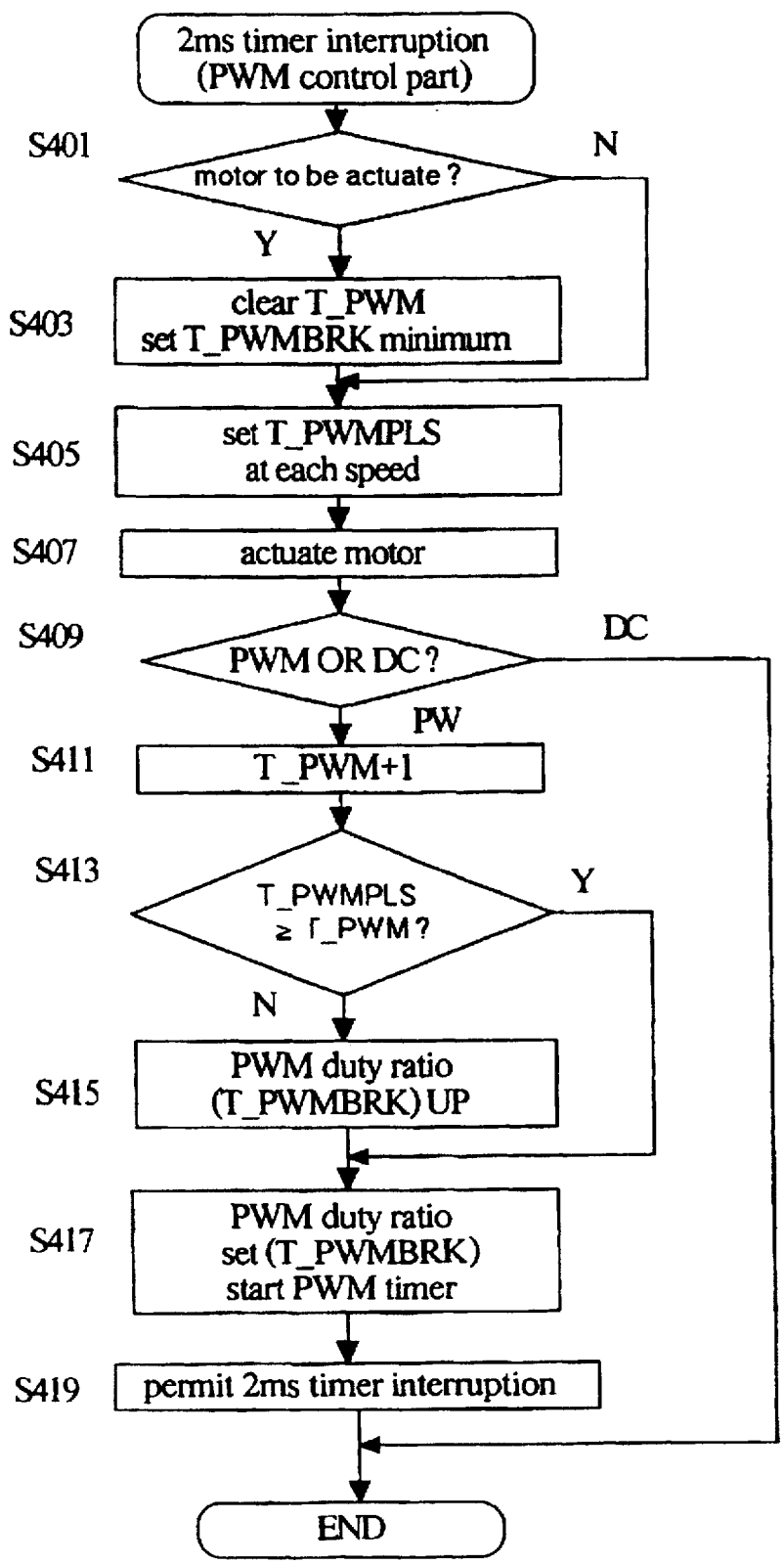
FIG. 11 is a flow chart regarding PWM 2 ms timer interruption routine.
Figure 12:
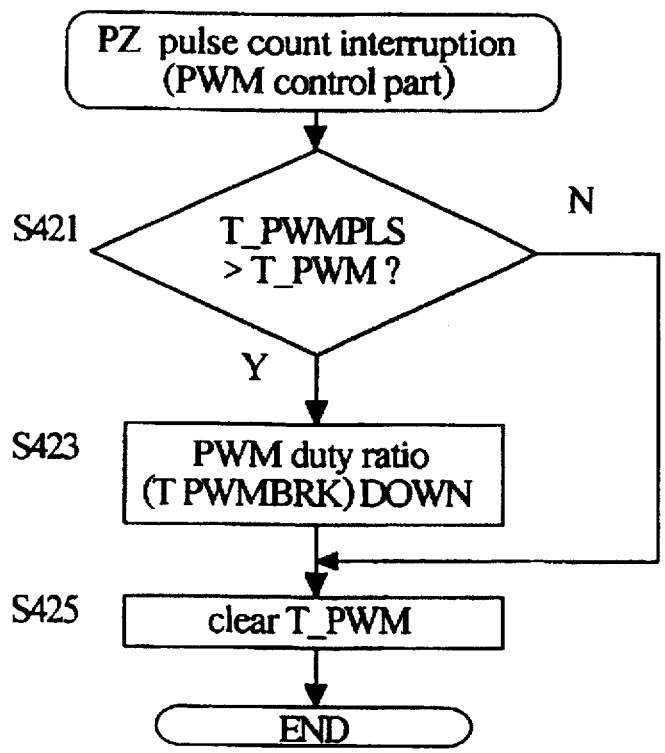
FIG. 12 is a flow chart regarding PZ pulse count interruption routine.
Figure 13:
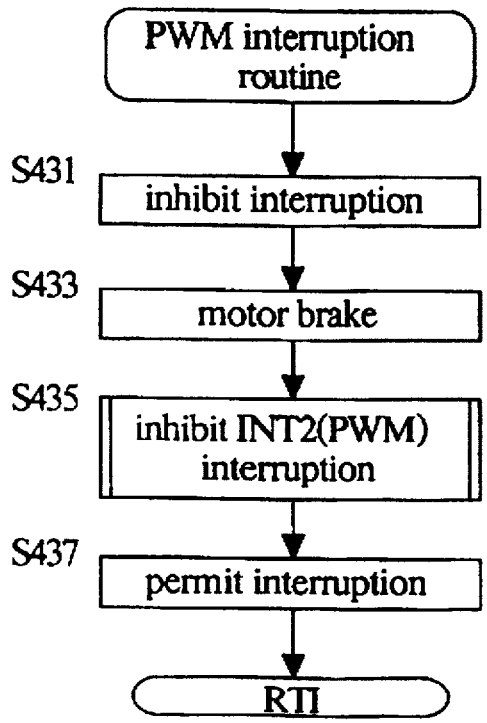
FIG. 13 is a flow chart of a pure interruption routine.
Figure 14:
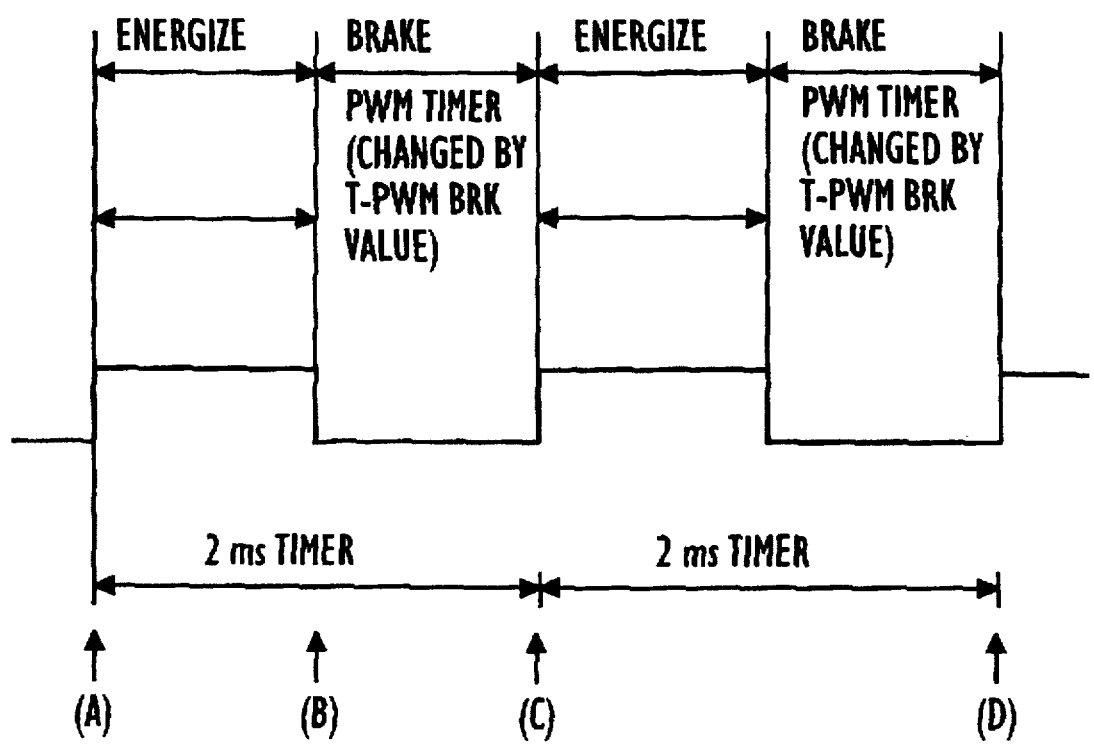
FIG. 14 is a time chart regarding PWM control.

A PWM control method will be explained below on the basis of the flow chart shown in FIGS. 11 to 13. FIG. 11 shows the portion of the 2 ms timer interruption routine, shown in FIGS. 9 and 10, which relates to PWM control. FIG. 12 shows the portion of the PZ pulse count interruption routine shown in FIGS. 95 and 96, which relates to PWM control. FIG. 13 shows a PWM interruption routine (brake operation) during PWM control. The relationship between the main flow of FIG. 6 and various interruption routines will be explained hereinafter. It is possible to interrupt, by one of the communication interruptions (2 ms timer interruption or PWM interruption), the loops of main flow steps S127–S131 and S131–S157 shown in FIG. 6. It is also possible to effect the interruption by one of 2 ms timer interruption, PZ pulse count interruption or PWM interruption in the communication interruption routine. In the PWM control, speed is controlled by increasing or decreasing a ratio (PWM duty ratio T_PWMBRK) between a period of time in which power is supplied and a period of time in which power is not supplied. In other words, a constant speed control is realized by increasing the PWM duty ratio (T_PWMBRK) so as to prolong power supply time to the zoom motor 65 when a PZ pulse is not detected within a predetermined period of time, thereby making the control speed higher, or by decreasing the PWM duty ratio (T_PWMBRK) so as to shorten the power supply time to the zoom motor 65 when a PZ pulse is detected within a predetermined period of time, thereby making the control speed slower (see FIG. 14).

Upon starting (i.e., when the motor is brought into actuation from its stopped state or braked state), the duty ratio is set at the minimum (i.e., the shortest power supply time) and then the zoom motor 65 is supplied with power and pulses outputted from the PZ pulser 69 are counted. When no pulses are outputted within a predetermined period of time, the duty ratio is gradually increased. When pulses are output within the predetermined period of time, the duty ratio is decreased. Thus, the zoom motor 65 is driven under acceleration control or constant speed control so that pulses are outputted at a preset time, period or cycle. Also, by setting the duty ratio at the minimum when the motor is actuated, it enables the photographer to effect a very smooth zooming operation.

Whether the zoom motor 65 is driven for the first time is checked in step S401 (i.e., whether or not the flag F_START is set). The first drive of the zoom motor 65 takes place when the zoom motor that has been stopped or braked is rotated. If the zoom motor 65 is driven for the first time, the PWM timer T_PWM is cleared so as to drive the zoom motor at the minimum speed, and the PWM duty ratio T_PWMBRK is set at the minimum value (minimum speed) in step S403. Thereafter, control proceeds to step S405. If the zoom motor 65 is not driven for the first time in step S401, control directly proceeds to step S405.

In step S405, the process sets the pulse duration (pulse period P_PWMPLS) in accordance with the speed set by the zoom speed changing switch 75, etc. so as to supply electricity to the zoom motor 65 (S405, S407). This means that the zooming speed is controlled so that the PZ pulse is outputted at a pulse duration T_PWMPLS.

The process checks if the PWM drive mode or the DC drive mode is suited to the zooming speed. If the PWM drive mode is selected, the process proceeds to step S411. If, however, the DC drive mode is selected, the process will be returned (S409). In step S411, one increment is added to the PWM timer T_PWM. The process checks whether the value, having been increased by one increment, exceeds the pulse period T_PWMPLS. If exceeded, PWM duty ratio (T_PWMBRK) is increased, and if not exceeded, no operation is performed (S413, S415). That is, if the PZ pulse is given within a predetermined period of time (T_PWMPLS), the PWM duty ratio (T_PWMBRK) is increased to prolong the power supply time, thus prescribing a high speed operation towards the preset speed.

The process will be completed after setting the PWM duty ratio (T_PWMBRK), starting the PWM timer and permitting interruption of the 2 ms timer (S417, S419). It should be noted that steps S407–S419 correspond to times (A), (C) and (D) in FIG. 14, respectively.

When PZ pulse is outputted from PZ pulser 69, the process enters the PZ pulse count interruption operation in FIG. 12. In the PZ pulse count interruption operation, the pulse period (T_PWMPLS) is compared with the PWM timer T_PWM. If the pulse period (T_PWMPLS) is larger than PWM timer, a pulse is outputted within the pulse period T_PWMPLS, and thus the PWM duty ratio T_PWMBRK is decreased and the PWM timer T_PWM is cleared. If the pulse period T_PWMPLS is less than the PWM timer, a pulse is outputted after one pulse period T_PWMPLS, so that the PWM timer T_PWM is cleared to complete the process at this time (S421, S423, S425).

In the PWM interruption routine in FIG. 13, the process inhibits interruption, and brakes the zoom motor 65 so as to inhibit interruption of INT2 (PWM), while allowing another interruption, and the process is returned. The operation in the above corresponds to time (B) in FIG. 14.

In the PWM control, the pulse period T_PWMPLS is set at three stages, i.e., low speed at 8, medium speed at 4, and high speed at 3, depending upon the speed designated by the zoom speed changing switch 75 etc. The PWM timer T_PWM is cleared when the motor is actuated and when the process transfers to the PZ pulse count interruption operation upon receipt of a PZ pulse outputted from the PZ pulser 69. Thereafter, the PWM timer is counted-up in the 2 ms timer interruption routine at S411 until after the PZ pulse is outputted. Accordingly, the PWM timer T_PWM indicates a time which is a multiple of the time elapsed since the previous PZ pulse was outputted. It should be noted, however, that the duration of a PZ pulse is greater than the period of the 2 ms timer interruption, even in a high speed mode.

For example, when high speed 3 is assigned (i.e., pulse duration T_PWMPLS=3), the time period elapsed since the previous PZ pulse was outputted is 2 ms×3=6 ms. When low speed 8 is assigned, T_PWMPLS will be 8. The operation during the low speed will be explained with reference to the flow charts illustrated in FIGS. 11 and 12. If, in step S413 of the 2 ms timer interruption, it is determined that the pulse period T_PWMPLS is smaller than the PWM timer T_PWM, i.e., more than 2 ms×8=16 ms has passed since the previous PZ pulse was outputted, the process proceeds to PWM duty ratio increase (S415).

On the other hand, and in the PZ pulse count interruption operation, if it is determined that the pulse period T_PWMPLS is larger than PWM timer T_PWM during the check in step S421, a PZ pulse is outputted before 2 ms×8=16 ms has passed since the previous PZ pulse was output and accordingly, the PWM duty ratio is decreased (S423).

As shown above, a constant speed control in which PZ pulse duration is kept constant is made possible, by increasing or decreasing the duty ratio (T_PWMBRK) of PWM so that the PZ pulse is outputted at a predetermined pulse cycle or period (T_PWMPLS). The PZ pulse duration, and thus the control speed, may be changed by changing the pulse period T_PWMPLS to be set.

Constant Image Magnification Ratio Zooming

Constant image magnification zooming (ISZ) will now be explained. Constant image magnification zooming is a control in which an image magnification ratio m represented by m=f/D may be kept constant regardless of variation in object distance, wherein object distance and focal length are represented by D and f, respectively.

First, the principle of constant image magnification zooming will be explained. For clearer illustration, a zoom lens constituted by two lens groups of a first group and a second group will be used in the explanation. Image magnification ratio m of the zoom lens is given by equation 1) below:

$$m_1 = x/f_1$$

$$m_2 = f/f_1$$

$$m = m_1 * m_2 = x * f/f_1^2 \qquad 1)$$

wherein;

m : image magnification ratio $m_1$ (m1) : magnification ratio of the first group $m_2$ (m2) : magnification ratio of the second group f : composite focal length $f_1$ (f1) : focal length of the first lens group x : amount of advancement of the first lens group from infinite end (amount of displacement)

The amount of advancement upon setting an image magnification ratio $x_0$ (xO), focal length $f_0$ (f0), and image magnification ratio $m_0$ (m0) is given by:

$$m_0 = x_0 * f_0 / f_1^2 \qquad 2)$$

If a focal length f which satisfies the following equation 3) is found when the lens is displaced to x by means of a focusing operation, the image magnification ratio can be maintained constant:

$$m_0 = x * f / f_1^2 \qquad 3)$$

From equations 2) and 3), $$x0 * f0/f_1^2 = x * f/f_1^2$$

Thus, focal length f, which is to be found, is given as follows:

$$f = x_0 * f_0 / x \qquad 4)$$

If a defocus amount $\Delta x$ at the lens advancement amount x is obtained by means of AF macrometer, objective focal length f can be calculated by:

$$f = x_0 * f_0 / (x + \Delta x) \qquad 5)$$

The principle (theory) of constant image magnification ratio zooming is explained above. In practical (applied) control, however, the amount of advancement of the lens is managed by the focal length code plate, AF pulser, etc. The AF pulser is designed so that it will have a linear relationship with the amount of advancement of the lens.

Thus, the amount of advancement x, $x_0$ in equation 4) and 5) may be replaced with an AF pulse number from the infinite end, and a defocus amount with defocus pulse number.

An actual operational method will be explained below. The lens CPU 61 performs constant image magnification ratio zooming (control zooming). The operation is performed on the basis of an image magnification ratio supplied from the camera body 11 or on the basis of object distance and focal length at a given instance.

(1) When an image magnification ratio $m_0$ is sent from the body:

(i) provisional set value, pulse number for advancement $x_0$ and focal length $f_0$ is obtained from $m_0$.

First, let $$f_0 = |f_1| \qquad 6)$$

let the amount of advancement corresponding to $x_0$ be X, and using equation 2):

$$m_0 = X * f_0 / f_1^2 \qquad 7)$$

let the AF pulse number per 1 mm of lens advancement amount be k:

$$x_0 = X * k \qquad 8)$$

from equation 8), 6) and 7), objective advancement pulse number x0 is given as follows:

$$x_0 = m_0 * |f_1| * k \qquad 9)$$

(ii) next, $x_0 \ f_0$ will be obtained.

From equations 6) and 9), $x_0 * f_0$ is obtained as follows:

$$x_0 \ f_0 = x_0 * f_0 \qquad 10)$$

(iii) objective focal length f is obtained.

f is obtained on the basis of the present position (present advancement pulse number) x as follows:

$$f = x_0 \ f_0 / x \qquad 11)$$

f is also obtained on the basis of defocus pulse number $\_x$ as follows:

$$f = x_0 \ f_0 / (x + \_x) \qquad 12)$$

(2) When f is to be obtained on the basis of advancement pulse number $x_0$ stored in the lens RAM 61b and focal length $f_0$.

(i) $x_0 \ f_0$ will be obtained from the above $x_0$ and $f_0$, using equation 10) as follows:

$$x_0 \ f_0 = x_0 * f_0$$

(ii) magnification ratio $m_0$ will be obtained by using equations 7), 8), and 10) as follows:

$$m_0 = x_0 \ f_0 / (f_1^2 * k) \qquad 13)$$

(iii) objective focal length f is obtained as follows:

f will be obtained in the same way as (iii) above in 1)

(iiii) $f_1$ is data peculiar to the lens and is stored in ROM 61a.

ISZ Operation

Figure 15:
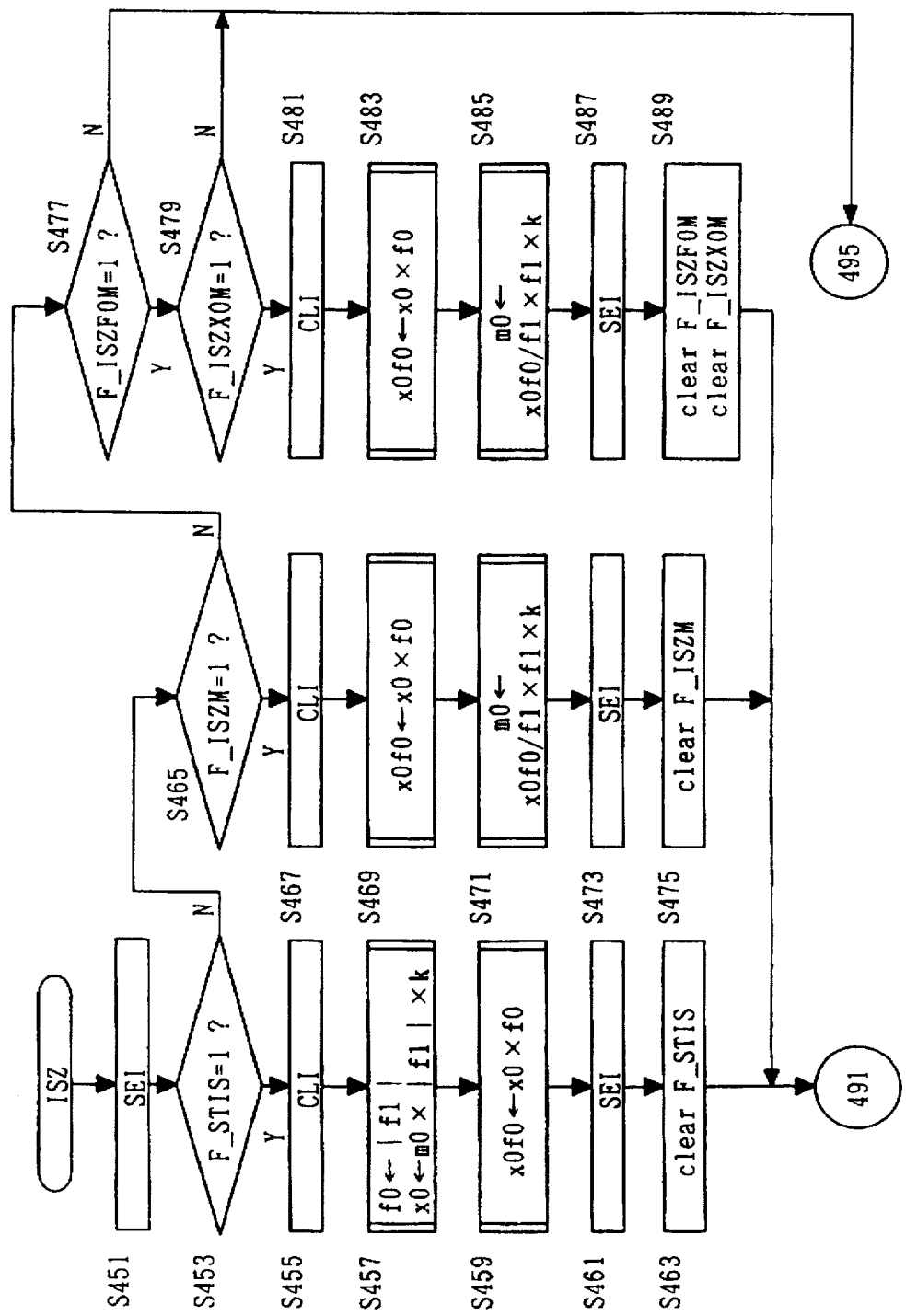
FIGS. 15 and 16 are a flow chart regarding zoom control under constant image magnification.
Figure 16:
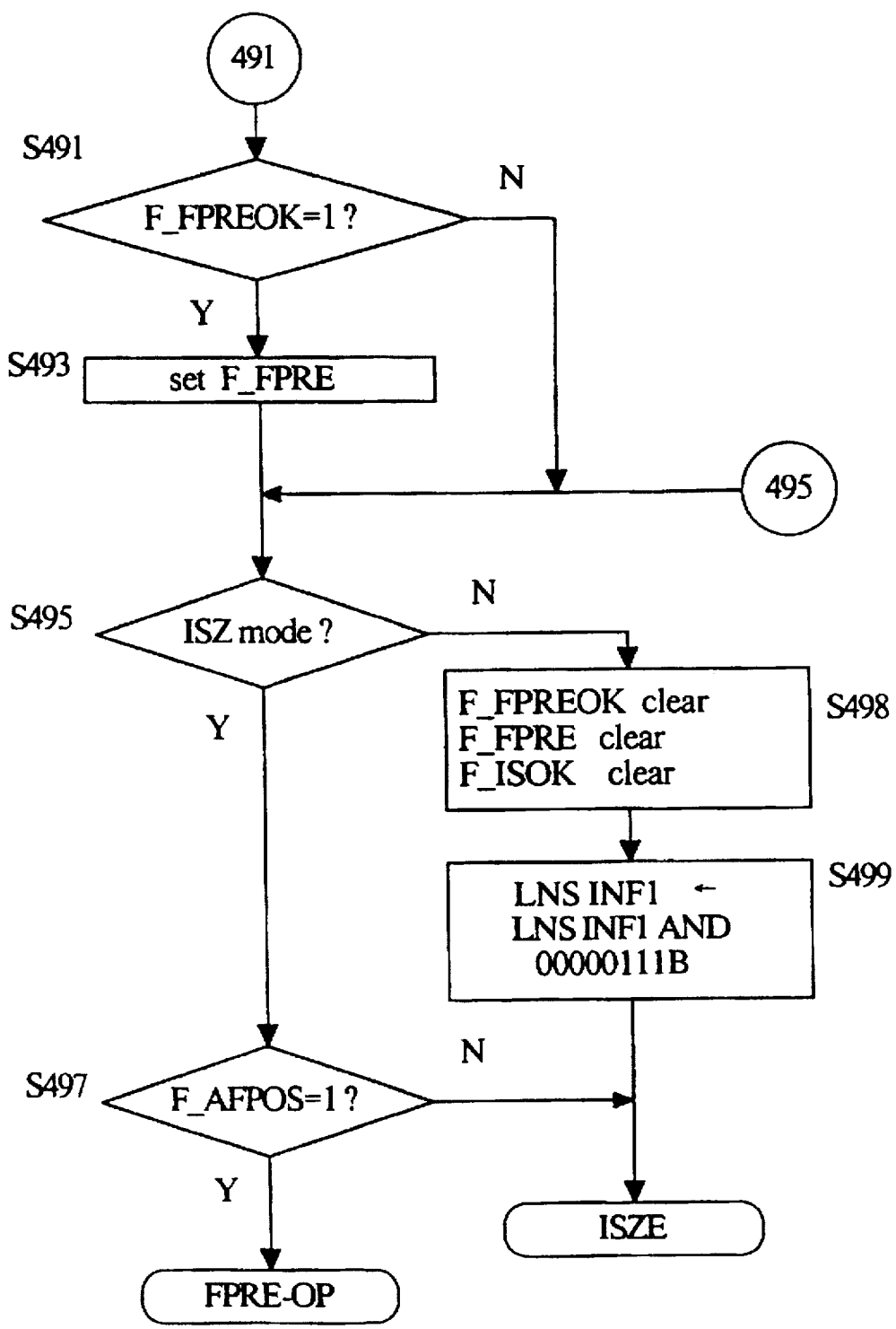

A calculation operation regarding constant image magnification ratio zooming (ISZ) based on the above described principle will be explained in detail with reference to flow charts shown in FIGS. 15 and 16. This operation is performed by the lens CPU 61.

An image magnification ratio is set by the zoom speed changing switch 75 or set-up switch (SL switch). This will be explained later in detail with reference to FIG. 90.

The ISZ operation is related to the calculation of the preset image magnification ratio and to calculation of focal length for maintaining the preset image magnification ratio. The focal length will be calculated in the case where focusing is required and the case where focusing is not required. In each case, calculation is made by the photographing lens or camera body. When focusing is required, the focal length, image magnification ratio and objective lens advancement amount are calculated on the basis of the amount of advancement of the lens upon focusing. When focusing is not required, image magnification ratio and objective lens advancement amount are calculated on the basis of the defocus amount and the present focal length.

The process first performs inhibition of communication interruption (SEI) and checks the flags (F_STIS, F_ISZM, F_ISZFOM, F_ISZXOM) in order to determine the way in which the ISZ operation is being performed, on the basis of communication information transferred from the camera body 11 (S451, S453, S465, S477, S479). These flags indicate that communication regarding ISZ has been performed in relation to the camera body 11. In each communication, the flag is set (stored) in RAM 61b. The required operation or calculation will be made on the basis of the flags.

F_STIS designates the flag for carrying out the calculation of ISZ based on the image magnification data transferred from the camera body. F_ISZM designates the flag for carrying out the calculation of ISZ based on the current value of AF pulse and the current value of the focal length. F_ISZFOM and F_ISZXOM designate the flags for carrying out the calculation of ISZ based on the focal length and AF pulse transferred from the camera body, respectively. Note that, when both the flags F_ISZFOM and F_ISZXOM are set, the calculation of ISZ is effected. Moreover, F_ISZFOM designates the flag that indicates that the focal length data f from the camera body is to be used, and F_ISZXOM" designates the flag that indicates that the object distance data x from the camera body is to be used.

When constant image magnification ratio zooming is performed on the basis of the image magnification ratio sent from the camera body 11 (F_STIS=1), communication interruption is permitted (CLI), $x_0 \times f_0$ is obtained from the above equations 6), 9) and 10) to be stored in RAM 61b at a predetermined address, and interruption is inhibited so as to clear flag F_STIS (S455–S463).

In the case that the image magnification ratio has been stored and constant image magnification ratio zooming is performed on the basis of the focal length and object distance stored in the memory (F_STIS=0, F_ISZM=1), interruption is permitted, $x_0 \times f_0$ is calculated from the above object distance (advancement pulse number) x0 and focal length $f_0$, image magnification ratio m0 is calculated using equation 13) so as to be stored in RAM 61b at a predetermined address, communication interruption is inhibited, and flag F_ISZM is cleared (S465–S475).

In the case that constant image magnification ratio zooming is performed on the basis of focal length $f_0$ sent from the camera body 11 and object distance (advancement pulse number) x0 (F_STIS=0, F_ISZM=0 and ISZFOM=1, F_ISZXOM=1), x0 f0 is first calculated on the basis of focal length $f_0$ as received and object distance $x_0$ so as to be stored in memory. Image magnification ratio $m_0$ is calculated from equation 13). Interruption is inhibited and flags F_ISZFOM, F_ISZXOM are cleared (S477–S489). In a case other than the above, it is noted that no communication regarding operation is conducted in relation to the camera body 11. Accordingly, no operation is performed in such a case.

Thereafter, whether or not the defocus amount Δx sent from the camera body 11 is effective, is checked in accordance with the state of the flag F_FPREOK in step S491. If the flag F_FPREOK is set at "1", the flag F_FPRE is set in step S493. Conversely, if the flag F_FPRE is not set at "1", flag F_FPRE is not set. The flag F_FPREOK indicates that the calculation to obtain a target value of focal length in accordance with the defocus pulses has been carried out. The flag F_FPRE indicates commencement of the calculation (steps S503–S513) to obtain the target value of focal length in accordance with the defocus pulses in the constant image size mode. Although the defocus amount and the predictor value are used for the calculation, they represent the defocus pulses.

Whether or not the mode is the ISZ zoom mode is checked in step S495. If the mode is the ISZ zoom mode, whether the latest position of the focusing lens 53F (i.e., the object distance) is detected is checked, that is, whether or not the flag F_AFPOS, which indicates that the lens CPU correctly recognizes (or counts) the current position of the focusing lens 53F, is set at "1" is checked (step S497). If the flag F_AFPOS is set at "1", control proceeds to the FPRE-OP operation in which control is effected in accordance with the predictor calculation results. Conversely, if flag F_AFPOS is not set at "1" in step S497, control proceeds to the ISZE operation.

If the mode is not the controlled zooming mode, flags F_FPREOK, F_FPRE, F_ISOK are cleared. Then, the content at a predetermined address (LNS_INF1) and the logical sum of each of the bits [00000111B] are stored at a predetermined address (LNS_INF1). Thereafter, the process passes through the ISZE operation (S495, S498, S499).

FPRE-OP Operation

Figure 17:
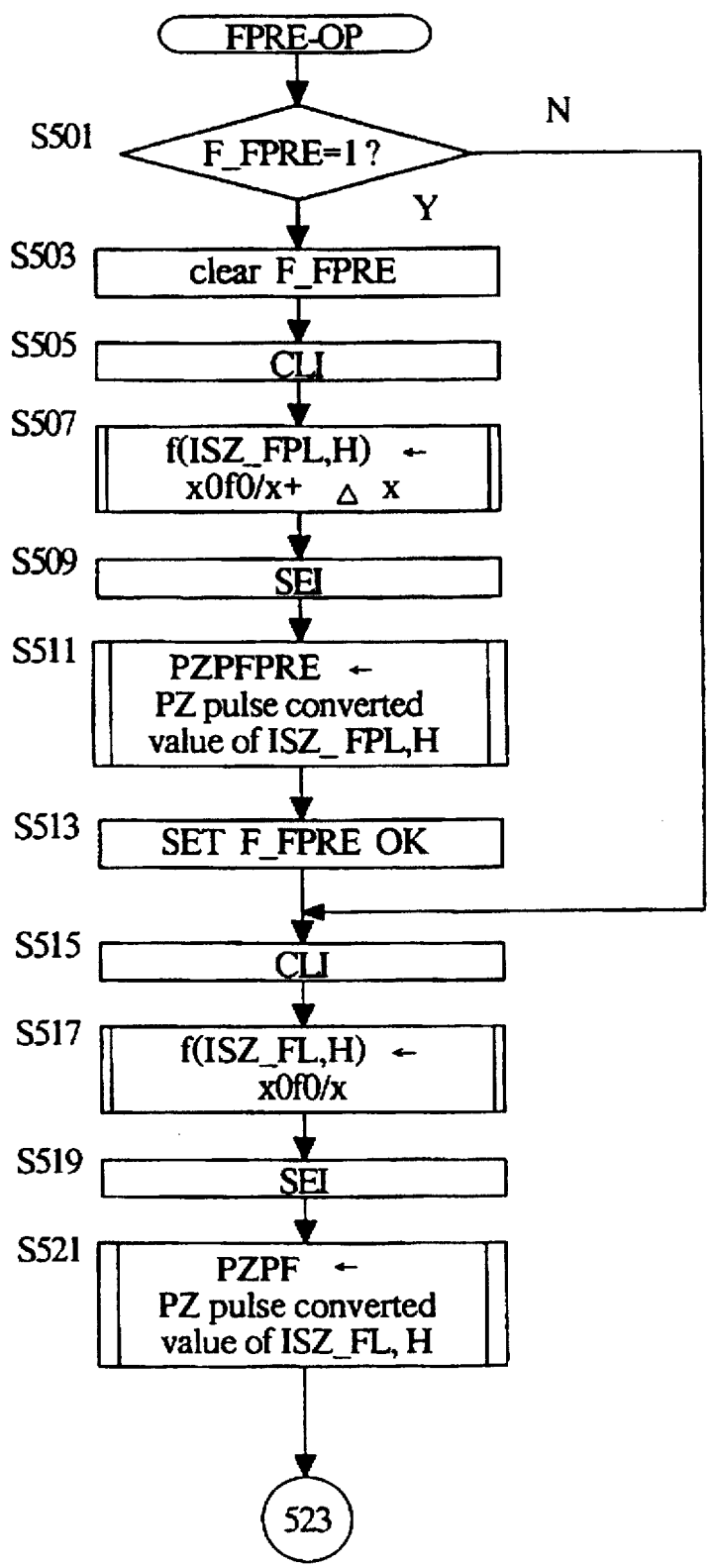
FIGS. 17 and 18 are a flow chart of a predictor operation regarding an amount of defocus.

The (FPRE-OP) operation, shown in steps S501–S513 in which objective focal length f is obtained on the basis of a predictor amount, will be explained with reference to the flow chart shown in FIG. 17. This process is performed by the lens CPU 61 when predictor amount is sent from the camera body 11 during communication of the CPU with the camera body 11 (during this communication, flag F_FPRE is stored (memorized) in RAM 61b), or when steps S453 S463, S465–S475 or S477–S489 are performed to change or modify $x_0 f_0$ values by the communication of the CPU with the camera body 11 regarding ISZ and flag F_FPRE is set in S491–S493. The flag F_FPRE is a flag which determines whether or not the calculation (f=x0 f0/(x+Δx)) is performed to obtain objective focal length f based on predictor amount.

When entering this operation, the process checks if the flag F_FPRE is set so as to determine whether the operation based on predictor amount is to be performed (S501). If flag F_FPRE is not set, the process jumps to S515. Otherwise, the process proceeds with the following operation.

First flag F_FPRE is cleared and communication interruption is inhibited. Objective focal length f is calculated from equation 12), utilizing predictor amount, and communication interruption is inhibited (S503–S509). Then, the objective focal length f is transformed to objective PZ pulse number from a WIDE end so as to be stored in RAM 61b at a predetermined address (PZPFPRE). Flag F_FPREOK which indicates that the operation based on the predictor amount is effective is set. Then, the process proceeds to step S515 (S511, S513).

S515–S521 are steps in which the objective focal length f is calculated on the basis of present AF pulse (advancement pulse number).

In S515, permission of interruption (CLI) is performed. Then, the objective focal length f is calculated using equation 11) so as to be stored in RAM 61b at a predetermined address (ISZ_FL.H) and then inhibition of interruption (SEI) is performed (S515, S517). The objective focal length f calculated above is transformed into objective PZ pulse number from the WIDE end. The transformed pulse value is stored in RAM 61b at a predetermined address (PZPF) in S519, S521.

The content of bits 3 through 7 of LENS_INF1, calculated in S529, will be explained below. LENS_INF1 is information which is periodically sent from the lens to the camera body by means of communication. Bits 3 through 7 are information regarding ISZ mode.

Bits 6 and 7 are flags which indicate whether the objective PZ pulse (PZPFPRE or PZPF) obtained by the ISZ operation is positioned on the WIDE side or the TELE side with respect to the present PZ pulse. If the objective PZ pulse is positioned on the WIDE side, bit 7 is set, and if it is positioned on the TELE side, bit 6 is set. If the objective PZ pulse is between the WIDE side and TELE side, neither bit 6 nor 7 is set.

Bits 3 through 5 indicate, by ⅛ segments, an approximate value which is the difference between the objective PZ pulse number and the pulse number of the present position, i.e., PZ pulse number required for the lens to move from the present position to the objective position, divided by the total PZ pulse number (i.e., PZ pulse number required for the lens to move from the WIDE end to the TELE end). Bits 3, 4 and 5 are weighted by ⅛, ¼ and ½, respectively. The above value will be zero when the present position is equal to the objective position. Thus, bits 3 through 5 are all cleared. If the present position is at the WIDE end and the objective position is at the TELE end, or vice versa, the value will be ⅞ and therefore bits 3 through 5 are all set at "1".

Thus, the camera body 11 receives, in LENS_INF1, periodically or upon request, information from the photographing lens 51 so that the camera body is able to send appropriate ISZ control information to the photographing lens 51.

The process checks if the operation based on predictor amount is effective (F_PREOK=1). If effective, an objective PZ pulse number (PZPFPRE), obtained by using predictor amount, is stored in an accumulator (ACC). If not effective, an objective PZ pulse number (PZPF) obtained on the basis of the present AF pulse number is stored in the accumulator (S523, S525, S527).

Then, the values of bits 3 through 7 in LENS_INF1 are calculated on the basis of the objective PZ pulse number stored in the accumulator. The thus calculated values are stored in RAM 61b at a predetermined address (i.e., bits 3 through 7 of LENS_INF1) and an interruption inhibition operation (SEI) is performed (S529, S531).

When all of the following conditions are satisfied, that is, when the constant image magnification zoom mode (Image Size Tracking Mode) is selected, the lens CPU correctly recognizes the current position (focal length) of the zoom lens group 53Z (F_PZPOS=1), and the zooming is being effected at the constant image magnification mode (F_ISOK=1), the following operations are effected. If any one of the conditions is not satisfied, control skips to step S551 (steps S533–S537).

If operation of the objective focal length based on the predictor amount (PZ pulse number) is effective (flag F_FPREOK=1), and a control flag for ISZ is set up (flag F_ISZD=1), the PZ pulse number obtained by using the predictor amount (from equation 11)) is stored in RAM 61b at a predetermined address (PZPTRGT) as objective pulse number (S539, S541, S543). If, however, operation of the objective focal length based on the predictor amount is not effective (F_FPREOK=0) or the ISZ control flag is cleared, PZ pulse number obtained on the basis of the AF pulse of the present position (advancement pulse number) using equation 12) is stored in the above predetermined address (PZPTRGT) in S539, S541 and S545. Flag F_ISZD is data which is sent from the camera body 11 by means of communication and stored in RAM 61b. If F_ISZD=1, ISZ control is performed on the basis of the calculated value based on the predictor amount. If flag F_ISZD=0, ISZ control is performed on the basis of the calculated value based of the AF pulse of the present position.

Zoom speed data (bit 6, 7 of BD_ST1) sent from the camera body 11, and stored in RAM 61b, is stored in RAM 61b at a predetermined address (bit 2, 3 of SPDDRC2). Constant image magnification ratio zooming flag F_ISZ is set up and interruption is permitted. Then the operation is returned (S547, S549, S551). Constant image magnification ratio flag F_ISZ indicates that the CPU 61 has completed calculating the distance of the target focusing point, and that preparations for the motor and the zoom lens to be driven have been made. When the constant image magnification ratio flag F_ISZ has been set, a constant image magnification ratio zooming operation is performed in the 2 ms timer interruption routine. The values of PZPTRGT, SPDDRC2 are also used in the 2 ms timer interruption routine.

Instruction Operation

An instruction operation to be performed in the photographing lens 51 when instruction codes (command) are received from the camera body 11 will be explained below with reference to flow charts shown in FIGS. 19 to 26, together with Tables 1 and 2 indicating the content of the instruction codes. The instruction codes are details of S217 in the communication interruption routine of FIG. 8. Each instruction operation is performed depending upon the lower bits of the command.

Figure 19:
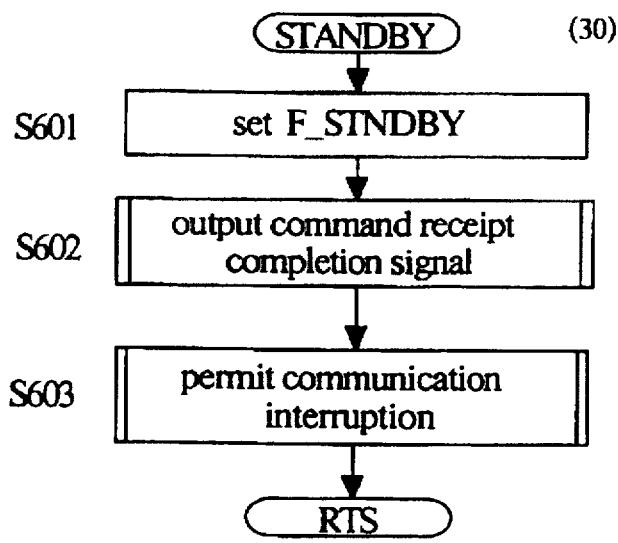
FIG. 19 is a flow chart regarding a standby operation.

A STANDBY command is a command to cause the lens CPU 61 to be brought into a low power or sleep mode. A flow chart regarding an operation upon input of the STANDBY command is shown in FIG. 19.

The lens CPU 61, upon receipt of the STANDBY command, sets up flag F_STNDBY, transmits a command receipt completion command to the camera body 11, allows communication interruption and is returned (S601, S602, S603). Lens CPU 61 checks flag F_STNDBY in the main routine at step S143. If flag F_STNDBY is set up, the lens CPU stops the clock 91 and is transferred into a low power consumption mode (standby mode) (See FIG. 7).

Figure 20:
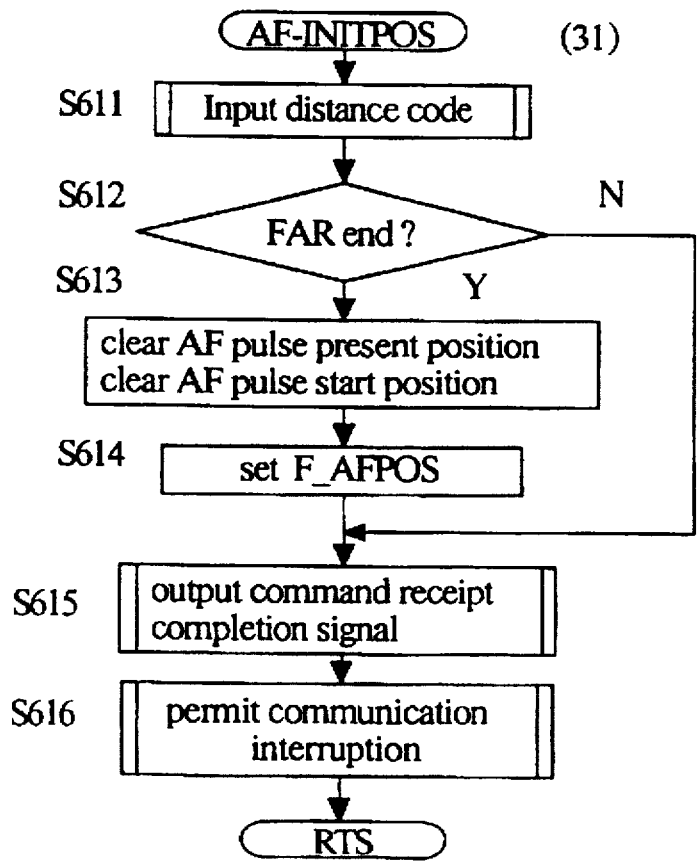
FIG. 20 is a flow chart regarding an initializing operation for an AF pulse.

An AF-INITPOS command is a command which is sent after the camera body 11 has moved the focusing lens 53F to infinite end by means of the AF motor 39. This command is an initializing operation command for AF to clear an AF pulse counter of the photographing lens 51. A flow chart regarding an operation performed by the lens CPU 61 when an AF-INITPOS command is inputted is shown in FIG. 20.

Lens CPU 61, when an AF-INITPOS command is input, inputs distance code data from distance code plate 81 (S611). If the code data corresponds to the infinite end (far end), AF pulse present position data (AFPXL, H) in RAM 61b and AF pulse start position data (AFPSTRTL, H) are cleared. A flag to identify that the present position of focusing lens 53F is known F_AFPOS is set up and the process proceeds to S615. If the code data does not correspond to the infinite end, the process skips through the above step and proceeds to S615. The process outputs command receipt completion command to body 11, allows communication interruption and is returned (S615, S616).

Figure 21:
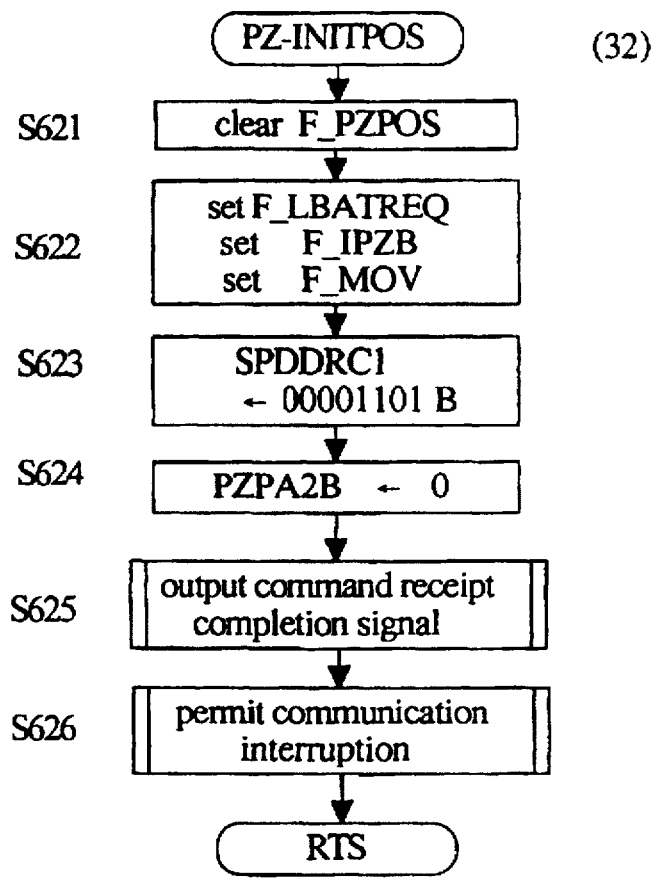
FIG. 21 is a flow chart regarding an initialization operation a powered zoom position.

A PZ-INITPOS command is a command which causes the lens CPU 61 to perform an initialization operation so as to identify the zooming position. In this embodiment, the PZ pulse number corresponding to the code of the zoom code plate 71 is set in the PZ pulse counter when the zoom motor 65 is actuated, to detect the boundary 72 of the code of the zoom code plate 71. A flow chart regarding an operation performed when a PZ-INITPOS command is input is shown in FIG. 21. Operations such as counting of the PZ pulse will be explained later in a POS-NG OPERATION shown in FIG. 86.

Lens CPU 61, when a PZ-INITPOS command is input, clears flag F_PZPOS, sets up flags F_LBATREQ, F_IPZB and F_MOV, stores a predetermined data (lowest speed, direction TELE) in lens RAM 61b at SPDDRC1, and sets PZPA2B of the PZ pulse counter to zero, the PZ pulse counter counting PZ pulse from the present position to the code boundary (S621–S624). The process outputs a command receipt completion signal, allows communication interruption and is returned (S625–S626). The initializing operation regarding power zooming (PZ) is performed on the basis of the above set value during the 2 ms timer interruption operation.

Figure 22:
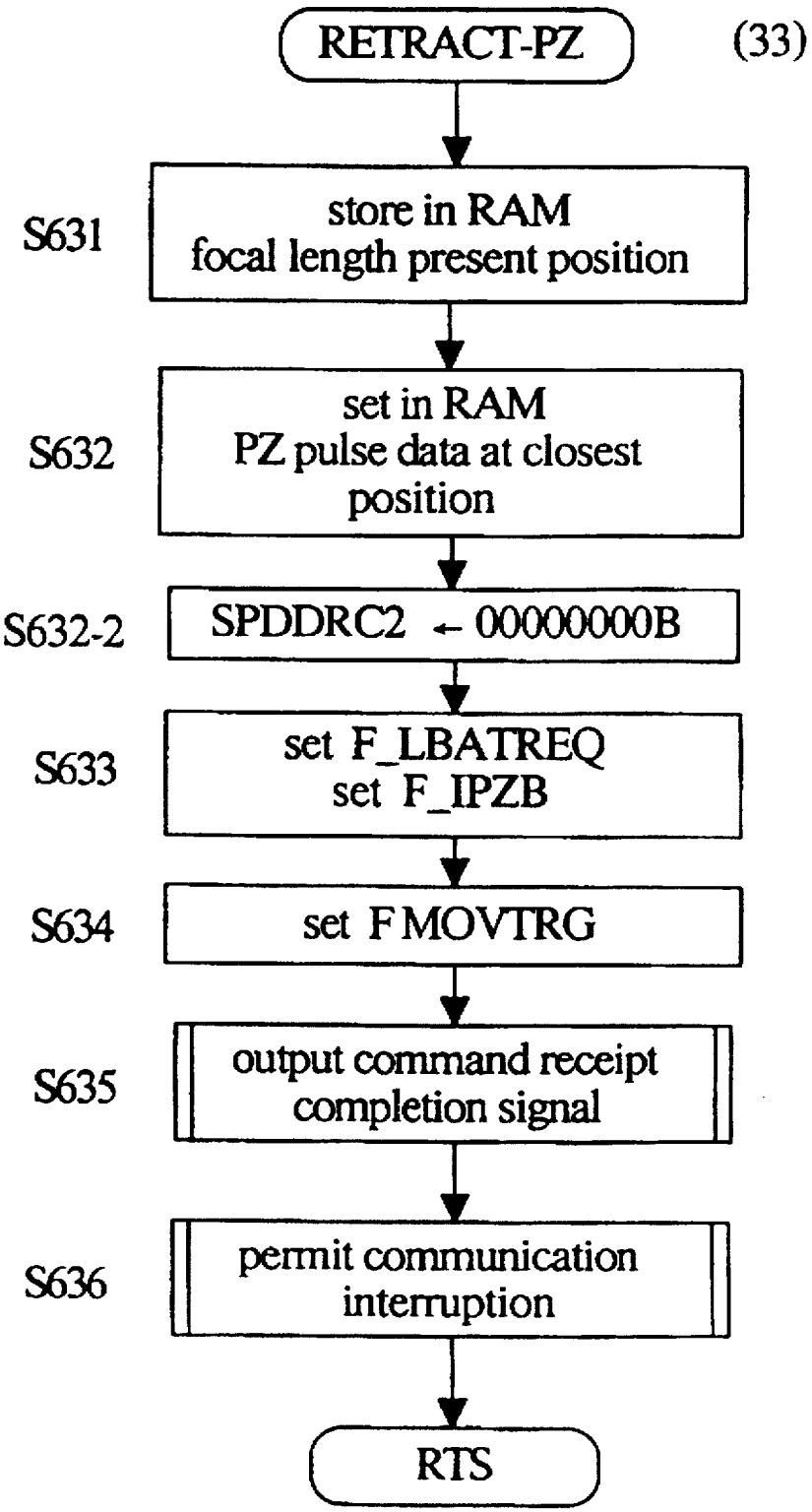
FIG. 22 is a flow chart regarding an accommodation operation for the powered zoom lens.

A RETRACT-PZ command is a command which effects power zooming of the photographing lens 51 to minimize the length of the photographing lens barrel (i.e., retract) when, for example, the main switch of the camera body is turned off. A flow chart regarding an operation upon input of the RETRACT-PZ command is shown in FIG. 22.

Lens CPU 61, upon receipt of the RETRACT-PZ command, stores present focal length data in RAM 61b at a predetermined address (RETPOS L,H), sets the PZ pulse data by which the length of the lens barrel becomes minimum (data inherent to the lens) in RAM 61b at a predetermined address, and sets predetermined data (maximum speed) in SPDDRC2 (S631, S632, S632-2). The Lens CPU also sets each flag F_LBATREQ, F_IPZB and flag F_MOVTRG, sends a command receipt completion signal, and permits communication interruption. The process is then returned (S634–S636).

The focal length data before retraction (accommodation) is sent to the camera body 11 by means of a separate communication command (FOCALLEN-X) which will be explained hereinafter. Flag F_LBATREQ is a flag which asks for electricity supply to the power zoom lens 51 for the power zooming operation thereof, flag F_IPZB is a flag which indicates that zooming control (ISZ, PZ-INITPOS, etc.) is being conducted in the lens, and flag F_MOVTRG is a flag which moves zooming lens 53Z to an objective pulse position stored in address PZPTRG in the 2 ms timer interruption operation. The accommodation operation regarding the zooming lens 53Z is performed in the 2 ms timer interruption routine on the basis of the above set value.

Figure 23:
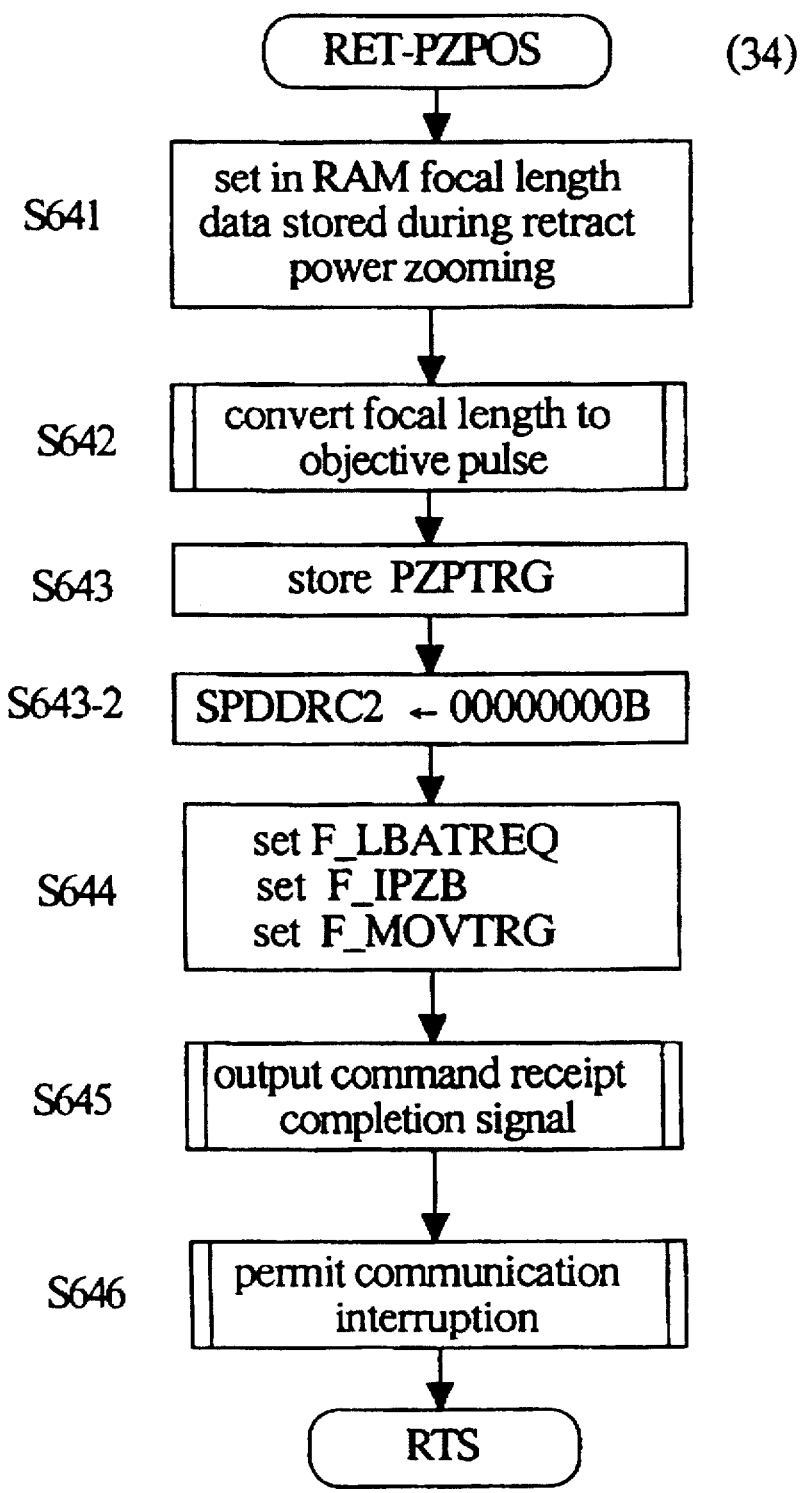
FIG. 23 is a flow chart regarding a return operation for the powered zoom lens.

RET-PZPOS is a command for returning the zooming lens, from its retracted state, to the state before it was retracted. In other words, it is a command to return the zooming lens 53Z to its state before retraction or accommodation, for instance, when the main switch of the camera body SWMAIN is turned ON (to the position of with focal length before retract power zooming was performed). A flow chart showing an operation upon input of the RET-PZPOS command is shown in FIG. 23.

When the lens CPU 61 receives the RET-PZPOS command, the lens CPU 61 sets the focal length data, which is one of the data items stored in the address before retraction, designated by the code of the command and which is sent immediately before retract power zooming, at a predetermined address (FCLL, H) of the lens RAM 61b (S641). It should be noted that focal length data stored before retraction and sent from the camera body 11 by means of a separate communication command is stored in the address RETPOSL, H.

The above focal length data is converted into an objective pulse number and stored in RAM 61b at a predetermined address as objective pulse number PZPTRG. A predetermined PZ speed data (high speed) is stored in SPDDRC2. Flags F_LBATREQ, F_IPZB, F_MOVTRG are then set and the command receipt completion signal is transmitted and communication interruption is permitted. The process is then returned (S642–S646). It is noted that the return operation is also performed in the 2 ms timer interruption operation.

Figure 24:
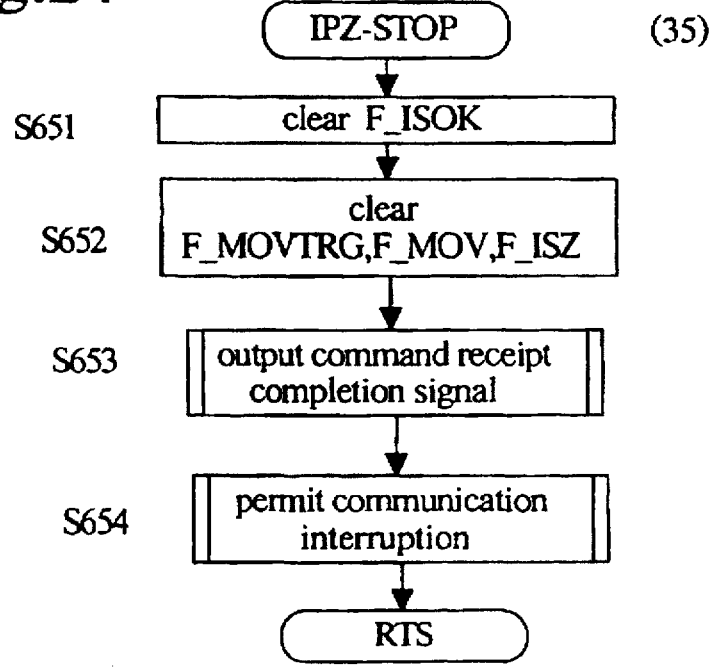
FIG. 24 is a flow chart regarding a stop operation for the powered zoom.

IPZ-STOP is a command which stops the power zooming operation. This command is a command which stops controlled power zooming such as ISZ (constant image magnification), PZ-INITPOS (return), RETRACT-PZ (retraction or accommodation). It is not a command to stop manual power zooming. A flow chart regarding an operation upon input of the IPZ-STOP command is shown in FIG. 24.

Lens CPU 61, when the IPZ-STOP command has been inputted, clears flag F_ISOK, together with flags (F_MOVTARG, F_MOV, F_ISZ) regarding the performance of the power zooming operation (S651, S652). F_ISZ designates the flag that indicates drive of the power zoom motor in the ISZ mode. Lens CPU 61 outputs a command receipt completion signal and permits communication interruption and the process is then returned (S653, S654). Since the above flags are cleared, controlled power zooming such as ISZ (i.e., other than manual power zooming) is not performed in the 2 ms timer interruption operation.

Figure 25:
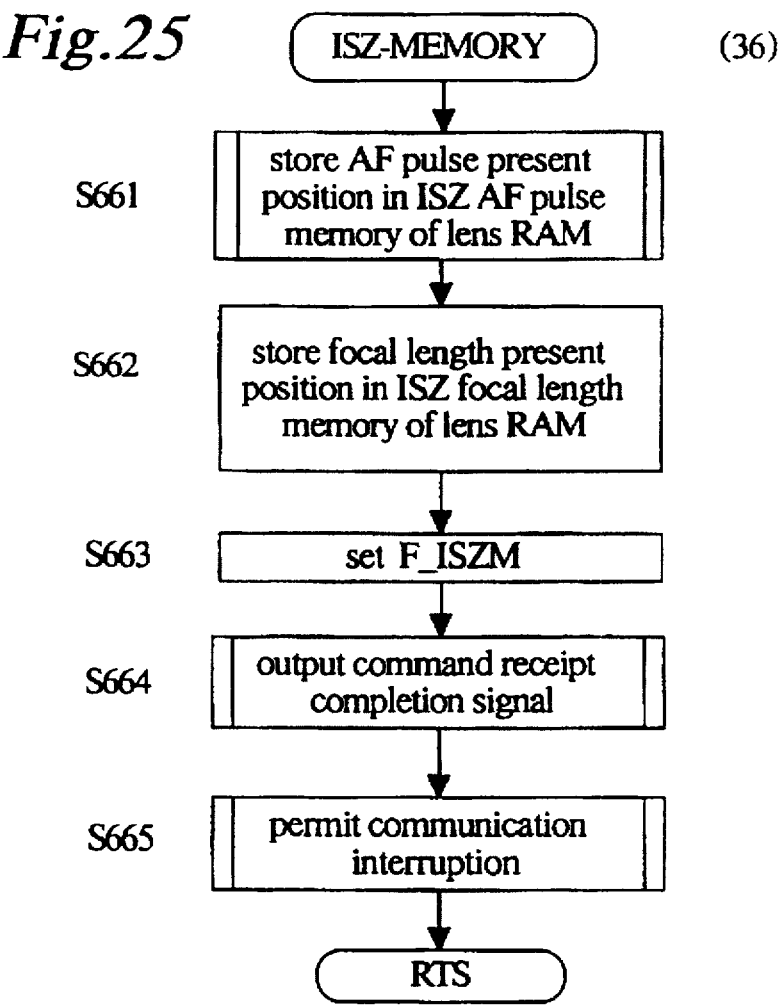
FIG. 25 is a flow chart effective upon receipt of data required for constant image magnification zooming.

ISZ-MEMORY is a command which stores present values of AF pulse and focal length in order to perform constant image magnification zooming. A flow chart regarding an operation upon input of ISZ-MEMORY command is shown in FIG. 25.

When an ISZ-MEMORY command is inputted, lens CPU 61 stores the present value (AFPXL,H) of the AF pulse counter in ISZAF pulse memory (ISZ_AFPL,H) in lens RAM 61b at a predetermined address. Lens CPU 61 also stores the present value (FCLXL,H) of the focal length in ISZ focal length memory (ISZ_FCLL,H) in lens RAM 61b at a predetermined address in steps S661, S662. Flag F_ISZM is the set, a command receipt completion command is outputted, and communication interruption is permitted. The process is then returned (S663–S665). On the basis of the above values, the operation of ISZ indicated by S465–S475 in FIG. 15 is performed.

Figure 26:
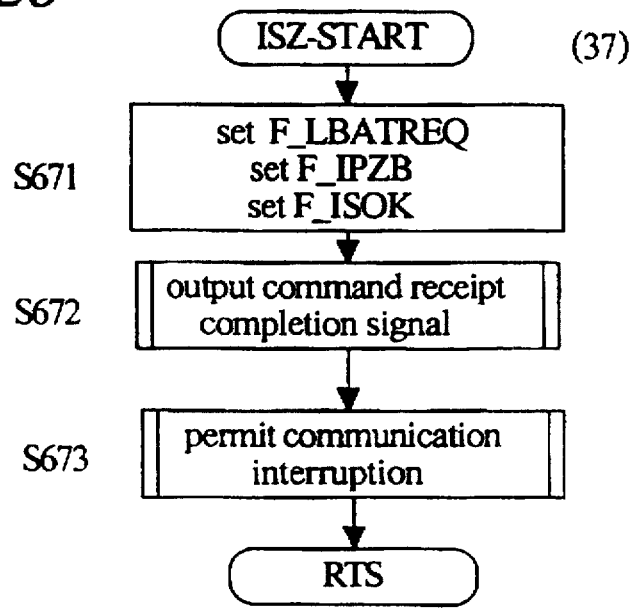
FIG. 26 is a flow chart regarding a constant image magnification zooming operation.

ISZ-START is a command which starts constant image magnification zooming. A flow chart regarding an operation upon input of the ISZ-START command is shown in FIG. 26.

When the ISZ-START command is inputted, lens CPU 61 sets flags F_LBATREQ, F_IPZB, F_ISOK and outputs a data transmission completion signal. Communication interruption is permitted and the process is returned (S671–S673). On the basis of the above values, the 2 ms timer interruption operation and operations at and after S537 in FIG. 18 will be performed.

BL Command Subroutine

The operation in the photographing lens 51 upon receipt of a BL command from camera body 11 will be explained with reference to FIGS. 27 to 37. The BL command communication operation is similar to that performed in the instruction command subroutine, except that the command receipt completion signal is first outputted, then data is inputted, and the inputted completion signal is outputted. The BL command is a detail of S213 in the communication interruption subroutine of FIG. 8. Each command operation is performed depending upon the content of lower bits of the command.

Figure 27:
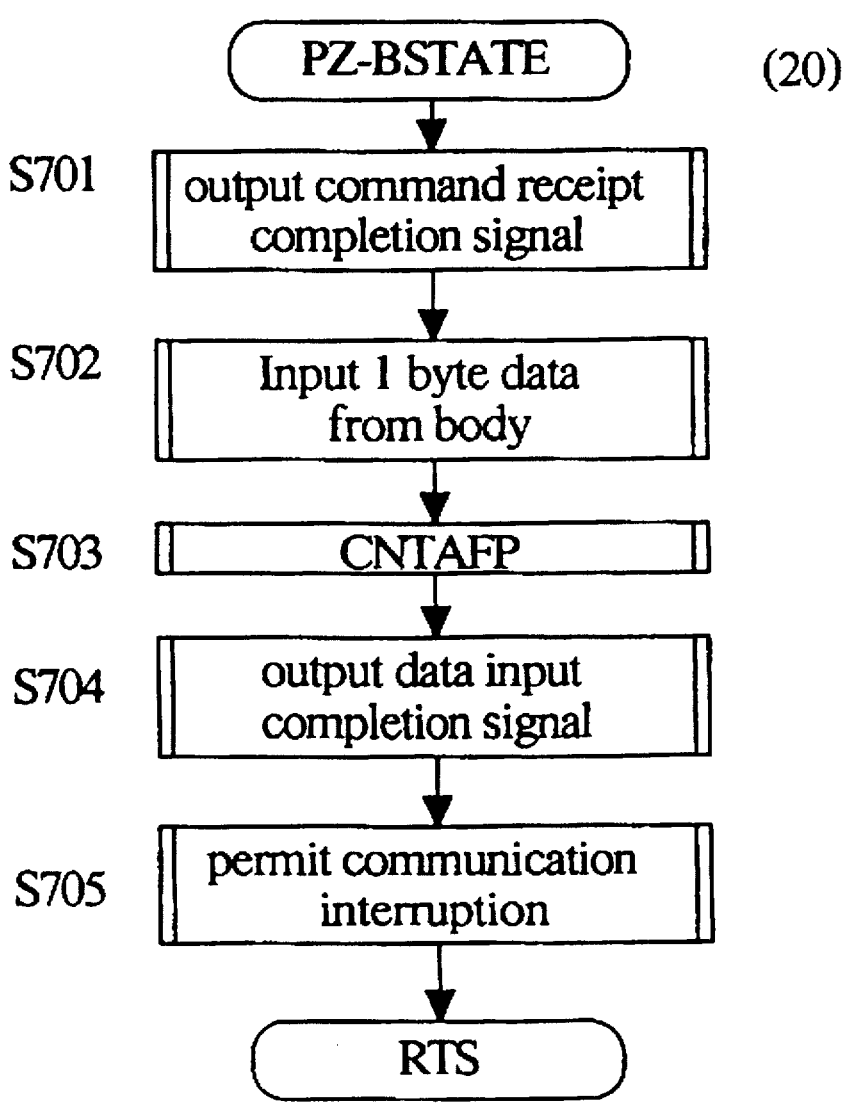
FIG. 27 is a flow chart effective upon receipt of input information regarding constant image magnification zooming.

PZ-BSTATE (20) is a command which sends necessary data for IPZ (constant image magnification ratio zooming). The data sent by this command includes data which indicates the status of the focusing lens 53F, i.e., whether the lens is at the far end (infinite end) (F_ENDF=1) or the near end (closest end (F_ENDN=1), in far move (F_FARM=1) or near move (F_NEARM=1), whether or not the lens is in overlap integration (F_OVAF=1), whether or not it is in a moving object prediction mode (F_MOBJ=1), whether or not it is in a focusing state (F_AFIF=1), whether an image magnification ratio should be stored by means of command (communication) from the body or by means of judgement by the lens CPU 61 (F_ISM=1), etc. A flow chart regarding an operation upon receipt of the PZ-BSTATE command is shown in FIG. 27.

When the PZ-BSTATE command is inputted, the lens CPU 61 sends a command receipt completion signal, inputs PZ-BSTATE data of 1 byte from camera body 11, and performs subroutine CNTAFP regarding an AF pulse count operation (S701–S703). Detail of the CNTAFP subroutine is shown in FIGS. 39 to 43 which will be explained hereinafter.

A data input completion signal is then outputted and communication interruption is permitted. Then, the process is returned (S704, S705). The camera has an AF drive source mounted to the body 11. Accordingly, when AF pulses are counted in the lens 51, driving direction information of AF, etc. is always sent from the body 11 to lens 51 by means of this command, before actuating AF and after changing driving direction.

Figure 28:
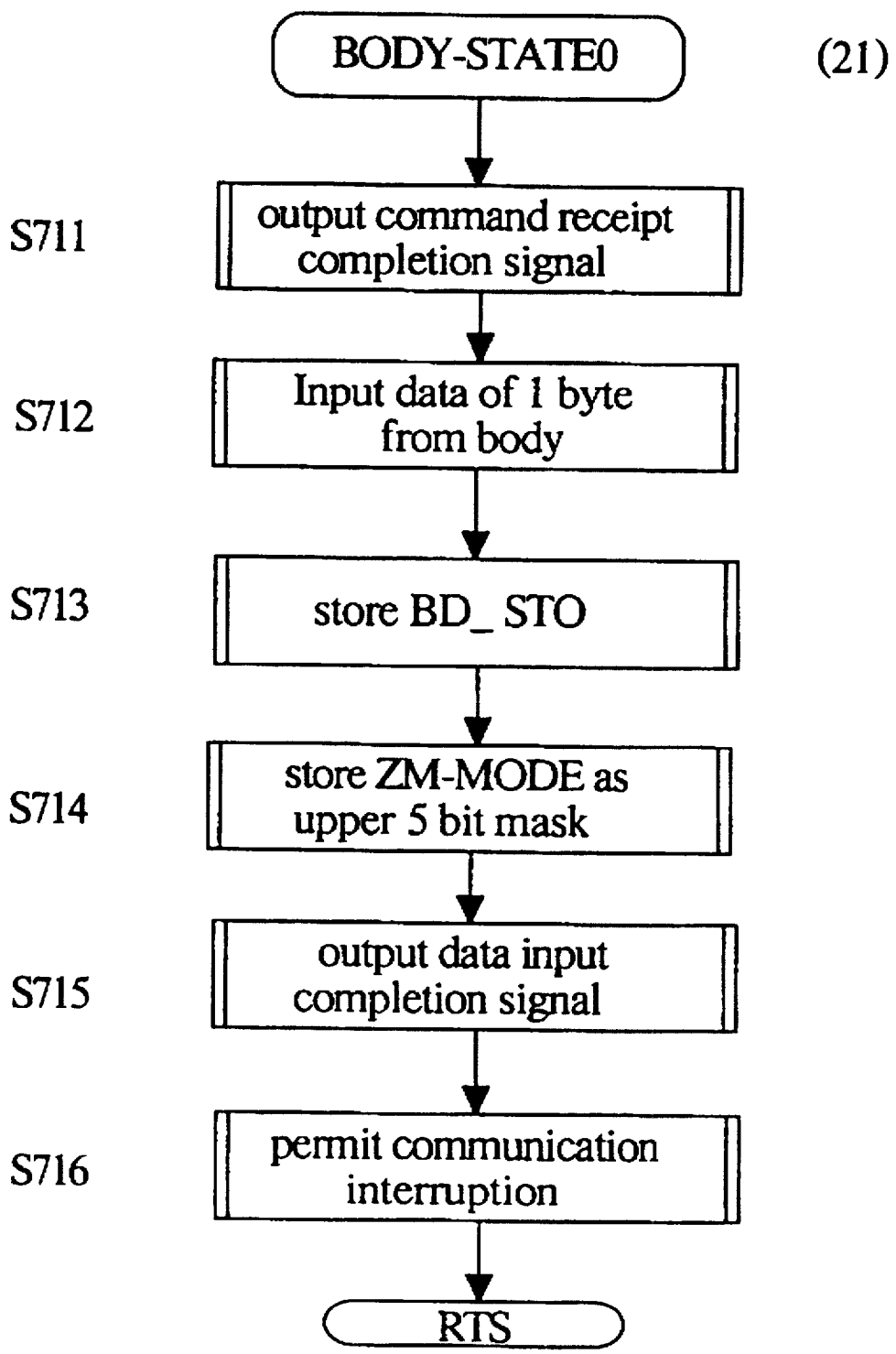
FIG. 28 is a flow chart effective upon receipt of input regarding a condition of a camera body.

BODY-STATE0 is a command which informs the photographing lens of data regarding the state or condition of the body. This command is sent during periodical communication between the photographing lens and the camera body. A flow chart regarding an operation upon receipt of the BODY-STATE0 command is shown in FIG. 28.

When the BODY-STATE0 command is inputted, the lens CPU 61 sends a command receipt completion signal, and inputs data (BODY-STATE0) of 1 byte regarding the status of the body 11 from the body so as to store the data in lens RAM 61 at BD_STO (S711–S713). When the upper 5 bits of the above 1 byte data are masked and stored in lens RAM 61b at ZM_MODE, a data input completion signal is outputted and communication interruption is permitted. The process is then returned (S714–S716).

In the lower 3 bits, BODY-STATE0 data includes information regarding the power zooming mode of the camera body 11, such as, constant image magnification ratio (ISZ), during-exposure zooming (EXZ), manual power zooming (MPZ), etc. BODY-STATE0 data includes, in the upper 5 bits, information regarding the ON/OFF status of an electric source of the body circuit system (F_VDD=1), the ON/OFF status of the photometric switch (F_SWS=0), supply of electricity from the body 11 to the zoom motor (F_BATT= 1), AF/MF changing switch of the body 11 being AF or MF (F_SWAF), and the mode of AF being single or continuous (F_MAF). Note that the flag F_SWAF which indicates the switch data of the AF/MF selecting switch provided in the camera body indicates AF and MF when the flag is set and cleared, respectively.

Flag F_BATT is set on the camera body side by the main CPU 35 when electricity is supplied to the terminal VBATT. On the other hand, on the lens side, the lens CPU 61 monitors the level of voltage of the terminal VBATT through the port P12. The lens CPU 61 sets the flag F_BDET for the detection of the electric source of the power zooming being turned ON when the voltage is over a predetermined level. Then, the flag F_BDET is outputted to the body side (in the main CPU) by the POFF-STATE communication. The camera body can determine if electric power is properly supplied to the lens side by checking if flag F_BDET is set.

When the flag F_BDET remains cleared even if the flag F_BATT has been set, the power supply to the terminal VBATT is stopped on the assumption that something unusual has occurred.

Figure 29:
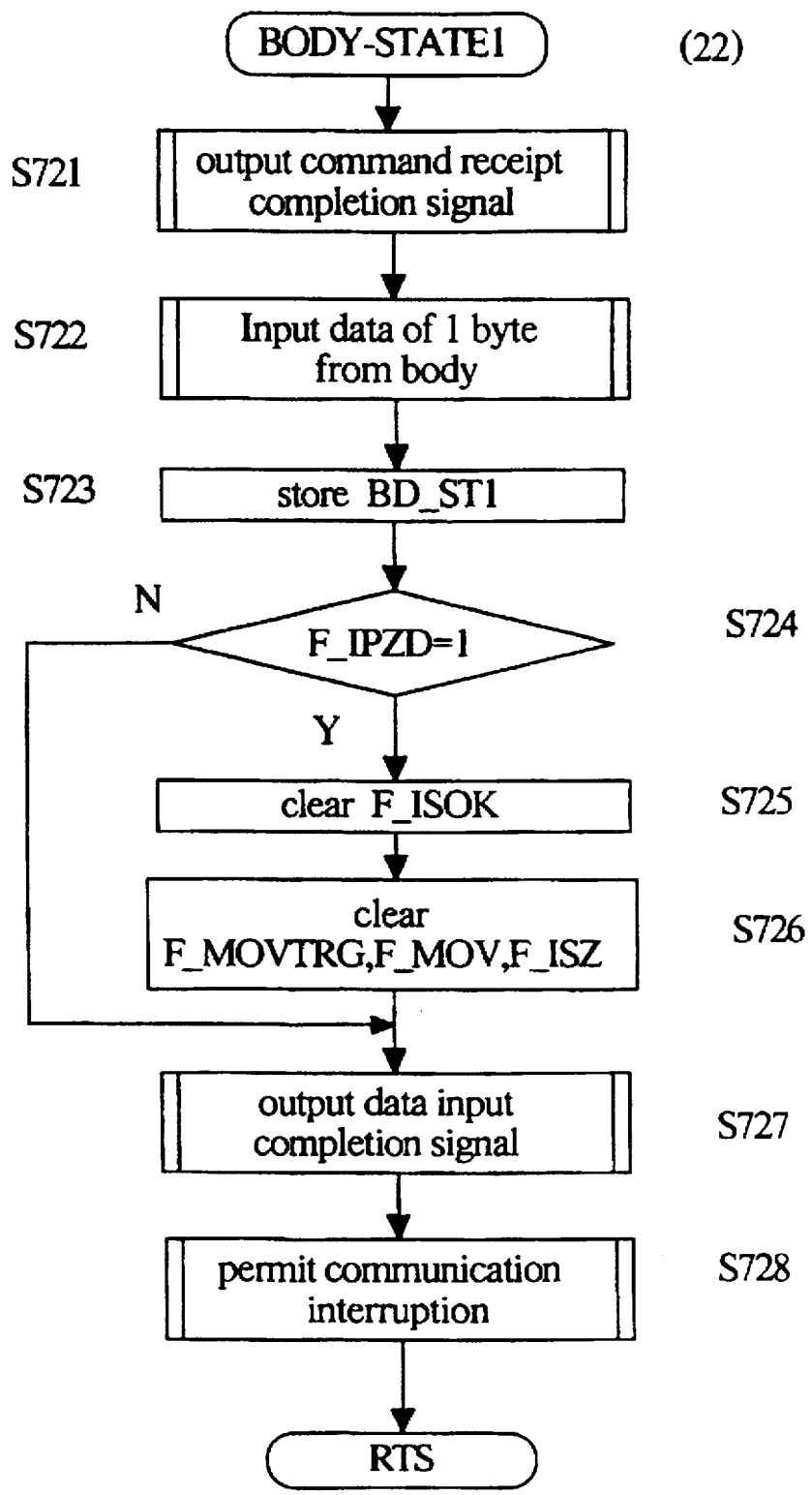
FIG. 29 is a flow chart effective upon receipt of input regarding a body sequence information.

BODY-STATE1 is a command which sends data regarding the status of the camera body 11, similar to those in BODY-STATE0 command. This command includes information regarding the status of the sequence of operations of the camera body 11. A flow chart regarding an operation upon receipt of a BODY-STATE1 command is shown in FIG. 29.

Upon receipt of the BODY-STATE1 command, the lens CPU 61 sends a command receipt completion signal and inputs data (BODY-STATE1) of 1 byte from the body 11 so as to store them in the lens RAM 61b at BD_ST1 (S721–S723). If flag F_IPZD is set, flags F_ISOK, together with flags F_MOVTRG, F_MOV, F_ISZ of address BD_ST1 are cleared. If flag F_IPZD is not set, the above operation is not performed (S724, S725, S726). A data input completion signal is outputted, and then communication interruption is permitted. Finally, the process is returned (S724, S727, S728).

The operation to be performed when flag F_IPZD is set is an operation similar to the IPZ-STOP command of instruction code 35. This command causes the lens CPU 61 to receive information regarding the body and to perform an IPZ-STOP command. Flags relating to the command will be explained below.

F_IPZD is a flag which identifies whether or not an operation similar to IPZ-STOP is to be performed.

F_MPZD is a flag which identifies whether or not manual power zooming is to be inhibited. When F_MPZD is set, manual power zooming is inhibited. Flag F_MPZD is referred to during the 2 ms timer interruption operation.

F_ISZD is a flag which identifies whether or not ISZ is to be controlled on the basis of AF pulse number of the present position (during focusing) or on the basis of focal length obtained from a predictor amount. This flag is referred to during a subroutine of ISZ (S541 in FIG. 18).

Figure 18:
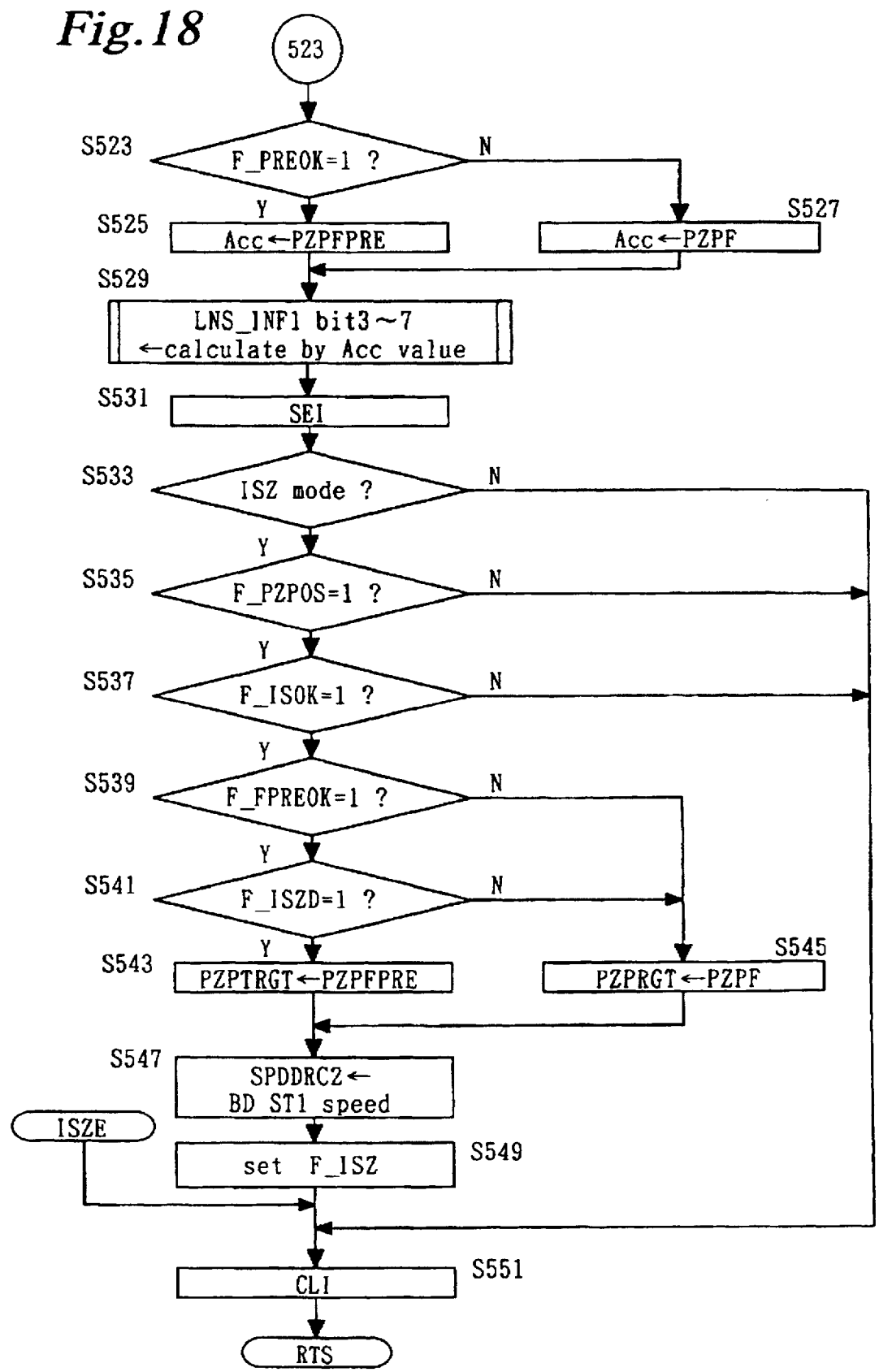

F_ISSPA and F_ISSPB are flags which identify the control speed of ISZ and are referred to in S547 in FIG. 18.

Figure 30:
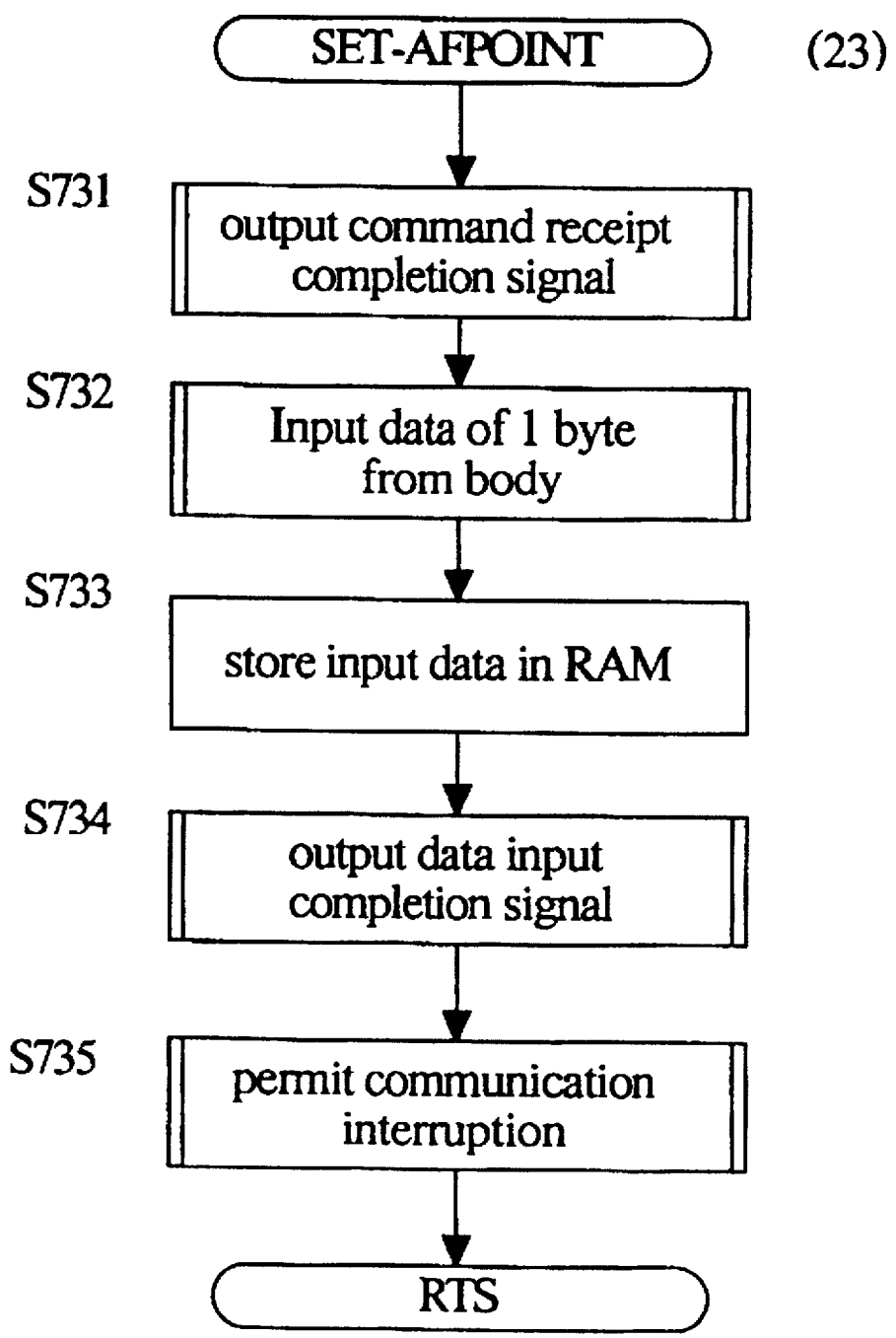
FIG. 30 is a flow chart effective upon receipt of input regarding an AF pulse from the camera body side.

A flow chart regarding an operation upon receipt of a SET-AFPOINT command is shown in FIG. 30.

Lens CPU 61 inputs a SET-AFPOINT command (23), outputs a command receipt completion signal, receives SET-AFPOINT data of 1 byte from the body side, so as to set them in lens RAM 61b at a predetermined address, outputs a data input completion signal and permits communication interruption. The process is then returned (S731–S735).

The SET-AFPOINT command is performed before communication of the LB command and LENS-AFPULSE (15).

A LENS-AFPULSE command determines which AFPULSE is to be sent from lens 51 to body 11, depending upon information sent by the SET-AFPOINT command.

When bit 3 (X) is set, AF pulse (AFPULSE (AFPXL,H)) of the present position is sent.

When bit 7 (ISZM) is set, AF pulse number (AFPULSE (ISZ_AFPL,H)), obtained when image magnification ratio is stored during ISZ mode, is sent. It is to be noted that it is impossible for bit 3 and bit 7 to be set at the same time.

If neither bit 3 nor bit 7 is set, bits 4 through 6 (FM0, FM1, FM2) become effective.

8 segments (0–7) for memorizing AF pulse data are provided in the lens RAM 61b of lens CPU 61 (AFP0L,H AFP7L,H). AF pulse data may be stored in respective segments by means of a command from the camera body 11. The three bits of bits 4 through 6 designate addresses 0 to 7. AF pulse data memorized in such addresses will be transmitted. This command only serves to designate one of the AF pulse data to be sent to the body 11 in LENS-AFPULSE (15).

Figure 31:
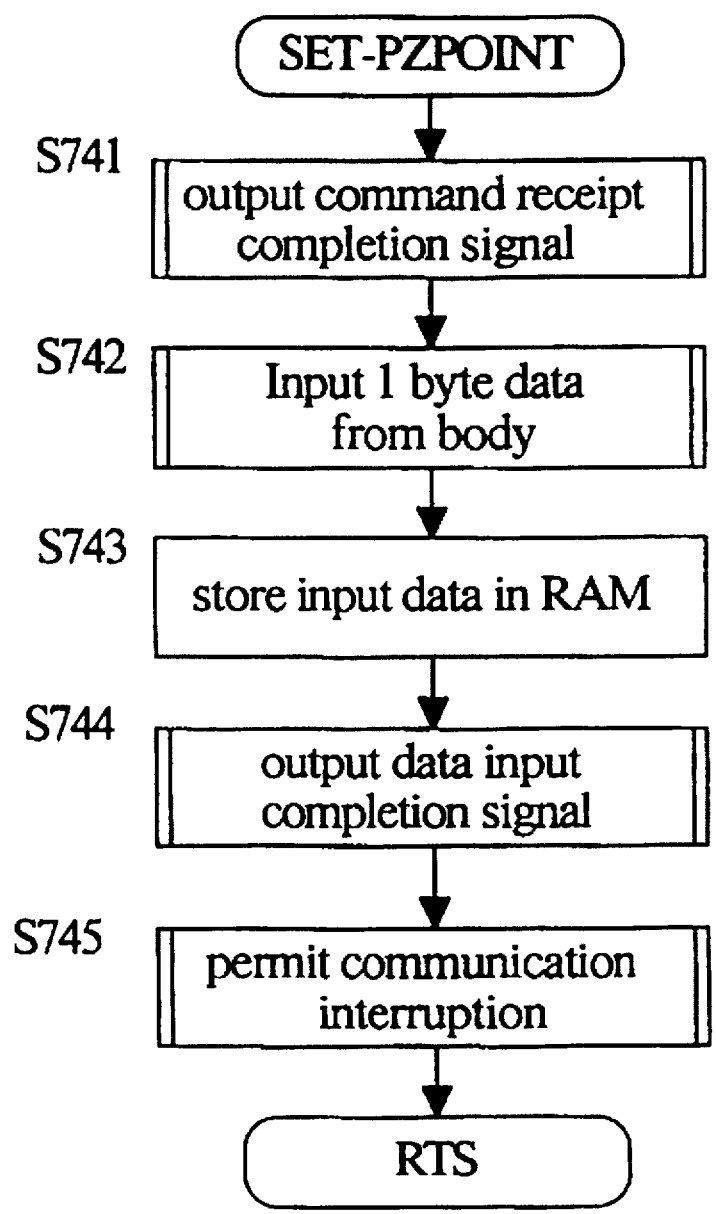
FIG. 31 is a flow chart effective upon receipt of input regarding a PZ pulse from the camera body.

A flow chart regarding an operation upon receipt of a SET-PZPOINT command is shown in FIG. 31.

When a SET-PZPOINT command (24) is inputted, the lens CPU 61 outputs a command receipt completion signal, receives SET-PZPOINT data from the body side and sets the same in the lens RAM 61b at a predetermined address, outputs a data input completion signal, and permits communication interruption. The process is then returned (S741–S745).

The SET-AFPOINT command is performed before communication of the LB command and FOCALLEN-X (16).

The LENS-AFPULSE command determines, on the basis of information sent by SET-PZPOINT command, whether focal length data of the present position or the focal length obtained when the image magnification ratio is memorized during the ISZ mode is to be sent to the camera body 11.

When bit 3 (X) is set, focal length data (FCLXL,H) of the present position is sent.

When bit 7 (ISZM) is set, focal length (focal length (ISZ_FCLL,H) of ISZ memory) obtained when the image magnification ratio is stored during ISZ mode is sent. It is to be noted that it is impossible for bit 3 and bit 7 to be set at the same time.

When neither bit 3 nor bit 7 is set, bits 4 through 6 (FM0, FM1, FM2) become effective.

8 segments (0–7) for memorizing focal length are provided in lens RAM 61b (FCL0L,H–FCL7L,H). Focal length may be stored in respective segments by means of a SET-PZPOINT command from the body 11. Three bits of bits 4 through 6 designate addresses 0 to 7. The focal lengths memorized in such addresses will be transmitted. This command only serves to designate one of the focal lengths to be sent to the body 11 in FOCALLEN-X (16).

Figure 32:
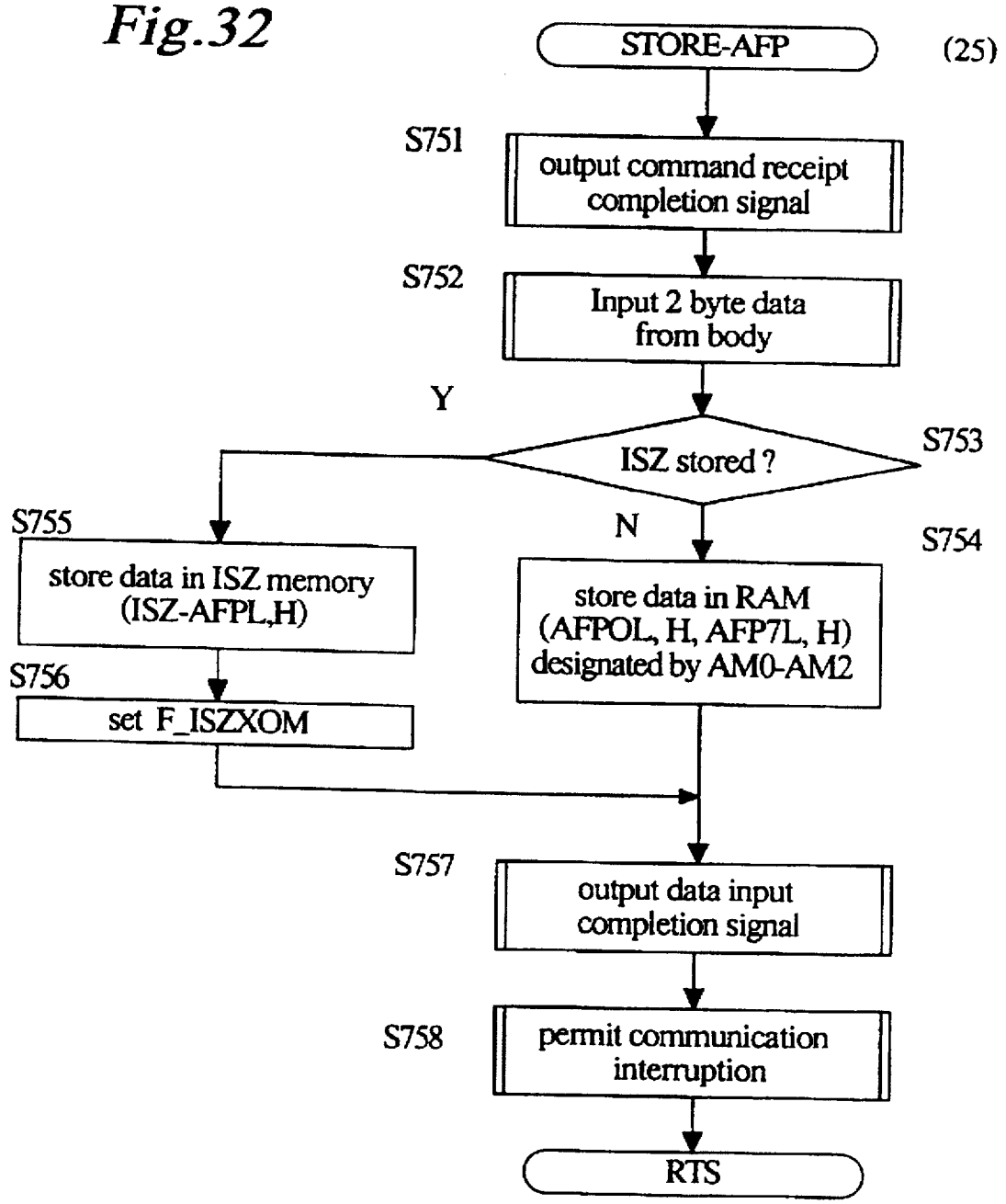
FIG. 32 is a flow chart effective upon receipt of a command which memorizes AF pulse data counted in the lens.

STORE is a command which sets predetermined AF pulse data at a designated address. A flow chart regarding an operation upon receipt of a STORE-AFP command is shown in FIG. 32.

Lens CPU 61, upon receipt of a STORE-AF command (25), outputs a command receipt completion signal and inputs data of 2 bytes from the camera body 11 (S751, S752). If one of the bits is not ISZ memory (ISZM=0), the input data is stored in lens RAM 61b at address (AFP0L, H–AFP7L,H), designated by AM0–AM2 of the data. The data is otherwise (ISZM=1) stored in the ISZ memory (ISZ-AFPL,H) of lens RAM 61b (S751–S756). ISZ operational flag F_ISZXOM is set, data input completion signal is outputted, and communication interruption is permitted. The process is then returned (S757–S758).

Figure 33:
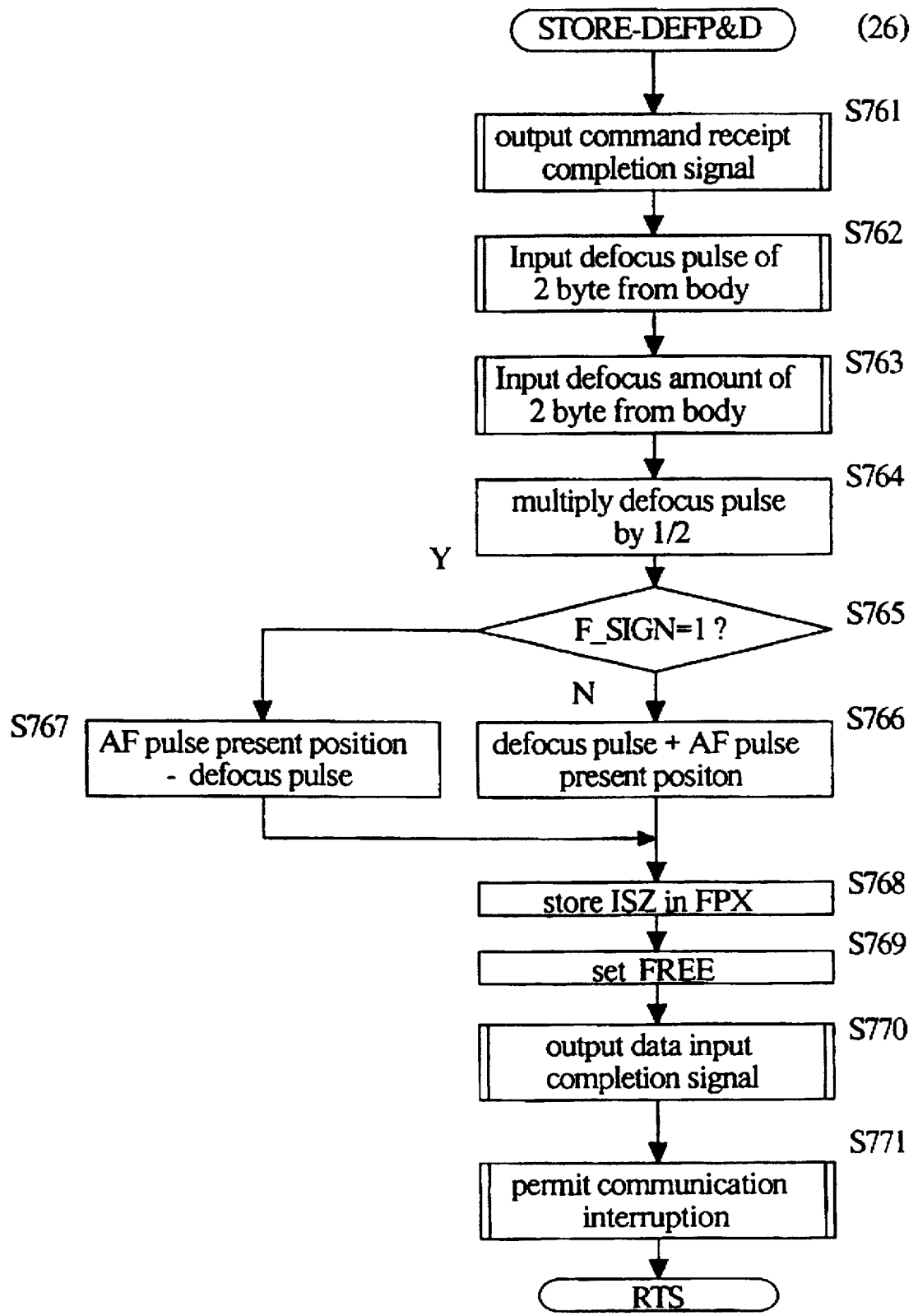
FIG. 33 is a flow chart regarding an operation for storing defocus amount, determined by AF on the body side, in a lens memory.

STORE-DEFP&D (26) is a command which causes the lens RAM 61b to store defocus amount and defocus pulse regarding camera body 11. A flow chart regarding an operation upon receipt of the STORE-DEFP&D command is shown in FIG. 33.

Lens CPU 61, upon receipt of a STORE-DEFP&D command, outputs a command input completion signal, and inputs defocus pulse data of 2 bytes and defocus amount data of 2 bytes from the camera body 11. This inputted defocus pulse is multiplied by ½ (S761–S764) in this case. Since the ratio of body AF pulses to lens AF pulses is 2:1, the input defocus pulse is multiplied by ½, although the ratio may be set as desired.

If flag F_SIGN has been cleared, the defocus pulse number is added to the present AF pulse number so as to store the added value in ISZ_FPX. If flag F_SIGN has not been cleared, the defocus pulse number is subtracted from the present AF pulse number and the subtracted value is stored in ISZ_FPX. When flag F_SIGN=1, the defocus amount is toward the FAR end, and when F_SIGN=0, the defocus amount is toward the NEAR end. Then, flag F_FPRE is set, a data input completion signal is outputted, and communication interruption is permitted. The process is then returned (S765–S771). The defocus pulse transmitted by means of the communication as described above is used in the ISZ operation routine so as to obtain objective focal length by utilizing defocus pulse. Flag F_FPRE is a flag which gives an indication to perform an operation using a predictor amount.

STORE-PZP (27) is a command which causes the present AF position (position of the focusing lens or the focusing object distance) and present position of PZ (position of the group of zooming lenses 53Z or the focal length) to be stored in a designated memory (address).

STORE-PZF is a command which causes the focal length designated by the camera body 11 to be stored at a predetermined address.

Figure 34:
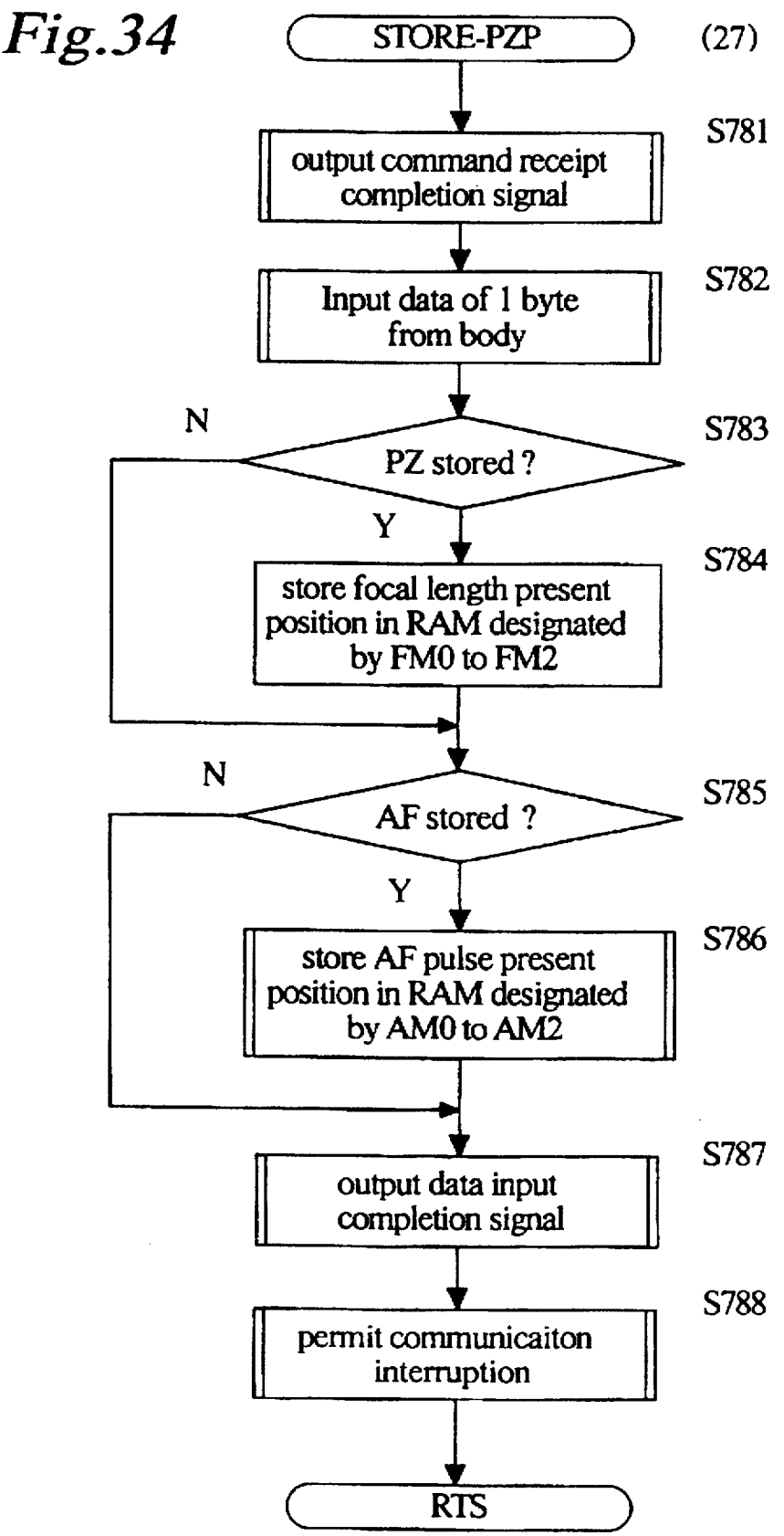
FIG. 34 is a flow chart regarding a storing operation for designated PZ pulse data and focal length data.

A flow chart regarding an operation upon receipt of the STORE-PZP command is shown in FIG. 34.

Lens CPU 61, upon receipt of the STORE-PZP command, outputs a command receipt completion signal and inputs data of 1 byte from the camera body 11 (S781, S782). If the PZ memory is designated (when PZM flag is set), focal length data of the present position is stored in the address (FCL0L,H–FCL7L,H) designated by FM0–FM2, otherwise the focal length data is not stored (S783, S784).

If the AF memory is designated (when AFM flag is set), an AF pulse number of the present position is stored in the address (AFP0L,H–AFP7L,H) designated by AM0–AM2. Otherwise, a data input completion signal is simply outputted, while permitting communication interruption. The process is then returned (S785–S788).

Figure 35:
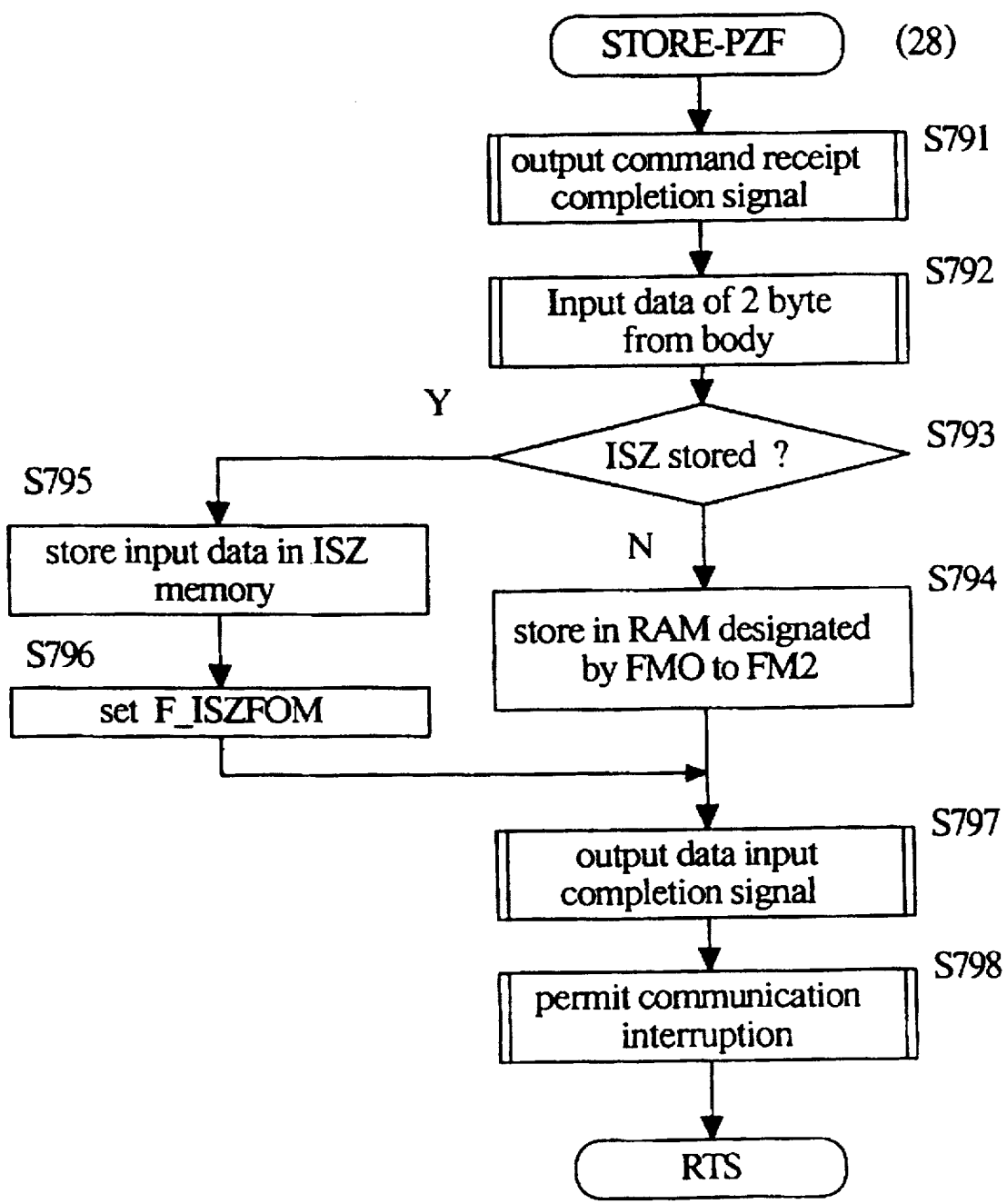
FIG. 35 is a flow chart regarding an operation for storing defocus amount obtained in the AF on the body side in the lens memory.

A flow chart regarding an operation upon receipt of a STORE-PZF command is shown in FIG. 35.

Lens CPU 61, upon receipt of a STORE-PZF command, inputs data of 2 bytes from the camera body. If this command is not ISZ memory (if flag F_ISZFM is not set), the inputted data of 2 bytes are stored in lens RAM 61b at address (FCL0L,H–FCL7L,H) designated by bits FM0 FM2. If the command is ISZ memory (if flag F_ISZFM is set), the inputted data is stored in ISZ memory and a flag F_ISZFOM, which performs operation on the basis of focal length, is set up (S791–S796). The a data input completion signal is outputted and communication interruption is permitted. The process is then returned (S797–S798).

Figure 36:
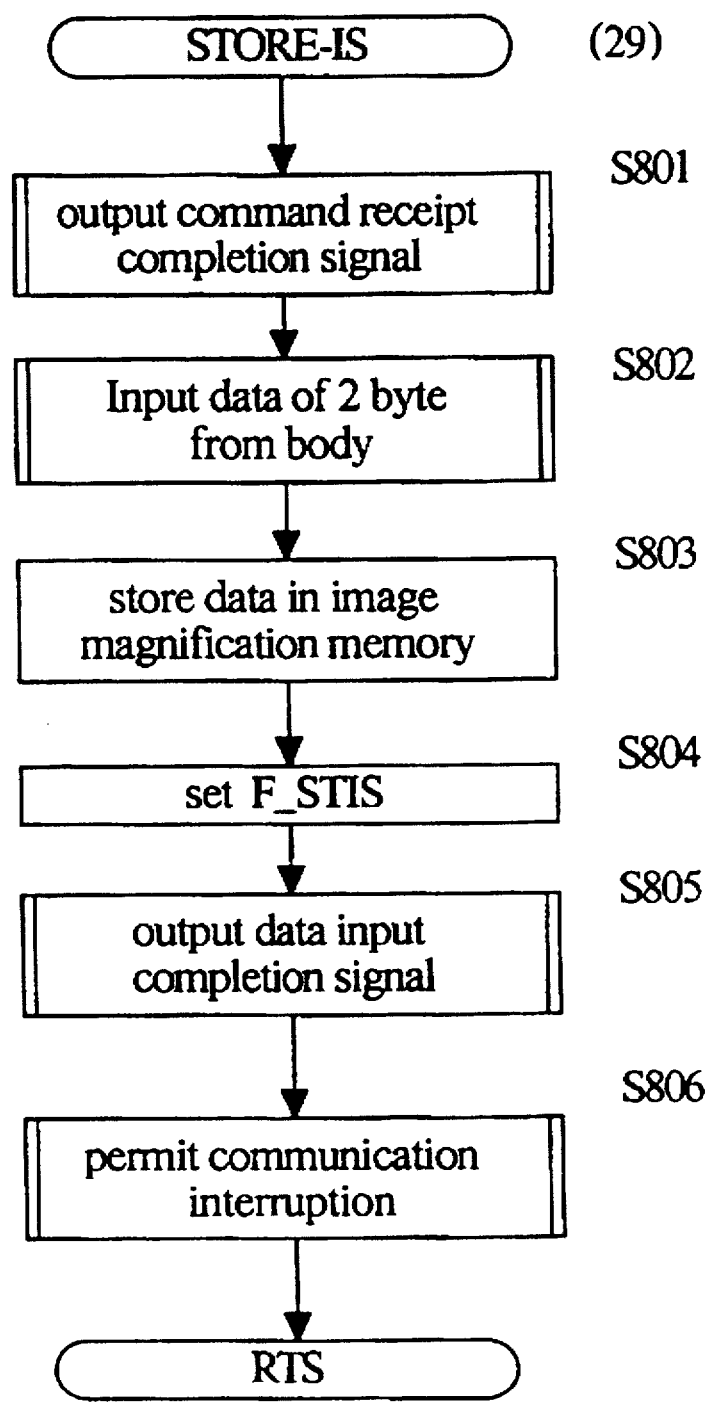
FIG. 36 is a flow chart regarding an operation for storing constant image magnification zooming data received from the camera body.

STORE-IS (29) is a command which causes the image magnification ratio memory (address ISZ-IMGL,H of lens RAM 61b) to store an image magnification ratio. A flow chart regarding an operation upon receipt of the STORE-IS command is shown in FIG. 36.

Lens CPU 61, upon receipt of the STORE-IS command, outputs a command receipt completion signal, inputs data of 2 bytes regarding an image magnification ratio from the camera body 11, stores the data in an image magnification ratio memory (ISZ-IMGL,H), and sets flag F_STIS (S801–S804). The data input completion signal is outputted and communication interruption is permitted. The process is then returned (S805–S806). Flag F_STIS is a flag for performing an operation of image magnification constant zooming in accordance with the image magnification ratio sent from the camera body.

MOVE-PZMD (2A) is a command which causes power zooming in the designated direction or toward a focal length in the designated memory (address in lens RAM 61b).

MOVE-PZF (2B) is a command which performs power zooming to a designated focal length, for example, to a focal length calculated in the camera body 11. The data of this command includes data regarding focal length and zooming speed.

Figure 37:
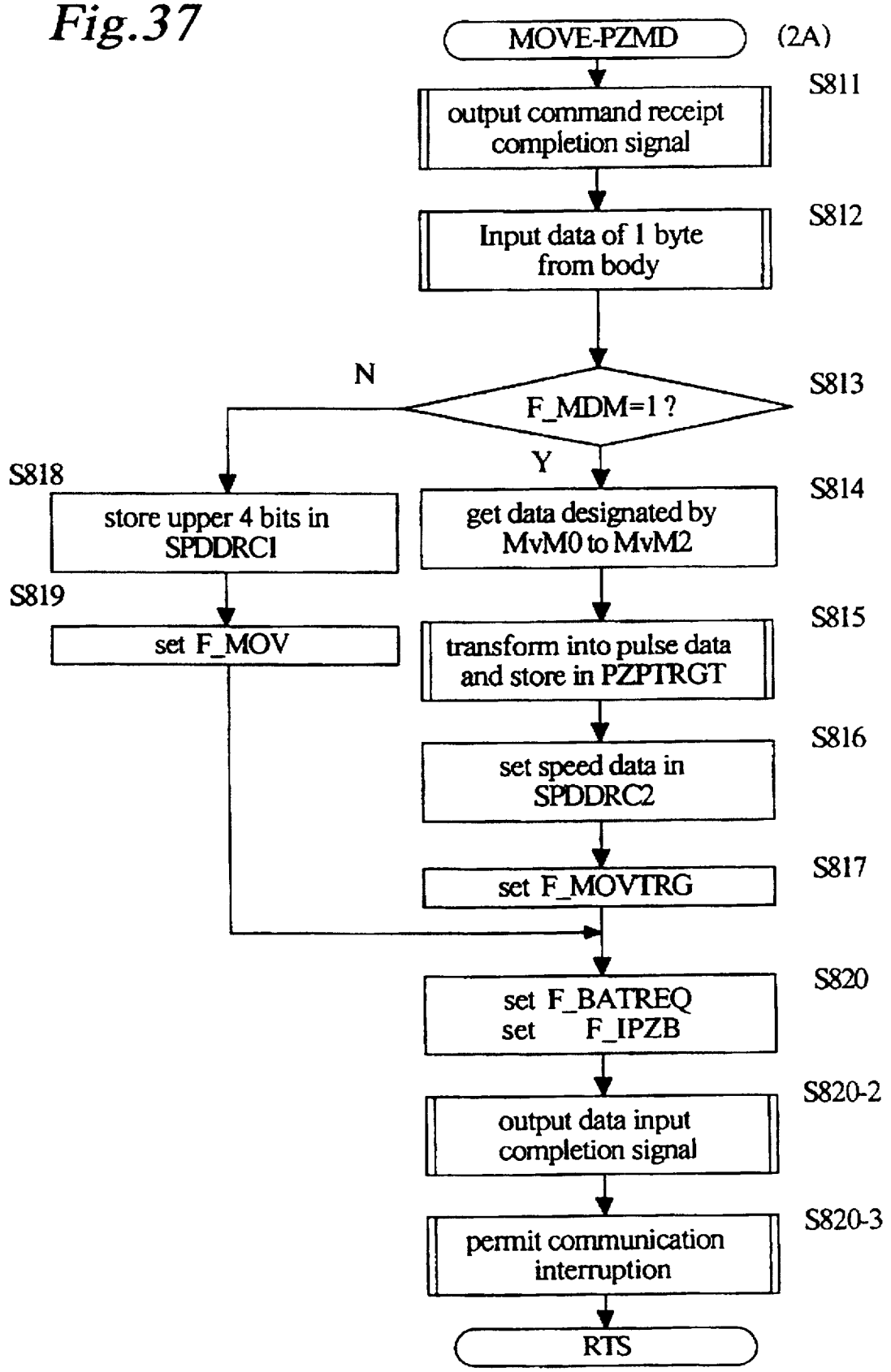
FIG. 37 is a flow chart regarding powered zooming in a designated direction, or to a designated position.

A flow chart regarding an operation upon receipt of the MOVE-PZMD command is shown in FIG. 37.

Lens CPU 61, when the MOVE-PZMD command is inputted, outputs a command input completion signal, and inputs data of 1 byte from the camera body 11 (S811–S812). If the flag F_MDM is set in the input data, data is read out from the address (FCL0L,H–FCL7L,H) designated by MVM0–MVM2. The read out data is converted into PZ pulse data and stored in the lens RAM 61b at PZPTRGT. Driving speed data (F_SPA, F_SPB of bits 6 and 7) is stored in SPDDRC2, and flag F_MOVTRG is set. If flag F_MDM is not set, the upper 4 bits of the input data are stored in address SPDDRC1 and flag FMOV is set (S813–S819). These data are referred to in the 2 ms timer interruption routine so as to perform power zooming in a designated manner.

When flags F_LBATREQ and F_IPZB are set, a data input completion signal is outputted and communication interruption is permitted. The process is then returned (S820–S820-3). If flag F_MDM (bit 3) is set, the command is to perform power zooming toward the focal length stored in the designated memory. If flag F_MDM is not set, the command is to perform power zooming in a direction designated by flag F_MDT and F_MDW (bits 4 and 5). Flag F_MDT designates driving in the TELE direction, flag F_MDW designates driving in the WIDE direction, and flags F_SPA and F_SPB (bits 6 and 7) designate zooming speed.

Figure 38:
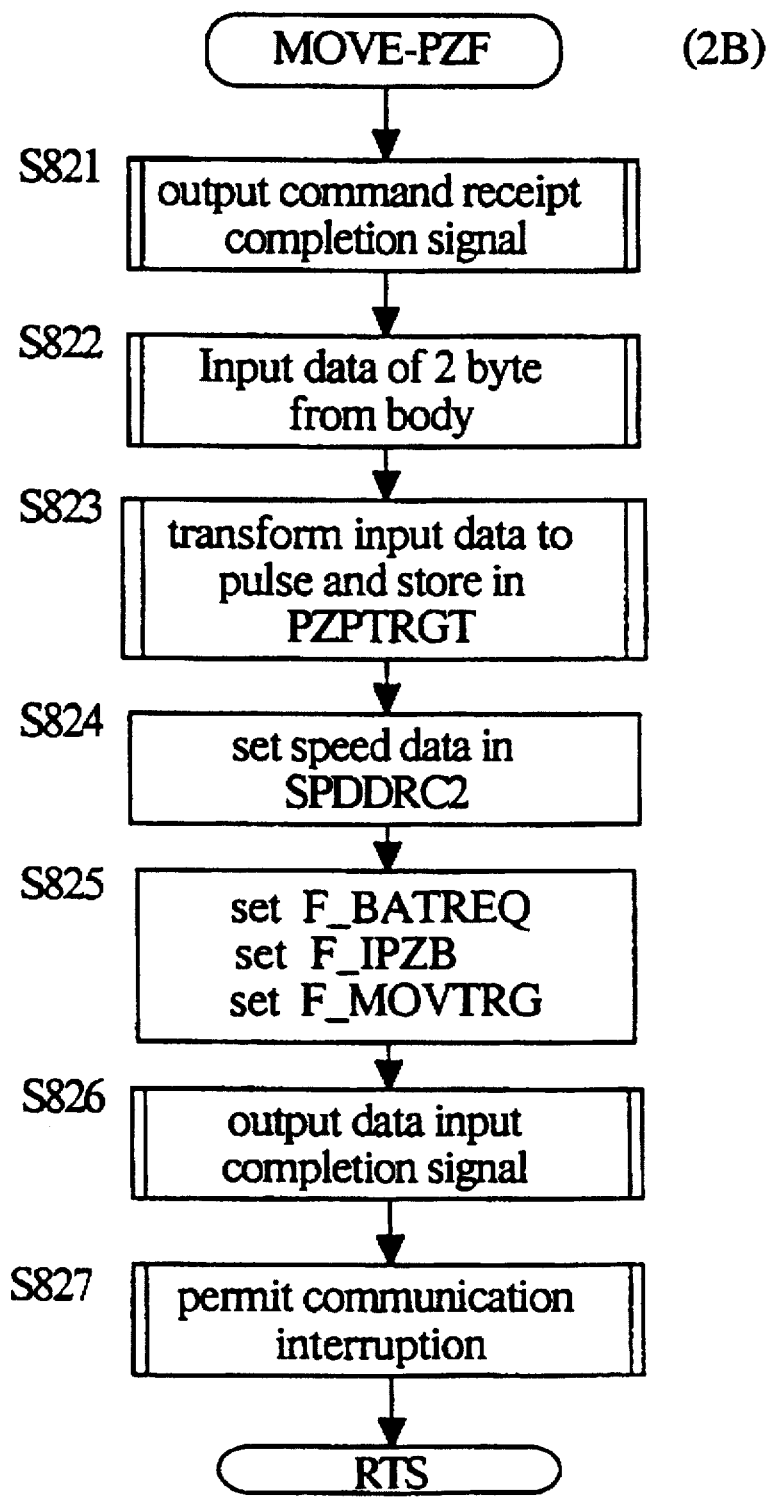
FIG. 38 is a flow chart regarding the powered zooming operation based on the data designated by the camera body.
Figure 39:
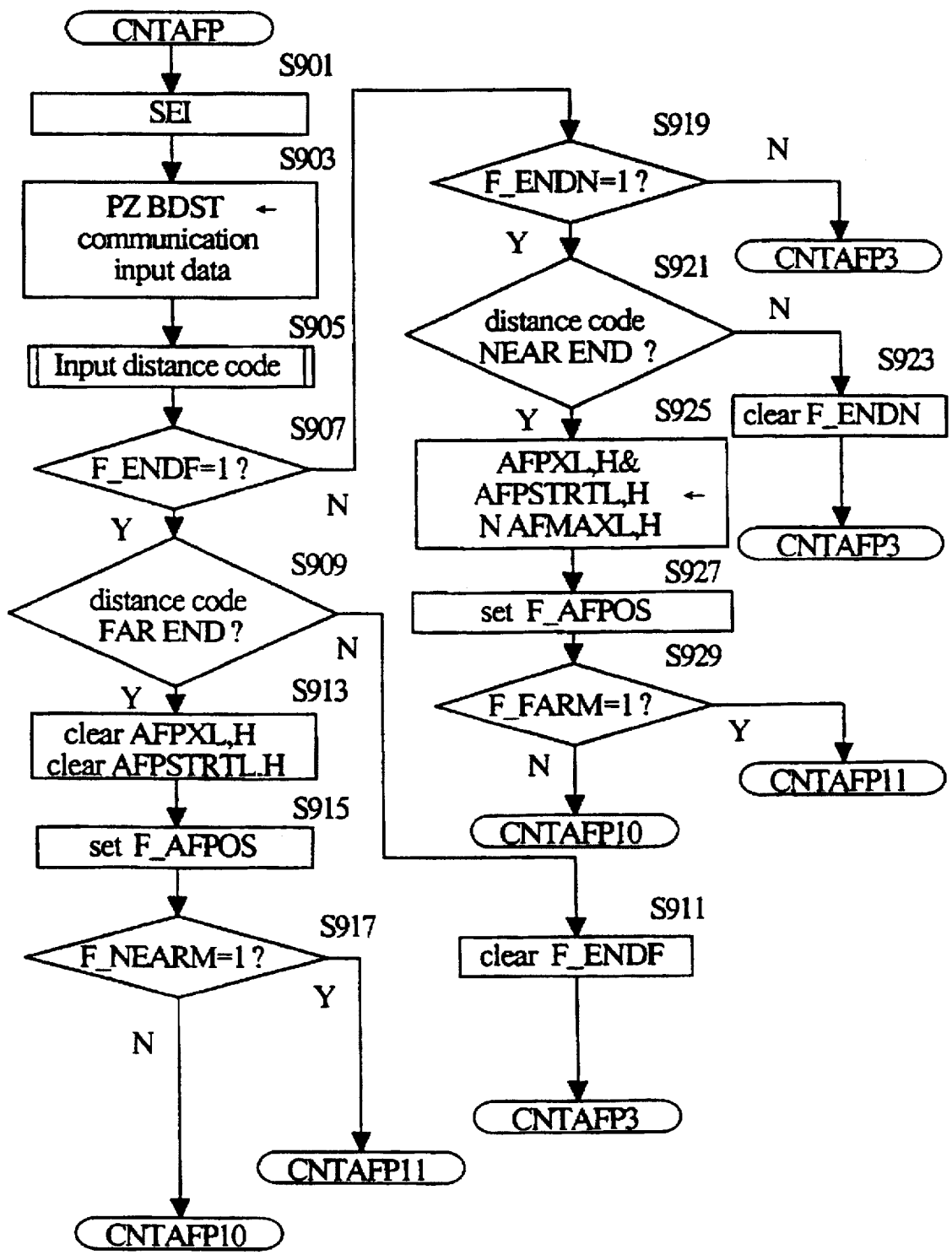
FIGS. 39, 40, 41, 42 and 43 are a lens flow chart regarding an AF pulse count operation.

A flow chart regarding an operation upon receipt of a MOVE-PZF command is shown in FIG. 38.

Lens CPU 61, when the MOVE-PZF command is inputted, outputs a command receipt completion signal, inputs focal length data of 2 bytes from camera body 11, converts input focal length data into PZ pulse data so as to store the same in the lens RAM 61b at address PZPTRGT, sets speed data in SPDDRC2, and sets flags F_LBATREQ, F_IPZB, F_MOVTRG. These data are referred to in the 2 ms timer interruption routine so as to perform power zooming in a designated manner. A data input completion signal is outputted and communication interruption is permitted. The process is then returned (S821–S827).

CNTAFP Operation

An AF pulse count operation in the photographing lens 51 will be explained below with reference to the flow charts shown in FIGS. 39 to 43. This count operation is a detail of an operation executed in S703 by means of the PZ-BSTATE command (20) shown in FIG. 27. In the illustrated embodiment, the value of the AF pulse counter is cleared (set to zero) when the focusing lens 53F reaches the FAR end (infinite photographing position). On the other hand, a maximum value is set at the AF pulse counter when the focusing lens reaches the NEAR end (closest photographing position). In the case of NEAR MOVE (driven toward closest distance), the AF pulse outputted from AF pulser 59 is added thereto. In the case of FAR MOVE (driven toward infinite), the AF pulse is subtracted therefrom.

Interruption is inhibited, the data inputted during communication is stored at address PZ_BDST, and the present distance code is inputted from the distance code plate 81 (S901–S905).

If the flag F_ENDF to identify FAR END (infinite position) is set, it is checked if the inputted distance code is a code of the FAR END (S907–S909). If the distance code is FAR END, the present AF pulse value and AF pulse count start value (address AFPZL,H, AFPSTRTL,H) are cleared and a flag F_AFPOS is set up to indicate that the AF pulse of the present position is known (S909, S913, S915). If a flag F_NEARM to identify NEAR MOVE is cleared, the process jumps to a CNTAFP10 operation. If F_NEARM flag is set, the process jumps to a CNTAFP11 operation, since the driving direction is to be changed (S917). If the detected distance code is not the FAR END code, far end flag F_ENDF is cleared and the process jumps to a CNTAFP3 operation (S909 and S911).

If the far end flag F_ENDF is cleared, the near end flag F_ENDN, which identifies the near end (closest focusing position), is checked. If the near end flag is cleared, the process proceeds to CNTAFP3 (S919).

If the near end flag F_ENDN is set, the process checks if the distance code is the near end code. If it is not the near end code, the near end flag F_ENDN is cleared and the process proceeds to a CNTAFP3 operation (S919–S923). If the distance code is the near end, the AF pulse count value and AF pulse count start value are set at a maximum (set N_AFMAXL,H at AFPXL,H, AFPSTRTL,H), and flag F_AFPOS which identifies that the present AF pulse is known is set. The process checks if the present status is FAR MOVE (F_FARM=1). If it is FAR MOVE, the process proceeds to a CNTAFP11 operation, otherwise the process proceeds to a CNTAFP10 operation (S925–S929).

As described above, in the case of FAR END (F_ENDF=1) or NEAR END (F_ENDN=1), the count value of the AF pulse is corrected by the corresponding predetermined value. If the input distance code is determined to be at neither end, the above end point correction is not performed.

Figure 40:
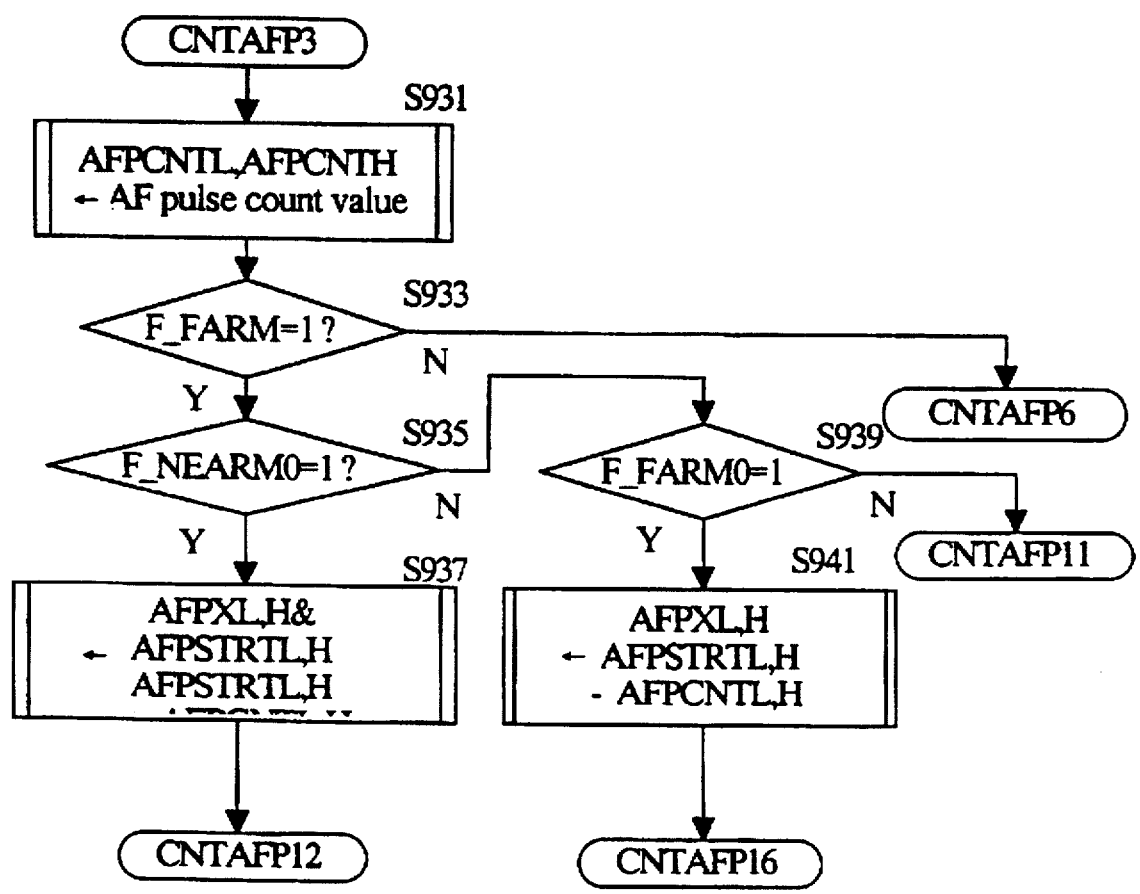

An operation (CNTAFP3 operation) when the group of focusing lenses 53F is positioned between the FAR END and NEAR END will be explained with reference to a flow chart shown in FIG. 40.

First, a counter value, in a hard counter of the present AF pulse, is set in an AF pulse counter (AFPCNTL,H) in steps S931, S933. If flag F_FARM is cleared, the process proceeds to a CNTAF6 operation. If F_FARM flag is set, it is checked if the previous status was NEAR MOVE (i.e., if flag F_NEARM0 is set) in steps S933, S935. If it is determined that the status has been changed from NEAR MOVE to FAR MOVE, an AF pulse count start value (AFPCNTL,H) is added to an AF pulse counter start value (AFPSTRL,H) so as to store it in the AFPXL, H & AFPSTRTL, H memory for present AF pulse value and AF pulse count start value. The process then proceeds to a CNTAFP12 operation (S935, S937).

If the previous status was not NEAR MOVE, it is determined if the previous status was FAR MOVE. If it is not the FAR MOVE, i.e., the lens was not moved, the process proceeds to CNTAFP11. If the previous status was also FAR MOVE, a count value (AFPCNTL,H) is subtracted from the AF pulse count start value (AFPSTRL,H) so as to store the difference in the present AF pulse value (AFPXL,H), since there is no change in driving direction. Then, the process proceeds to a CNTAFP6 operation (S939, S941).

Figure 41:
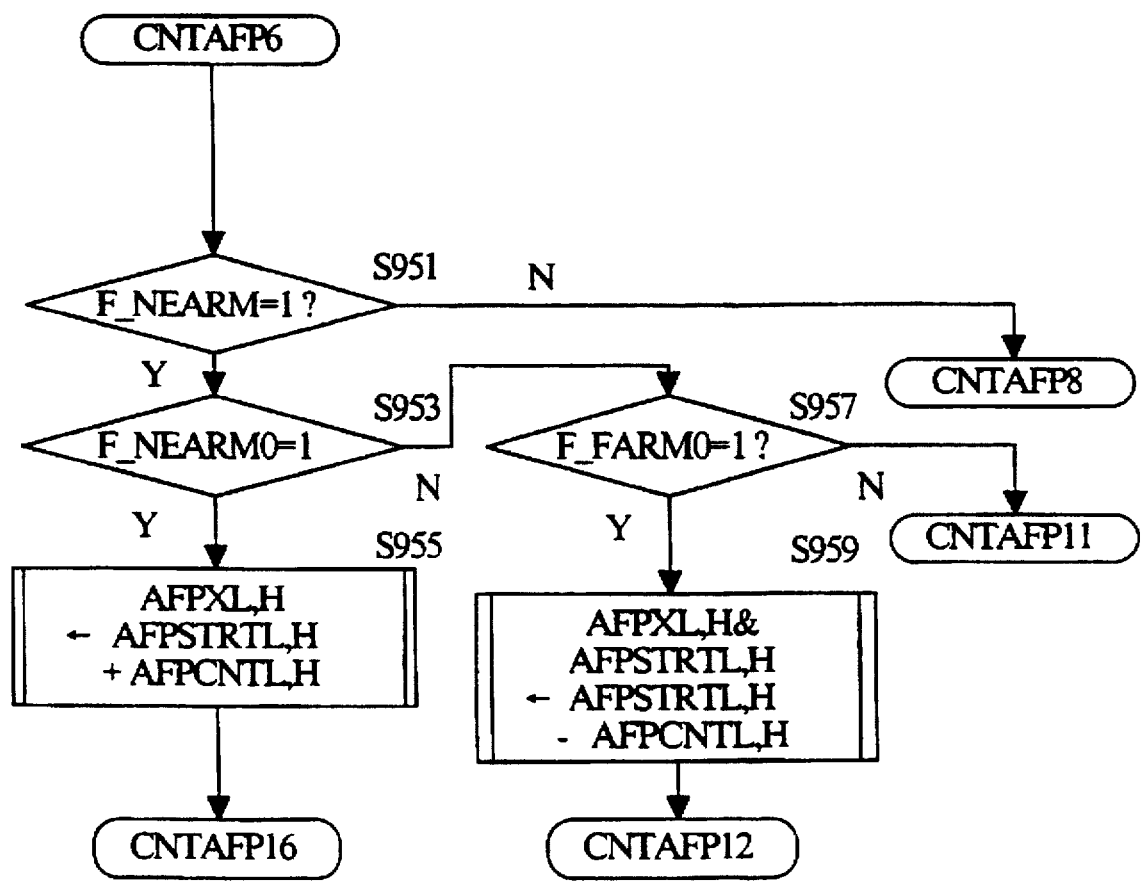

The CNTAFP6 operation, when the present status is not FAR MOVE, will be explained below with reference to the flow chart shown in FIG. 41. It is noted that the CNTAFP6 operation is the first operation that the process enters after start-up.

The process checks if it is the status is NEAR MOVE. If not NEAR MOVE, the process proceeds to a CNTAFP8 operation (S951). If it is NEAR MOVE, the process checks if the previous status was NEAR MOVE. If the previous status was also NEAR MOVE, an AF pulse count value (AFPCNTL, H) is added to the AF pulse count start value (AFPSTRTL,H) so as to store the sum as the present AF pulse value (AFPXL,H) in steps S953, S955.

If the previous status was not NEAR MOVE, but rather is FAR MOVE, this is an indication that the driving direction is to be changed. Accordingly, the AF count value (AFPCNTL,H) is subtracted from the AF pulse count start value (AFPSTRTL,H) so as to store the difference in the AF pulse value and AF pulse count start value (AFPXL, H&AFPSTRTL,H) in steps S958, S959. If the status is not FAR MOVE, the process proceeds to a CNTAFP11 operation (S957).

Figure 42:
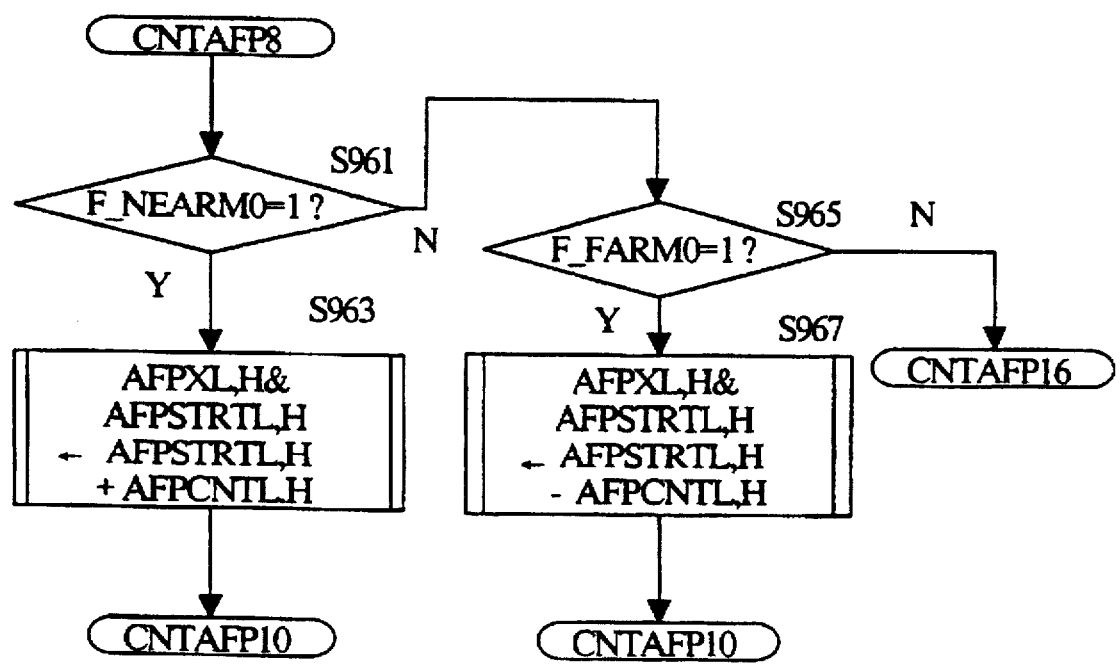

An operation effective upon stopping of the AF motor (CNTAFP8 OPERATION) will be explained below with reference to a flow chart shown in FIG. 42.

In the CNTAFP8 operation, the process first checks if the previous status was NEAR MOVE (S961).

If the previous status was NEAR MOVE, this means that the lens was stopped during NEAR MOVE. Accordingly, an AF pulse count value (AFPCNTL,H) is added to the AF pulse count start value (AFPSTRTL,H) and the sum is stored in the AF pulse value and AF pulse count start value (AFPXL,H & AFPSTRTL,H). The process then proceeds to a CNTAFP10 operation (S961, S963).

If the previous status was FAR MOVE, this means that the lens was stopped during FAR MOVE. Accordingly, an AF pulse count value (AFPCNTL,H) is subtracted from the AF pulse count start value (AFPSTRTL,H) so as to store the difference as the present AF pulse value and AF pulse count start value (AFPXL,H & AFPSTRTL,H). The process then proceeds to a CNTAFP10 operation (S961, S965, S967).

If the previous status was not NEAR MOVE nor FAR MOVE, this means that the lens has been stopped. Accordingly, the process proceeds to a CNTAFP16 operation (S961, S965).

Figure 43:
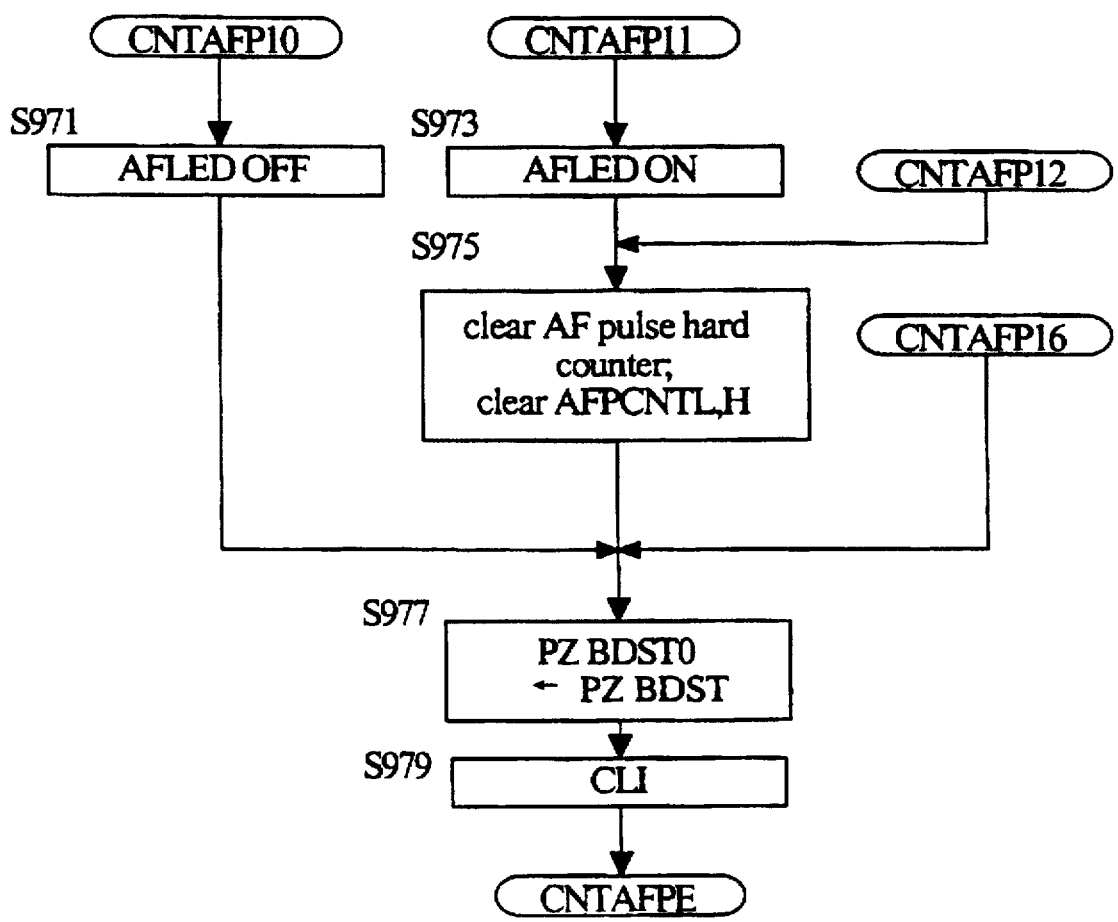

CNTAFP10, 11, 12, 16 operations will be explained below with reference to the flow chart shown in FIG. 43.

The process enters a CNTAFP10 operation just after the AF motor 39 has stopped. Accordingly, the LED of the AF pulser 59 is turned off, the content of PZ_BDST is stored in PZ BDST0, and communication interruption is permitted. The process then passes through the AF pulse count operation (S971, S977, S979).

The process enters a CNTAFP11 operation upon start of AF driving. Accordingly, the LED of AF pulser 59 is turned on, AF pulse hard counter and AF pulse count value memory (AFPCNTL,H) are cleared, the content of PZ_BDST memory is transferred to PZ_BDSTO, and communication interruption is permitted. The process then passes through an AF pulse count operation (S973, S975, S977, S979).

The process enters a CNTAFP12 operation when the driving direction is changed during the actuation of AF. Accordingly, the AF pulse hard counter and AF pulse count value (AFPCNTL,H) are cleared, the content of PZ_BDST memory is transferred to PZ_BDSTO, and communication interruption is permitted. The process then passes through an AF pulse count operation (S975, S977, S979).

The process enters a CNTAFP16 operation or processing during movement in the direction of NEAR MOVE or FAR MOVE (S655, S641), or when the AF motor is stopping (S965). Accordingly, the content of PZ_BDST is transferred to PZ_BDST0 and communication interruption is permitted. The process then passes through the AF pulse count operation(S977, S979).

LB Command Operation

An operation regarding a command which has the power zoom lens 51 send the information of the lens, i.e., state of the lens, to the camera body, in accordance with a demand from the camera body, will be explained below with reference to table 4 and the flow charts shown in FIGS. 44 to 51. Content of the command is shown in Table 4. The flow charts shown in FIGS. 44 to 51 are details of an operation of S209 in a communication interruption routine shown in FIG. 8. An operation will be performed in accordance with the lower bits of the command.

PZ-LSTATE OPERATION

Figure 44:
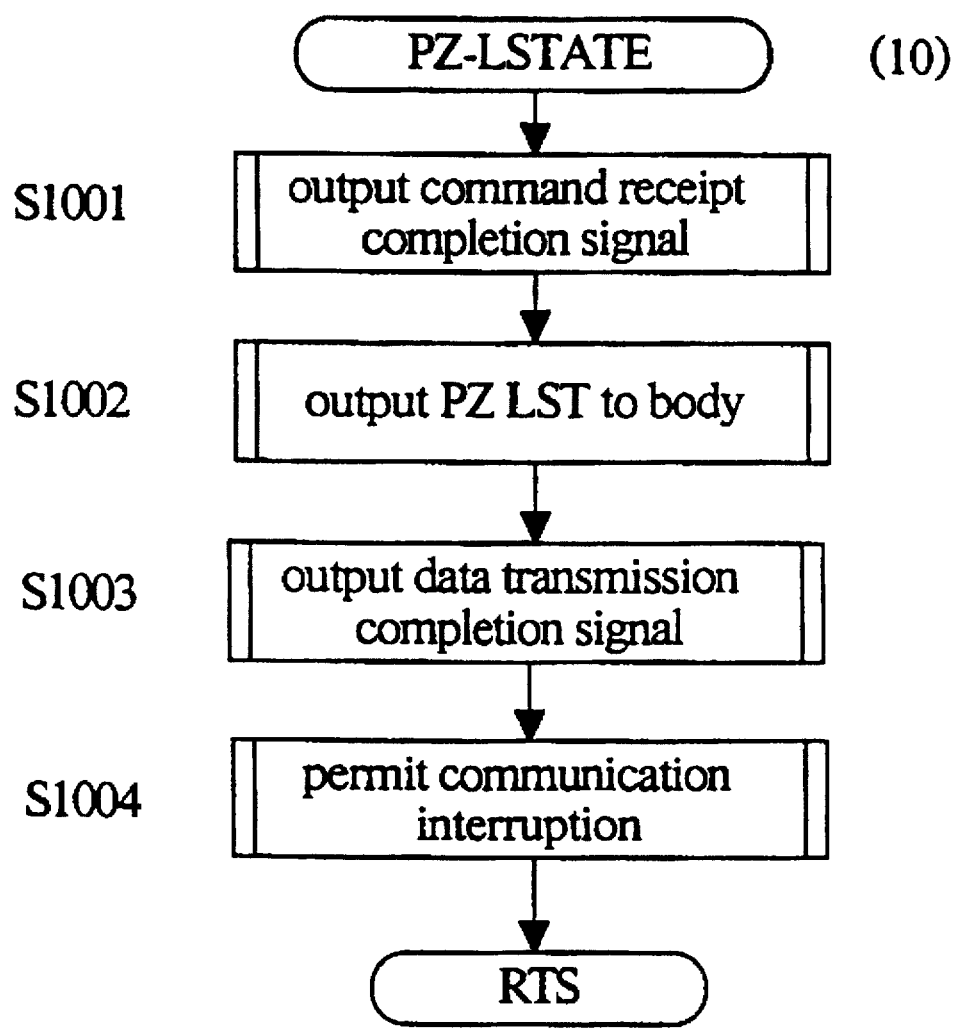
FIG. 44 is a flow chart regarding a transmission operation for the power zooming data on the photographing lens side.

The flow chart shown in FIG. 44 illustrates a PZ-LSTATE (10) command by which data regarding power zooming control of the power zoom lens 51 is sent to the camera body 11. Lens CPU 61, upon receipt of a (PZ-LSTATE) command requiring lens state information regarding power zooming, outputs a command receipt completion signal and thereafter outputs data regarding the type of power zooming control, (for example, constant image magnification ratio zooming control) to the camera body 11 (S1001, S1002). A data input completion signal is outputted and communication interruption is permitted. The process is then returned (S1003, S1004).

Flags used in this operation will be explained below.

Flag F_TMOV (bit 0) is set when the zoom motor is moving in the TELE direction.

Flag F_WMOV (bit 1) is set when the zoom motor is moving in the WIDE direction.

Flag F_TEND is set when the group of zooming lenses 53Z is positioned at the TELE end.

Flag F_WEND is set when the group of zooming lenses 53Z is positioned at the WIDE end.

Flag F_IPZB is set when power zooming (initializing operation for ISZ, PZ, and retracting operation) is performed in a mode other than the manual power zooming.

Flag F_IPZI is set when manual power zooming is performed during an ISZ operation.

Flag F_ISOK is set during an ISZ operation.

Flag F_MPZ is set while manual power zooming is being performed.

POFF-STATE, POFFS-WSLEEP OPERATION

Figure 45:
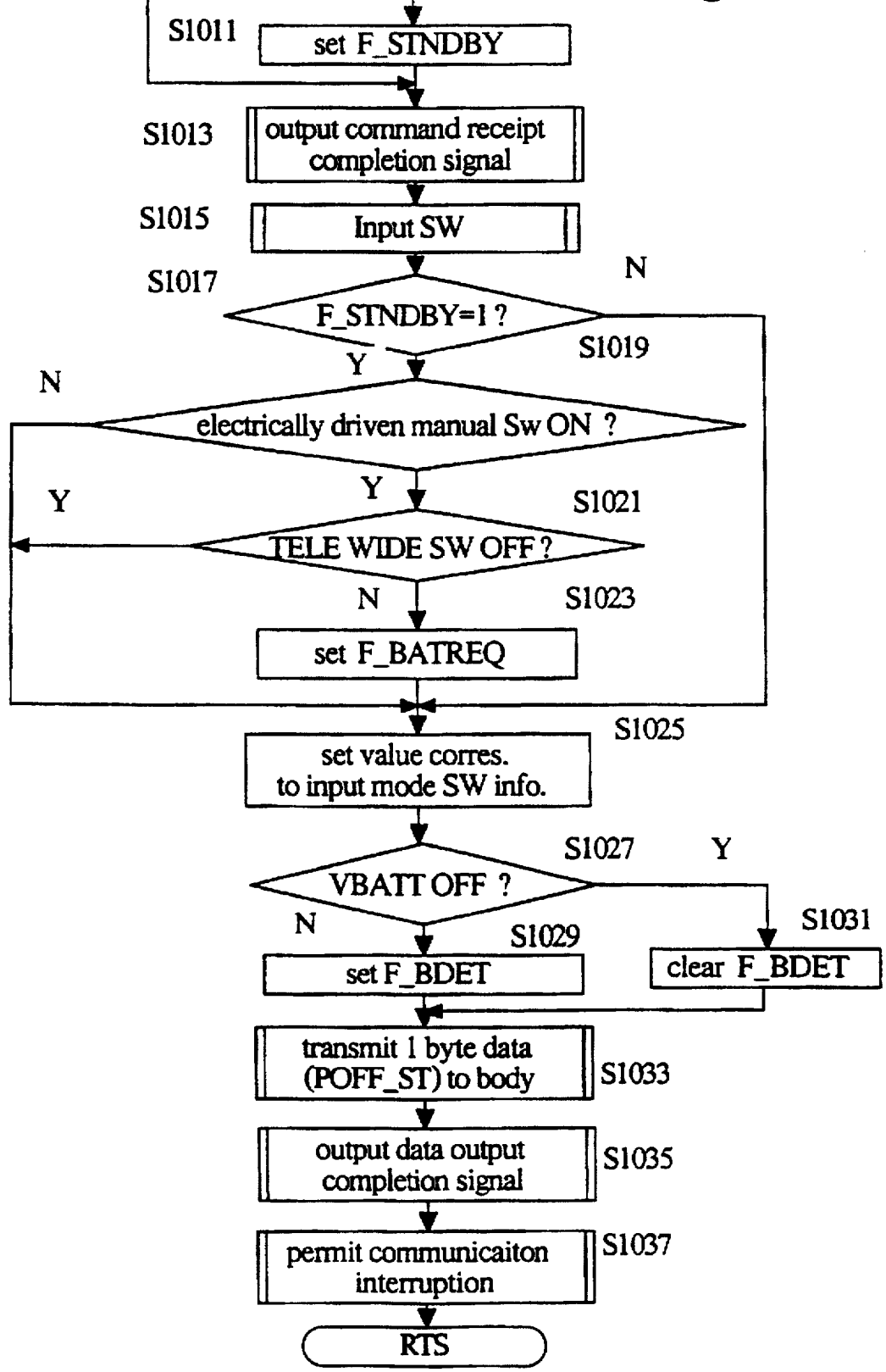
FIG. 45 is a flow chart regarding a standby operation for the photographing lens.

FIG. 45 illustrates a flow chart regarding the POFF-STATE (11) operation and POFFS-WSLEEP (12) operation. These operations serve to send to the body 11 information regarding power zooming of the lens, battery request information, monitor information of the electric source (battery) for Pz, etc. The difference between POFF-STATE (11) and POFFS-WSLEEP (12) resides in whether or not lens CPU 61 enters a lower power consumption mode after completion of this command communication. When the POFFS-WSLEEP (12) operation is performed, flag F_STNDBY is set during the communication and the lens CPU 61 proceeds to a low power consumption mode when returned to the main routine. That is to say, POFFS-WSLEEP (12) command is a command which performs both the POFF-STATE (11) and STANDBY command (30) of the instruction code.

In the case of the POFFS-WSLEEP (12) command, the lens CPU 61 sets the flag F_STNDBY, outputs a command receipt completion signal, and inputs the condition of switches (75, 77). If flag F_STNDBY is set (in the case of POFFS-WSLEEP (12)), electrically driven/manual changing switch (D/M switch) is assigned to an electrically driven mode. At this time, if the TELE or WIDE switch (speed changing switch) is turned on, the process sets the battery request flag F_BATREQ and proceeds to S1025. Otherwise, the process proceeds to S1025 (S1017, S1019, S1021, S1023).

If the flag F_STNDBY is set, the process normally completes this communication interruption and proceeds to a low power consumption mode after it is returned to the main routine. If, however, flag F_BATREQ is set, the process does not proceed to a low power consumption mode so that manual power zooming operation is possible, even though flag F_STNDBY is set to perform the normal operation, (see FIG. 7).

When flag F_STNDBY is not set, the process will not proceed to a low power consumption mode, even though it is returned to the main routine. Accordingly, operations such as manual power zooming will be possible even if flag F_BATREQ is not set in this command, provided that PZ speed switch 75 is turned on.

The process will proceed directly to S1025 if flag F_STNDBY is cleared (when POFF-STATE(11)).

In S1025, flags F_SLSW, F_ASSW, F_PZM, F_PZD, F_AFSW are set or cleared, depending upon the data of the zoom mode changing switch 77. The state of the VBATT terminal is monitored and if electric power for PZ is not supplied from the camera body 11, flag F_BDET is cleared (VBATT OFF), otherwise flag F_BDET is set (VBATT ON) in steps S1027–S1031. The data (POFF-ST) of 1 byte, as set above, is transmitted to the camera body 11, a data input completion signal is outputted and communication interruption is permitted. The process is then returned (S1033–S1037).

The flag F_SLSW indicates that the zoom setting button SL of the power zoom lens 51 is made ON and OFF when the flag is set and cleared, respectively.

The flag F_ASSW indicates that the slide switch of the power zoom lens 51 is in the position AS (i.e., self-back position or automatic power zoom mode changing position) and the position P or A (i.e., not in the position AS) when the flag is set and cleared, respectively.

The flag F_PZM indicates that the slide switch of the power zoom lens 51 is in the position AS or A (i.e., auto-zoom position) and the position P (i.e., manual power zoom position) when the flag is set and cleared, respectively.

The flag F-PZD on the power zoom lens side indicates that the switch of the power zoom lens 51 is a motor-driven switch and a manual switch when the flag is set and cleared, respectively.

The flag F_AFSW indicates that the AF switch of the power zoom lens 51 is in the AF position and MF position when the flag is set and cleared, respectively.

When a POFF-STATE operation is performed, the process jumps to step S1013 by-passing the flag F_STNDBY set operation in step S1011. Thereafter, operations similar to those of the POSFFS-WSLEEP operation will be performed.

LENS-INF1 OPERATION

Figure 46:
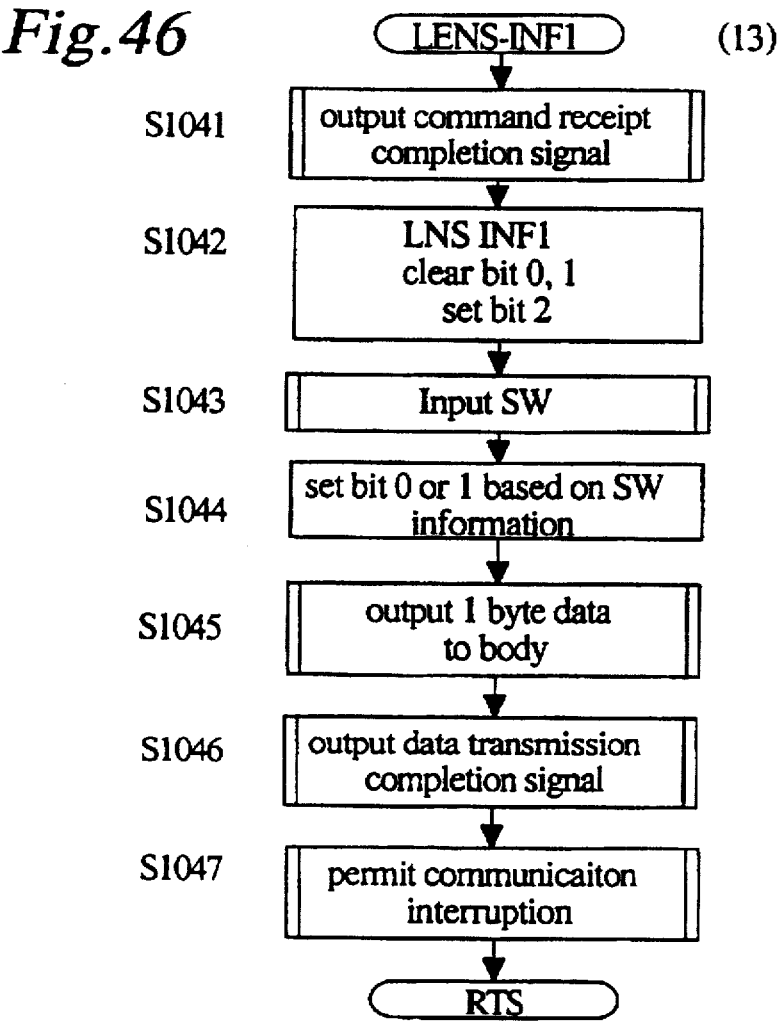
FIG. 46 is a flow chart regarding a transmission operation for variable data of the photographing lens.

A flow chart of a LENS-INF1 command shown in FIG. 46 illustrates an operation by which various information of the lens 51 is sent to the camera body 11.

Lens CPU 61, upon input of a LENS-INF1 data request command, sends a command receipt completion signal, clears 2 bits of LENS_INF1 data of 1 byte relating to the direction of power zooming, sets 1 bit to identify AE auto-lens, and inputs switch information of zooming direction (S1041–S1043). In response to the switch information as input, the corresponding bit is set so as to send 1 byte lens data to camera body 11 (S1044, S1045). A data transmission completion signal is outputted, and communication interruption is permitted. The process is then returned (S1046 and S1047). It is to be noted that LENS_INF1 data includes data relating to constant image magnification ratio zooming. The detail of which is described above.

LENS-INF2 OPERATION

Figure 47:
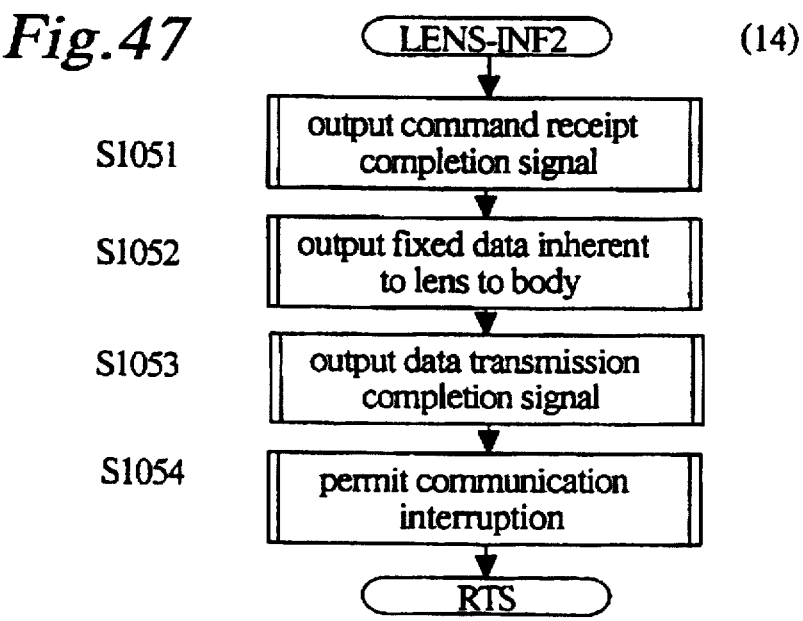
FIG. 47 is a flow chart regarding a transmission operation for fixed information of the photographing lens.

The flow chart of a LENS-INF2 command shown in FIG. 47 performs an operation by which fixed data inherent to the lens 51 is sent to the camera body 11.

Lens CPU 61, upon input of a LENS-INF2 command, outputs a command receipt completion signal, outputs LNS-INF2 data to the camera body 11, outputs a data input completion signal, and permits communication interruption. The process is then returned (S1051–S1054). LENS-INF2 data includes data to identify lens type, and PZ lens and the data is fixed data stored in ROM 61a.

LENS-AFPULSE OPERATION

Figure 48:
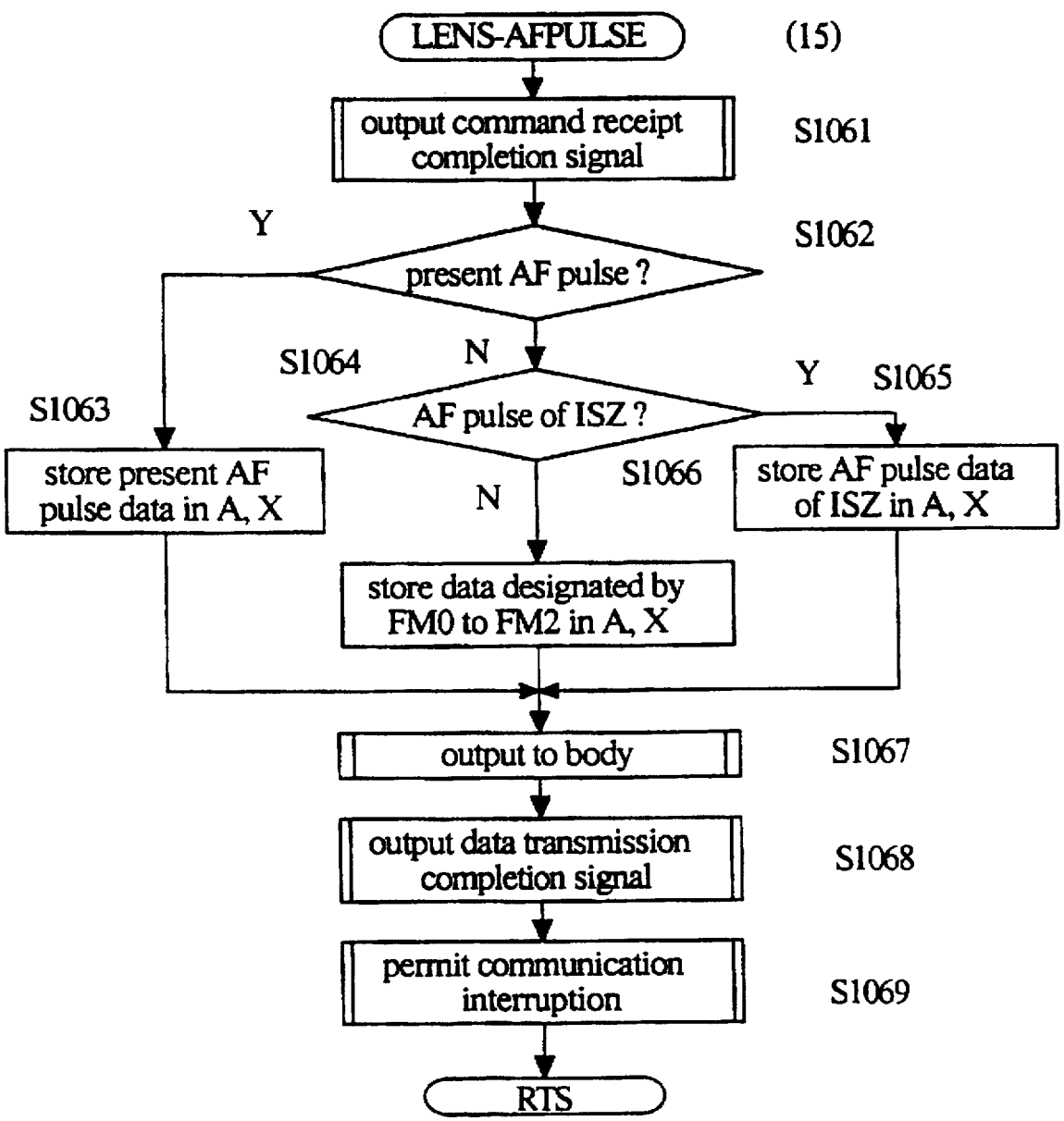
FIG. 48 is a flow chart regarding a transmission operation for an AF pulse count value on the lens side.

A flow chart of a LENS-AFPULSE command shown in FIG. 48 is for an operation by which lens AF pulse count data is outputted to the camera body 11.

As explained above, the SET-AFPOINT command communication is always performed prior to communication of the LENS-AFPULSE command. The content of the SET-AFPOINT command determines the AF pulse which is to be sent to the body by means of the LENS-AFPULSE command.

Lens CPU 61, upon input of the LENS-AFPULSE command, outputs a command receipt completion signal, and, if present AF pulse is required, stores the present AF pulse number (AFPXL.H) in a register (S1061–S1063). When a pulse of constant image magnification ratio zooming (ISZ9) is demanded, AF pulse data (ISZ-AFPL.H) of ISZ is stored in the register (S1062, S1064, S1065). In a case other than the above two cases, AF pulse data (AFP0L.H–AFP7L.H) of designated address is stored in the register (S1062, S1064, S1066). Thereafter, AF pulse data, set in the register, is outputted to the camera body 11, a data transmission completion signal is outputted, and communication interruption is permitted. The process is then returned (S1067–S1069).

FOCALLEN-X OPERATION

Figure 49:
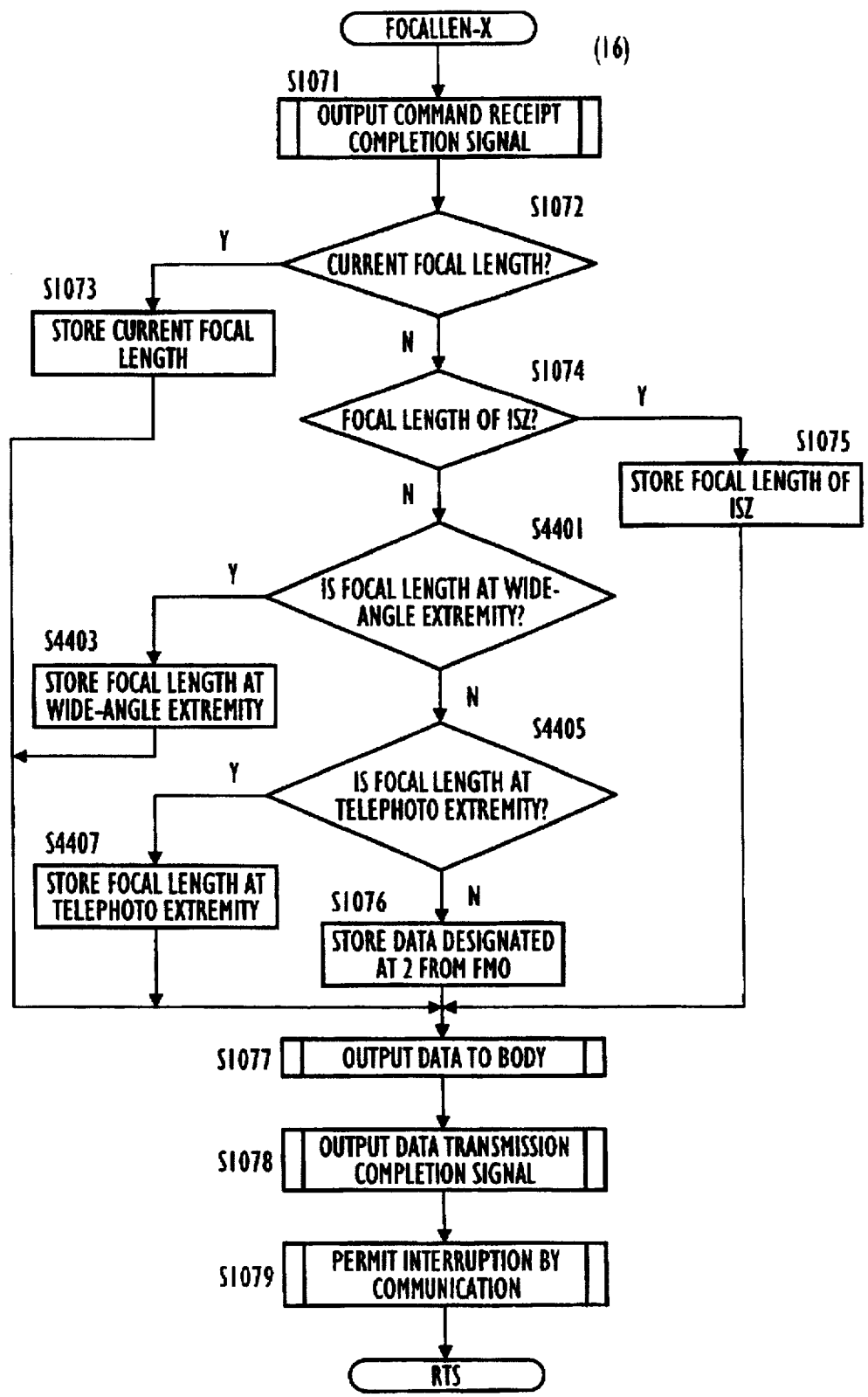
FIG. 49 is a flow chart regarding an output operation for focal length data of the photographing lens.

A FOCALLEN-X command operation by which focal length data of the lens 51 is outputted to the camera body 11 will be explained below with reference to a flow chart illustrated in FIG. 49.

As explained above, the SET-PZPOINT command communication is always performed prior to a FOCALLEN-X command communication. The SET-PZPOINT command determines a focal length which is to be sent to the body upon receipt of the FOCALLEN-X command.

Lens CPU 61, upon receipt of the FOCALLEN-X command, outputs a command receipt completion signal, and stores the present focal length (FCLXL.H) in the register, if present focal length is required (S1071–S1073). When a focal length (ISZ-FCLL.H) for constant image magnification ratio zooming (ISZ) is required, a focal length (ISZ-FCLL.H) for constant image magnification ratio zooming is stored in the register (S1072, S1074, S1075). In a case other than the above two cases, a focal length (FCL0L.H–FCL7L.H) of designated address is stored in the register (S1072, S1074, S1076). The focal length data set in the register is outputted to the camera body 11, a data transmission completion signal is outputted, and communication interruption is permitted. The process is then returned (S1077–S1079).

IMAGE-LSIZE OPERATION

Figure 50:
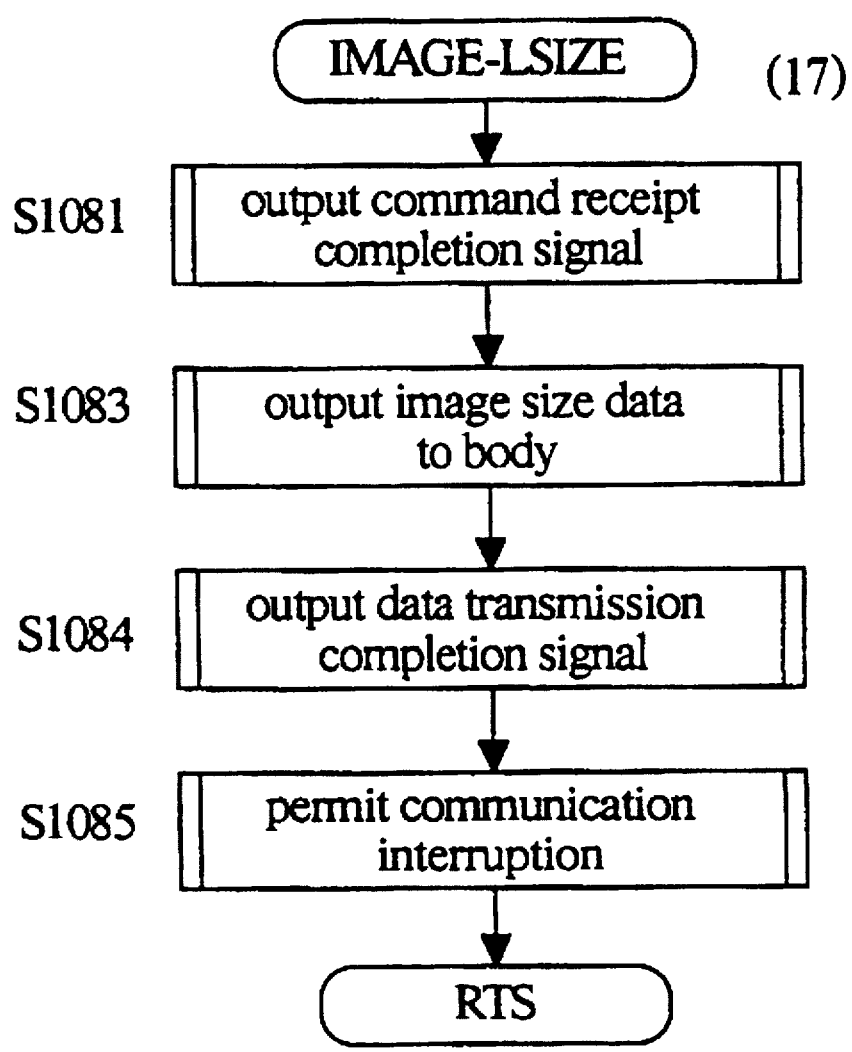
FIG. 50 is a flow chart regarding a transmission operation for constant image magnification data on the photographing lens side.

A flow chart of an IMAGE-LSIZE command shown in FIG. 50 is for an operation by which image magnification ratio data for performing constant image magnification ratio zooming, stored in lens RAM 61b at a predetermined address, is sent to the camera body 11.

Lens CPU 61, upon input of an IMAGE-LSIZE command, outputs a command receipt completion signal to the camera body 11, outputs data (ISZ-IMGL,H) relating to image magnification ratio (image size) to camera body 11, outputs a data transmission completion signal, and permits communication interruption. The process is then returned (S1081–S1085).

16 BYTE DATA PROCESSING

Figure 51:
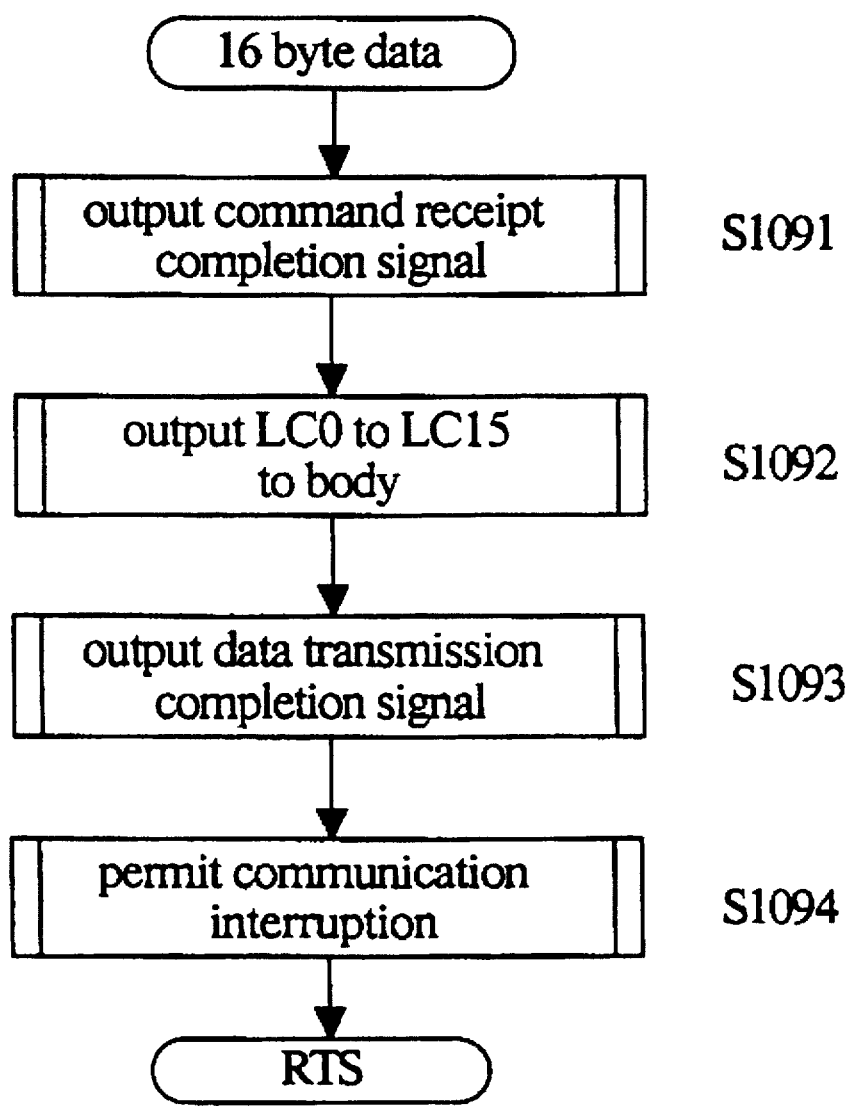
FIG. 51 is a flow chart regarding the output of all lens data.
Figure 52:
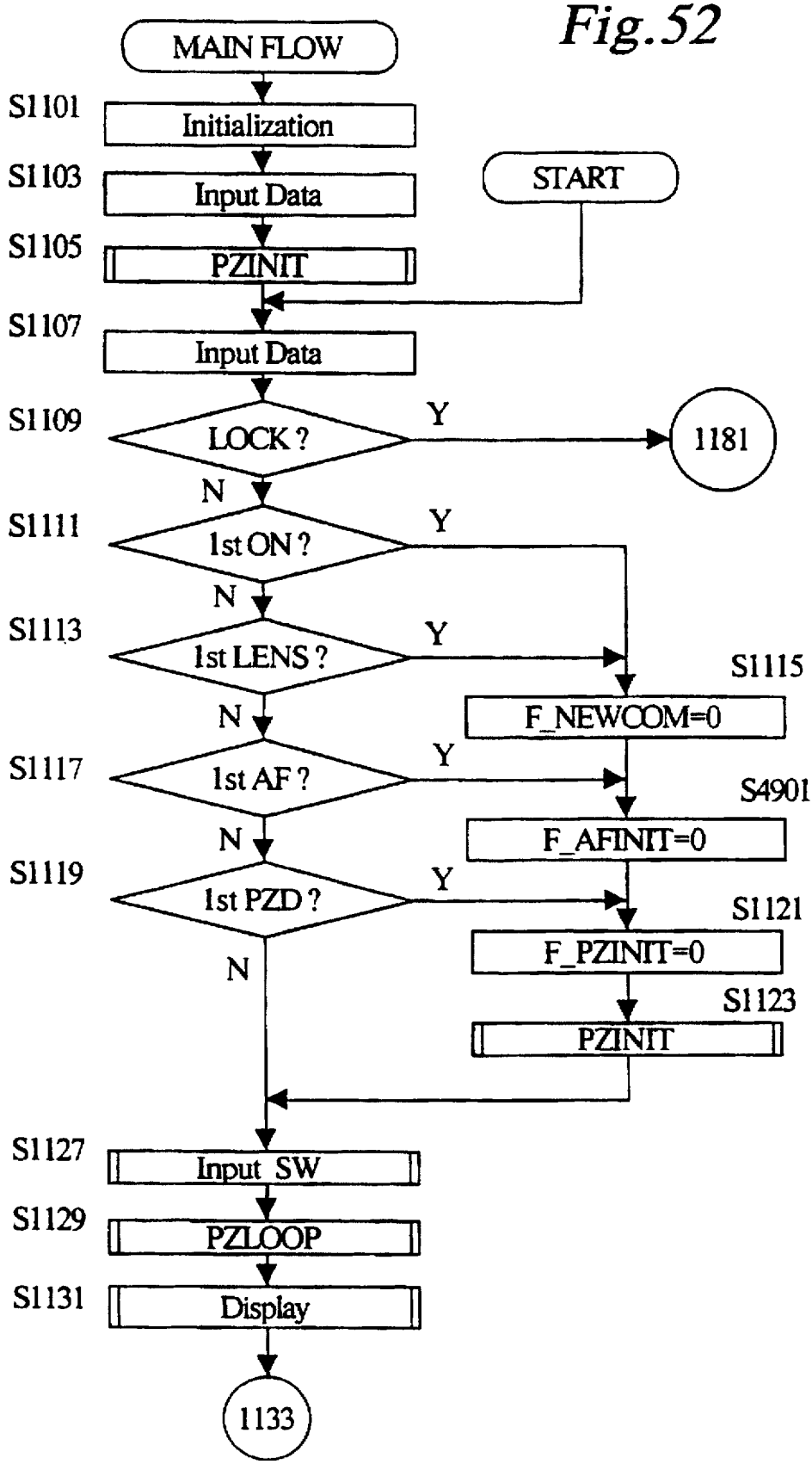
FIGS. 52, 53A, 53B, 54, and 55 are a flow chart of a PZ operation.
Figure 53A:
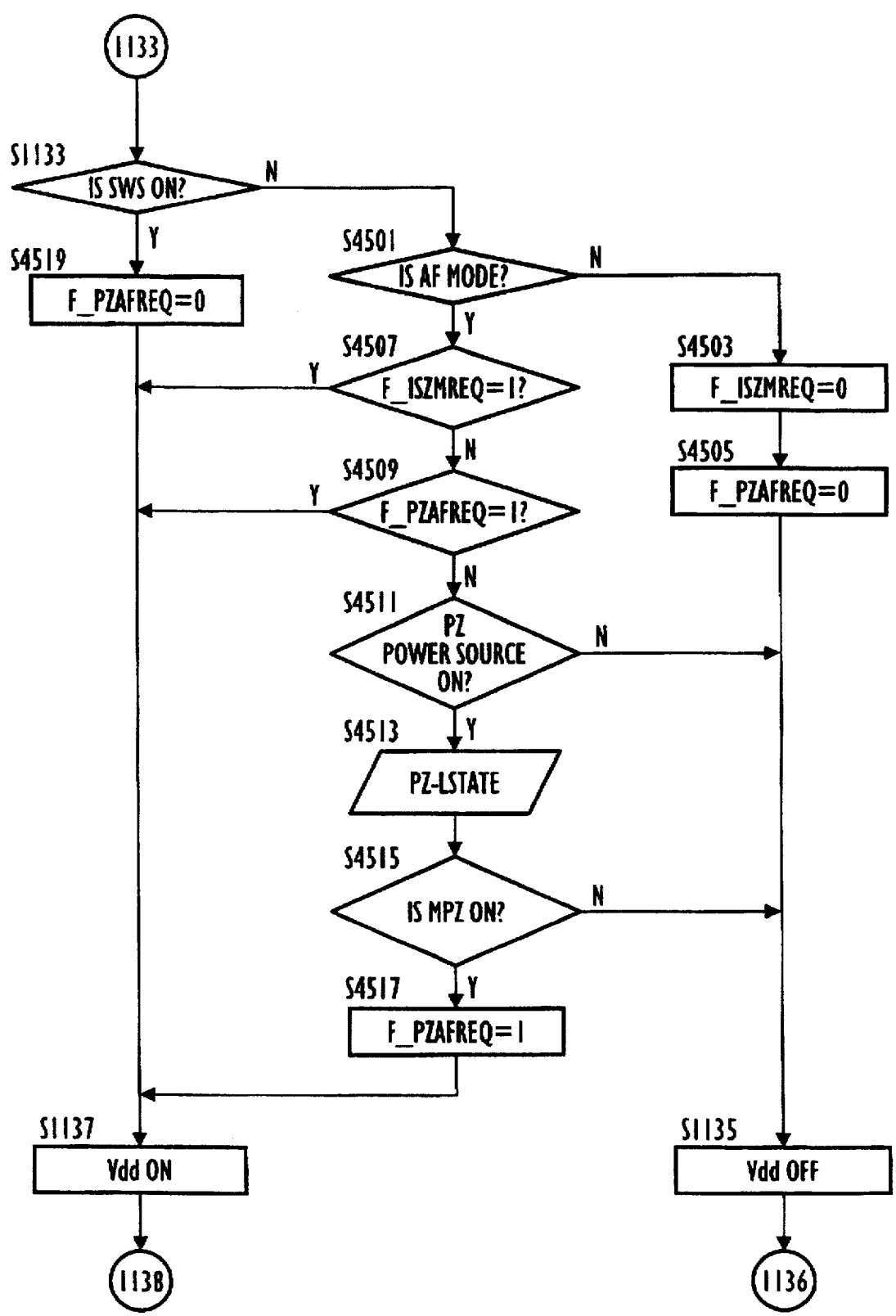
Figure 53B:
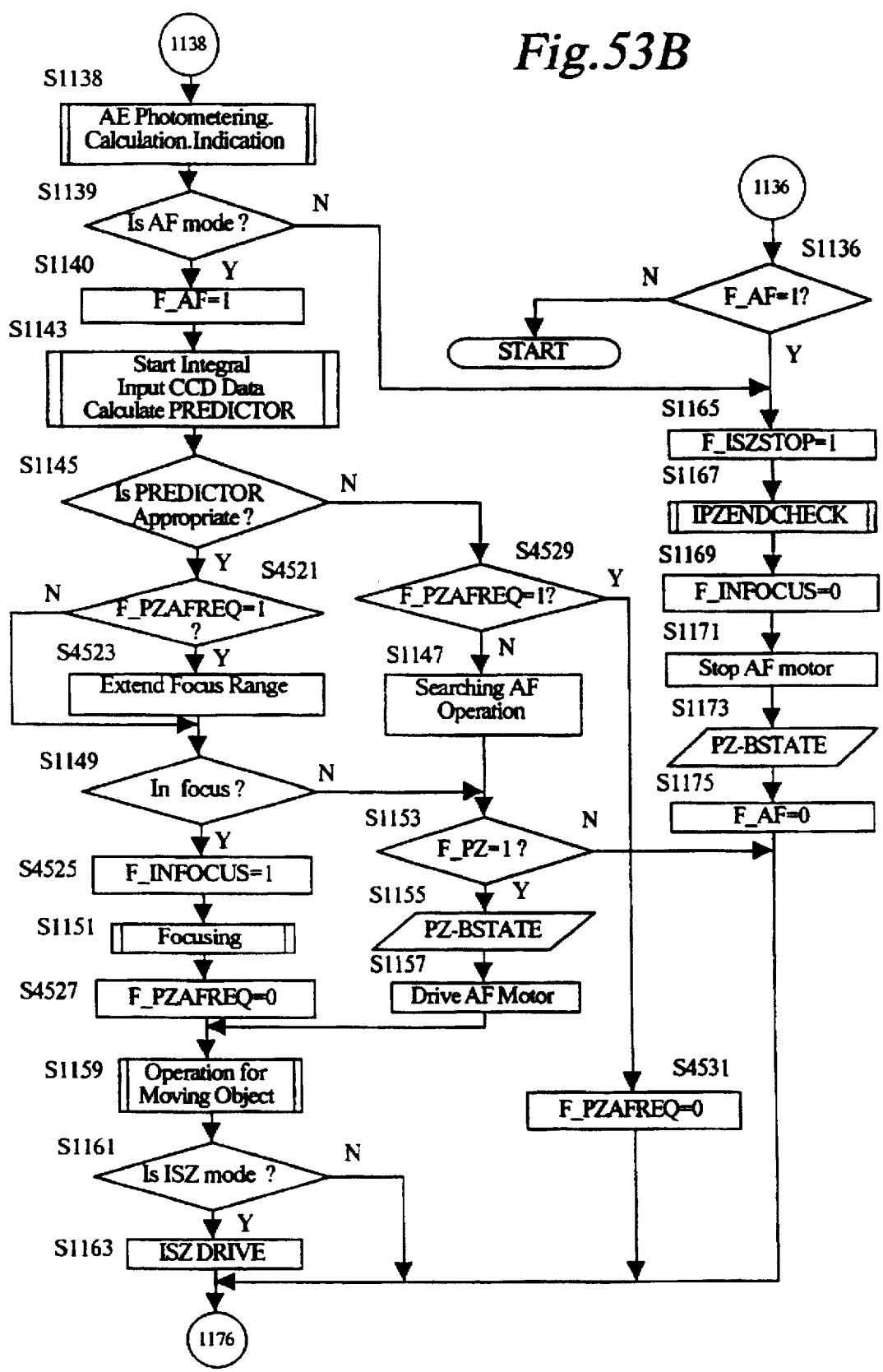
Figure 54:
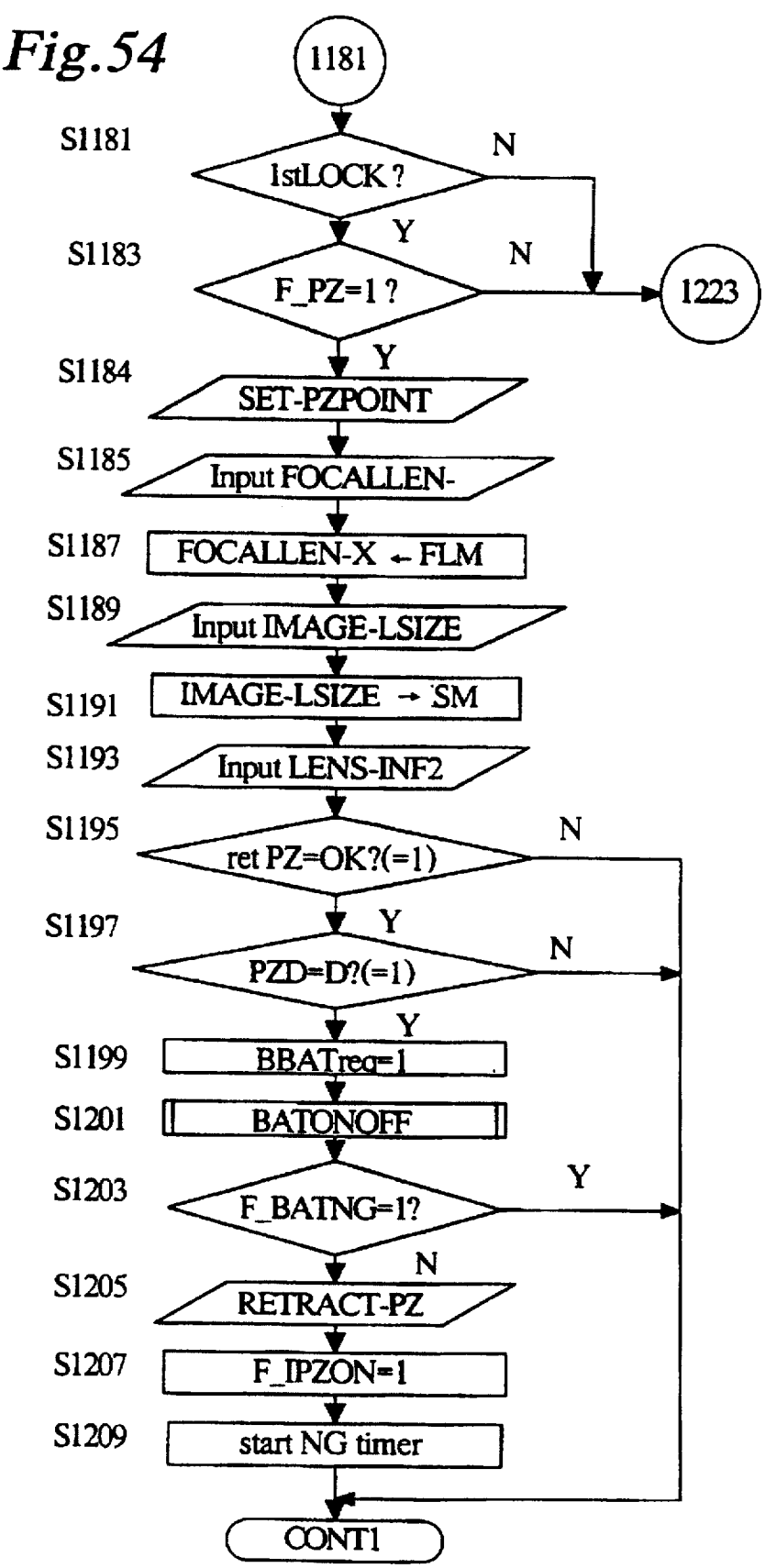
Figure 55:
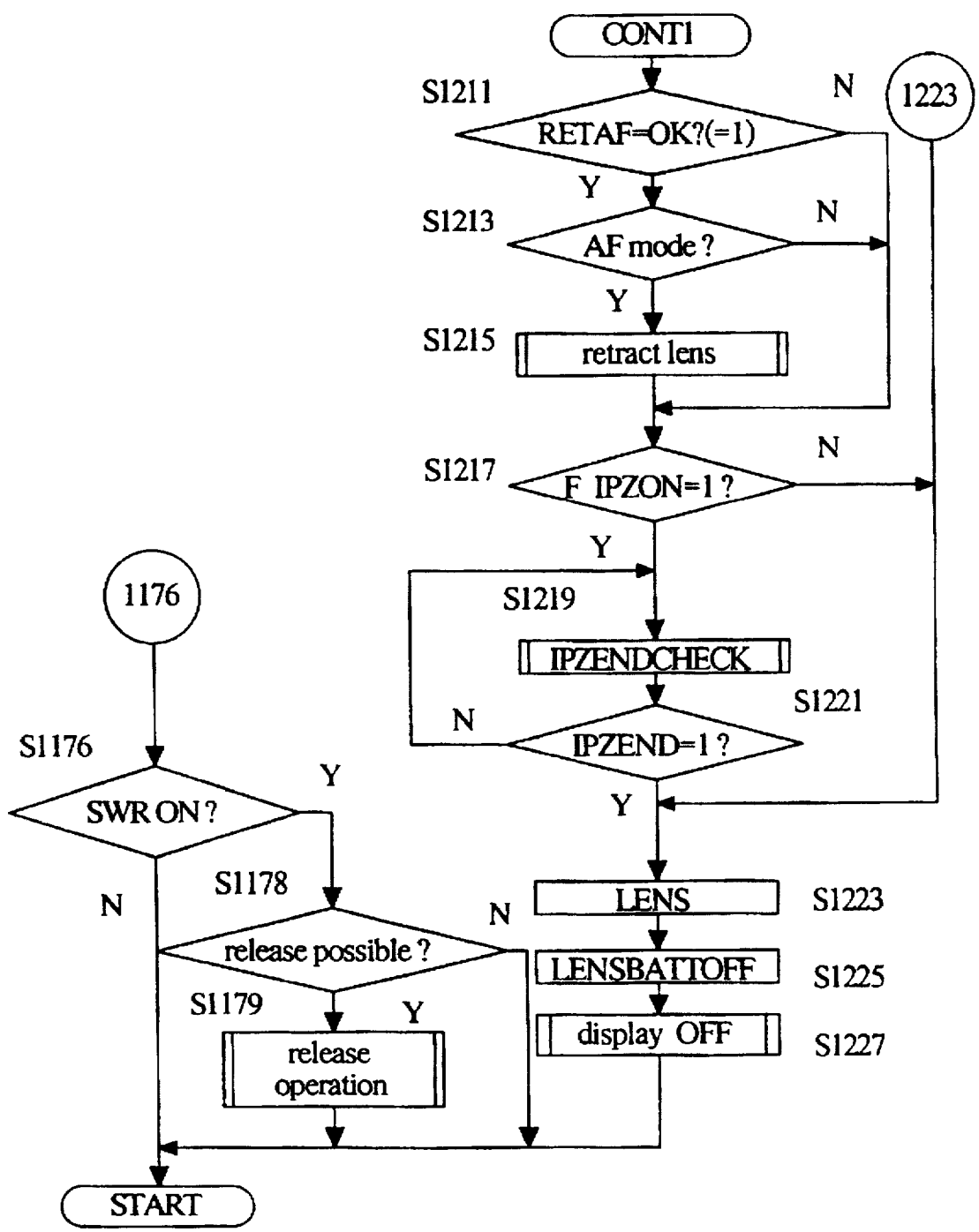

A 16 byte data flow chart shown in FIG. 51 is for an operation by which basic lens data of 16 bytes are all sent to camera body 11. It is to be noted that this command is a detail of the operation performed in the communication interruption routine of FIG. 8 at S221. Depending upon the lower bits of the command, each command will be performed. Processing of the first half 8 bytes and second half 8 bytes are similar to that of the 16 byte data communication and hence a detailed explanation is omitted.

Lens CPU 61, upon input of a 16 byte command, outputs a command receipt completion signal to the camera body 11, outputs a predetermined data (LCO–LC15) of 16 bytes to camera body 11, outputs a data transmission completion signal and permits communication interruption. The process is then returned (S1091–S1094).

PZ OPERATION FOR BODY

An operation relating to power zooming at the camera body 11 side will be explained below with reference to a flow chart shown in FIGS. 52 to 55. This operation or processing is performed by the main CPU 35 on the basis of a program stored in ROM 35a of the main (body) CPU 35 of the camera body 11.

The process first enters the operation of the main flow, when main CPU 35 is reset, such as when the main switch is turned on (when a battery is inserted and electricity is generated). The process, when entering this operation, initializes RAM 35b, port setting, etc., inputs predetermined information by means of switch input or E²PROM DATA INPUT, and performs a power zoom initializing operation (PZINIT subroutine) (S1101, S1103, S1105). In this embodiment, power zoom initialization is an operation by which initialization of the PZ lens and focusing lens is conducted, for the purpose of detecting positions of the zooming lens and focusing lens. The above steps are done upon initial input of power (i.e., when a main switch which is not shown is turned on). While electricity is supplied, the following steps (from S1107) will be repeated.

In S1107,predetermined information is inputted. If locked (i.e., when a main switch is turned on), photographing operation is possible, and hence the process proceeds with the necessary operations. If the lock is released (i.e., when the main switch is turned off), the process proceeds to a lock operation at and after S1181 (S1109).

When the lock is released for the first time, or if the process is performed for the first time after the photographing lens is mounted, flag F__NEWCOM (a flag which is set up when new communication is performed relative to the photographing lens after completion of old communication) is cleared, and a PZ initializing flag F__PZINIT is cleared so as to perform initialization of power zooming (S1109–S1115, S4901, S1121, S1123).

In the case that the lock is not initially released or the process does not perform an operation for the first time after the photographing lens is mounted, but the status is a first AF mode or first PZ mode, flag F__PZINIT is cleared in order to initialize various operations and data relating to AF, PZ, the flag being set when such data are initialized etc. The process then calls a PZINIT subroutine (S1111, S1113, S1117, S4901, S1121, S1123).

The process inputs switch information and performs an operation (PZLOOP subroutine) relating to power zooming and gives the necessary indication on the display panel. The process then proceeds to S1133 (S1127–S1131).

Whether or not the photometering switch SWS (AF switch) is made ON is checked, that is, whether or not the release switch is half-way depressed is checked in step S1133.If the photometering switch SWS is made OFF, control proceeds to step S4501 to check whether or not the AF mode is selected. In the illustrated embodiment, the AF mode, in which automatic focusing is effected, is set when the AF switch is made ON, and the MF mode, in which focusing is manually effected by the rotation of the focusing ring by the photographer, is set when the AF switch is made OFF, respectively.

If the AF mode is not set and the MF mode is set in step S4501, control proceeds to step S4503 to clear the ISZ memorization requesting flag F__ISZMREQ to thereby store the focal length at ISZ. Thereafter, the AF operation requesting flag F__PZAFREQ, requesting the AF operation during the power zoom driving operation, is cleared in step S4505. Thereafter, control proceeds to step S1135 to turn off the power source Vdd for the photometering IC, the CCD, the E²PROM and a part of the peripheral control circuit. Then, control proceeds to step S1136 to check whether or not the flag F__AF is cleared. If the flag F__AF is cleared, control is returned to START. If the flag F__AF is set, control proceeds to step S1165.

If flag F__AF is set, it is likely that AF processing and constant image magnification ratio zooming relating thereto have already been performed before photometric switch SWS is turned off. Accordingly, a constant image magnification ratio zooming stop flag F__ISZSTOP is set, and an operation to stop constant image magnification ratio zooming and to check whether or not the same has been stopped (IPZENDCHECK subroutine) is performed (S1136, S1165, S1167).

The process then clears focusing flag F__INFOCUS, performs an AF motor stopping operation, sends driving information of AF, etc. to power zooming lens 51 by means of PZ-BSTATE command communication, clears flag F__AF, and proceeds to step S1176 (S1169, S1171, S1173, S1175).

If the AF mode is set in step S4501, control proceeds to step S4507 where it is checked whether or not the ISZ memorization requesting flag F__ISZMREQ is cleared. Thereafter, if the AF operation requesting flag A__PZAFREQ is cleared in step S4509, neither the memorization at ISZ nor the AF operation during the power zooming are requested. If the power zoom source is made OFF in step S4511, control proceeds to step S1135 to make OFF the power source Vdd for the photometering IC, the CCD, the E²PROM and a part of the peripheral control circuit.

If the power zoom source is made ON in step S4511, control proceeds to step S4513 to carry out the PZ-LSTATE communication and receive the ON or OFF data of the manual power zoom from the side of the power zoom lens 51. Thereafter, in step S4515, whether or not the manual power zoom has an ON/OFF state is checked in accordance with the result of the PZ-LSTATE communication obtained in step S4513. If the manual power zoom is made OFF, it is considered that the photometering switch SWS is made OFF and the zoom operation ring is not rotated in the AF mode.

Thereafter, control proceeds to step S1135 to make OFF the power source Vdd for the photometering IC, the CCD, the E²PROM and a part of the peripheral control circuit.

If the manual power zoom is made ON in step S4515, it is considered that the photometering switch SWS is made OFF and the zoom operation ring is rotated to vary the focal length in the AF mode. Consequently, control proceeds to step S4517 to set the AF operation requesting flag F_PZAFREQ to request the AF operation. Thereafter, control proceeds to step S1137 to make ON the power source Vdd (apply a constant voltage), and the photometering and calculation for the exposure are then carried out and the results thereof are indicated in step S1138.

Namely, in the prior art, the AF operation is commenced only when the photometering switch SWS is made ON, and an AF operation is not effected as long as the photometering switch SWS is made OFF, even if the zoom operation ring is rotated. Whereas, in the illustrated embodiment of the present invention, even if the photometering switch SWS is made OFF, when the zoom operation ring is rotated to vary the focal length, the AF operation is commenced. Thus, the AF operation is effected when the zoom operation ring is rotated to vary the focal length, regardless of the ON/OFF state of the photometering switch SWS in the present invention.

As a matter of design of a zoom lens, it is preferable that the focusing position at the tele photo extremity concurs with that at the wide-angle extremity so that a deviation of focus does not take place even when the focal length is varied. It is, however, very difficult in practice to make the focusing position at the telephoto extremity precisely coincident with that at the wide-angle extremity. As a result, there is a small possibility that an object image is out of focus due to the change of the focal length. To prevent this, as shown in the illustrated embodiment, the AF operation is effected when the zoom operation ring is rotated to vary the focal length, regardless of the state of the photometering switch SWS, as mentioned above. Accordingly, a photographer can observe an object image in focus through the view finder at any focal length.

With the prior art, when the photometering switch SWS is released upon completion of the photographing operation, the latest focal length and focal point corresponding to the object distance are temporarily retained. It is assumed for the purpose of the present invention that a new object at an object distance different from the object distance of the previous object, whose picture has just been taken, is observed through the view finder after the focal length is varied (i.e., after the power zooming is effected). In the prior art, once the photometering switch SWS is released, an AF operation is not effected, as mentioned above. Accordingly, the previous object is maintained in focus, but the new object to be observed through the view finder is out of focus, which is rather inconvenient. With the illustrated embodiment of the present invention, when the zoom operation ring is rotated to effect the power zooming operation, the AF operation is carried out, even if the release button has been released so that the photometering switch SWS is also made OFF. Consequently, the photographer can perform the power zooming operation while observing the object image which remains continuously in focus.

If the photometering switch SWS is made ON in step S1133, the AF operation requesting flag F-PZAFREQ is cleared in step S4519, and thereafter, control proceeds to step S1137. Namely, if the photometering switch SWS is made ON, the AF operation requesting flag F_PZAFREQ is cleared. This means that when the photometering switch SWS is made ON, the AF operation is commenced regardless of the rotation of the zoom operation ring, and accordingly, the power zooming operation. In this AF operation, a precise focusing operation is effected, as will be discussed below. On the other hand, in the AF operation caused when the AF operation requesting flag F_PZAFREQ is set, the focusing range is enlarged, so that a relatively coarse focusing is carried out, as will be discussed hereinafter. To this end, the precise AF operation to be carried out when the photometering switch SWS is made ON, after the AF operation requesting flag F_PZAFREQ is cleared, is set prior to the coarse AF operation to be carried out when the AF operation requesting flag F_PZAFREQ is set.

If the ISZ memory requesting flag F_ISZMREQ has already been set in step S4507 or the AF operation flag F_PZAFREQ has already been set in step S4509 when the photometering switch SWS is turned OFF and when the AF mode is set, control proceeds to step S1137.

The power source Vdd is made ON (a constant voltage is applied) in step S1137, and then the detection and calculation necessary for the exposure are carried out and the results thereof are indicated in step S1138. Thereafter, in step S1139, whether or not the mode is the AF mode is checked. If the AF mode is not selected, control skips to step S1165. If the AF mode is selected in step S1139, the AF flag F_AF is set in step S1140. Thereafter, the photometering operation, i.e., the integration, is commenced in step S1143. The integral data is then fetched to perform the prediction operation, and control proceeds to step S1145.

If the prediction operation result is appropriate in step S1145, and if the AF operation requesting flag F_PZAFREQ is cleared in step S4521, whether or not the image is focused is checked in step S1149. If the image is in focus, a flag F_INFOCUS is set in step S4525. Thereafter, the focusing operation is carried out in step S1151. Thereafter, the AF operation requesting flag F_PZAFREQ is cleared in step S4527, and the operation for a moving object is carried out in step S1159.

If the object is out of focus in step S1149, whether or not the power zoom lens is mounted is checked in step S1153. If a power zoom lens is not mounted (F_PZ=0), control jumps to step S1176. Conversely, if the power zoom lens is mounted, the AF drive data etc., is sent to the power zoom lens 51 by the PZ-BSTATE command in step S1155. Thereafter, the AF motor 39 is driven in step S1157, and control proceeds to step S1159.

If the prediction calculation results are appropriate at step S1145, and if the AF operation requesting flag F_PZAFREQ is set in step S4521, the operation to expand the focusing range is carried out in step S4523, prior to the checking operation in step 1149. Namely, in the operation in step S4523, the tolerance within which the image is determined to be in focus is increased. For example, the focusing range of the focusing operation, which is carried out when the photometering switch SWS is made ON, is doubled (in absolute value).

Namely, the AF operation, which is compulsively effected, when the photometering switch SWS is made OFF and the zoom operation ring is rotated, is not directly for the focusing upon taking a picture, but merely for the maintenance of the focused state when the focal length is varied or when the photographer performs the framing operation while observing the object image through the view finder. Therefore, no precise focusing is needed. On the other hand, the focusing operation upon taking a picture must be precisely effected so that the focusing range is restricted to a small tolerance. Furthermore, it may arise that no focus position may be found upon taking a picture. In such a case, a focus position is searched for by reciprocally moving the AF motor between the near position and the far position. However, the search operation is troublesome. In particular, if the search is effected during the zooming operation when a photographer does not intend to take a picture, the photographer might be disturbed.

Under these circumstances, in the preferred embodiment of the present invention, as mentioned above, when the flag F_PZAFREQ is set, since the focusing range is expanded at step S4523 prior to the check operation of the focus state at step S1149 and the control skips the search operation at step S1147, the focusing can be easily effected. Consequently, the photographer is not disturbed by the troublesome search operation.

If the prediction calculation results are not appropriate (not within an effective range) at step S1145, namely, for example, if the contrast of the object is too low, the flag F_PZAFREQ is cleared at step S4529, and the searching is effected to obtain an effective value at step S1147. Thereafter, the control proceeds to step S1153 to check whether or not the power zoom lens is mounted. The searching operation refers to an operation to perform the integral while reciprocally moving the AF motor 39 to obtain an effective defocus value. If the flag F_PZAFREQ is set at step S4529, the control proceeds to step S4531 to clear the flag F_PZAFREQ without effecting the searching operation. Thereafter, the control jumps to step S1176.

When the focusing operation at step S1151 is completed and the flag F_PZAFREQ is cleared at step S4527 or when the AF motor 39 is driven at step S1157, the control proceeds to step S1159 to carry out the operation necessary for the moving object. Thereafter, at step S1161, whether or not the mode is the constant magnification zoom mode is checked. If the constant magnification zoom mode is selected, the constant magnification zoom operation is carried out at step S1163. Thereafter, the control proceeds to step S1176 to perform the check operation of the release switch SWS.

At step S1176, the process checks if release switch SWR has been turned on. If the release switch is turned off, the process is immediately returned to START. If the release switch is turned on, the process is returned to START after performing a releasing operation, provided that release is permitted (S1176, S1178, S1179).

If the lock is effected (i.e., the main switch is turned off) upon checking at S1109, the process proceeds to S1181. If the lock is effected for the first time in this routine and if in the power zooming mode, the process proceeds to a retrieval operation (S1184–S1209) in order to retrieve to the camera body the focal length data stored in the preset zoom set mode. Otherwise, the process jumps to step S1223 (S1181, S1183).

If the lock is not effected for the first time, or if the photographing lens is not a power zoom lens, the process shuts off constant voltage supply (CONT) and power supply (VBATT) to the photographing lens, and clears the indication on display 45. The process is then returned to START (S1181, S1183, S1223–S1227).

In the retrieval operation, the address of the memory (RAM 61b) to be retrieved is designated by means of a SET-PZPOINT command in order to retrieve the focal length stored in lens RAM 61b to the body. Then, the focal length data stored in the address designated by the FOCALLEN-X command is inputted from lens 51, so as to store them in body RAM 35b at address FLM as focal length data (S1184, S1185, S1187). IMAGE-LSIZE data including image magnification ratio is inputted from lens RAM 65b so as to store the image magnification ratio data in the body RAM 35b at address ISM, and LENS-INF2 data is inputted from RAM 65b. The process then proceeds to step S1195 (S1181–S1193).

In this embodiment, the image magnification ratio data is transferred to the camera body in order to simplify the process of communication in the retracting operation. However, it is also possible for both the focal length data, which is obtained when an image magnification ratio is set, and the amount of lens movement data, regarding lens retraction, to be transferred.

At steps S1195 and S1197, the process checks whether accommodation of the power zoom is possible or power zoom is to be effected based on the data input by a LENS-INF2 command. If it is impossible to accommodate the power zoom or power zoom is not to be effected, the process immediately proceeds to CONT1. If power zoom accommodation is possible and power zoom is to be effected (flag F_RETPZ=1, F_PZD=1), the body side requests BBATreq to check the battery. When the battery is normal, a command (RETRACT-PZ) to cause the power zoom lens 51 to perform a power zoom accommodation operation is sent, a flag F_IPZON to identify that controlled zooming is being performed is set, and a NG timer is started. The process then proceeds to a CONT1 operation (S1195–S1209). As mentioned above, since the preset zoom is included in the auto (control) zoom, as long as the preset mode is selected, the preset drive is indicated when the flag F_IPZON is set.

If the battery is found to be abnormal during battery checking, the process proceeds to the CONT1 operation (S1203). It should be noted that flag F_RETPZ relates to information inherent to the lenses. This flag will be cleared when the zooming lens is, for example, an inner zooming lens and hence the lens does not require accommodation or retraction thereof, so that an accommodation or retraction operation is not performed.

In the CONT1 operation, it is checked, based on the AF retraction flag F_RETAF inputted by the LENS-INF2 command, whether the power zoom lens 51 is AF-retractable or in an AF mode. If the lens is AF-retractable and in the AF mode, the focusing lens 53F is returned to a retracted position by driving the AF motor 39 (S1211–S1215). Then, if controlled power zooming is being effected, a standby is continued until power zooming has ended, while checking the operation of the controlled power zoom. When power zooming ends, the constant voltage supply and power to the camera lens are turned off and the display 45 is also turned off, resulting in a return to the start (S1217–S1227). If the lens is not AF-retractable or not in the AF mode, the lens retraction operation is skipped. The flag F_RETAF is information inherent in the lens and is cleared when the zoom lens is an inner focusing type and a retraction of the focusing lens is not necessitated, as a result of which no processing for the retraction is performed.

PZINIT, AF-INIT OPERATION

Figure 56:
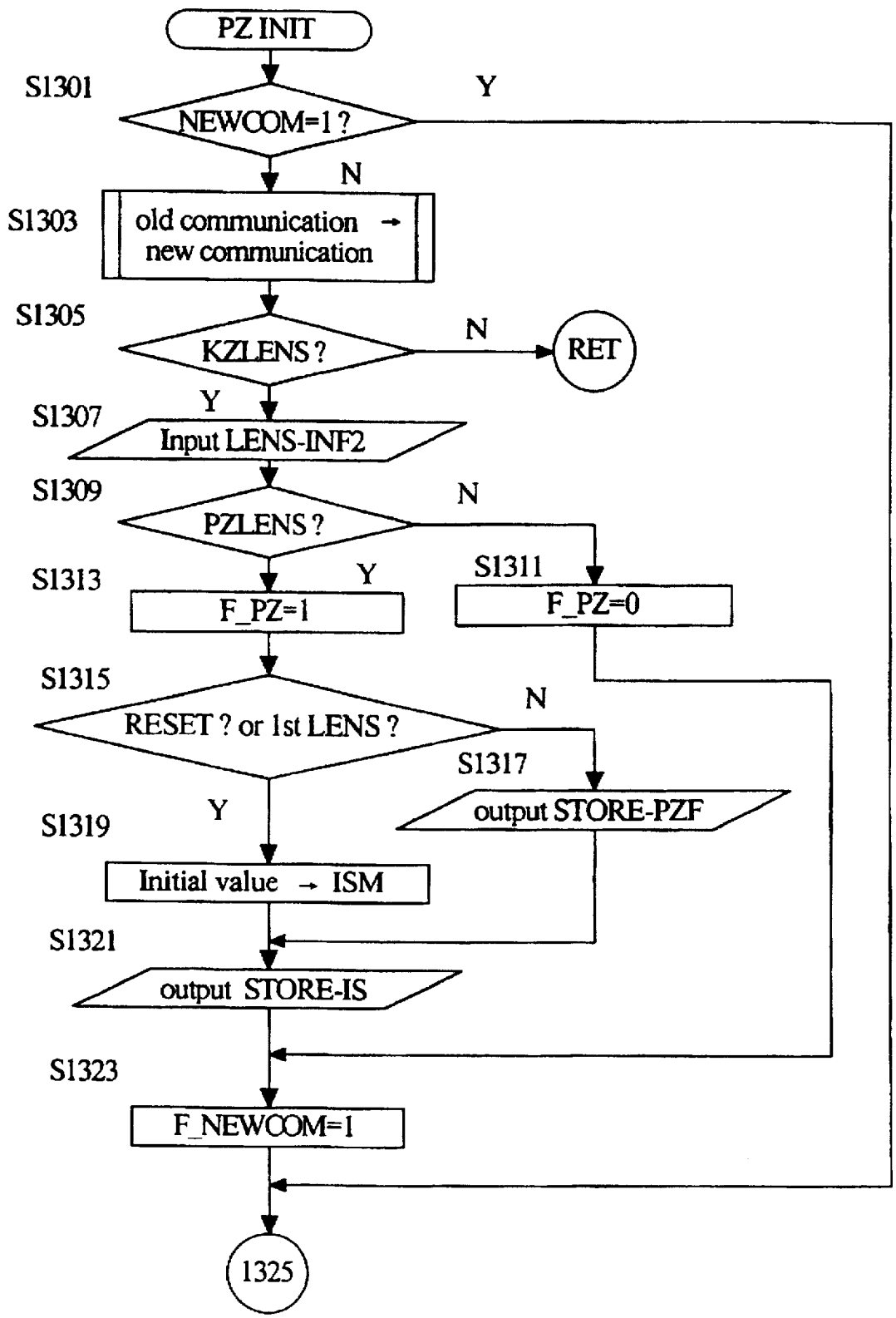
FIG. 56 is a flow chart regarding an initialization operation for PZ.
Figure 57:
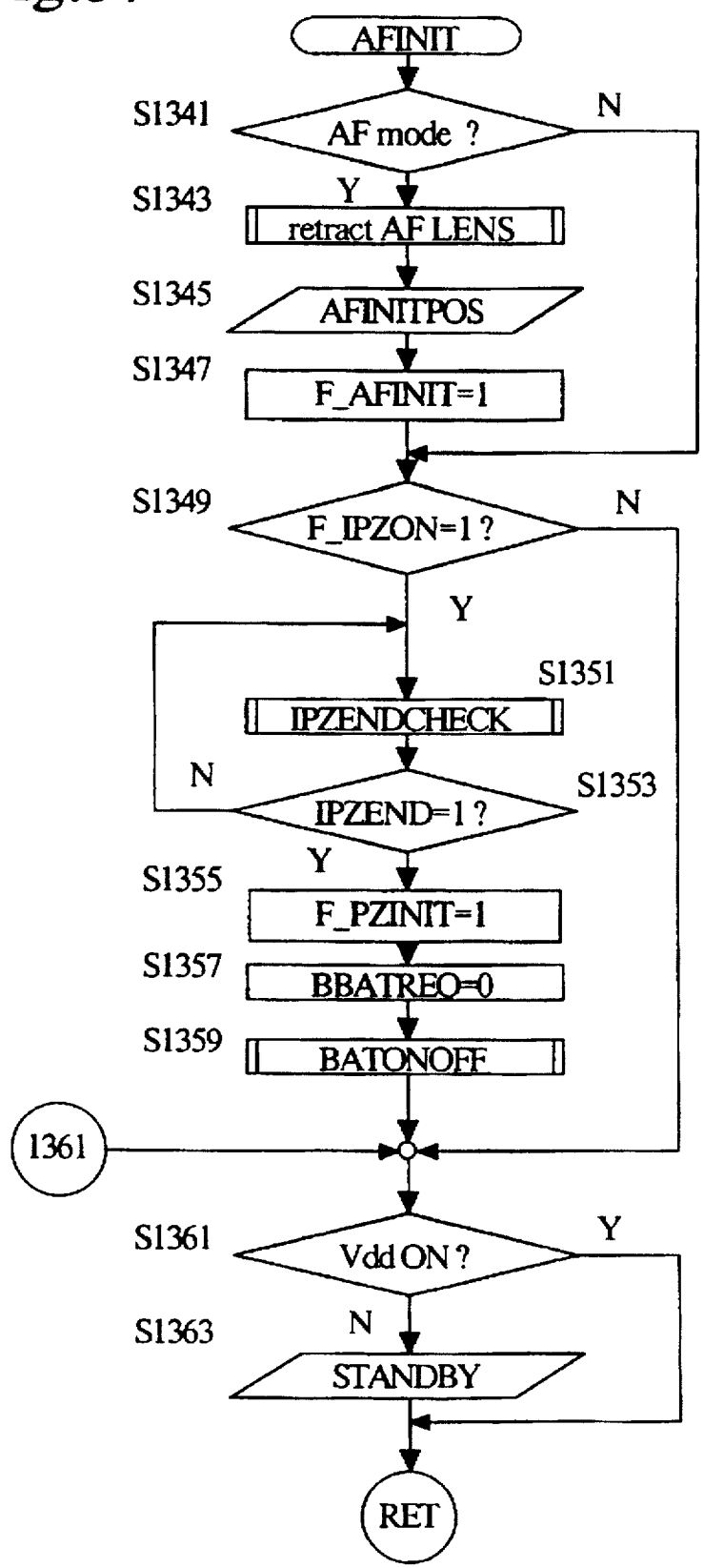
FIGS. 57 and 58 are a flow chart regarding an initialization operation for AF.
Figure 58:
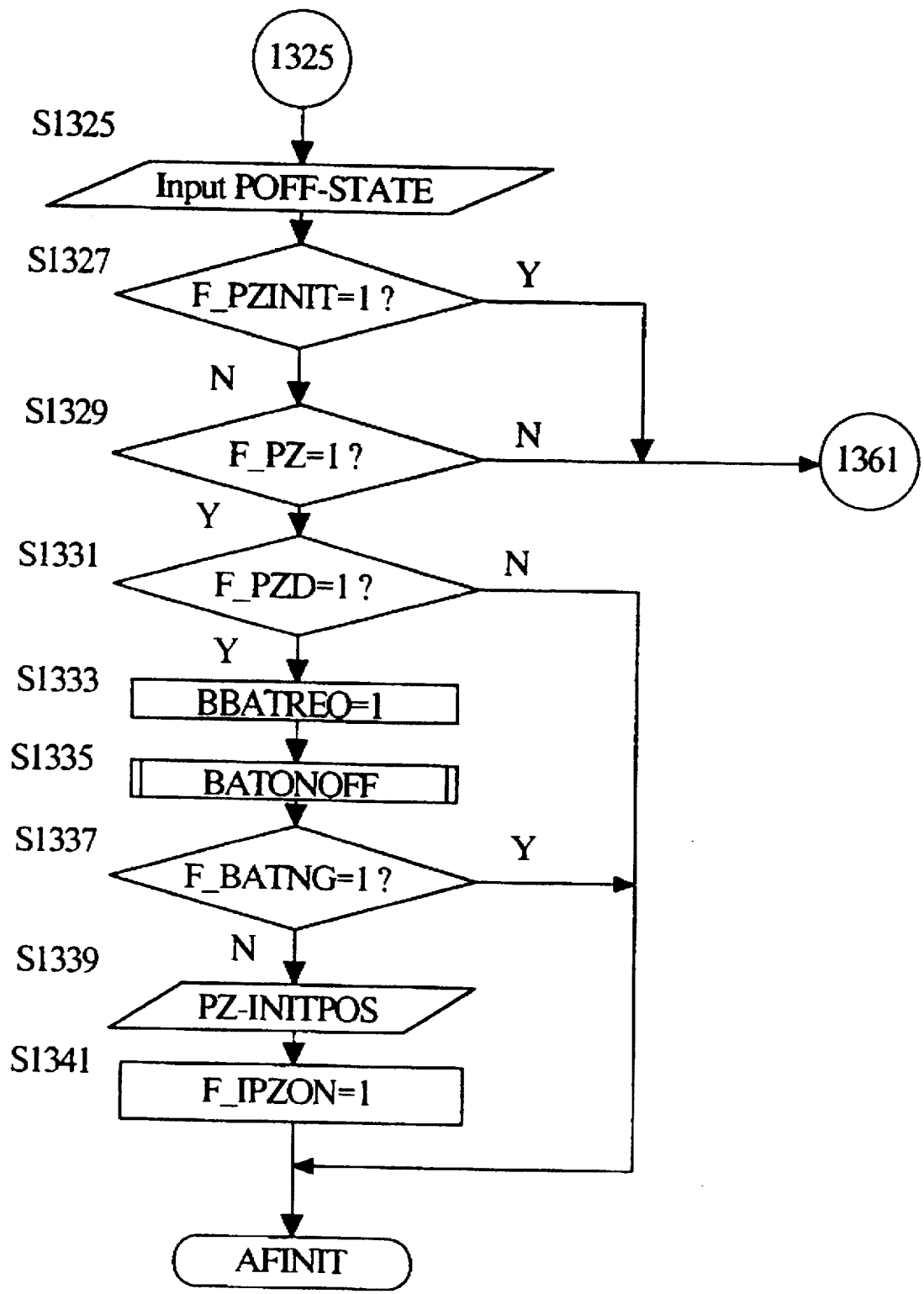

Hereinafter, the initialization operation of the power zoom lens 51 to be controlled on the body 11 side will be described with reference to a PZINIT subroutine as shown in FIGS. 56 to 58.

In the operation, the power zoom lens 51 initializes both the zooming lens group 53Z and the focusing lens group 53F and returns the information, protected against the turning off of the main switch in the body, to the lens 51. In detail, the former is an operation which detects the positions of the zooming lens and the AF lens, while the latter is an operation for again returning to the lens 51 (the lens RAM 65b) an image size of ISZ and a focal length for a preset zoom, which are held in the body RAM 35b when the main switch is turned off (or locked).

If this processing is initiated for the first time, a new communication flag F_NEWCOM indicative of the end of the old communication is cleared and thus the old communication is performed to communicate with the lens ROM in synchronization with the clock of the camera body 11. After that, the old communication is switched to the new communication which communicates with the lens CPU 61 in synchronization with the clock of the lens CPU 61 (S1301, S1303).

If an attached camera lens is not a Kz lens (including the power zoom lens 51 embodying the present invention) having the lens CPU, the new communication is impossible so that the flow is returned. On the contrary, if the lens is the Kz lens, an input of data from the camera lens is effected by the new communication LENS-INF2 (14) and it is checked if the attached lens is the power zoom lens (PZ lens) (S1305, S1309). If it is not the PZ lens, a flag F_PZ identifying the PZ lens is cleared and, the flow advances to step S1323 (S1309, S1311).

If the attached lens is the PZ lens, the flag F_PZ is set. When a reset is effected in the camera body 11 (or when the battery is exchanged) or when the lens is first attached to the camera body 11, an initial value is stored in an image size memory (ISM) (S1313, S1315, S1319). In the other cases, information regarding the focal length for a preset zooming operation and the like, sheltered in the body RAM 35b, is stored through a STORE-PZF (28) communication at a predetermined address (FCL0L, H to FCL7L, H) of the lens RAM 61b for the lens CPU 61. Then, a STORE-IS (29) communication is performed so that the image size, sheltered in the RAM (35b) of the body CPU or the image size of the initial value set at step S1319, is stored at predetermined addresses (ISZ-IMGL, H) of the RAM (61b) for the lens CPU, and a new communication flag is set (S1321, S1323).

Next, the data is inputted through a POFF-STATE (11) communication from the lens CPU 61, and then the flow is sent to step S1361 where a standby operation is performed if the flag F_PZINIT, which indicates that initialization of the power zoom has been completed, is set or if the flag F_PZ has been cleared (S1325 to S1329).

If the flag PZINIT is cleared and the flag F_PZ is set, and when power zooming is not performed (i.e., when a flag F_PZD (bit 5 of POFF-STATE data) is cleared), that is, when manual zooming is performed, the flow advances to an AF initialization (AFINIT) operation (S1325 to S1331). When the power zoom mode is used, a flag F_BBATREQ, requesting power supply for PZ, is set and the power zoom lens 51 is supplied with power by means of the BATONOFF subroutine. Further, it is checked whether or not the power is supplied thereto in a normal manner (S1331 to S1337). If the power from the battery is not outputted to the power zoom lens 51 in a normal manner thereto (i.e., flag F_BATNG=1), the flow advances to the AFINIT operation. On the contrary, if the power supply is normal (the flag F_BATNG=0), a PZ-INITPOS command (32) is outputted to force the camera lens to initialize PZ. Further, the flow advances to the AFINIT operation after setting up the flag F_IPZON, indicating that initialization of PZ has been completed.

AFINIT OPERATION

A flowchart for an AFINIT operation, as shown in FIGS. 57 and 58, is an operation for initialization of the AF. Further, in the present case, the AF is initialized after initialization of PZ. However, the AF may be initialized before initialization of PZ.

In the AFINIT operation, under the condition that the camera lens is in the AF mode, a focusing lens 53F is moved to the retracted position, at which point the tube length is minimized (S1341, S1343). Specifically, the position is the far (i.e., infinity) position. The initialization data is then inputted by an AFINITPOS communication and a flag F_AFINIT is set (S1345, S1347). Also, upon initialization, the lens CPU 61 generally initializes the lens RAM 61b for AF-pulse counting.

Next, if a flag F_IPZON, indicative of power zooming other than manual power zooming being effected, is set, it is checked in an IPZENDCHECK subroutine whether or not the initialization of power zooming is ended (S1349 to S1353). When the initialization of power zooming has ended, a flag F_PZINIT, identifying the end of power zooming initialization, is set while a battery request flag F_BBATREQ at the body side is set to "0". Further, in a BATONOFF subroutine, it is requested to stop the power supply and it is checked if the stop has been completed (S1355 to S1359).

Then, if the power supply for the photometric IC 17, CCD 21 and E$^2$PROM 43 and the like of the body 11 are turned on (Vdd ON), the flow is returned. However, if they are turned off, a STANDBY command is effected, and the flow is returned after the lens CPU 61 of the camera lens 51 is set in a standby state (a transfer to a low power consumption mode) (S1361, S1363).

BATONOFF OPERATION

Figure 59:
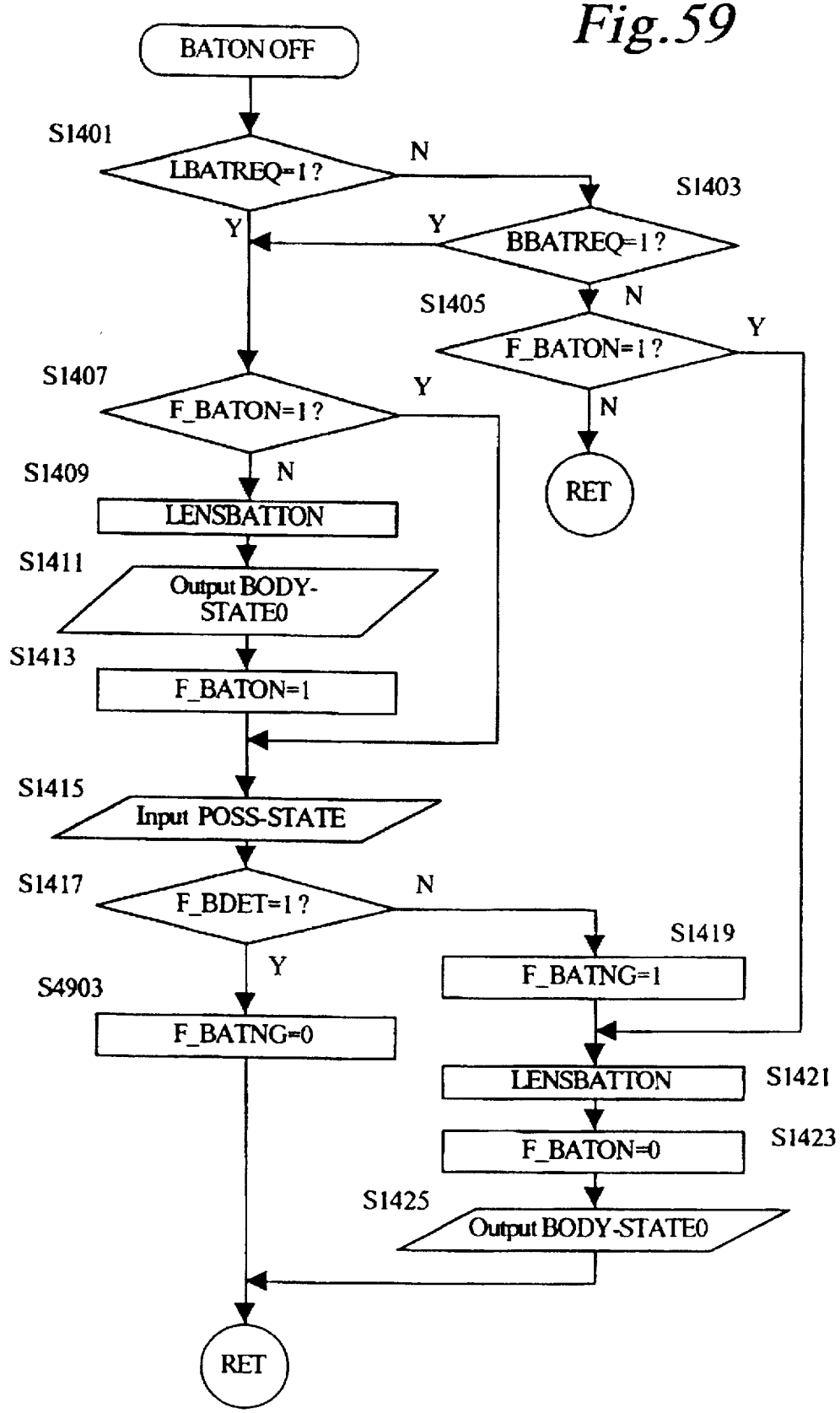
FIG. 59 is a flow chart regarding an operation for checking a supply of electricity.

A BATONOFF flowchart, as shown in FIG. 59, illustrates a checking operation performed by main CPU 35, wherein it is checked whether power for the zoom motor 65 is normally supplied from the camera body 11 to the power zoom lens 51 upon issuance of a power request (or a battery request) from the body or the lens. In the present case, such a battery request may be issued by either of camera body 11 itself or the camera lens 51.

In the BATONOFF operation, first of all, if the battery request is not issued from either of the power zoom lens 51 or the camera body 11, the flow is returned when power supply to the VBATT terminal has been already stopped (i.e., when flag F_BATON has been cleared (S1401, S1403, S1405)). However, when the power supply is effected the power supply to the power zoom lens 51 is turned off, the flag F_BATON is cleared, a BODY-STATE0 output command is issued so as to send information indicative of the power supply being turned off (BATT of bit 5 is cleared) to the lens. Thereafter the flow is returned (S1421 to S1425).

When the battery request is issued from the power zoom lens 51 or the camera body 11 (i.e., when a LBATREQ or BBATREQ of bit 1 of the POFF-STATE data is set) and if the power is not yet being supplied, the power zoom lens 51 starts to be supplied with power and BODY-STATE0 data, concerning the body state, transmits information indicative of the power supply being supplied (i.e., a BBAT of bit 5 is set) to the lens. After the flag F_BATON, identifying power supply under way, is set, POFF-STATE data is inputted. However, if the power supply is already turned on, the flow goes directly to step S1415 where POFF-STATE data is inputted (S1407 to S1415).

If the battery supply is normal (i.e., flag F_BDET=1 in bit 0 of POFF-STATE), the flow is returned (S1417). However, if the battery supply is abnormal, for example, in the case of a short circuit, a flag F_BATNG identifying the battery abnormality is set, power supply to the power zoom lens 51 is cutoff, and flag F_BATON is cleared. Further, a BODY-STATE0 command is issued to send to the lens information regarding the "ON" state of the power supply and then the flow is returned (S1419 to S1425). The flag F_BATNG is cleared at step S4903 when the flag F_BDET is set at step S1417.

PZ-LOOP OPERATION

Figure 60A:
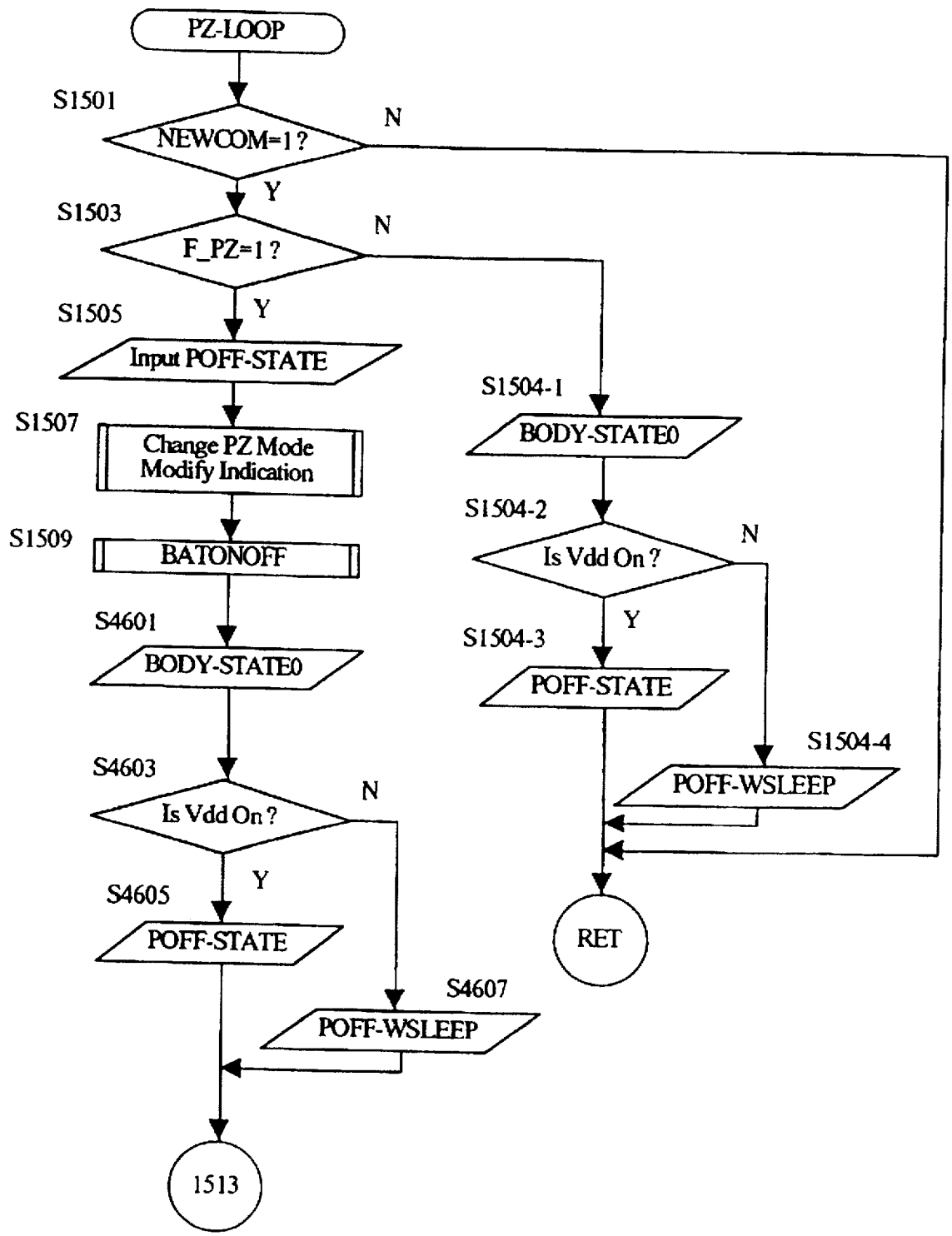
FIGS. 60A, 60B, 61A and 61B are a flow chart of a loop operation for PZ.
Figure 60B:
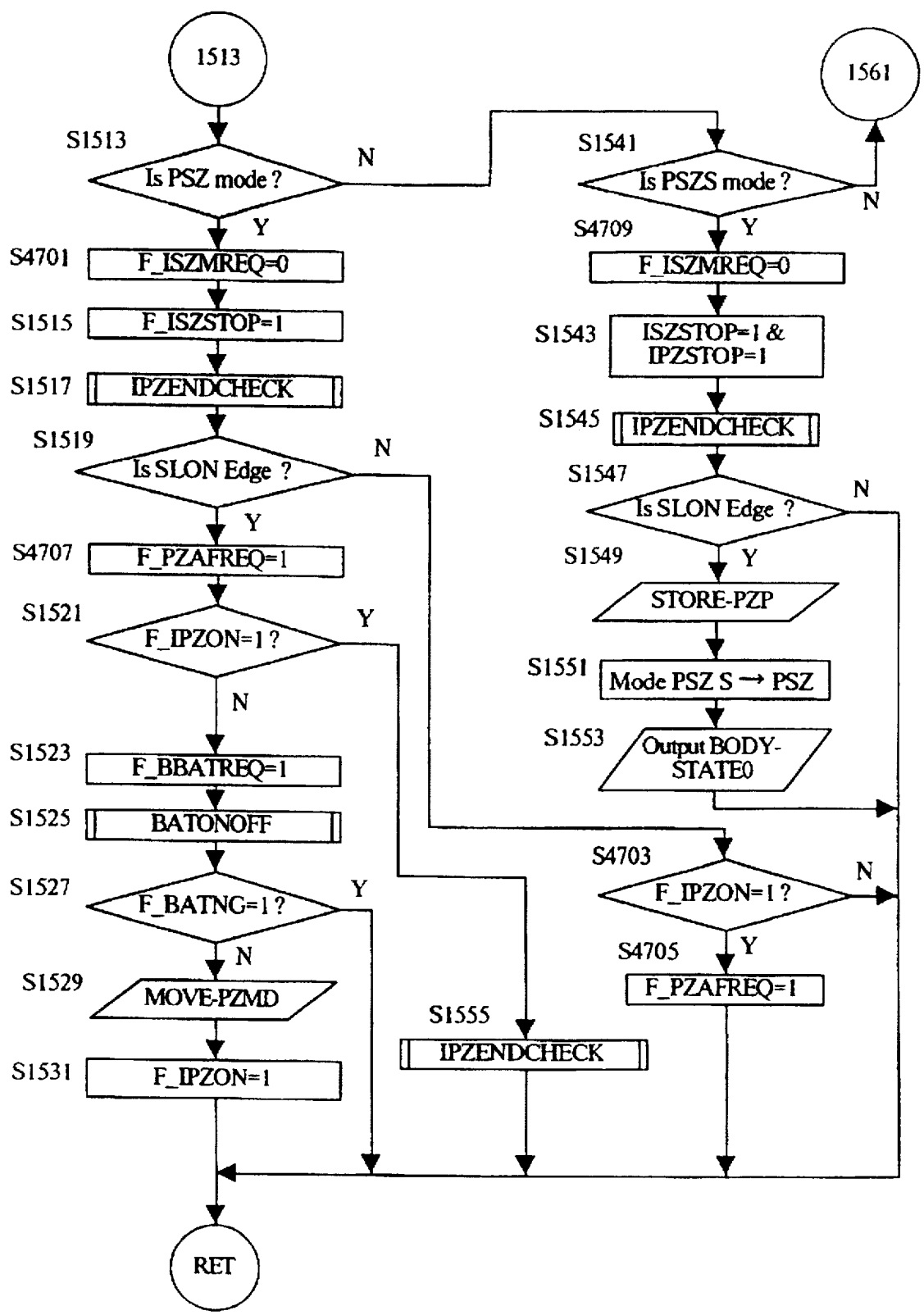
Figure 61A:
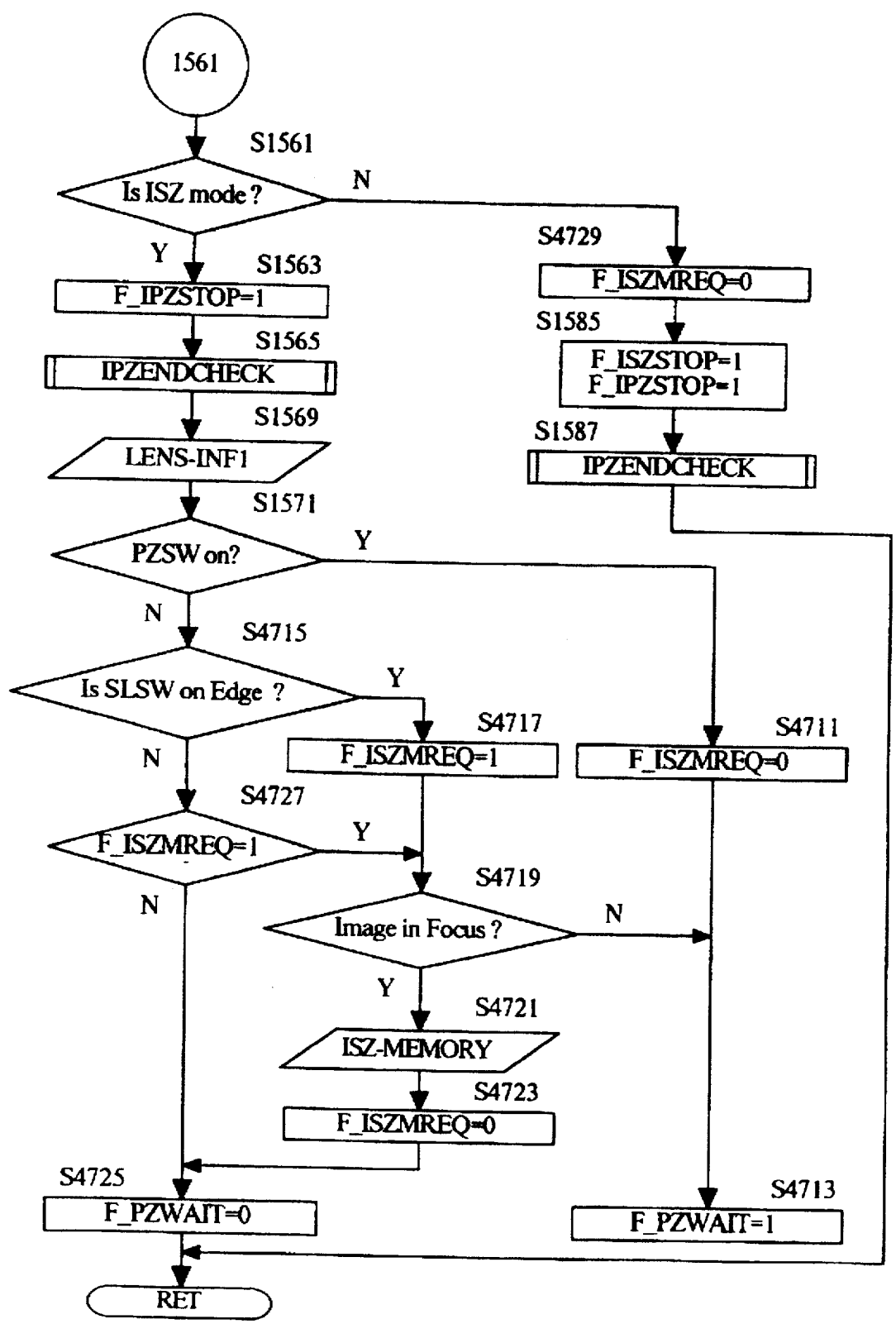

The PZ-LOOP operation shown in FIGS. 60A, 60B and 61A is the power zooming operation performed by the main CPU 35. In the PZ-LOOP operation, the preset zoom (clipping-PSZ) operation to effect power zooming to obtain the preset focal length, the focal length setting operation (PSZS), and the constant magnification zoom operation (ISZ), etc., are carried out in connection with the power zoom operation.

In the illustrated embodiment, as will be discussed hereinafter, when the zoom set button 77 (i.e., the PZ mode switch SL) is pressed down in the preset zoom mode (PSZ), the AF operation is commenced regardless of the ON/OFF state of the photometering switch SWS to effect the power zooming operation until the preset focal length is obtained. Consequently, the photographer can observe the focused object image, during power zooming to the preset focal length, through the view finder.

When the zoom set button 77 is pressed down in the preset zoom set mode (PSZS), the current focal length which can be optionally set by rotating the zoom operation ring 78 is stored. When the preset zoom set mode is set, no AF operation is carried out when the zoom set button 77 is pressed down, but the AF operation is carried out by the rotation of the zoom operation ring 78 when the photometering switch SWS is made OFF, as discussed above with reference to FIG. 53A. Consequently, the photographer can perform the framing, while observing the object image in focus through the view finder, when the focal length is varied in the preset zoom set mode.

When the zoom set button 77 is pressed down at the constant magnification zoom (ISZ) mode, the AF operation is carried out by setting the ISZ memory requesting flag F_ISZMREQ, and the image magnification at that time determined in accordance with the object distance and the focal length of the focused object is stored.

When the control enters the routine of the PZ-LOOP operation, whether or not the flag F_NEWCOM is set is checked at step S1501. If the flag F_NEWCOM is cleared, namely, if the new communication is not available, the control is returned without performing any operation. Conversely, if the flag F_NEWCOM is set at step S1501, and if the flag F_PZ is set at step S1503, namely, if the new communication and the power zooming are available, the control proceeds to step S1505 to effect the necessary operations which will be discussed below.

If the flag F_PZ is cleared at step S1503, and if the new communication is available and no power zooming is permitted, the control proceeds to step S1504-1 to perform the BODY-STATE0 communication. In the BODY-STATE0 communication, the data, such as mode data of the power zoom, on the camera body side is sent to the lens. If the power source Vdd is made ON at step S1504-2, the control proceeds to step S1504-3 to input the lens data, such as switch data on the lens side through the POFF-STATE communication. If the power source Vdd is made OFF at step S1504-2, the control proceeds to step S1504-4 to input the lens data through the POFF-WSLEEP communication. Consequently, the lens CPU 61 is transferred to the stand-by mode (i.e., low power consumption mode). The lens CPU 61 maintains the low power consumption mode in accordance with the POFF-WSLEEP command until the lens CPU 61 receives a subsequent communication command. After the operation at step S1504-3 or S1504-4 is completed, the control is returned.

At step S1505, the data, such as the switch data of the power zoom lens 51 is input through the POFF-STATE communication. Thereafter, the PZ mode is switched in accordance with the input data and the altered mode is indicated at step S1507. Thereafter, the power is supplied or the power supply is stopped at step S1509. Thereafter, the BODY-STATE0 communication is carried out at step S4601. In the BODY-STATE0 communication, data, such as the power zoom mode data on the camera body side is sent to the lens. If the power source Vdd is made ON at step S4603, the control proceeds to step S4605 to input the lens data, such as switch data on the lens side through the POFF-STATE communication. If the power source Vdd is made OFF, the control proceeds to step S4607 to input the lens data through the POFF-WSLEEP communication. Consequently, the lens CPU 61 is transferred to the stand-by mode. The lens CPU 61 is maintained in the stand-by mode in accordance with the POFF-WSLEEP command until the lens CPU receives a subsequent communication command. After the operation at step S4605 or S4607 is completed, the control proceeds to step S1513.

At step S1513, whether or not the preset zoom (PSZ) mode (i.e., clip mode) is selected is checked. If the mode is the PSZ mode, the ISZ memory requesting flag F_ISZMREQ is cleared to stop the memorization as a part of the initialization at step S4701. Thereafter, the flag F_ISZSTOP is set at step S1515 to forbid the constant magnification zoom operation. Thereafter, the IPZEND-CHECK sub-routine is performed at step S1517, ending the constant image magnification zooming. After that, whether or not the zoom set button 77, attached to the side portion of the power zoom lens 51, is actuated is checked. In other words, whether or not the preset zoom drive is commenced is checked at step S1519. To this end, the edge of the rising portion of a pulse that switches from the ON state to the OFF state is detected, i.e., the moment at which the zoom set button 77 is pressed down is detected.

If preset zoom drive is not commenced (i.e., if zoom set button 77 is not pressed down), whether or not the flag F_IPZON is set is checked at step S4703. If the flag F_IPZON is cleared, that is, if no preset zoom drive is commenced, the control is returned. Consequently, if the image is focused at step S1149 (FIG. 53B), the flag F_PZAFREQ is cleared to stop the AF operation at step S4527. Accordingly, if the image is focused when the preset zoom (clip) operation is completed, no AF operation continues.

If the flag F_IPZON is set at step S4703, i.e., the zoom set button 77 has been pressed down and the preset zooming is being effected, the control proceeds to step S4705 to set the flag F_PZAFREQ to continue with the AF operation. Thereafter, the control is returned. This is because, if the control was directly returned, the AF operation would be stopped immediately when the image is once focused. Namely, even if the image is out of focus during the preset zoom (clip) operation, the AF operation continues to try to obtain a focused object image as long as the preset zoom operation continues.

If the preset zoom drive is commenced at step S1519, the flag F_PZAFREQ is set at step S4707 to drive the AF operation. Namely, in the illustrated embodiment, the AF operation is commenced immediately after the zoom set button 77 is pressed down, independently of the commencement of the preset zoom operation. As a result, the AF operation is commenced when the zoom set button 77 is actuated to start the preset zoom operation so that the image is always kept in focus during the preset zoom operation.

After the AF operation is commenced, whether or not the preset zooming (clipping) is being carried out (F_IPZON= 1) is checked at step S1521. If the preset zooming is being carried out, whether or not the preset zooming operation is completed, in the IPZEND check sub-routine, is checked at step S1555. Thereafter, the control is returned.

If the preset zoom operation is not commenced at step S1521, the camera body 11 demands power supply thereto at step S1523. Consequently, power is supplied at step S1525. Thereafter, whether or not the battery is normal is checked at step S1527. If the battery is defective, the control is returned. Conversely, if the battery is normal, the control proceeds to step S1529 to transmit the MOVE-PZMD command to effect the power zooming so that the zoom lens is moved to the focal length position stored at a designated address. Thereafter, the flag F_IPZON is set at step S1531 to indicate that the preset zooming is being effected.

If no preset zoom (PSZ) mode is set at step S1513, the control proceeds to step S1541 to check whether or not the preset zoom set (PSZS) mode (i.e., the clip set mode) is set. If the preset zoom set mode is set, the control proceeds to step S4709 to clear the ISZ memory requesting flag F_ISZMREQ. Thereafter, the flags F_ISZSTOP and F_IPZSTOP are set to stop the constant magnification control and the auto zoom drive (preset zoom drive) at step S1543. Thereafter, the preset zoom drive or the constant magnification zoom drive is stopped in the IPZENDCHECK subroutine at step S1545.

Whether or not the zoom set button 77 is pressed down and the preset zoom set mode is indicated are checked at step S1547, similar to step S1519. If the zoom set button 77 is actuated, the control proceeds to step S1549 to send the STORE-PZP command to the power zoom lens 51 to store the current focal length data in the lens CPU 61 at a designated address of the lens RAM 61b. Thereafter, the preset zoom set (PSZS) mode is changed to the preset zoom (PSZ) mode at step S1551. Namely, once the current focal length data is stored, the mode is automatically switched to the preset zoom (clip) mode. Thereafter, the values of bits 0-2 of the BODY-STATEO command are modified, and then, the BODY-STATEO command is output to give information on the change into the preset zoom mode to the power zoom lens 51. Thereafter, the control is returned. If the zoom set button 77 is not actuated at step S1547, no operation is carried out and the control is returned. Namely, preset zoom mode (clip set mode) is maintained.

If no preset zoom set (PSZS) mode is set at step S1541, namely, if neither the preset zoom mode (clip mode) nor the preset zoom set mode (clip set mode) are set, the control proceeds to step S1561 to check whether or not the constant magnification zoom mode (ISZ) is set. If the constant magnification zoom mode (ISZ) is set, the flag F_IPZSTOP is set to stop the preset zoom at step S1563. Thereafter, the IPZENDCHECK sub-routine is carried out at step S1565. Thus, the preset zooming is completed.

Thereafter, the LENS-INF1 data is input at step S1569, and whether the power zoom switch PZSW is made ON by the rotation of the zoom operation ring 78 to modify the focal length is checked at step S1571. If the power zoom switch PZSW is made ON, namely, if the focal length is being modified, the control proceeds to step S4711 to clear the ISZ memory requesting flag F_ISZMREQ, since no focal length can be stored during the modification. Thereafter, the flag F_PZWAIT is set to forbid the constant magnification zoom ISZ, and the control is thereafter returned.

If the power zoom switch is made OFF at step S1571, namely, if the zoom operation ring 78 is not rotated (i.e., the zooming operation is completed or is not effected), the control proceeds to step S4715 to check whether or not the zoom set button 77 is pressed down, similar to step S1519. If the zoom set button 77 is pressed down, the control proceeds to step S4717 to set the ISZ memory requesting flag F_ISZMREQ. Thereafter, whether or not the image is in focus is checked at step S4719. If the image is focused, the control proceeds to step S4721 to output the ISZ-MEMORY command to the taking lens to store the image magnification. Thereafter, the ISZ memory requesting flag F_ISZMREQ is cleared at step S4723, and the flag F_PZWAIT, which forbids the commencement of the constant magnification zoom ISZ, is cleared at step S4725, so that the constant magnification zoom operation ISZ is permitted.

If no image is focused at step S4719, the control proceeds to step S4713 to set the flag F_PZWAIT to prohibit the constant magnification zoom ISZ. Thereafter, the control is returned.

If neither the zoom set button 77 is actuated nor the zoom operation ring 78 is rotated at step S4715, the control proceeds to step S4727 to check whether or not the ISZ memory requesting flag F_ISZMREQ is set. If the flag F_ISZMREQ is set, that is, if the zoom set button 77 has been pressed down and the flag F_ISZMREQ has been set at step S4717, the control proceeds to step S4719 to check whether or not the image is focused.

If the flag F_ISZMREQ is judged to be cleared at step S4727, the ISZ memory requesting flag F_ISZMREQ has been cleared at step S4723 after the judgement of the focus state of the object image. Accordingly, the control proceeds to step S4725 to clear the flag F_PZWAIT to permit the commencement of the constant magnification zooming so that the constant magnification zooming can be carried out.

If at step S1561 it is judged that the mode is not the preset zoom (clip) mode, the preset zoom set (clip set) mode or the constant magnification zoom mode, the ISZ memory requesting flag F_ISZMREQ is cleared at step S4729. Thereafter, flag F_IPZSTOP and flag F_ISZSTOP are both set at step S1585 to stop the preset zooming and the constant magnification zooming. Thereafter, the IPZENDCHECK sub-routine is carried out and the completion of the preset zooming is checked.

Figure 61B:
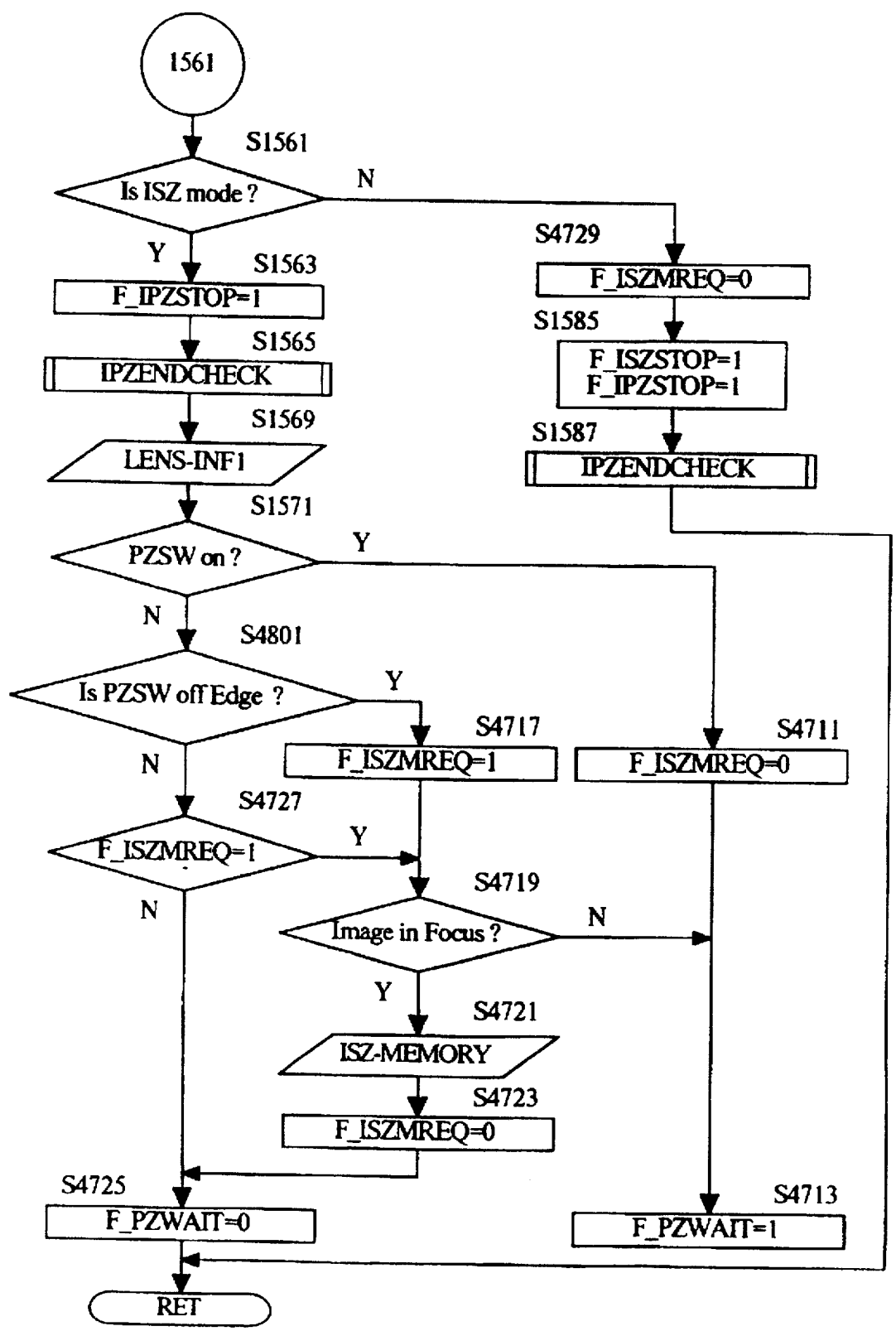

In the illustrated embodiment, the image magnification is stored in accordance with the distance of the in-focus object and the focal length corresponding thereto at the constant magnification zoom (ISZ) mode, when the zoom set button 77 is pressed down, as mentioned above. The present invention is, however, not limited thereto. FIG. 61B shows a modified embodiment of FIG. 61A by way of example. In FIG. 61B, step S4715 in FIG. 61A is replaced with step S4801. In FIG. 61B, steps corresponding to those in FIG. 61A are designated with the same reference numbers and no detailed explanation of each step will be given.

At step S4801, the OFF edge (i.e., the edge of a pulse portion switching from ON to OFF) of the power zoom switch is detected to start the memorization of the image magnification. In other words, the object distance of the focused object and the corresponding focal length are measured to obtain and store the image magnification only when the OFF edge of the power zoom switch is detected. In the illustrated embodiment, the power zoom switch is switched from ON to OFF in accordance with the return movement of the zoom operation ring 78 to a neutral position thereof. Consequently, when a photographer rotates the zoom operation ring 78 to set a desired focal length (with the AF operation starting when the zoom operation ring 78 is first rotated), if the photographer releases the zoom operation ring 78 with the zoom operation ring 78 automatically returning to the neutral position by a return spring (not shown) incorporated in the camera, the power zoom switch is switched from ON to OFF. Accordingly, the OFF edge of the power zoom switch is detected. Thus, the operations subsequent to step S4717 are carried out when the power zoom switch is made OFF. Namely, the object distance and the corresponding focal length are measured to obtain the corresponding image magnification which is then stored in the memory.

As can be understood from the foregoing, with the present invention, it is possible to store the image magnification in the constant magnification zoom (ISZ) mode, in accordance with either the operation in which the photographer presses the zoom set button 77 or releases the zoom operation ring 78 after a desired focal length is set.

IPZENDCHECK OPERATION

Figure 62:
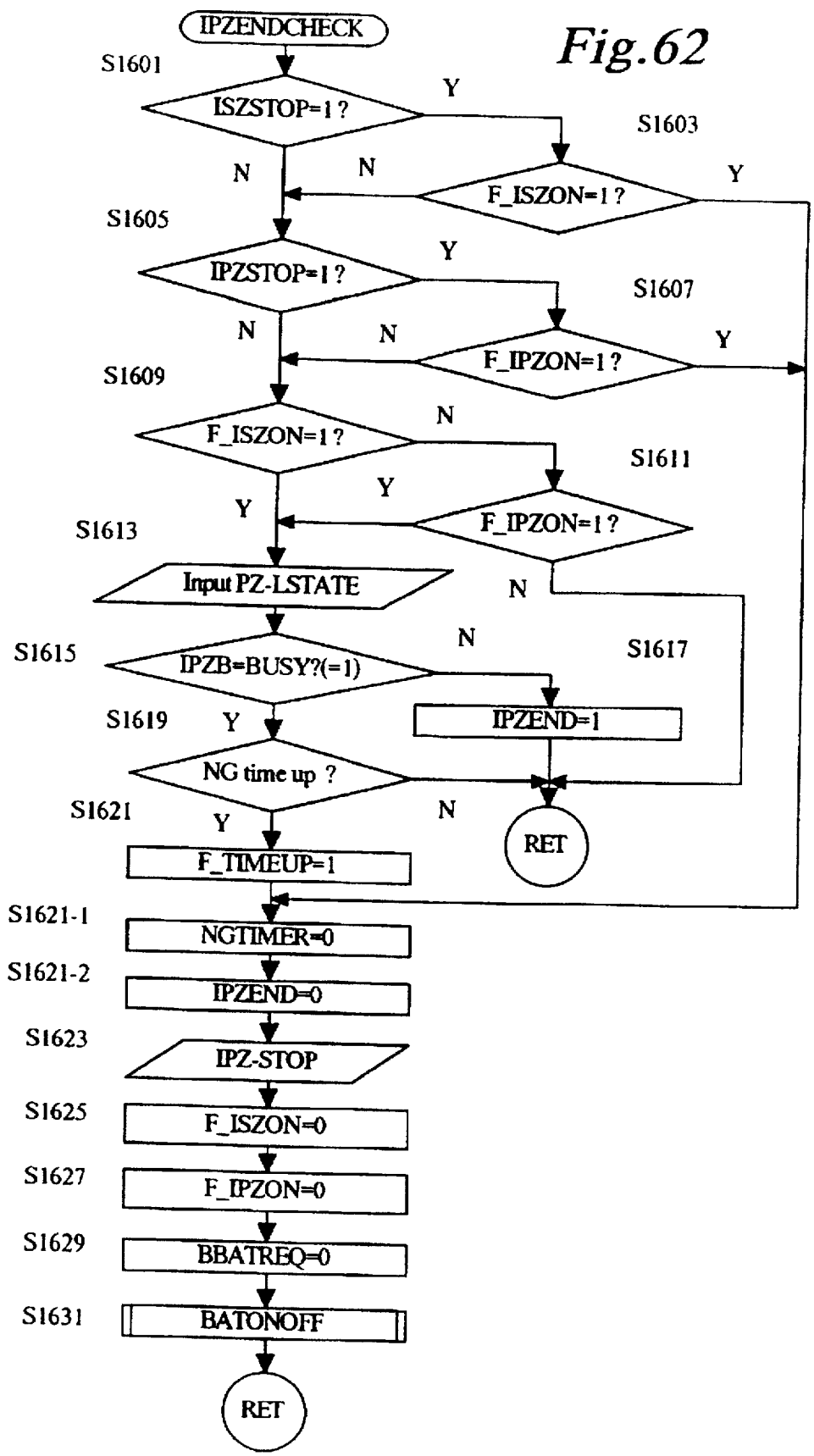
FIG. 62 is a flow chart regarding an operation for checking for a completion of preset powered zooming.
Figure 63:
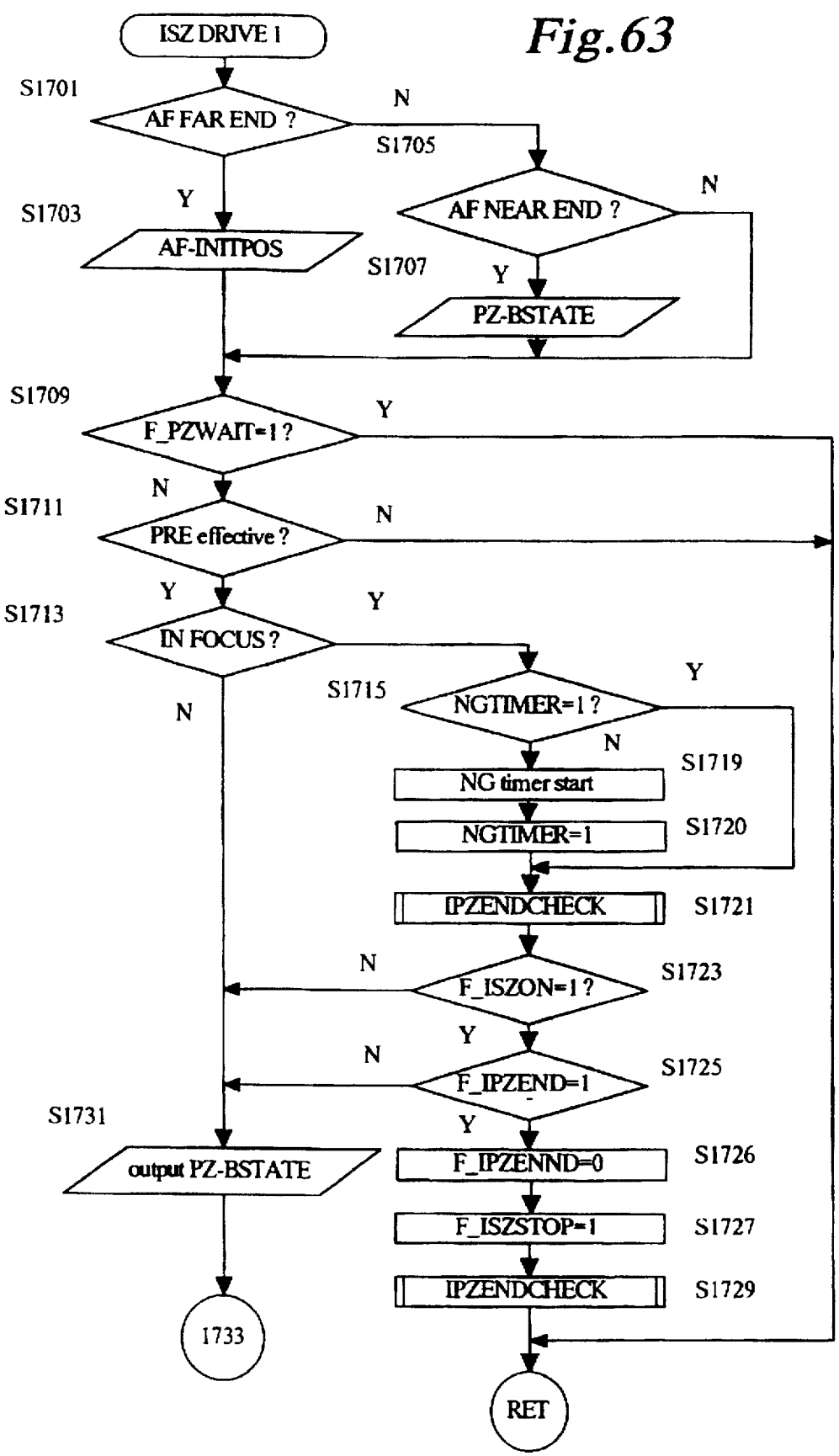
FIGS. 63 and 64 are a flow chart showing a first embodiment of constant image magnification zooming.
Figure 64:
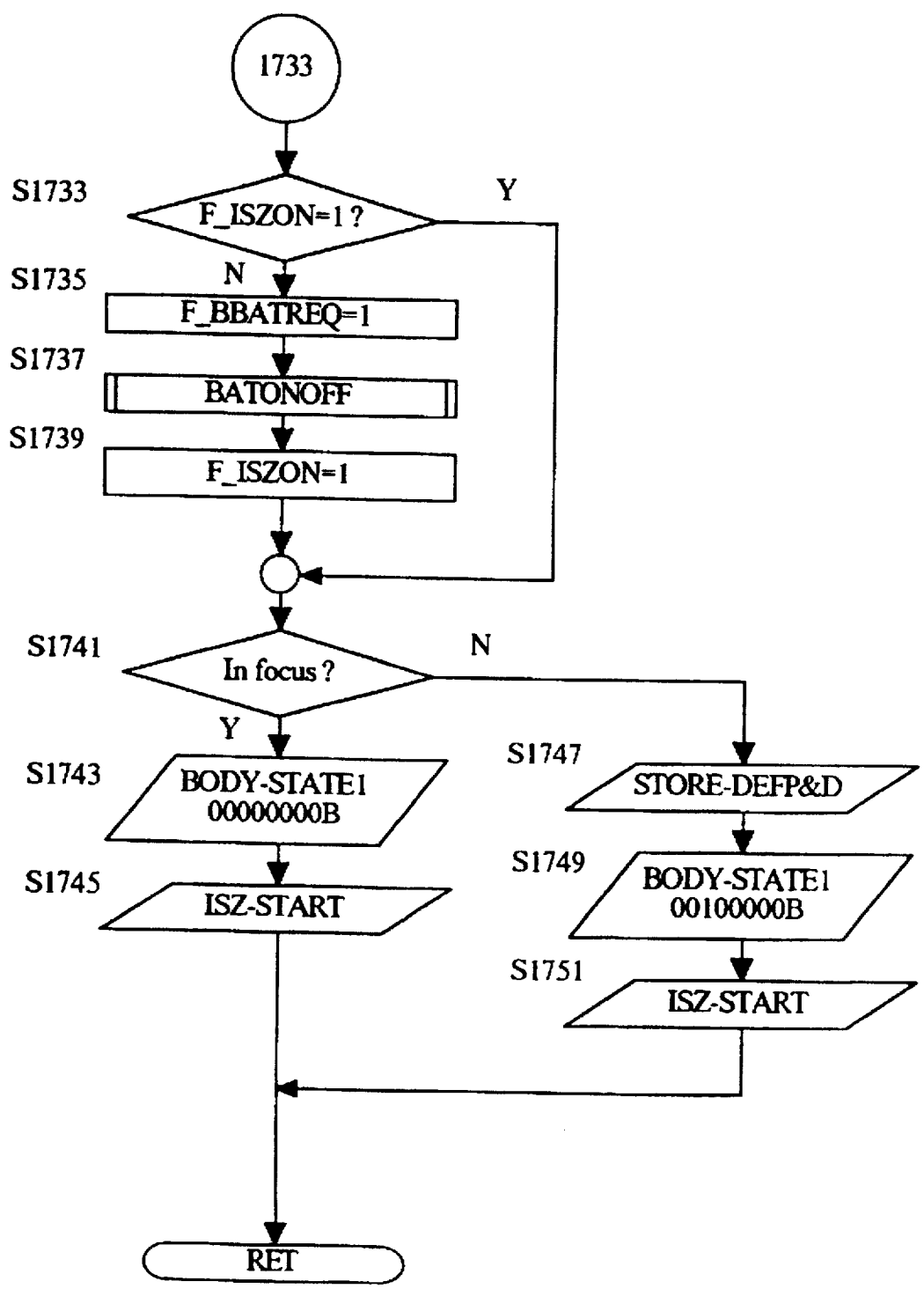

An IPZENDCHECK flowchart, as shown in FIG. 62, is a body-side operation which finishes preset power zooming and constant image size zooming and checks for the completion thereof.

Upon initiation of the IPZENDCHECK subroutine, during constant image size zooming completion and constant image size zooming-on (F_ISZSTOP=1, F_ISZON=1) or during preset zooming completion and the preset zooming-on (F_IPZSTOP=1, F_IPZON=1) state, an NGTIMER flag and an IPZEND flag are cleared, a transmission of an IPZ-STOP command to stop the power zoom is performed to clear the respective flags F_ISZON, F_IPZON and BBATREQ, and the flow is returned after stopping the battery supply and checking it (S1601 to S1607, S1621-1 to S1631).

If the camera is not currently in the state of constant image size zooming-on or preset zooming-on, a PZ-LSTATE data is inputted and it is checked whether the power zoom lens 51 is in the preset zooming-on or constant image size zooming-on states. If the camera is not currently in the state of zooming-on (IPZB=0), a flag of signifying a preset zooming completion or constant image size zooming completion is set and the flow is returned (S1601 to S1617). If currently in the preset zooming-on or constant image size zooming-on (IPZB=1) states, the flow is returned unless an abnormal detection timer (NG timer) expires (S1619).

Since it is expected that an abnormal event has occurred if the NG (abnormality detection) timer expires before the end of constant image size zooming, a TIMEUP flag is set (F_TIMEUP=1) and a NGTIMER flag and IPZEND flag are cleared (F_NGTIMER=0, F_IPZEND=0) (S1621-1, S1621-2). Then, a power zooming stop operation is performed (S1623 to S1631). If the NG timer has not yet expired, the flow is directly returned.

ISZ-DRIVE1 OPERATION

A flowchart (ISZ-DRIVE1) as shown in FIGS. 63 to 66 is an operation in the body CPU 31 in which the power zoom lens 51 (lens CPU 61) is forced to perform a constant image size zooming operation. The ISZ-DRIVE operation is called at S1163, as shown in FIG. 53.

When the focusing lens is at its infinite position, data concerning an AF position is transmitted to the power zoom lens 51 by an AF-INITPOS command (S1701, 1703). When the focusing lens is at its near position, PZ body state data concerning the power zoom mode of the camera body is transmitted to the power zoom lens 51 by a PZ-BSTATE command (S1701, S1705, S1707).

If a power zoom wait (F_PZWAIT=1) has been effected or if the result of a predictor operation is invalid, the flow is returned without any processing (S1709, S1711). If power zoom wait has not been effected and the result of the predictor operation is valid, the focus condition is checked (S1709 to S1713). If in focus, it is checked if the NG timer has been actuated (F_NGTIMER=1). If it has not been actuated, the NG timer is started and the flag F_NGTIMER is set, thereafter advancing to step S1721 (S1713, S1715, S1719, S1720). If the NG timer has already been actuated, the foregoing operation is skipped and the flow is advanced to S1721.

Next, after checking the completion of constant image size zooming at step S1721 (IPZEND-CHECK), it is checked if the completion of the same has occurred while in the constant image size zooming-on state (S1723, S1725). If in the constant image size zooming-on state (F_ISZON=1) and the constant image size zooming has ended (F_IPZEND=1), the flag F_IPZEND is cleared and the flag F_ISZSTOP is set. Further, the flow is returned after an end operation of constant image size zooming is performed in the IPZENDCHECK subroutine (S1725 to S1729).

If the camera is not in the constant image size constant zooming-on state or if constant image size zooming has not ended, a transmission of data concerning the power zoom state in the camera body 11 is performed by a PZ-BSTATE command (S1723, S1725, S1731). Then, if the camera is not in the constant image size zooming-on state, power supply is requested on the body side and a check of the battery supply is performed. Further, after a flag identifying the continuation of constant image size zooming is set, the flow advances to an in-focus judgment. However, if the camera is already in the constant image size zooming-on state (S1733 to S1741), the flow directly advances to the in-focus judgment.

If in focus, the camera is in focus in order to perform constant image size zooming based on the current AF pulse (i.e., the value of AFPXL, AFPXH), predetermined data is transmitted to the power zoom lens 51 by the BODY-STATE 1 command. Furthermore, after a transmission of a constant image size zooming start (ISZ-START) command is effected to start constant image size zooming by the power zoom lens 51, the flow is returned (S1741 to S1745). If the camera is out of focus, defocus pulse data, measured by the camera body 11, is transmitted by a STORE-DEFP & D command. After that, data, by which the constant image size zooming is effected based on the defocus pulse, is transmitted by a BODY-STATE1 command.

Finally, a constant image size start command (ISZ-START) is transmitted, and the flow is returned.

ISZ-DRIVE2

Figure 65:
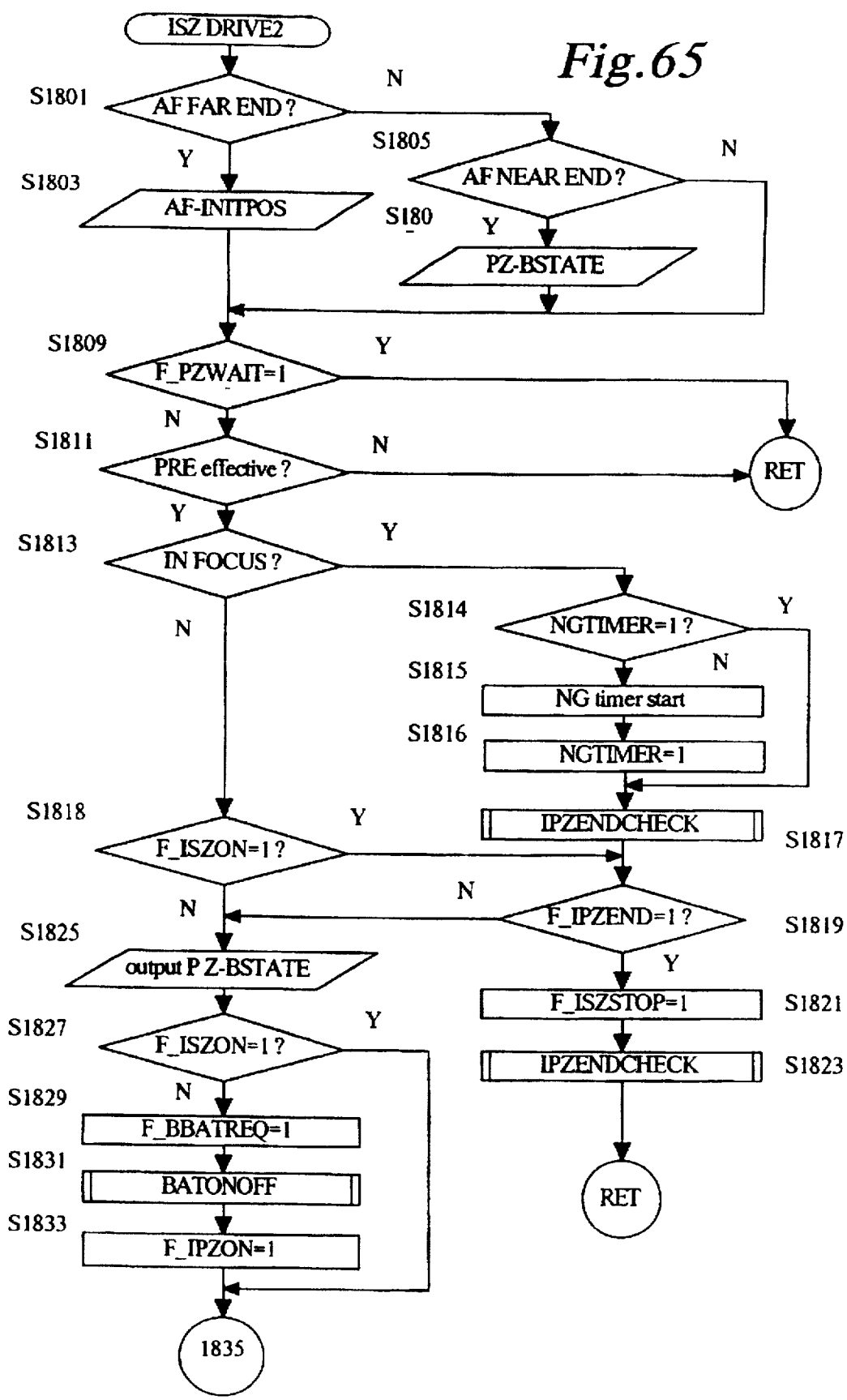
FIGS. 65 and 66 are a flow chart showing a second embodiment of constant image magnification zooming.
Figure 66:
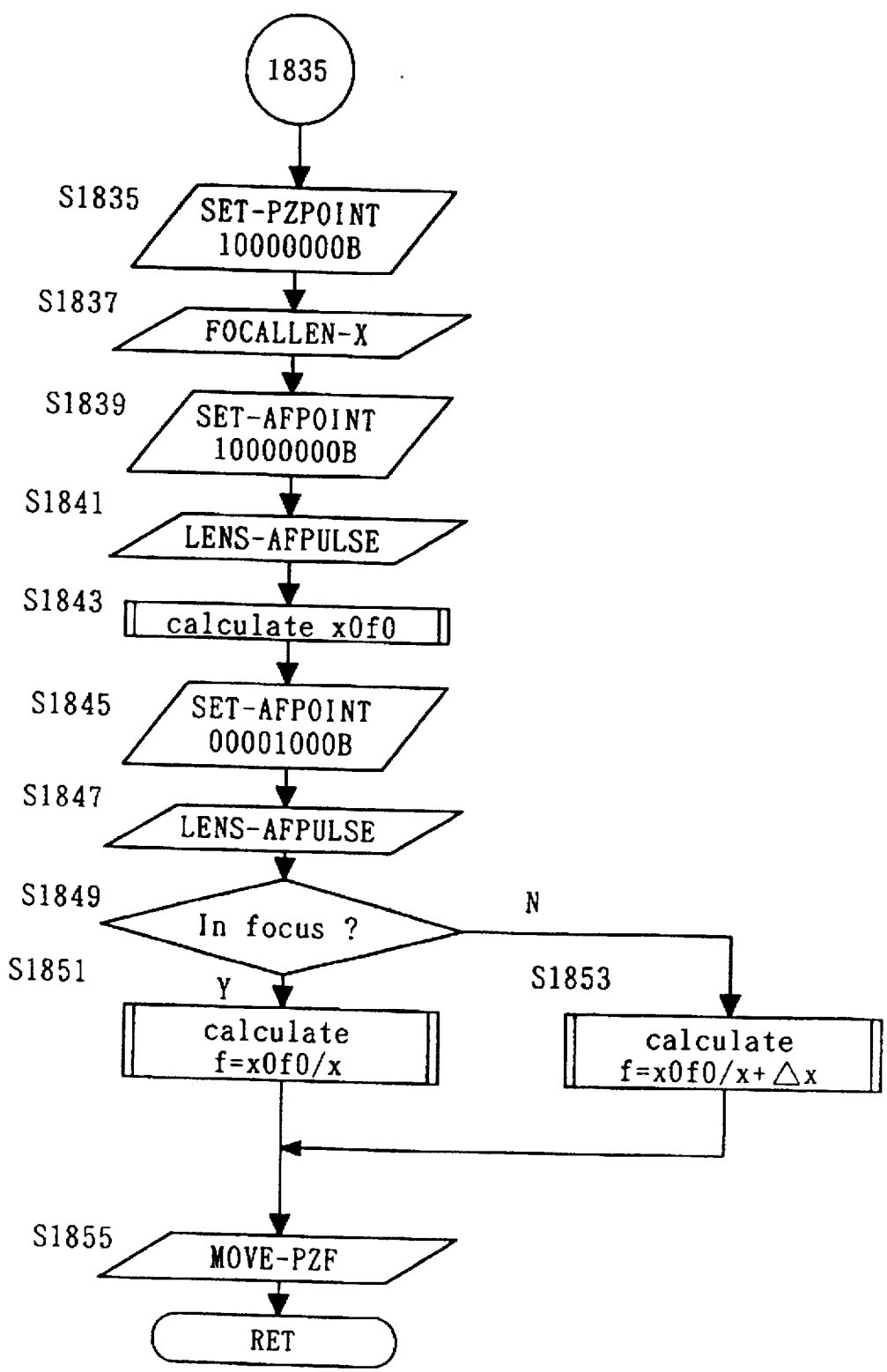

Hereinafter, another alternative constant image size zooming operation as shown in FIGS. 65 and 66 will be described. This is characterized in that the operations and controls concerning constant image size zooming are performed in the camera body 11.

Since the operations from S1801 to S1823 are similar to those from S1701 to S1731, explanations are omitted. Hereinafter the operations from S1825 will be described.

If the lens is not focused, transmission of data concerning the power zoom state of the camera body 11 is performed by a PZ-BSTATE command (S1813, S1825 to S1833). Then, if the power zoom lens 51 is not undergoing constant image size zooming, power supply is requested by the body side. The battery supply operation and the checking thereof are then performed. Additionally, a control zooming-on flag F_IPZON is set (S1827 to S1833).

Next, transmission of a SET-PZPOINT command is issued designating an address of the lens RAM 61b in which the focal length, at the time of image size storing, is stored, and an input of the focal length (FOCALLEN-X data), at the time of image size storing and designated by the SET-PZPOINT command, is issued from the power zoom lens 51 (S1835, S1837). Further, a transmission of a SET-AFPOINT command is effected with a designation of the focal length data, at the image size storing, stored in the lens RAM 61b, and an input of the number of AF pulses (LENS-AFPULSE data), at the time of the image size storing, is effected from the lens 51 (S1839,S1841). Then, the image size (x0f0) is calculated based on the inputted data (S1843). Further, a transmission of the SET-AFPOINT command is effected with a designation of the current number of the AF pulses and an input of the current number of the AF pulses, (LENS-AFPULSE data) is effected based on the designation from the lens 51 (S1845, S1847).

Next, it is checked whether the lens is in focus and, in the case that it is in-focus, the focal length is found from equation 4) by utilizing the current number x of AF pulses. If not in focus, it is checked if the photographing image is a moving object. If it is a moving object, the focal length is calculated in the same manner as that of the in-focus calculation, based on the present AF pulse. If it is not a moving object, a target focal length is found from equation 5) utilizing the current number x of AF pulses and defocus pulses Δx (S1849 to S1853). Then, after transmission of a command by which the power zoom is performed to the operated target focal length and the focal length data (MOVE-PZF command), the flow is returned (S1855).

The lens CPU 61, receiving this MOVE-PZF command, drives the zooming lens 53F to the target focal length sent from the camera body.

In this case, the method for calculating the target focal length is changed according to the focusing state of the photographing lens. However, the method may be changed according to other conditions, for instance, the condition of whether or not the moving object prediction mode is being effected.

In this case, a judgement operation "Is the photographing image a moving object ?" is to be added before S1853. In the case of a moving object, the target focal length is calculated by the present lens moving amount at S1851. If not a moving object, the focal length is calculated at S1853. The reason why the target focal length is calculated without utilizing defocus amount when the moving object prediction mode is effective, is to make the driving speed of the lens faster and more stable.

ISZ-DRIVE3

Figure 67:
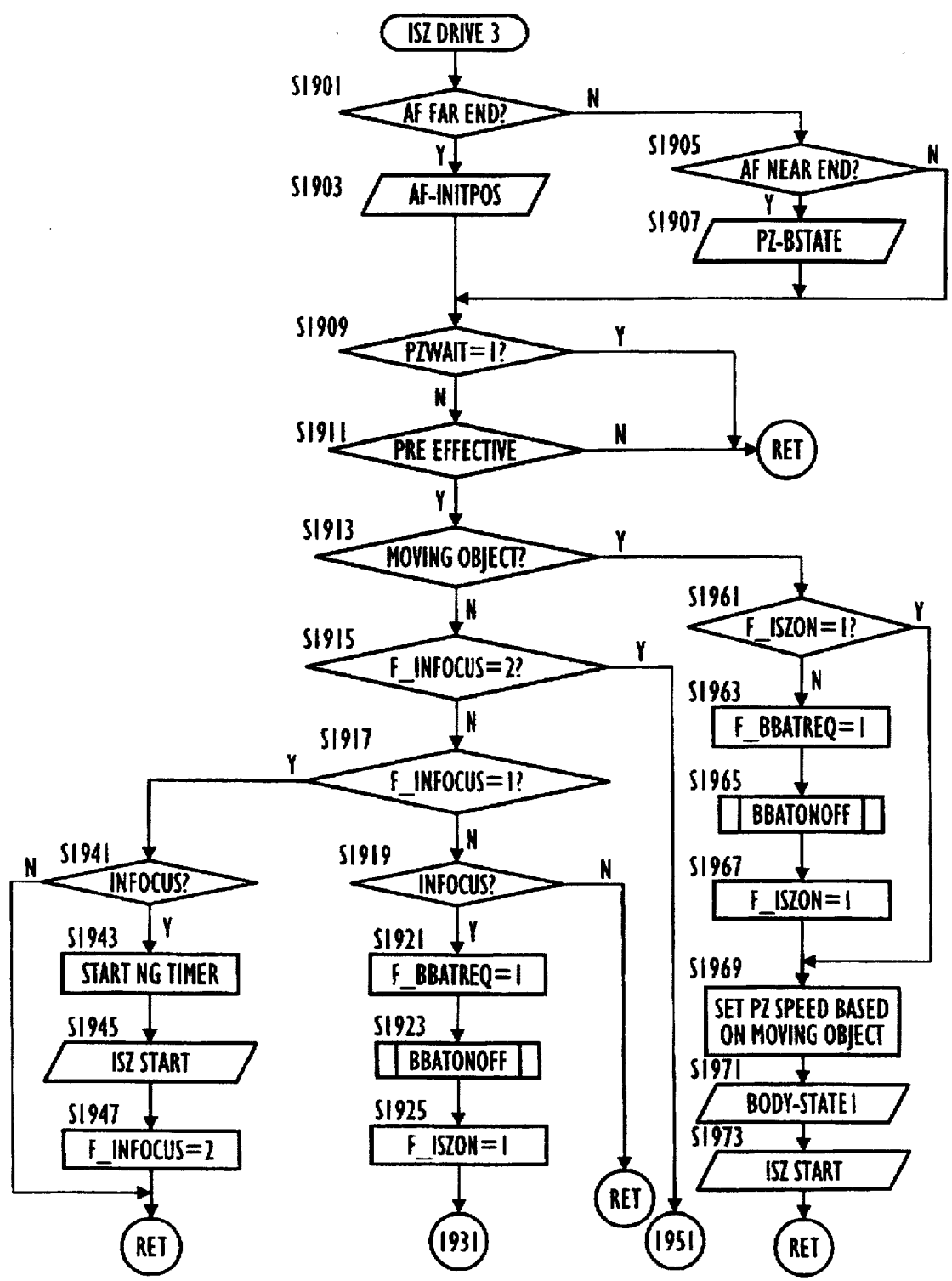
FIGS. 67 and 68 are a flow chart showing a third embodiment of constant image magnification zooming.
Figure 68:
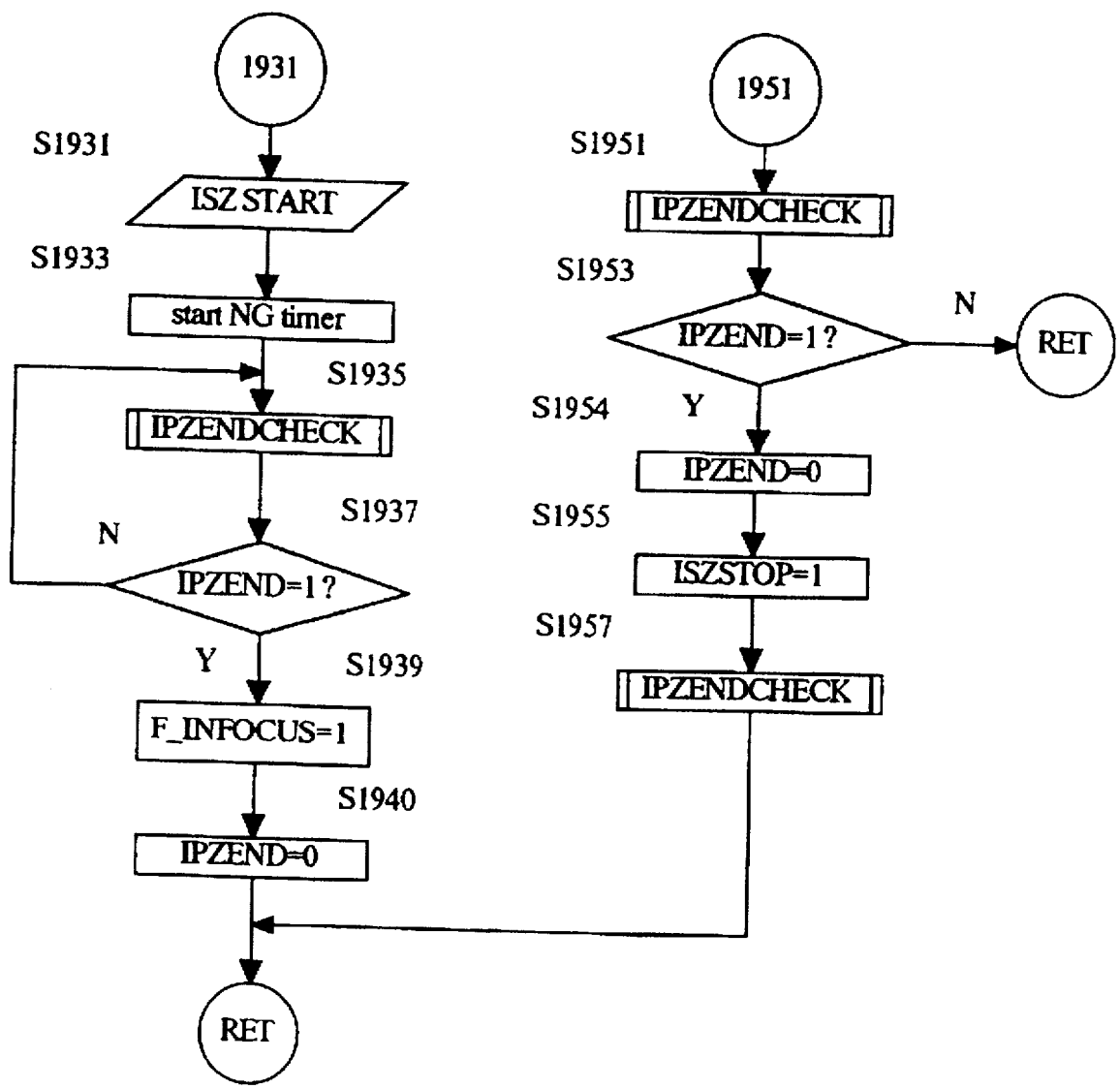

A constant image size zooming operation, as shown in FIGS. 67 and 68, illustrates a further alternative. In this case, a modification of constant image size zooming is controlled at the body 11 side. In detail, in the case that constant image size zooming is effected after the lens comes into focus once, the in-focus state may be shifted when the zooming is ended. Therefore, the AF operation and constant image size zooming are again effected after constant image size zooming has ended. In addition, this alternative is provided with a method for driving the lens during constant image size zooming by changing its speed depending on the speed of the moving object at the time of the moving object prediction AF.

If the focusing lens 53F is in the far position, a AF-INITPOS command is transmitted to the taking lens (power zoom lens 51 (S1901, S1903). If the focusing lens is in the near position, PZ body state data concerning the power zoom mode of the camera body is transmitted to the power zoom lens 51 by a PZ-BSTATE command (S1901, S1905, S1907).

If the lens is in a power zoom wait mode or if the result of the predictor operation is invalid, the flow returns without any processing (S1909, S1911).

If the lens is not in the power zoom wait mode and if the result of the predictor operation is valid, it is checked whether a subject is a moving object (S1909 to S1913). If the subject is a moving object and the constant image size zooming-on flag has been cleared (i.e., not during constant image size zooming), the body battery request flag (F_BBATREQ=1) is set and battery supply is effected. Further, the constant image size zooming-on flag (F_ISZON 1) is set (S1961 to S1967). Then, the power zoom speed is set, depending on the speed of the moving object (moving speed on an image surface). A flag F_ISZD is cleared to effect the ISZ control by using the set power zoom speed data and the AF pulse at the current position. Further, a transmission of an ISZ-START command is effected through the BODY-STATE1 data communication to force the camera lens 51 to commence constant image size zooming (S1969 to S1973). Note that when the flag F_ISZD to control the constant magnification zoom (ISZ) is set and cleared, the focal length is controlled to be a target value which is obtained using the defocus pulses and a target value which is obtained using the current values of the AF pulses, respectively.

In the case that the object is not moving, it is checked if the lens is in-focus for the second time (F_INFOCUS=2) or the first time (F_INFOCUS=1 (S1913, S1915, S1917)). Here, the F_INFOCUS is two bits. If the lens is not in-focus for the first or second time, i.e., in an initial state, it is checked if it is in focus. If not in-focus, the flow is returned. In the case of an in-focus condition, the body battery request flag F_BBATREQ is set to effect the power supply, and the constant image size zooming-on flag F_ISZON is set (S1919 to S1925).

Then, transmission of the constant image size zooming start command is effected so that constant image size zooming and the NG timer are started. It is then checked if constant image size zooming has ended. When it has ended, the first operation is ended after a first in-focus condition flag is set and a constant image size zooming end flag F_IPZEND is cleared (S1935 to S1940).

The next time this operation is initiated, the flow moves from S1917 to S1941 because the first in-focus flag is set. It is then checked whether it is again in focus. If not in focus, the flow is returned and the foregoing operation is repeated until an in-focus condition is achieved. If it is in focus, the NG timer is started and the constant image size zooming start command is transmitted to the camera lens to force the camera lens to start constant image size zooming. The flow is then returned after the second in-focus flag is set (S1943 to S1947).

If this ISZ-DRIVE 3 operation is initiated after the end of the S1947 operation, the second in-focus flag is set so that the flow advances from S1915 to S1951 and it is checked if constant image size (control) zooming has ended. If the control zoom has not ended, the flow is returned. If the control zoom has ended, a control zoom end flag F_IPZEND is cleared and constant image size zooming stop flag F_ISZSTOP is set. The flow is then returned after the constant image size zooming end operation is performed (S1953 to S1957).

AFP-CNT OPERATION

Figure 69:
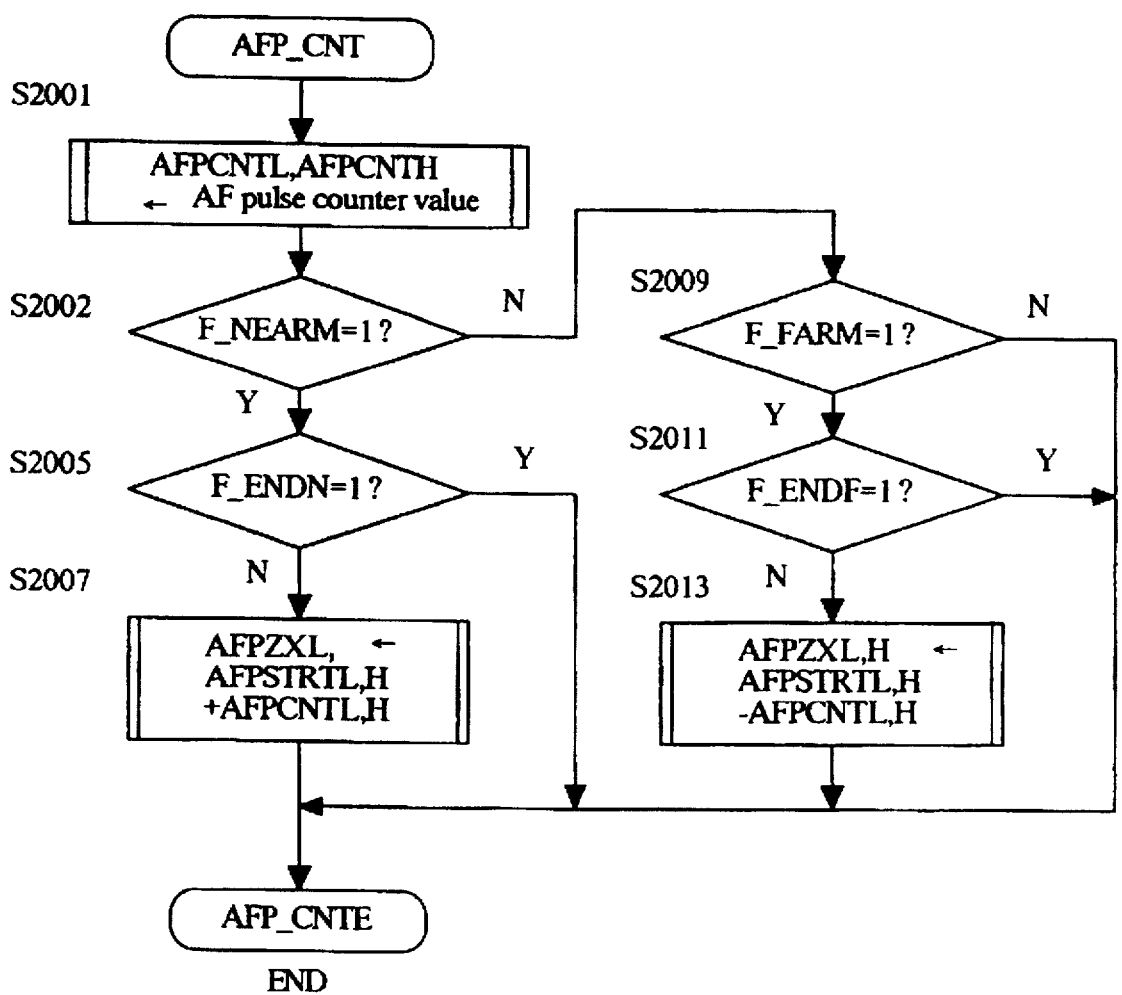
FIG. 69 is flow chart of an operation for AF pulse count.

An AFP-CNT operation, as shown in FIG. 69, is an AF pulse count operation in the power zoom lens 51. The lens CPU 61 comprises an AF pulse counter for counting AF pulses outputted from the AF pulser 59 in a hardware manner. This AFP-CNT operation is initiated at 2 ms intervals by a 2 ms timer interrupt. This operation illustrates, in detail, the operation at S303 in the 2 ms timer interrupt routine, as shown in FIG. 9.

In the AFP-CNT operation, a count value of the AF pulse hard counter is first stored in an AF pulse count value memory (addresses AFPCNTL, H of the lens RAM 61b (S2001)). Then, by reference to data (i.e., data installed in bit 3–0 of PZ-BDST, which is a predetermined address of RAM 61b) concerning an AF operation which is inputted by PZ-BSTATE command when the AF motor 39 is moving the lens to the near end and before it arrives at the near end, the AF pulse count value is added to the AF pulse count start value (AFPSTRTL, H) and this is stored in the current AF pulse value memory (AFPXL, H of the lens RAM 61b) before ending the routine. However, if it arrives at the near end, the flow immediately ends (S2002 to S2007).

When the AF motor 39 is moving the lens to the far end and before it arrives at the far end, the AF pulse count value is subtracted from the current AF pulse count start value and the result is stored in the current AF pulse value memory (AFPXL, H) to end the AFP-CNT operation. If it arrives at the far end, the AFP-CNT operation is immediately ended (S2009 to S2013). Also, if the lens is neither moving towards the near end nor the far end, the AF motor does not rotate. Therefore the AFP-CNT operation ends without any processing (S2002, S2009).

AFP-ADJ OPERATION

Figure 70:
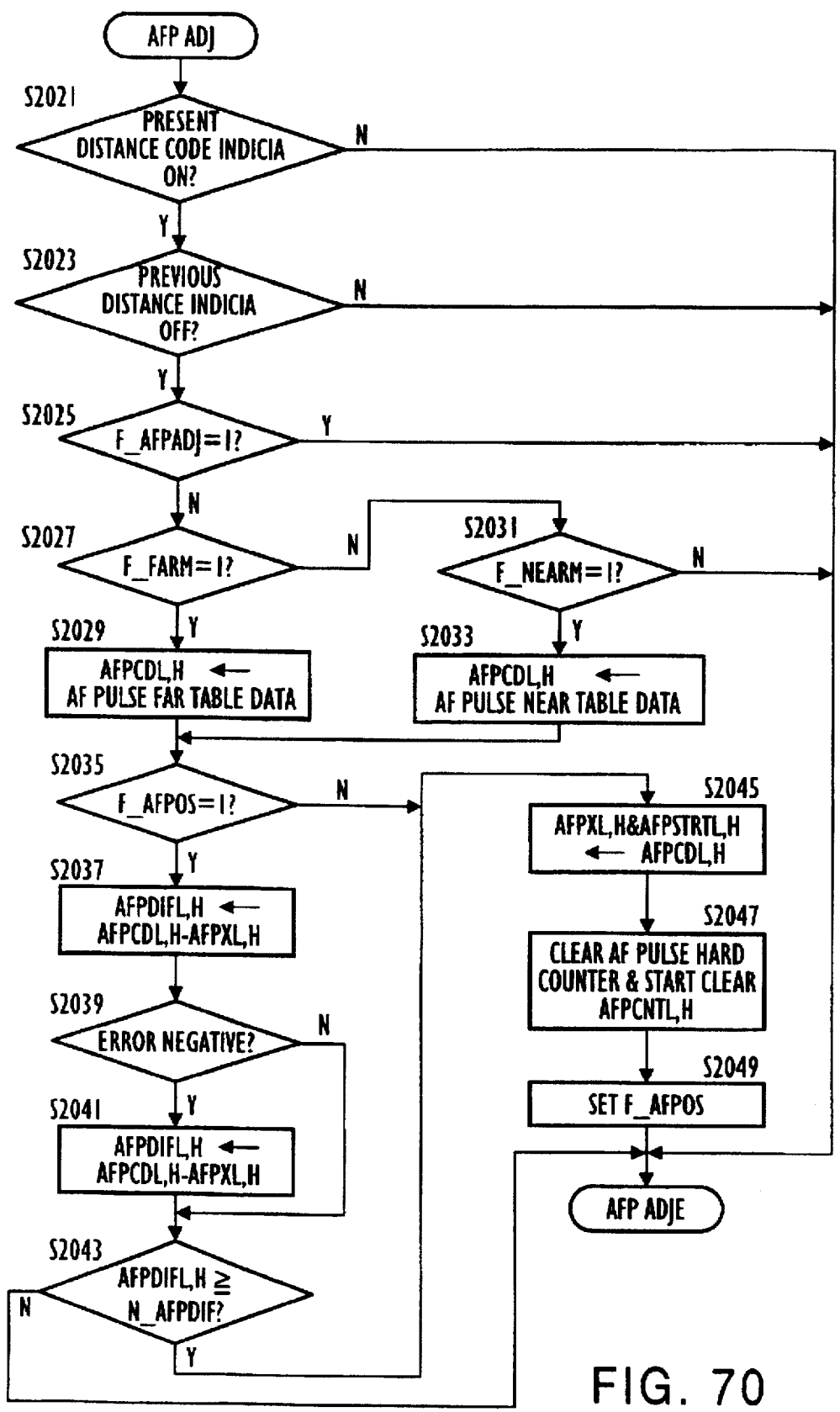
FIG. 70 is a flow chart regarding an operation for adjusting the AF pulse count value.

An AFP-ADJ flowchart as shown in FIG. 70 is an operation on the camera lens 51 side. It amends the current AF pulse value affected by backlash and the like. In the present case, the AF pulse value at the far end is set at zero and the AF pulse value at the near end is set at the maximum value. Then, the present AF pulse count is amended every time the brush 85 crosses one of the indicators 83 on the distance code 81, in accordance with an absolute pulse number, which is to be determined by the position of the indicator 83, based on an absolute value code. The present operation is a detail of the 2 ms timer interrupt routine at S307, as shown in FIG. 9.

Upon initiation of the AFP-ADJ operation, it is first checked if the brush 85 has contacted the indicator 83. If not, the operation is ended (S2021). If it has contacted the brush, the flow is directly returned in the case that such a contact was achieved during the preceding operation (S2021, S2023). In other words, at the time when the indicator 83 and the brush 85 contact is detected (at an edge of the indicator 83).

If the indicator 83 and the brush 85 contact each other and such contact occurs when the AF motor 39 is moving the lens to the far position, an AF pulse FAR table data (data concerning an edge at the near end side of the indicator 83) corresponding to the near end position of the indicator 83 is read and stored in addresses AFPCDL, H. If such contact occurs during the near end movement, an AF pulse NEAR table data (data concerning an edge at the FAR end side of the indicator 83) corresponding to the far end position of the indicator 83 is read and stored in addresses AFPCDL, H (S2025 to S2033). The reason why there are two kinds of tables, i.e. the FAR table and the NEAR table is because the indicator 83 has a width and an absolute position at the contact time which is different along the width, depending on the contact direction. When the AF motor 39 is stopped, the flow is immediately ended (S2027, S2031). Further, a flag F_AFPADJ at S2025 is provided for test purposes and is usually cleared.

Next, if the current AF pulse value is known (when flag F_AFPOS is set), the current AF pulse count value (data of the AFPXL, H) is subtracted from the table data (AFPCDL, H) and its subtracted value (difference) is stored in an AF pulse error memory (AFPDIFXL, H (S2035, S2037)). Here, when the error is negative, the absolute value of the error is stored in the AF pulse current value memory (S2039, S2041).

It is then checked if the difference is larger than an allowable error (N_AFPDIF). If the difference is smaller, the operation is directly ended. However, if the difference is larger, an amendment is effected, that is, the table data (AFPCDL, H) are incorporated into the current AF pulse value memory (AFPXL, H) and the AF pulse count start value memory (AFPSTARTL, H (S2043, S2045)). On the other hand, if the AF pulse current value is not known, the amendment operation at S2045 is unconditionally performed (S2035, S2045).

Then, the AF pulse hard counter is cleared and started and the AF pulse count start value (AFPCNTL, H) is cleared. After that, the flag F_AFPOS, showing the current AF pulse value being known, is set and the operation ends (S2047, S2049).

LMT-DTC OPERATION

Figure 71:
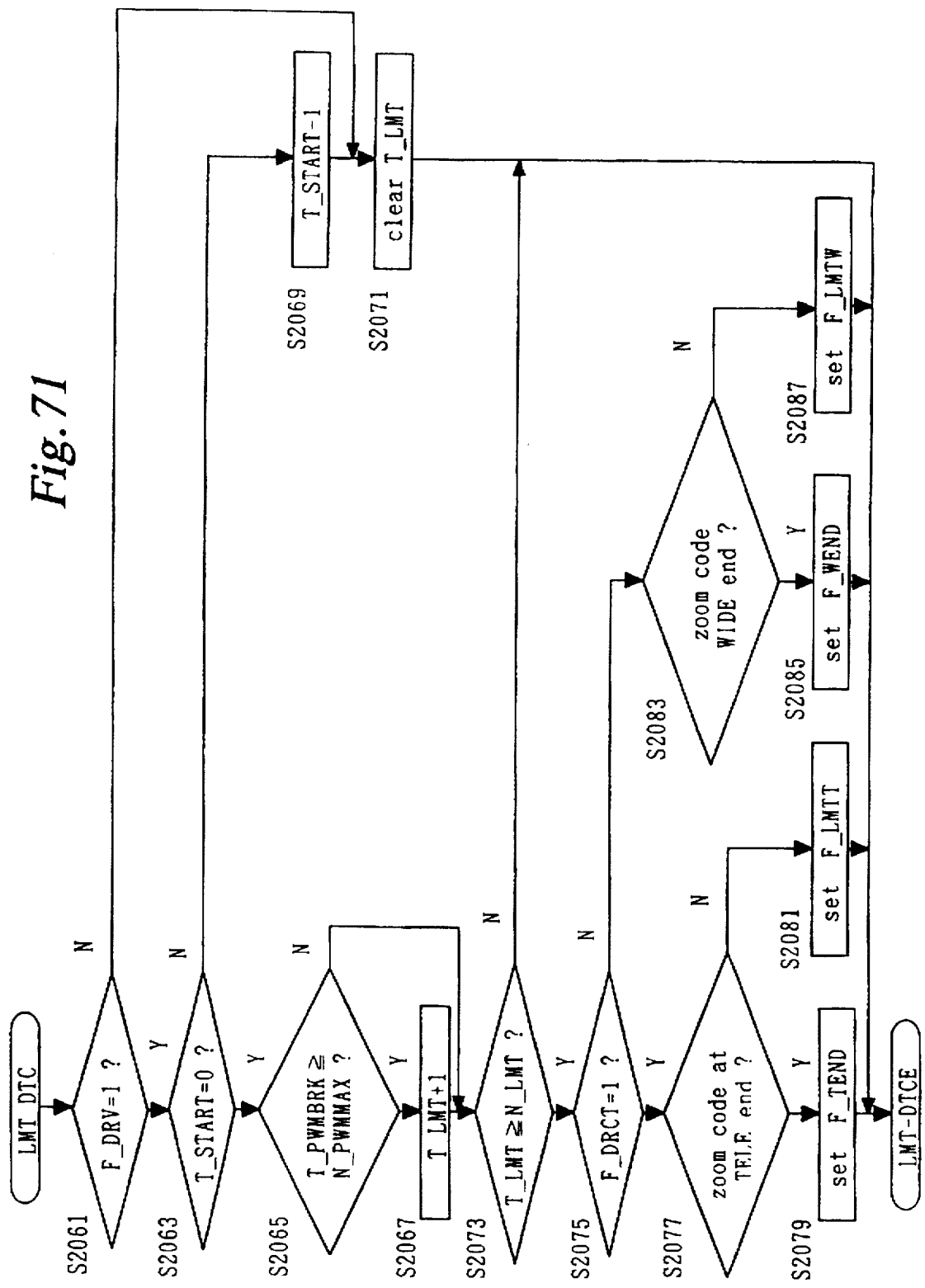
FIG. 71 is a flow chart regarding an operation for a PZ terminal point.
Figure 72:
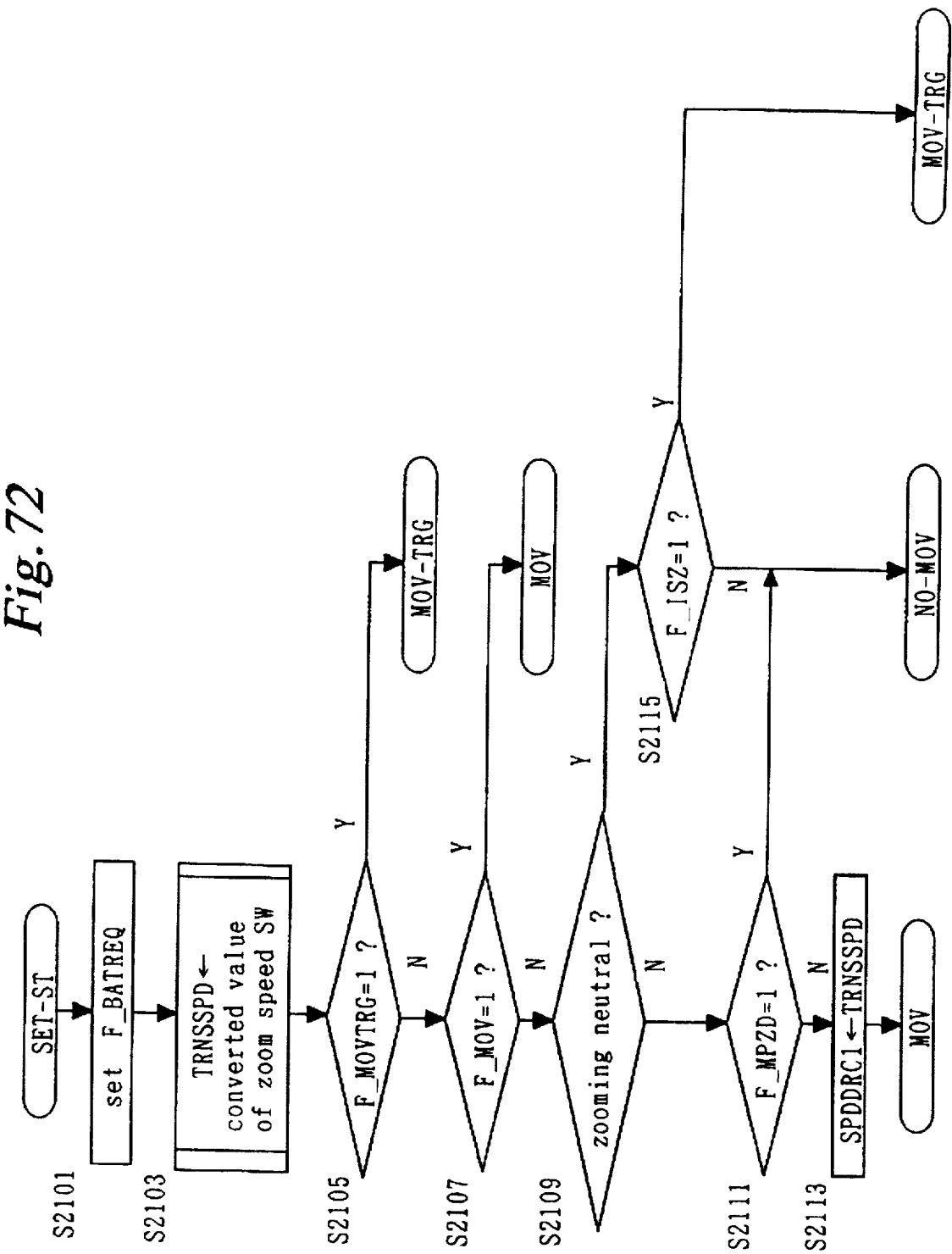
FIG. 72 is a flow chart regarding an operation for controlling rotational direction and rotational speed of a zoom motor.

A LMT-DTC flowchart as shown in FIG. 71 is an operation on the side of the camera lens 51. This operation detects that a zooming lens group 53Z has arrived at an end point or that movement is prevented by some external circumstances (i.e., the lens group 53Z has arrived at a para-end point). Such detections are performed by checking if, during the drive of the PZ motor 65, the PZ pulses are outputted within a predetermined period of time. Further, the predetermined period of time is changed depending on a driving speed of the PZ motor (zooming speed). Also, since a starting torque becomes larger for a constant period after the start of the PZ motor (i.e., upon a transfer from a stop state or a braking state to a driving state), the detection of the end point is not performed. The present operation illustrates the detail of the 2 ms timer interrupt routine at S351, as shown in FIG. 10.

First, it is checked if the PZ motor is performing a driving operation. In the case of non-driving, the flow exits after clearance of a limit counter T_LMT, which detects arrival at a limit (i.e., the end point or the para-end point (S2061, S2071)). Specifically, a PWM timer T_PWM is cleared when the PZ pulse is outputted to initiate the PZ pulse count interrupt operation as shown in FIG. 12.

During the PZ drive, it is checked if a counter T_START, which measures the time since the start, becomes zero (i.e., whether a predetermined period of time has expired). In the case that it is not zero, the counter T_START is decremented by one and the limit counter T_LMT is cleared to leave the operation (S2061, S2063, S2069, S2071). This processing is initiated every 2 ms so that the counter T_START is decremented every 2 ms. The value of the counter T_START is set at a predetermined value when the zoom motor is started, but the end point detection is not performed within a constant period after that start.

The fact that the counter T_START becomes zero means that a predetermined time has expired after the motor start, as a result of which the flow advances to the operation of end point detections, from S2065.

In the case that a duty ratio T_PWMBRK of the PWM becomes more than its maximum limit value N_PWMMAX, the counter T_LMT for the end point detection is incremented by one and the flow advances to S2073. In the opposite case, the flow advances directly to S2073 (S2065, S2067). Also, if the motor is engaged in DC drive (i.e., the maximum speed drive), the value of the maximum limit value N_PWMMAX, as a duty ratio T_PWMBRK, is established. Therefore, during the DC drive, the limit counter T_LMT is incremented by one (S2065, S2067).

Next, the PWM drive of the zoom motor is controlled as follows.

The PWM duty ratio T_PWMBRK is usually set at a smaller value than the maximum limit value N_PWMMAX. Accordingly, the counter T_LMT is not incremented and the flow exits (S2065, S2073). However, if the PZ pulse is not outputted for a constant period of time, the duty ratio T_PWMBRK is gradually increased by the 2 ms timer routine and becomes a value similar to the maximum limit value N_PWMMAX (generally DC drive) after a predetermined period to let the counter T_LMT be incremented by one.

Here, in the case of the PWM low speed drive, the value of the PWM duty ratio T_PWMBRK is small in the beginning. Therefore, upon arrival at the end point or the para-end point, it takes a long time for the counter T_LMT to be incremented.

In the case of the PWM high speed drive, the value of the PWM duty ratio T PWMBRK is large. Therefore, upon arrival at the end point or the para-end point, it takes a shorter time for the counter T_LMT to be incremented in comparison with that of the PWM low speed drive.

With the above processing, it is possible to change the end point detection time depending on the zoom motor drive speed (S2063, S2067). Further, if the counter T_LMT is below a predetermined value (N_LMT), a predetermined end point detection period will have not yet expired so that the flow immediately leaves this subroutine (S2073).

If the counter T_LMT increases beyond the predetermined value N_LMT, it is regarded as the end pointer the para-end point. In the case of a tele-direction drive, a tele end flag F_TEND is set if a zoom code is a tele end value. However, if the zoom code is not the tele end value, its stop is effected by any abnormality and therefore a para-tele end flag F_LMTT is set (S2075 to S2081). In the case of a wide-direction drive, a wide end flag F_WEND is set if a zoom code is a wide end value. However, if the zoom code is not a wide end value, its stop is effected by any abnormality and therefore a para-wide end flag F_LMTW is set (S2075, S2083 to S2087).

SET-ST OPERATION

A SET-ST flowchart as shown in FIGS. 72 to 80 is an operation on the power zoom lens 51 side and is configured to settle a status (speed control bit) such as controls of rotational direction, speed, stop and brake of the zoom motor. The present operation is a detail of the 2 ms interrupt routine, as shown in FIG. 10. Further, this SETST operation includes, as shown in FIGS. 72 to 80, a MOV operation, an INIT3 interrupt operation, a NO-MOVE, a MOV1 operation, BRK1, 2-operation, a STP1 operation, a MOV-TRG operation and a DRV-TRG8 operation.

Firstly, a power request flag F_BATREQ is set and the position of the zoom speed change switch 75 is transformed into a predetermined code (which indicates its direction and speed). Thereafter the code is stored in a transformed value memory TRNSSPD (S2101, S2103).

If the lens is driven towards a designated position (F_MOVTRG=1), the flow advances to the MOV_TRG operation. If it is a usual move or drive in a designated direction (i.e., when a F_MOV is set), the flow advances to the MOV operation (S2105, S2107).

If it does not correspond to any move or drive and a zoom operation ring is located on a neutral position (when the zoom switch 75 is turned off), the flow advances to the MOV-TRG operation when in the image size constant zoom mode while the flow advances to the NO-MOV operation when in the non-image size constant zoom mode (S2109, S2115). If the zoom operation ring is not located in the neutral position, flow advances to the NO-MOV operation when a manual power zoom stop bit is set (F_MPZD=1). If not, manual power zooming is being effected and therefore the flow advances to the MOV operation with a storage of a zoom speed data, which is transformed from a zoom switch status, in an address SPDDRC1 (S2109, S2111, S2113).

In the above operation, since upon initiation of a release operation in the body and the like a flag F_MPZD is set by a communication command BODY-STATE1 (22), the manual power zoom operation during the release can be stopped. Also, upon reception of a transmission of a communication command IPZ-STOP (35) for stopping the power zoom, the respective flags such as F_MOVTRG, F_MOV and F_ISZ are cleared and therefore power zoom operations in addition to the manual power zoom can be stopped.

MOV OPERATION

Figure 73:
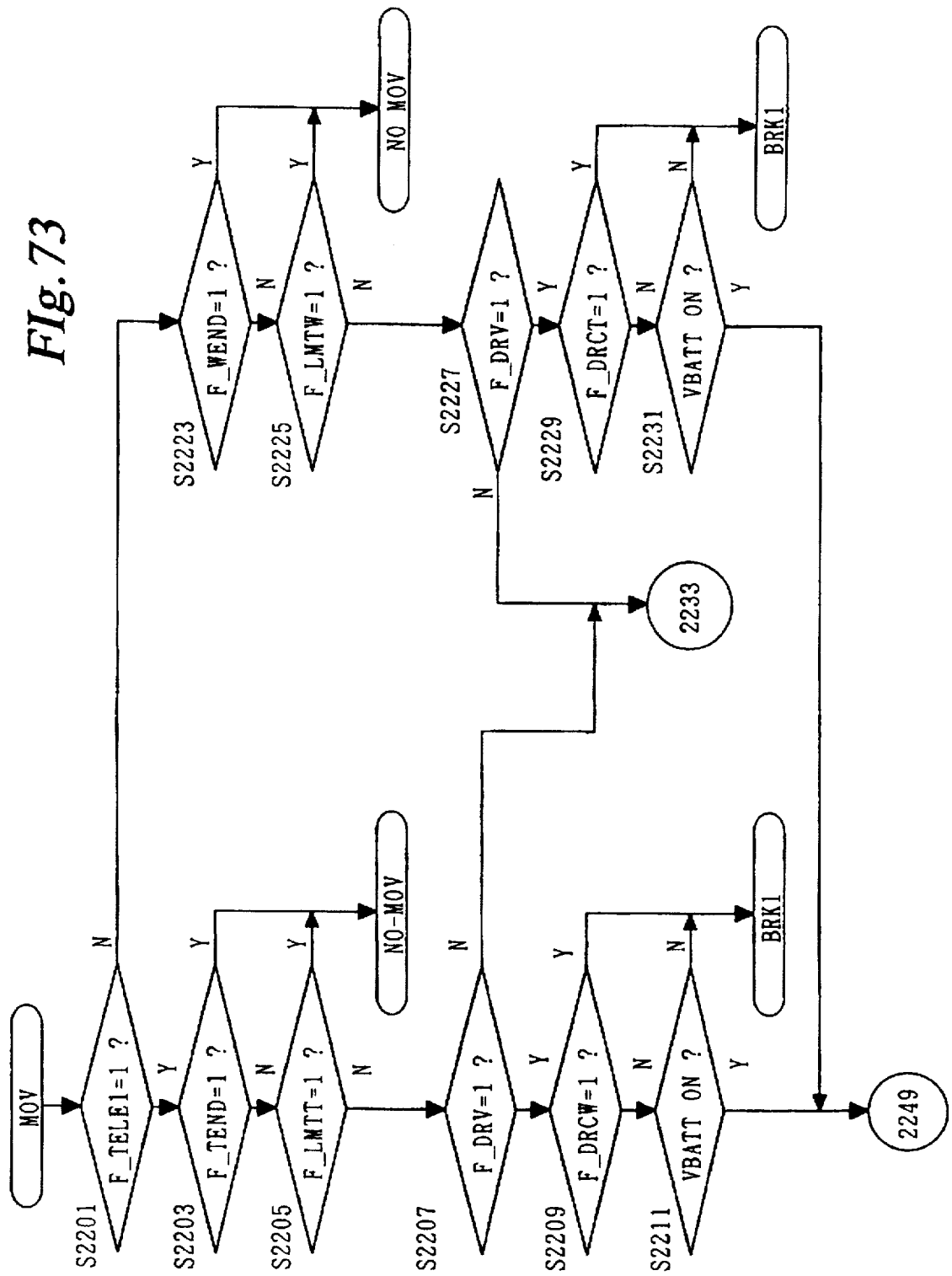
FIGS. 73, 74, and 75 are a flow chart regarding powered zooming operation by a zoom switch.
Figure 74:
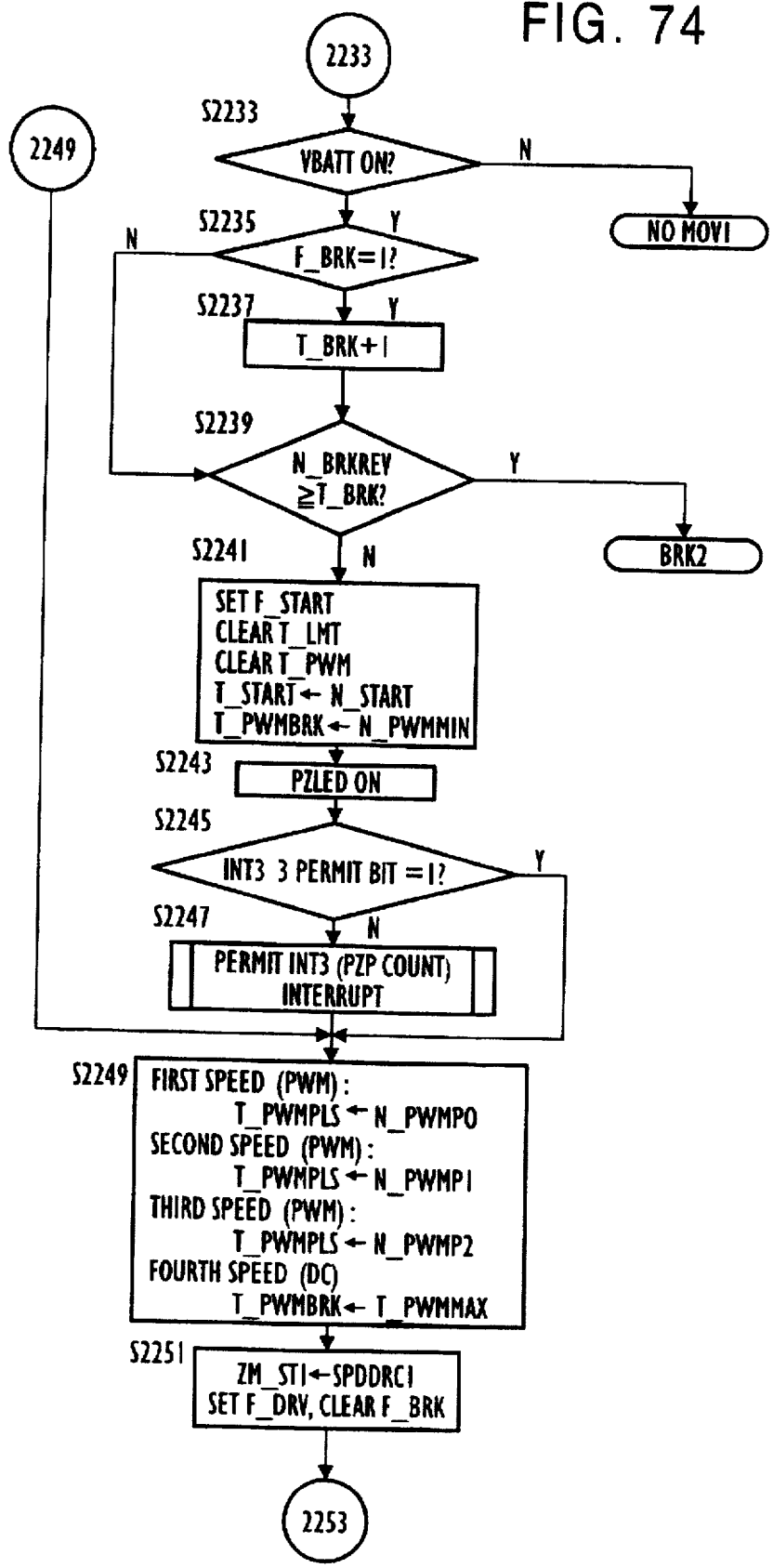
Figure 75:
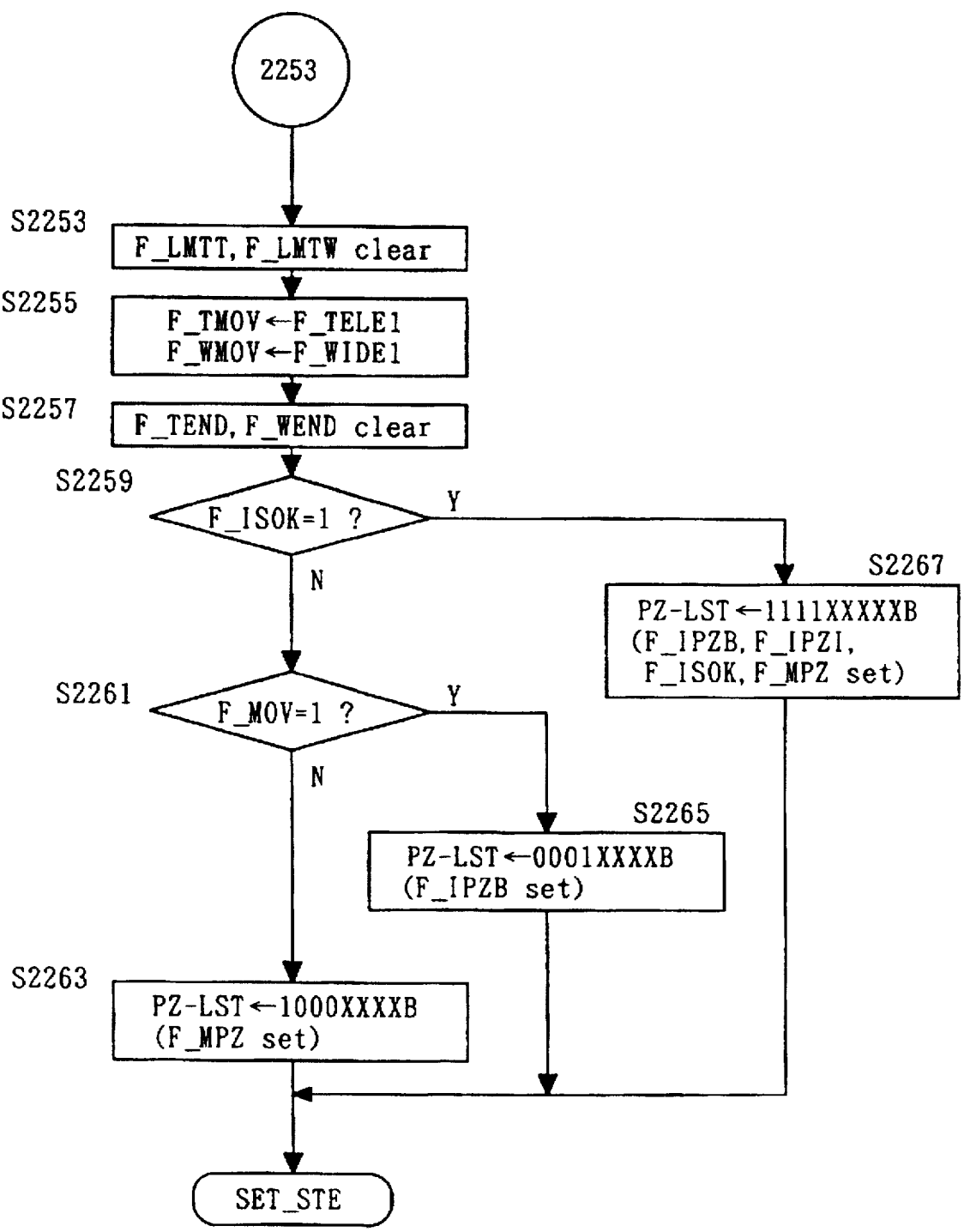

Next, control of the power zoom motor will be described with reference to a MOV flowchart, as shown in FIGS. 73 to 75. This control is an operation in the power lens 51 and concerns manual zooming and controlled power zooming in a designated direction (i.e., when the flag F_MOV is set up).

Firstly, it is checked (i.e., bit 0 of a move direction memory SPDDRC1) if movement is in the tele direction (F_TELE1=1 (S2201)).

If the direction of movement is in the tele direction and it arrives at the tele end or para-tele end, the flow advances to the NO-MOV operation (S2201 to S2205). If it is an initial movement (or a start), the flow advances to an operation S2233 for initialization (S2207). Then, by reference to data concerning the previous zooming motor operation stored in the memory ZM-ST1, which is used for for operating the zoom motor, if movement occurred the preceding time, but in a different direction (of the zoom motor), or if the power supply from the body is turned off, the flow advances to the brake operation (BRK1 (S2207 to S2211)). If at the present time the movement is in the same direction as that of the preceding operation and the power supply is turned on, the flow advances to a speed settle operation at S2249 (S2207 to S2211).

If the movement is not in the tele direction, but arrives at the wide end or the para-wide end (F_WEND=1 or F_LMTW=1), the flow advances to the NO-MOV operation (S2201, S2223, S2225). If the lens starts, but does not arrive at the wide end or the para-wide end, the flow advances to a processing S2233 for initialization. If movement occurred the preceding time, but the present movement is in a different direction or if the power supply from the body is turned off, the flow advances to the brake operation (BRK1). If the present movement is in the same direction as that at the preceding movement and if the power supply is turned on, the flow advances to the speed settle operation at S2249 (S2225 to S2231).

The initial set up operation upon start-up is executed on condition that power from a power source is being supplied. If power is not being supplied, the operation proceeds to an ending process (NO-MOV1 (S2233 represents the foregoing operation)).

When power is being supplied, the brake counter T_BRK is incremented by 1, if the brake flag F_BRK is set (i.e., when the motor is being braked). If the brake counter T_BRK is less than a predetermined value (N_BRKREV), the operation proceeds to a brake 2 operation (BRK2) at which point a brake is applied (S2235 through S2239).

When the brake flag F_BRK has been cleared, or if it has been set whilst brake counter T_BRK is greater than a predetermined value, braking is completed. In such case, the start up flag F_START is set, and the limit timer T_LMT and the PWM timer, T_PWM, are cleared. Then, a counter is set so that terminal detection does not take place for a certain period of time after the start-up, and the initial value (i.e., minimum value) of the PWM duty ratio is set (S2235 through S2241 represent the foregoing operation). This means, the start flag F_START is set, the terminal detecting counter T_LMT and the PWM counter T_PWM are cleared, an initial value is entered at the start counter T_START, and a duty ratio T_PWMBRK of PWM is filled with the minimum value. Setting the minimum value at T_PWMBRK provides the slowest start-up for PWM.

Upon completion of the setting operation, the LED of the PZ pulser 69 is turned on to prepare for the PZ pulse count. Then, PZ pulse count interruption (INT3) is enabled, if it was disabled, before proceeding to a speed setting operation (S2249 (S2243 through S2247 represent the foregoing operations)).

In the speed setting operation, a PZ pulse interval (T_PWMPLS value) is set according to the speed selected. In this case, the time during which electricity is supplied at PWM is controlled so that PZ pulses are outputted at the selected PZ pulse interval. Four speeds can be selected, although it does need to be limited to four. The speed is selected according to the two bits, bits 2 and 3 (F_SPDA1, F_SPDB1), of SPDDRC1. Since the fourth speed is not controlled by PWM control, but rather by DC control, a PZ pulse interval is not set. The maximum value is set at PWM duty ratio T_PWMBRK for terminal detection (S2065 in FIG. 71).

Upon completion of the speed selection, the speed and its direction (SPDDRC1) are inputted in the zoom control memory (ZM-ST1), the drive flag F_DRV is set, and the brake flag F_BRK is cleared (S2251). Bits 3–0 of zoom memory ZM-ST1 (i.e., flags SPD1, SPD0, DRCW, DRCT) are set so that the flags correspond to bits 3–0 of SPDDRC1 (i.e., flags SPDB1, SPDA1, WIDE1, TELE1), respectively. The telephoto end and wide-angle end dummy flags, F_LMTT and LMTW, are then cleared. The drive direction flags, F_TMOV, F_WMOV, F_TELE1, F_WIDE1, are set while the telephoto end and wide-angle end flags, F_TEND and F_WEND, are cleared (S2253 through S2257 represent the foregoing operations). F_TMOV, F_WMOV, F_TEND and F_WEND are flags for the PZ-LST data, and are set so that the flags F_TMOV and F_WMOV correspond to F_TELE1, F_WIDE1 of SPDDRC1, respectively. In the case that either one of F_TMOV and F_WMOV is set, the other is cleared.

During the zooming operation at a constant image magnification, manual power zooming is activated by interrupting constant image magnification. Predetermined bits are set at the memory data (PZ_LST) for the PZ conditions of the lens, and the flag is set before processing is completed (S2259 and S2267). When zooming is not being performed at a constant image magnification, if power zooming (manual power zooming) is being effected by a zoom switch operation, data including flag F_MPZ for manual power zooming is set at the zoom condition data (PZLST). If controlled power zooming (i.e., zooming to a specified direction) is being effected, data (including flag F_IPZB) for the controlled power zooming are entered at the zooming condition data (PZ-LST), before the SET-ST operation is completed (S2261 through S2265 represent the foregoing processes). The content of the PZ_LST data is transmitted to the camera body by means of communication using command PZ-LSTATE(10).

INIT3 INTERRUPTION ENABLING OPERATION

Figure 76:
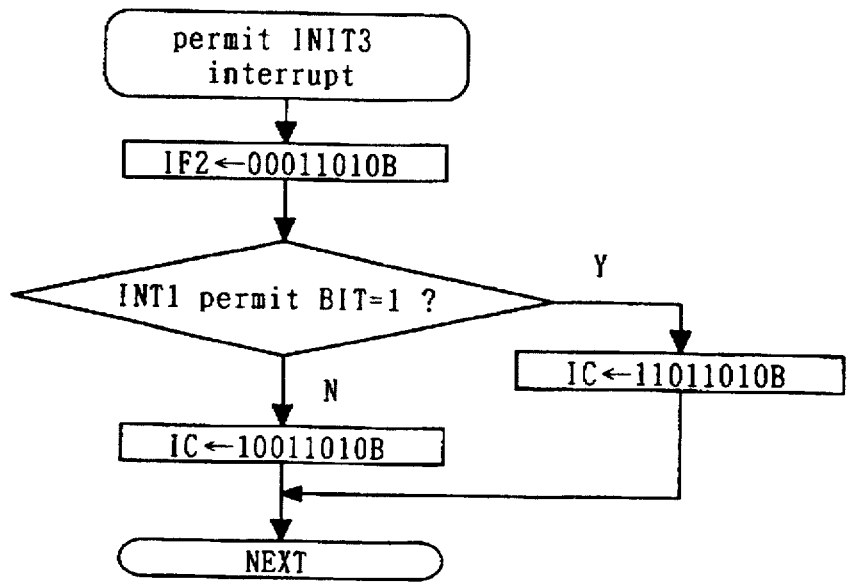
FIG. 76 is a flow chart regarding interruption treatment for the PZ pulse count.
Figure 82:
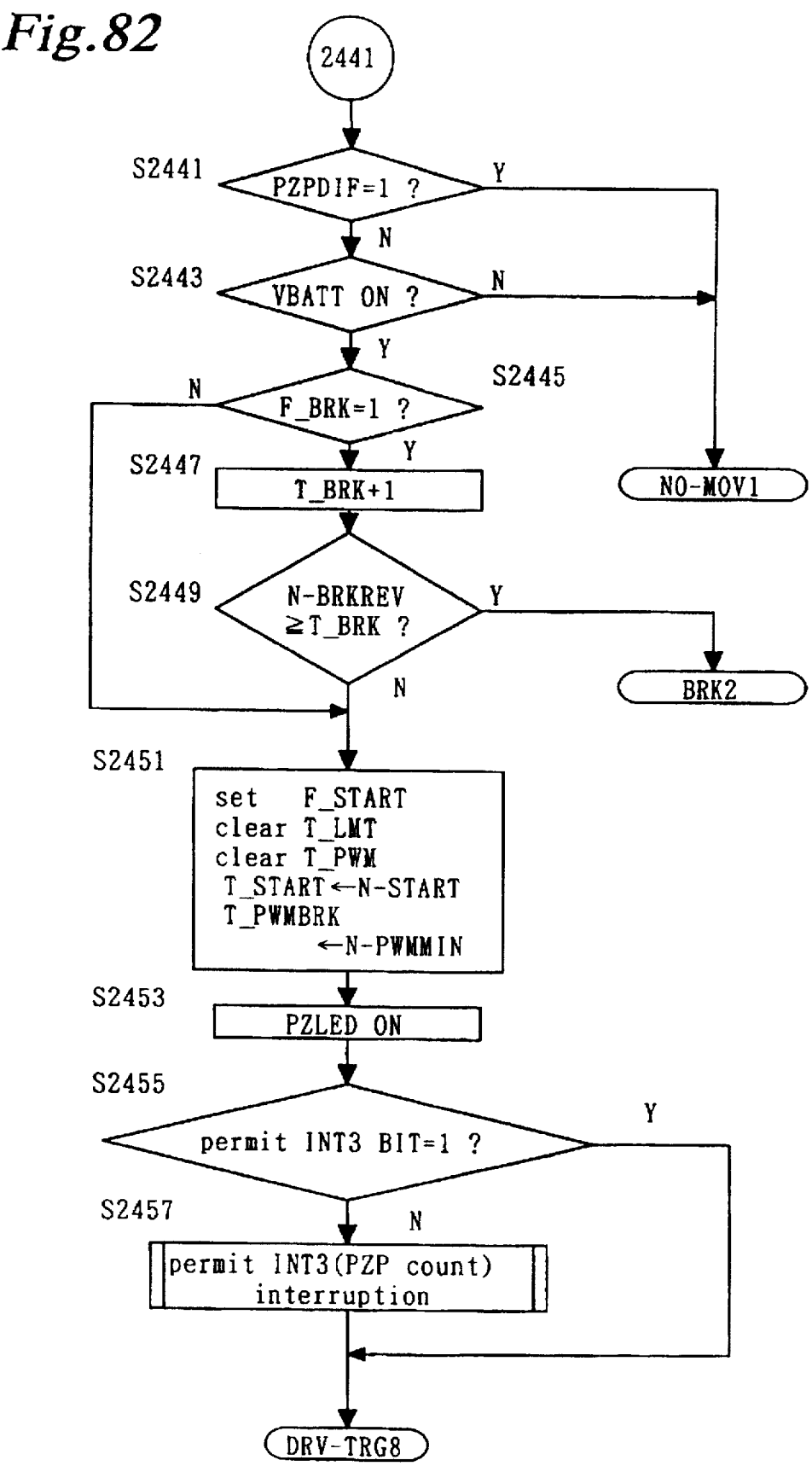

FIG. 76 shows an operation that enables interruptions by the PZ pulse count. In this preferred embodiment, the PZ pulse counting is effected by software using an interruption of a 2-ms timer. In this process, the enabling bit for the INIT interruption is set to enable counter interruptions by PZ pulses. This operation shows the details of step S2247 in FIG. 74 and S2457 in FIG. 82.

NO-MOV and NO-MOV1 OPERATIONS

Figure 77:
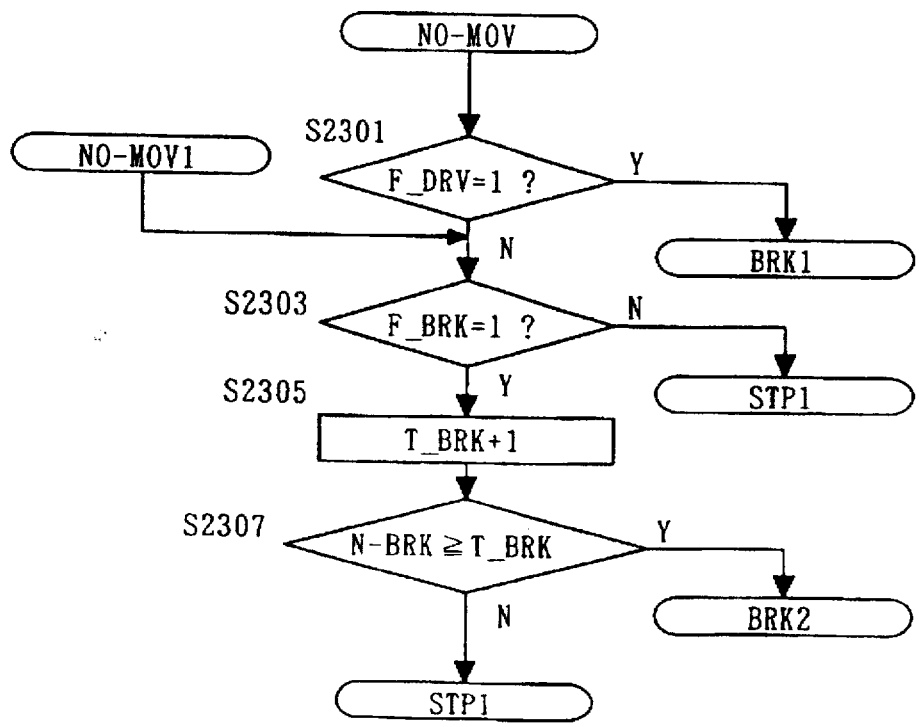
FIG. 77 is a flow chart regarding an operation for stopping powered zooming.

Flow charts NO-MOV and NO-MOV1 shown in FIG. 77 are operations that stop the power zooming operation or effect a shift to a braking operation. When power zooming is being effected (i.e., when flag F_DRV has been set), the operation proceeds to the BRK1 operation. If power zooming is not being effected, and if brake is not being effected (i.e., flag F_BRK has been cleared), the operation proceeds to the ending operation (STP1). If brake is being effected, the brake counter is incremented by 1, and if the value exceeds a predetermined value (N_BRK), the ending operation (STP1) is executed. If the value is less than the predetermined value, the operation proceeds to Brake 2 (BRK2) to continue the braking operation (S2301 through S2307 represent the foregoing processes). Since this NO-MOV1 operation is performed when power zooming is not being effected, the process begins from step S2303, skipping step S2301.

BRK1 and BRK2 OPERATIONS

Figure 78:
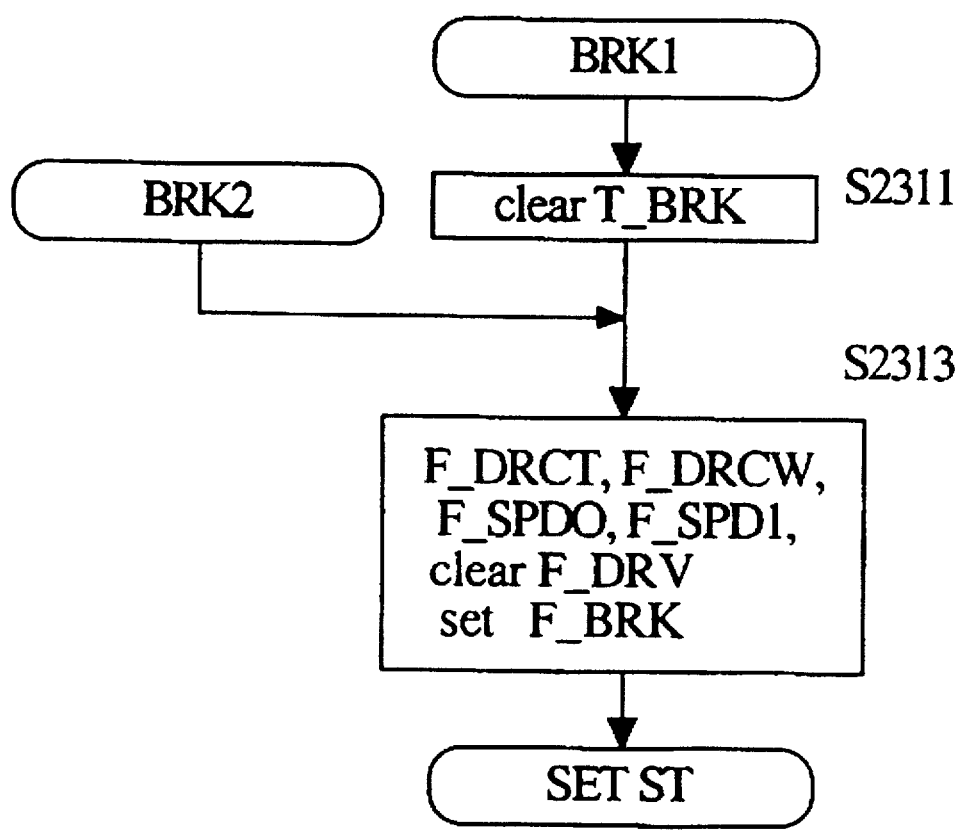
FIG. 78 is a flow chart regarding an operation for braking the zoom motor.

In the brake operation (BRK1) in FIG. 78, the brake timer T_BRK is cleared and the telephoto direction flag F_DRCT, wide-angle direction flag F_DRCW, speed-1 flag F_SPD0, speed-2 flag F_SPD1, and the drive flag F_DRV are cleared. The brake flag F_BRK is then set (S2311 and S2313 represent the foregoing processes). Since BRK2 is entered only after the second operation, only step S2313 is executed. After completing the above operations, the SET-ST operation is completed.

STP1 OPERATION

Figure 79:
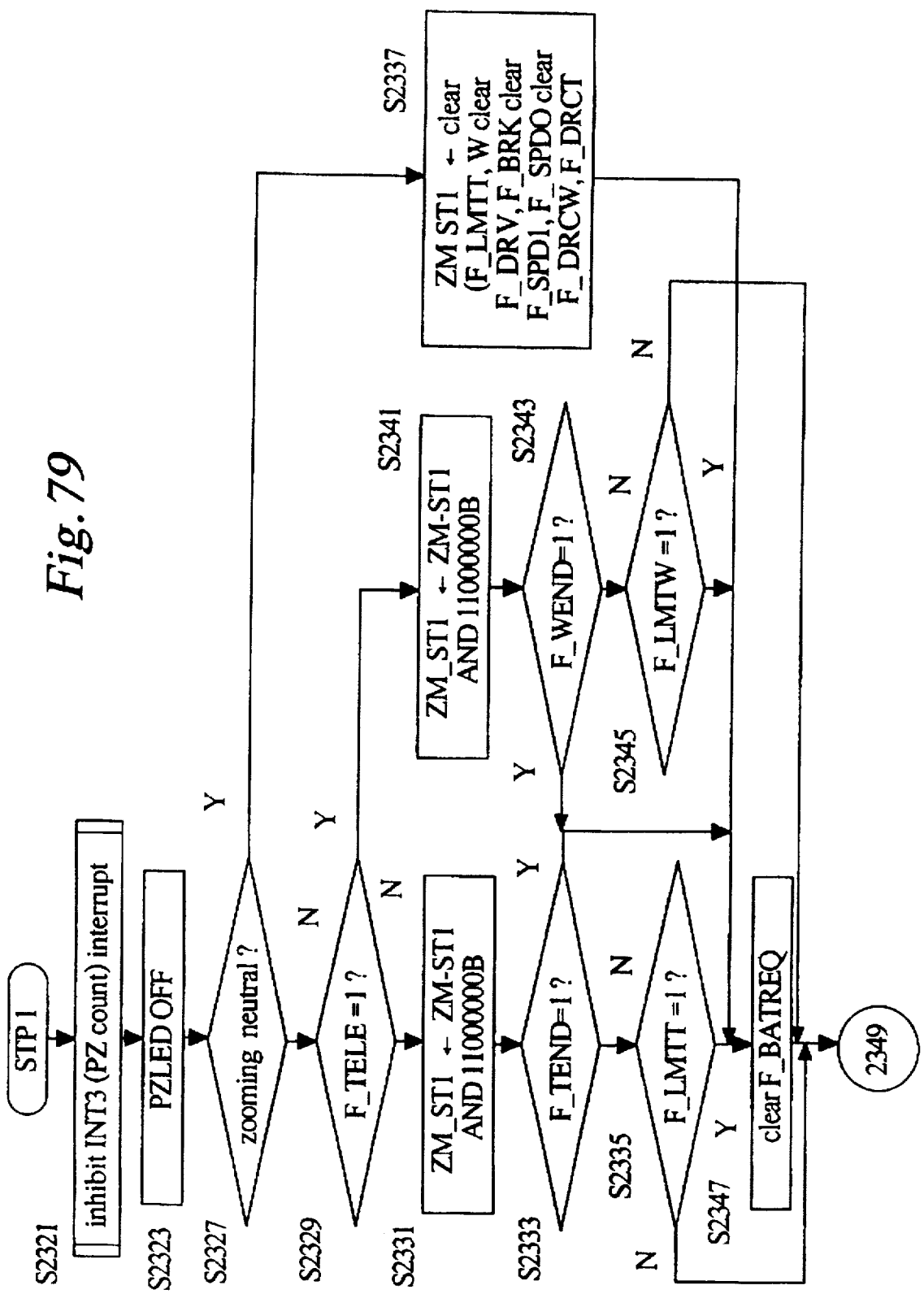
FIGS. 79 and 80 are a flow chart regarding an operation for setting a state of the photographing lens.
Figure 80:
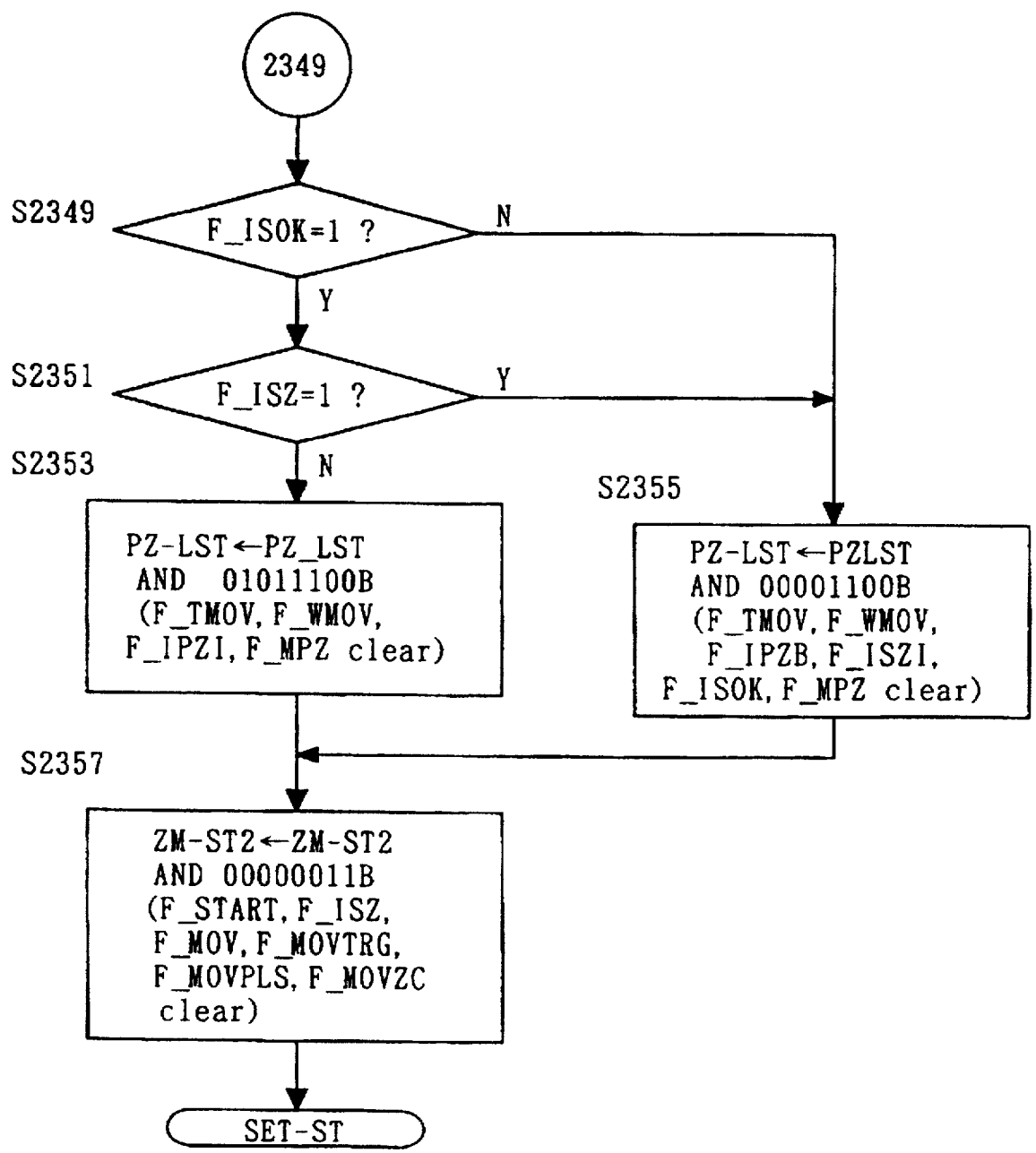

The STP1 flow chart shown in FIG. 79 is an operation for stopping the power zooming operation.

First, the PZ pulse count interruption is disabled, and the LED of the PZ pulser 69 is turned off (S2321 and S2323).

When the zoom switch 75 is at the neutral position, ZM_ST1 data is cleared (i.e., all the flags are cleared), and a battery request is cancelled (S2327, S2337 and S2347) before proceeding to step S2349. When the zoom switch 75 returns to the neutral position, the dummy terminal flags (F_LMTT and F_LMTW) are cleared. Therefore, zooming can also be performed in the direction that the dummy terminal was previously set.

When the zoom switch 75 is not set at the neutral position, but rather the telephoto direction, flags F_LMTT and F_LMTW in the ZM_ST1 data are left unchanged, while all the other flags are cleared (S2329, S2331). If the lens is at the telephoto end, or at the para-telephoto end, a battery request is cancelled before proceeding to S2349. If the lens is neither at the telephoto end nor the paratelephoto end, the battery request is not cancelled, and the operation proceeds to step S2349 (S2333 and S2335 represent the foregoing processes). When the zoom motor 65 is revolving toward the wide-angle direction, flags F_LMTT and F_LMTW in the ZM_ST1 data are left unchanged, while other flags are cleared (S2329 and S2341). In the wide-angle end or in the para-wide-angle end, the battery request is cancelled before proceeding to step S2349. If, however, the lens is neither at the wide end nor the para-wide-end, the battery request is not cancelled before proceeding to step S2349 (S2343 and S2345 represent the foregoing processes).

In S2349, whether or not zooming with a constant image magnification is being effected is tested. In step S2351, whether or not a calculation for zooming with a constant image magnification has been completed is tested. If zooming with a constant image magnification is in operation, but the calculation has not been completed, flags F_TEND, F_WEND, F_IPZB and F_ISZOK in the PZ_LST data are left unchanged, while other flags F_TMOV, F_WMOV, F_IPZI and F_MPZ are cleared (S2353). If zooming with a constant image magnification is not being effected, or if the calculation has not been completed during zooming with a constant image magnification, flags F_TEND and F_WEND in the PZ_LST data are left unchanged, while other flags are cleared (S2355). The content of the data PZ_LST is transmitted to the camera body 11 by means of communication using command PZ-LSTATE (10).

The logical sum of the ZM-ST2 data and a predetermined data is stored in ZM-ST2. The start flag F_START, the zoom flag for constant image magnification, F_ISZ, the specified direction drive flag F_MOVTARG, the specified position drive flags, F_MOVPLS and F_MOVZC, etc. are all cleared, after which the SET-ST operation is completed (S2357). This means, flags F_PZPOS and F_PZPDRC in the ZM-ST2 data are left unchanged, while other flags are cleared.

Flag F_PZPDRC has the same function as those of flags F_DRCW and F_DRCT in the data of ZM-ST1. The flag F_PZPDRC indicates that the lens is driven to the wide end when F_PZPDRC=1 and that the lens is driven to the tele end when F_PZPDRC=0.

MOV-TRG OPERATION

Figure 81:
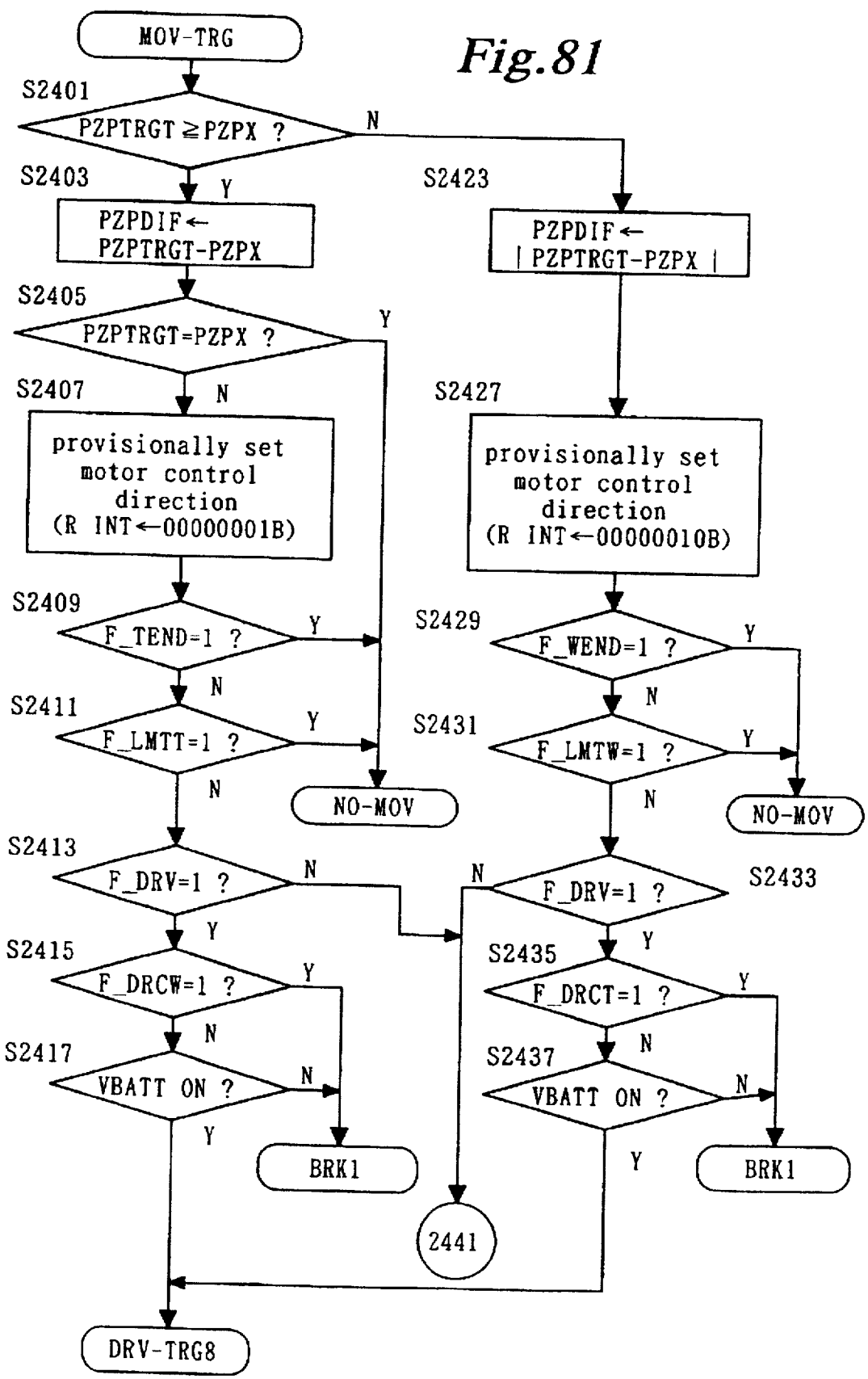
FIGS. 81 and 82 are a flow chart regarding powered zooming toward a designated focal length.

The flow chart shown in FIG. 81 is the MOV-TRG operation for driving the zoom lens to a desired position.

First, whether or not the targeted number of PZ pulses is greater than the present PZ pulse is checked (S2401). If it is greater, driving is effected in the telephoto direction, while if it is smaller, driving is effected in the wide-angle direction.

When the driving operation is effected in the telephoto direction, the targeted number of PZ pulses (PZPTRGT) is subtracted by the present number of pulses (PZPX), and the difference is stored in a memory (PZPDIF) as the number of driving pulses (S2403). If the targeted number of pulses and the present number of pulses are equal, the operation proceeds to NO-MOV (S2405) because the driving operation is not necessary. If they are not equal, the direction of the motor driving operation is temporarily set for the telephoto direction. If it is neither in the driving end or in the para-telephoto end, the operation proceeds to NO-MOV (S2407 through S2411). If it is neither the telephoto end nor para-telephoto end, but during the driving operation, the operation proceeds to BRK1 if the wide direction flag F_DRCW is set, or if the battery is turned off (S2413 through S2417). If driving is being effected in the same direction, and if the battery is on, the operation proceeds to DRV-TRG8 (S2413 through S2417). If it is not being driven, the operation proceeds to S2441.

When driving is being effected in the wide-angle direction, the targeted number of pulses (PZPTRGT) is subtracted from the present number of pulses (PZPX), and the difference is stored in the memory (PZPDIF) as the number of driving pulses (S2423). The driving direction of the zoom motor is then temporarily set for the wide-angle direction, and if it is in the wide end or in the para-wide end, the operation proceeds to NO-MOV (S2427 through S2431).

If the lens is neither at the wide-angle end nor the para-wide-angle end, but rather in the midst of the driving operation, the operation proceeds to BRK1, if the telephoto direction flag F_DRCT is on or if the battery is turned on (S2433 through S2437). If driving is being effected in the same direction, and if the battery is turned on, the operation proceeds to DRV-TRG8 (S2433 through S2437). If driving is not currently being effected, the operation proceeds to S2441.

In this control method, the possibility exists that an excess pulse will occur as a result of the driving being changed to braking when the targeted PZ pulses and the present PZ pulses become equal. However, since an excess pulse is of minimal importance, the operation proceeds to NO-MOV1 when the difference pulse PZPDIF is 1, or when it is not 1 but power supply is turned off (S2441 through S2443).

When the difference pulse PZPDIF is not 1, and when power supply is on, the brake counter T_BRK is incremented by 1, if the brake flag F_BRK is set. If the brake counter T_BRK is smaller than a predetermined value, the operation proceeds to the braking operation (BRK2 (S2443 through S2449 represent the foregoing processes)).

If the brake flag F_BRK has been cleared, or if the brake counter T_BRK is greater than a predetermined value, the brake operation is completed. The start-up flag F_START is set, and the limit timer and the PWM timer are cleared. The counter is then set so that terminal detection is not performed for a certain period of time after start-up, and an initial value (i.e., the minimum value) is set for the PWM duty ratio (S2451). This means, the start flag F_START is set, the terminal detecting counter T_LMT and PWM counter T_PWM are cleared, an initial value is entered in the start counter T_START, and the minimum value is entered in the PWM duty ratio T_PWMBRK.

Upon completion of the setting operation, the LED of the PZ pulser 69 is turned on to prepare for the PZ pulse counting. If PZ pulse interruption is not enabled, it is enabled before proceeding to DRV-TRG8 (S2453 through S2457).

DRV-TRG8 OPERATION

Figure 83:
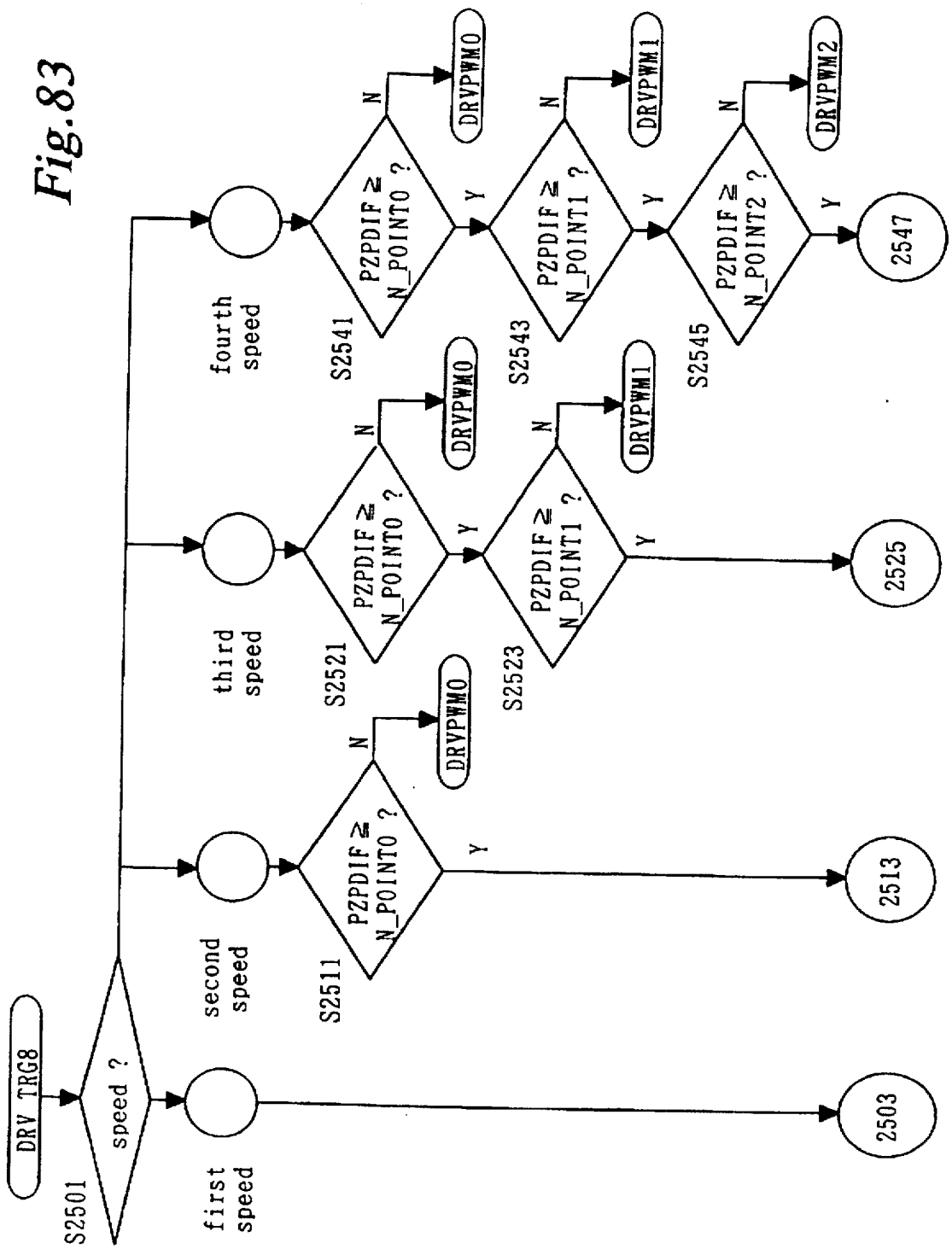
FIGS. 83 and 84 are a flow chart regarding an operation for adjusting drive speed in accordance with a pulse number, which corresponds to a target position.
Figure 84:
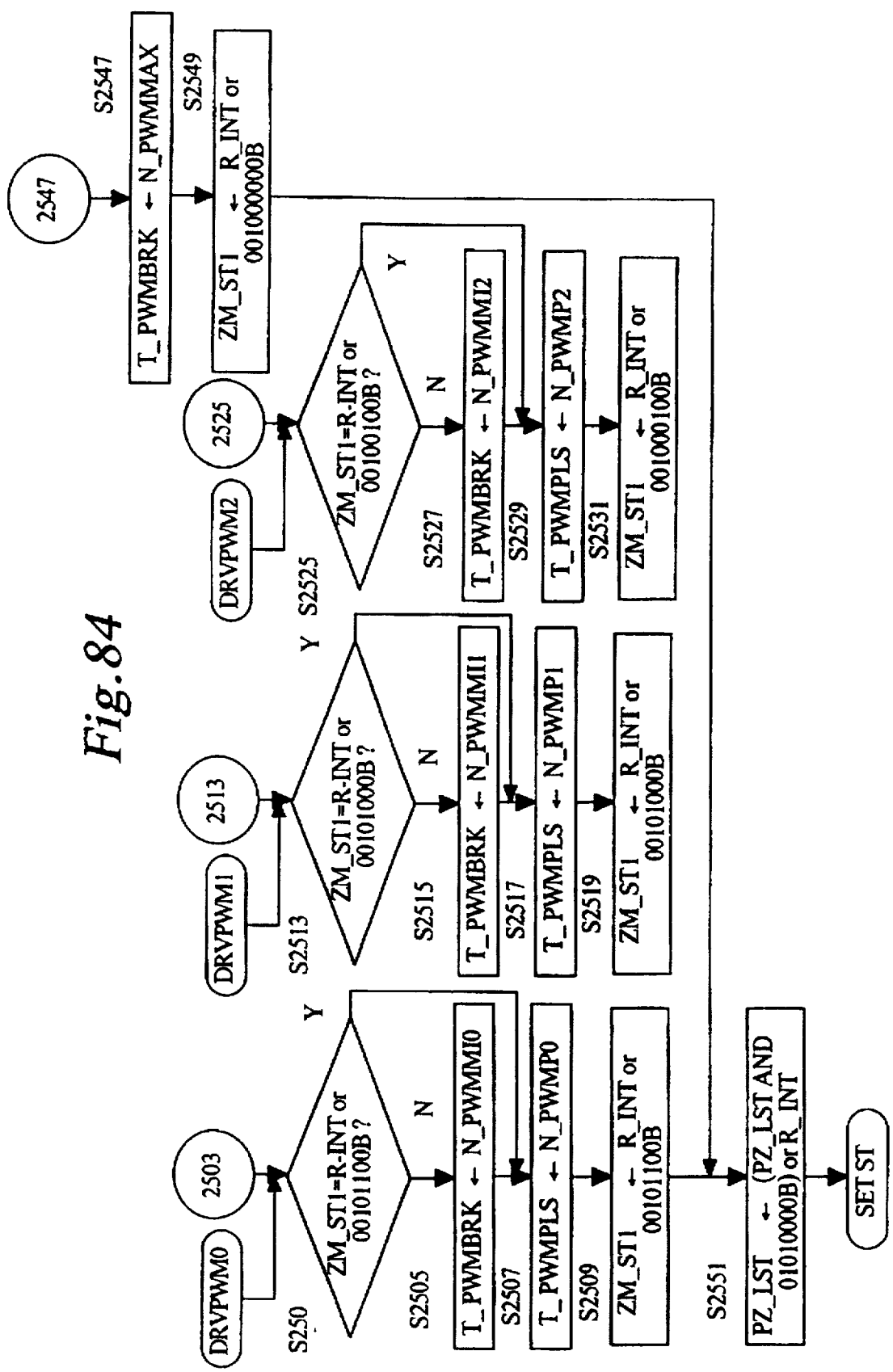
Figure 85:
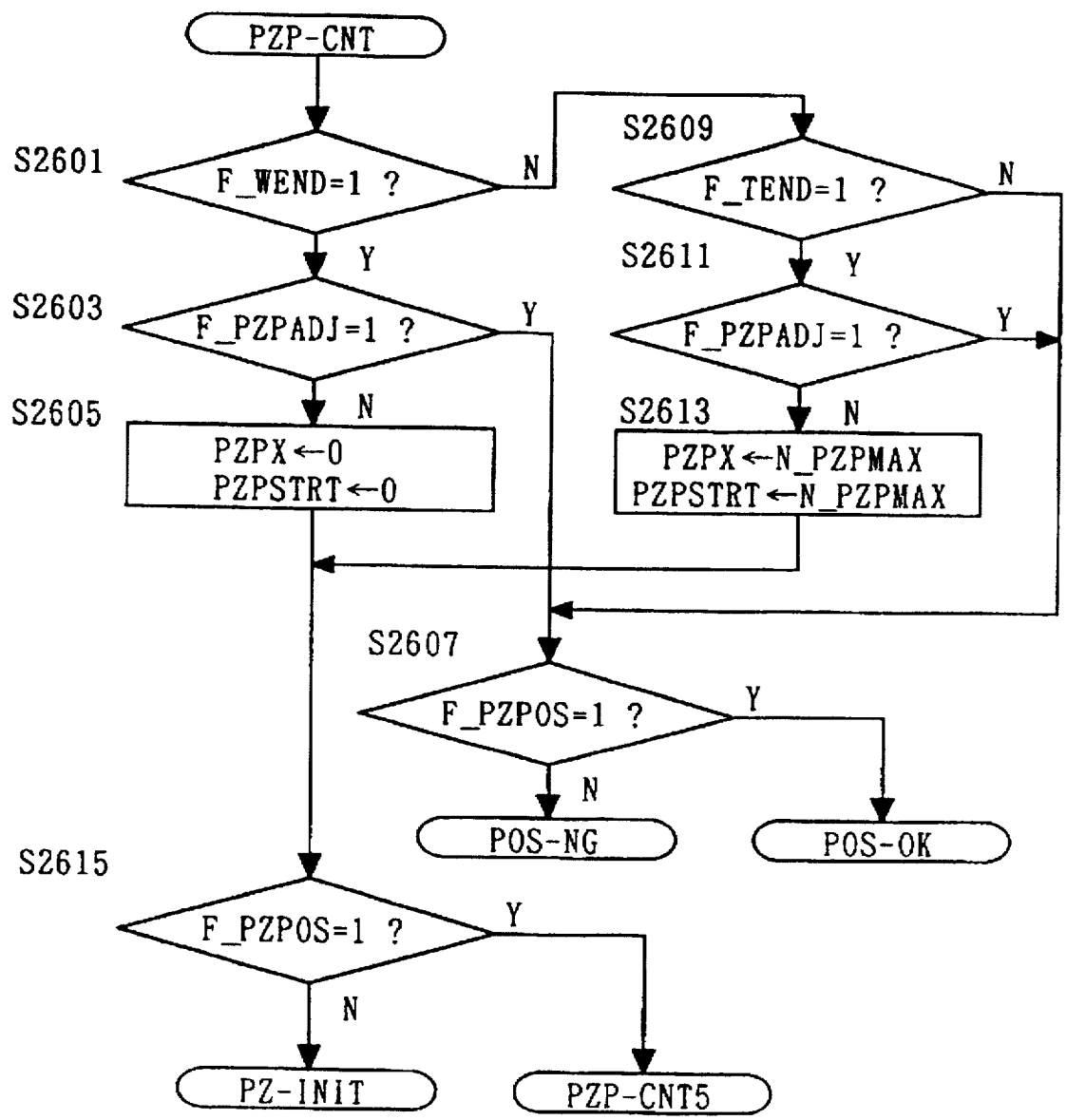
FIG. 85 is a flow chart regarding an operation for correction of PZ pulse count when a terminal point is achieved.

The DRV-TRG8 operation shown in FIGS. 83 and 84 is an operation to control the speed according to the number of the driving PZ pulses until the targeted focal distance is reached, and in which speeds are changed in several steps in accordance with the number of pulses to the targeted position (PZPDIF). In this preferred embodiment, when the number of driving pulses to the target is equal to or above that of the third pulse, driving is done at the fourth speed (DC driving), which is the maximum speed. When it is less than that of the third pulse, but equal to or above that of the second pulse, driving is done at the third speed. When it is less than that of the second pulse, but equal to or above that of the first pulse, the second speed is selected. When it is less than that of the first pulse, the first speed is selected. In this operation, the fourth speed is greater than the third, which is greater than the second, which is greater than the first. The number of the third pulses is greater than the second, which is greater than the first. Also in this preferred embodiment, four speeds can be selected. However, the number of speeds may be more or less than four, or a large number of steps for effecting an almost continuously variable speed.

The control proceeds to a speed selection operation in accordance with the set zoom speed (step S2501). Namely, when a first speed, a second speed, a third speed and a fourth speed are selected, the control proceeds to step S2503, S2511, S2521 and S2541, respectively. The selection of the speed is effected in accordance with the values of the bits 2 and 3 of SPDDRC2 (i.e., flags F_SPDA2 and F_SPDB2) indicating the speed at which the zooming is effected to obtain a target value of the focal length (i.e., when the flag F_MOVTRG is set). The speeds are set as follows, in accordance with a combination of a setting and clearing of the flags F_SPDA2 and F_SPDB2.

| F_SPDA2 | F_SPDB2 | |
|---------|---------|---|
| clear | clear | fourth speed |
| clear | set | third speed |
| set | clear | second speed |
| set | set | first speed |

The SPDDRC2 is used when the target position is set so that the zoom direction at the commencement of the drive of the zoom lens and the zoom speed which is automatically set by the main CPU 35 or the lens CPU 61 are stored in the SPDDRC2.

When the first speed is selected, whether or not there are any changes in the speed and its driving direction (the value of ZM-ST1) is tested. If there are changes, the standard value for the first speed N_PWMMI0 is set at the PWM brake timer (PWM duty ratio). If there are not any changes, nothing is done at this stage. Then the PZ pulse cycle N_PWMP0 of the first speed is set at T-PWMPLS, and the logical sum of R_INT and a predetermined data is stored in ZM-ST1 (i.e., setting of the speed and its direction (S2503 through S2509 represent the foregoing operations)). By means of the above operations, the slowest speed is selected. The logical sum of the PZ-LST data and a predetermined data is computed. Further logical sum of the above mentioned sum and the R_INT data is stored in the PZ-LST data, before the SET-ST operation is completed (S2551).

When the second speed is selected, whether or not the number of pulses to the target position is equal to or above that of the first pulses is tested. If it is smaller, the operation proceeds to DRVPWM0 (S2503 for the first speed). It is equal to or above, the operation proceeds to step S2513 in which whether there are any changes in speed or its direction (i.e., the value of ZM-ST1) is tested to control at the second speed. If there are any changes, the standard value of the second speed is set at PWM brake timer (PWM duty ratio). If there are no changes, an operation is not performed. The cycle N_PWMP1 of the PZ pulse for the second speed is then set at T-PWMPLS. The logical sum of the R_INT data and a predetermined data is stored in ZM-ST1 before proceeding to S2551 (S2503 through S2509 represents the foregoing operations wherein the second speed is selected).

When the third speed is selected, whether or not the number of pulses to the target position (PZPDIF) is less than that of the first pulses is tested. If it is smaller, the operation proceeds to step S2503 (DRVPWM0) for the first speed. If it is equal to or above the number of first pulses, and less than that of the second pulses, the operation proceeds to DRVPWM1 for the second speed operation (S2521 and S2523). If it is equal to or above the number of second pulses, the control is performed at the third speed. Whether or not there are any changes in speed and direction (i.e., the value of ZM-ST1) is tested. If there are any changes, the standard value, N_PWMMI2 of the third speed, is set at PWM brake timer (PWM duty ratio). If there are no changes, no operation is performed. The cycle N_PWMP2 of the PZ pulse for the third speed is then set at T-PWMPLS. The logical sum of the R_INT data and predetermined data is stored in ZM-ST1 before proceeding to step S2551. Steps S2523 through S2531 represent the foregoing operations, wherein the third speed is selected.

When the fourth speed is selected, whether or not the number of pulses to the target (PZPDIF) is equal to or above that of the first pulses is tested. If it is less than the number of first pulses, the operation proceeds to step S2503 (DRVPWM0) for the first speed processing. If it is equal to or above the number of the first pulses, and less than the number of the second pulses, the operation proceeds to DRVPW1 for the second speed processing. If it is equal to or above the number of the second pulses, and less than the number of the third pulses, the operation proceeds to DRVPWM2. If it is equal to or above the number of third pulses, the maximum value N_PWMMAX is set at the PWM brake timer (PWM duty ratio), and the logical sum of R_INT data and a predetermined data is set at ZM-ST1, before proceeding to step S2551. Steps S2547 and S2549 represent the foregoing operations. The fourth speed (DC drive) is selected.

PZP-CNT OPERATION

PZP-CNT flow charts shown in FIGS. 85 through 89 are for operations regarding the PZ pulse count. These are the details of step S335 in the interruption routine for a 2 ms timer in FIG. 10.

To calibrate the PZ pulse (i.e., when F_PZPADJ=0) when the zoom lens group 53Z is at the wide-angle end, the present PZ pulse value and the PZ pulse count starting value are reset to zero. Then, if the flag F_PZPOS, which shows whether or not the present position is known, has been set, the operation proceeds to PZP-CNT5. If the present position flag has been cleared, the operation proceeds to the initializing operation (PZ-INIT) of the power zoom (S2601 through S2605 and S2615 represent the foregoing operations). When calibration is not carried out, if the present position is known (i.e., when F_PZPOS=1), the operation proceeds to the present position OK operation (POS-OK). If the present position is unknown (F_PZPOS=0), the operation proceeds to the present position unknown operation (POS-NG (S2603 and S2607 represent the foregoing operations)).

Likewise, to calibrate the PZ pulse when the zoom lens is at the telephoto end, the present PZ pulse value and the PZ pulse count starting value are set to the maximum (N_PZPMAX). If the flag that shows the present position as being known has been set, the operation proceeds to the PZP-CNT5. If the flag has been cleared, the operation proceeds to the PZ initializing operation (PZ-INT (S2609, S2611, S2613, and S2615 represent the foregoing operations)). When no calibration is needed, if the present position is known (i.e., when the flag is on), the operation proceeds to the present position OK operation (POS-OK), but if the present position is not known, the operation proceeds to the present position unknown (POS-NG) operation (S2611 and S2607). As explained above, when the zoom lens group 53Z is at the wide-angle end (F_WEND=1), or at the telephoto end (F_TEND=1), the PZ pulse is calibrated with a predetermined value. F_PZPADJ is a flag for testing, and when F_PZPADJ1, calibration is not performed.

When the lens is neither at the telephoto end nor at the wide-angle end, if the present position is known, the operation proceeds to the present position OK operation (POS-OK), but if the present position is unknown, the operation proceeds to the present position unknown operation (POS-NG (S2601, S2611 and S2607 represent the foregoing operations)).

POS-NG AND PZ-INIT OPERATIONS

Figure 86:
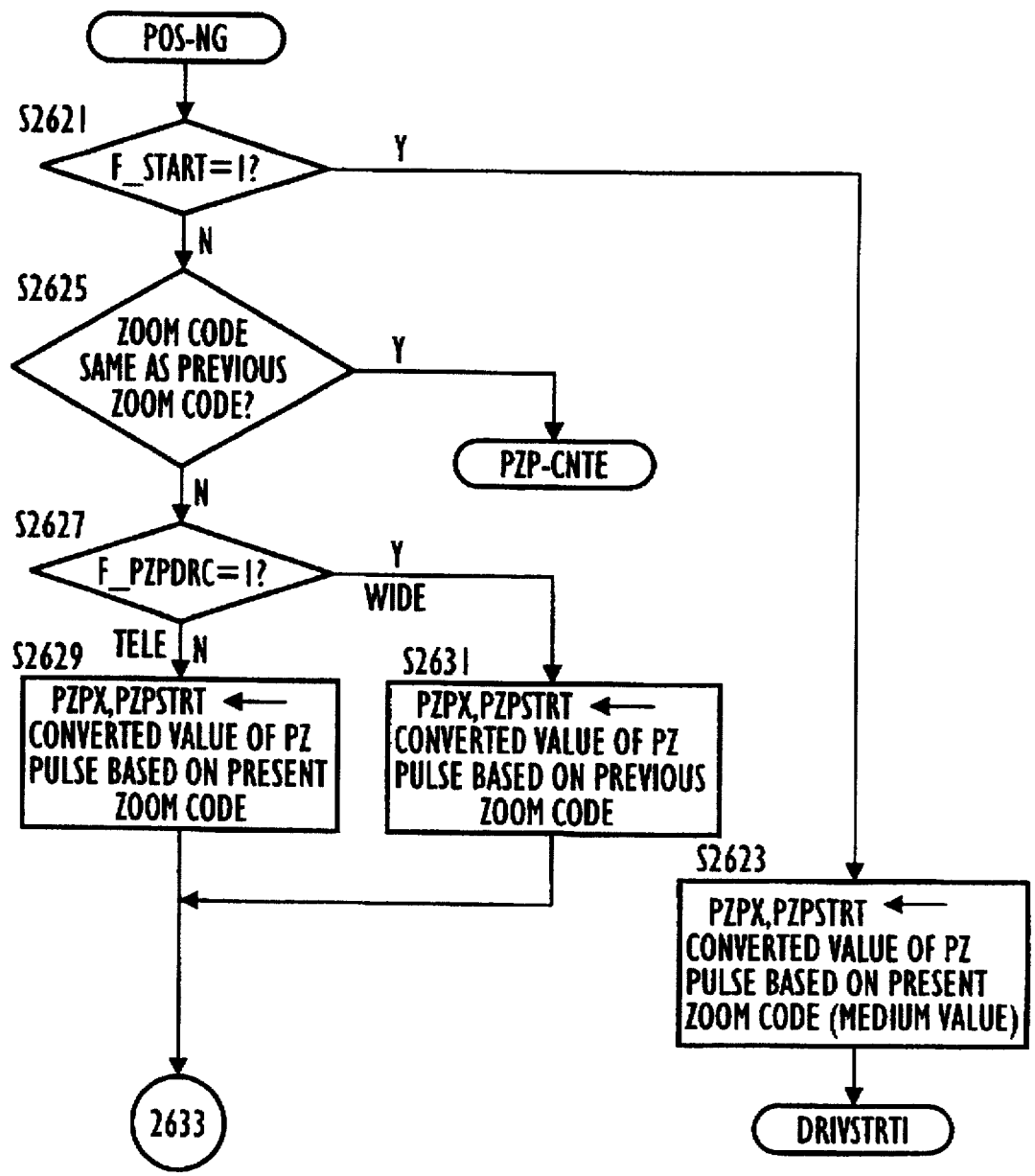
FIG. 86 is a flow chart regarding an operation for correcting the PZ pulse count when an actual or a present position of the zooming lens is unknown.
Figure 87:
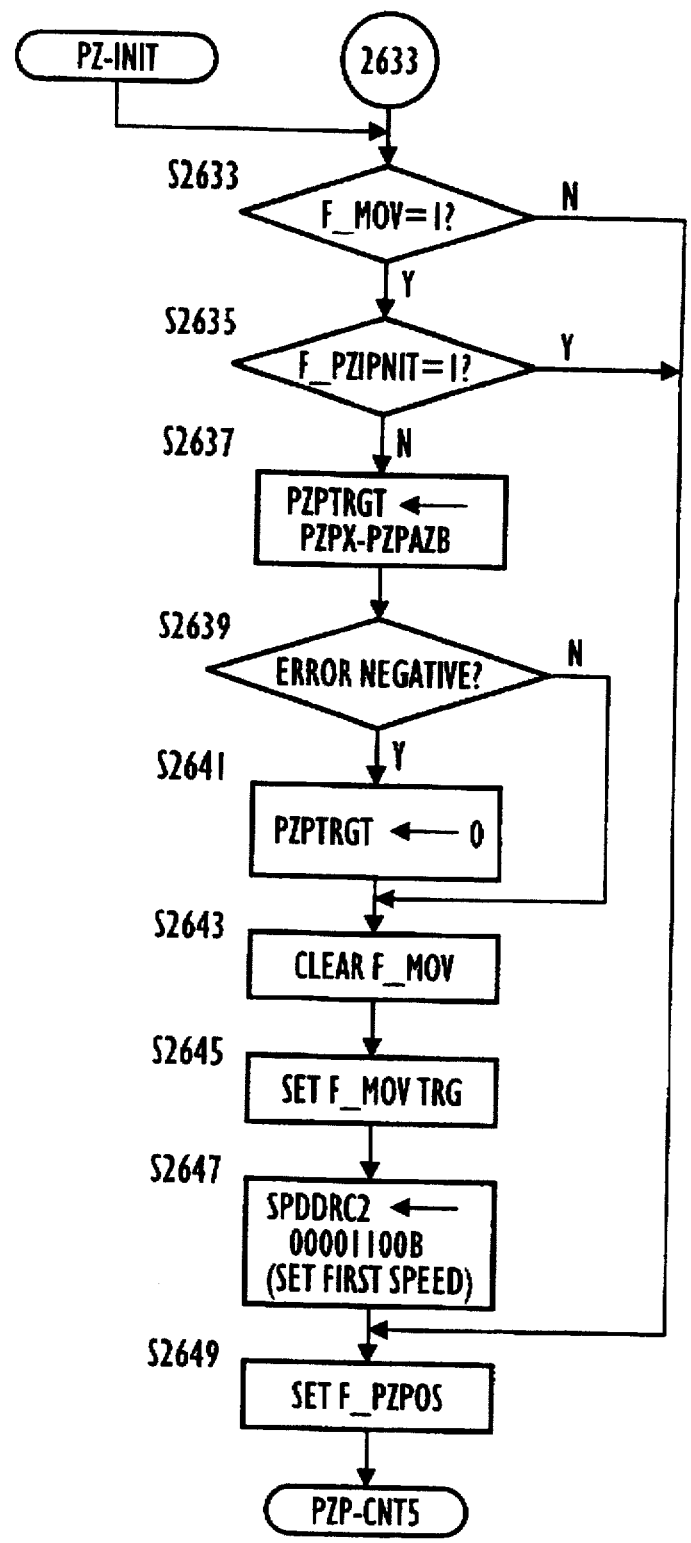
FIG. 87 is a flow chart regarding an operation for correcting the PZ pulse counter when actual or present position of the zooming lens is unknown.

POS-NG and PZ-INIT, shown in FIGS. 86 and 87, are operations effective when the present position is unknown, or when the telephoto end or wide-angle end has been reached.

The POS-NG and PZ-INIT operations are executed when the present position of the zoom lens is unknown. Usually, if the present position is not known, the POS-NG and PZ-INIT operations are also executed when the initializing command PZ-INITPOS (32) is transmitted from the camera body when the main switch in the camera body is turned on, or when the zooming operation is switched from manual to power.

In the present case, when the PZ-INITPOS command is transmitted, the zoom lens group 53Z is moved toward the telephoto end at the slowest speed. The present position of the zoom lens group can be detected by storing the number of absolute PZ pulses in a certain address (PZPX and PZPSTRT) at the position where the first divisional point 72 of the zoom code plate 71 or the telephoto end is detected. Furthermore, the zoom lens group 53Z is returned to its original position after detecting the present position. This can be done by the following procedures. When the PZ_INITPOS command is transmitted, a counter (PZPAZB) is cleared (making it zero), the first divisional point on the zoom code plate or the PZ pulse to the telephoto end is counted, and the zoom lens is returned from that position (i.e., when the present position is detected) to the position with which the count corresponds. This returning operation of the zoom lens is performed in the PZ-INIT operation (especially in S2637 through S2649).

The operation of the zoom lens at the slowest speed is executed by the PZ-INITPOS command through communication.

In the present case, the lens is driven toward the telephoto end in a uniform manner to detect the present position. However, this may be toward the wide-angle end, or either direction may be selected, based on other conditions.

Furthermore, in this present case, when the present position is unknown, it can be detected automatically (i.e., the present position can be known), even if the PZ_INITPOS command is not transmitted from the camera body 51 at the time the lens has reached at a divisional point on the zoom code plate or a terminal point (i.e., far side and/or near side) when the manual power zoom is operated.

When the operation enters the POS-NG operation, if the start flag F_START has been set (i.e., at the time the zoom motor is activated), the PZ pulse conversion value (i.e., roughly detected PZ pulse value) on the zoom code plate 71, which is read-in for the operation, is set at the present position and the start pulse counter. The operation proceeds to the zoom driving operation (DRIVSTART1 (S2621 and S2623 represent the foregoing operations)).

The following operation is performed when the start flag F_START is set OFF. When the zoom code is the same as the previous one, the switching point has not been reached. The execution then exits the PZP-CNT operation (S2623 and S2625). When the zoom code has been changed (i.e., when at the divisional point on the code plate), the PZ pulse conversion value of the zoom code, which is entered for the present operation, is entered as the present PZ pulse value (PZPX) and PZ pulse count starting value (PZPSTRT), if the driving is toward the telephoto side (F_PZPDRC=0). If the driving is toward the wide-angle side (F_PZPDRC=1), the PZ pulse conversion value of the zoom code that was entered previously, is entered as the PZ pulse value (PZPX) and the PZ pulse count starting value (PZPSTRT (S2627 through S2631 represent the foregoing operations)).

When the move flag (F_MOV) has been cleared (i.e., when the PZ_INITPOS command has not been transmitted), or when flag F_PZPINIT has been set, the flag F_PZPOS, which indicates recognition of the present position, is set when flag F_PZPINIT has been set before proceeding to the pulse count (PZP-CNT5) operation (S2633, S2635 and S2649).

When the move flag F_MOV has been set (i.e., the PZ-INITPOS command has been transmitted), and when the present position flag F_PZPINIT has been turned OFF, the targeted PZ pulse (PZPTRGT) is the present PZ pulse value PZPX (i.e., the code plate border value) subtracted by the PZ pulse count value (PZPAZB) from the original position before the PZ initializing to the border position on the code plate (S2633, S2635 and S2637). The F_PZPINIT is a flag for disabling the initializing operation of PZ, and is used for testing. When F_PZPINIT=1, the operation is disabled.

A borrow in the above subtraction is indicative of an error in the counting process. In such a case, the targeted number of PZ pulses is set to zero to clear the drive flag F_MOV. If there is no borrow, the move flag is cleared without any other processing (S2639 and S2641). Then, the move flag for the target value (F_MOVTRG) is set ON, the PZ speed is set to the first speed (the slowest speed), and the present position flag is set ON, after which the operation proceeds to the PZP-CNT5 operation (S2643 through S2649).

When the operation starts at the PZ-INIT operation, S2633 is the starting set.

POS-OK AND DRVSTRT1 OPERATIONS

Figure 88:
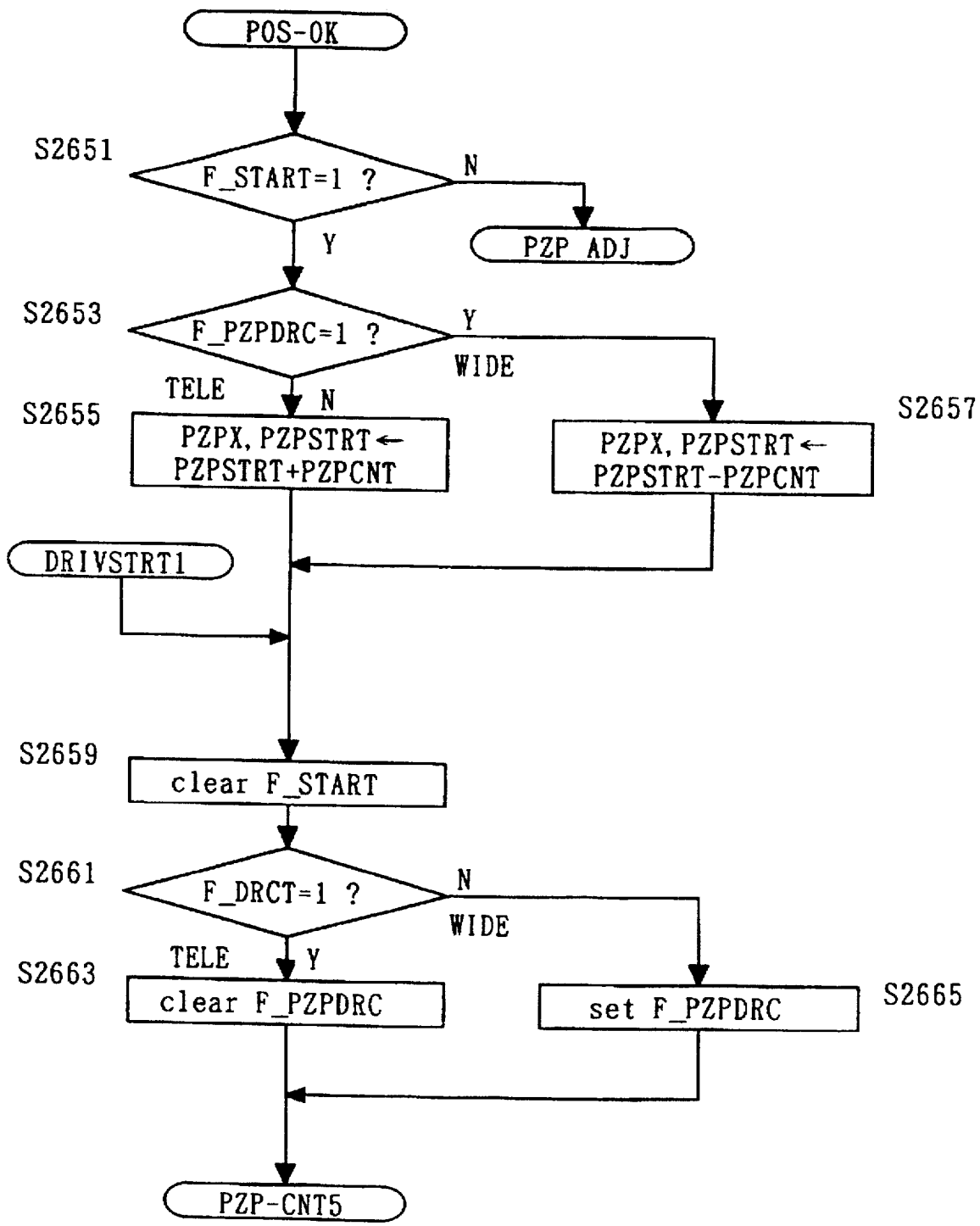
FIG. 88 is a flow chart regarding an operation of the PZ pulse count when actual or present position of the zooming lens is known.

The POS-OK operation shown in FIG. 88 is the PZ pulse counting operation in which the present position is known.

When the operation has started already (i.e., the start flag has been cleared), the operation proceeds to the PZ pulse calibrating operation (PZP-ADJ operation). When the operation is about to start, if the driving operation is effected in the telephoto direction (F_PZPDRC=0), the sum of the PZ pulse count starting value (PZPSTRT) and the PZ pulse count value (PZPCNT) is entered into the PZ pulse count starting value (PZPSTRT) and into the present PZ pulse count value (PZPX). If the driving operation is effected in the wide-angle direction (F_PZPDRC=1), the PZ pulse count starting value (PZPSTRT) is subtracted by the PZ pulse count value (PZPCNT) and entered into the PZ pulse count starting value (PZPSTRT) and into the present PZ pulse count value (PZPX (S2651 through S2657 represent the foregoing operations)).

The start flag F_START is then cleared, and the power zooming direction flag F_PZPDRC is cleared (i.e., the telephoto direction is selected) when the driving operation is effected in the telephoto direction (i.e., the direction toward which the lens is going to move this time). If the movement is effected in the wide-angle direction (i.e., the current direction toward which the lens is going), the power zooming direction flag F_PZPDRC is set (i.e., the wide-angle direction is selected (S2659 through S2665 represent the foregoing operations)).

When the operation begins from DRIVSTART1, step S2659 is the first step. The start flag is cleared, and the driving direction is set in steps S2659 through S2665.

THE PZP-ADJ AND PZP-CNT5 OPERATIONS

Figure 89:
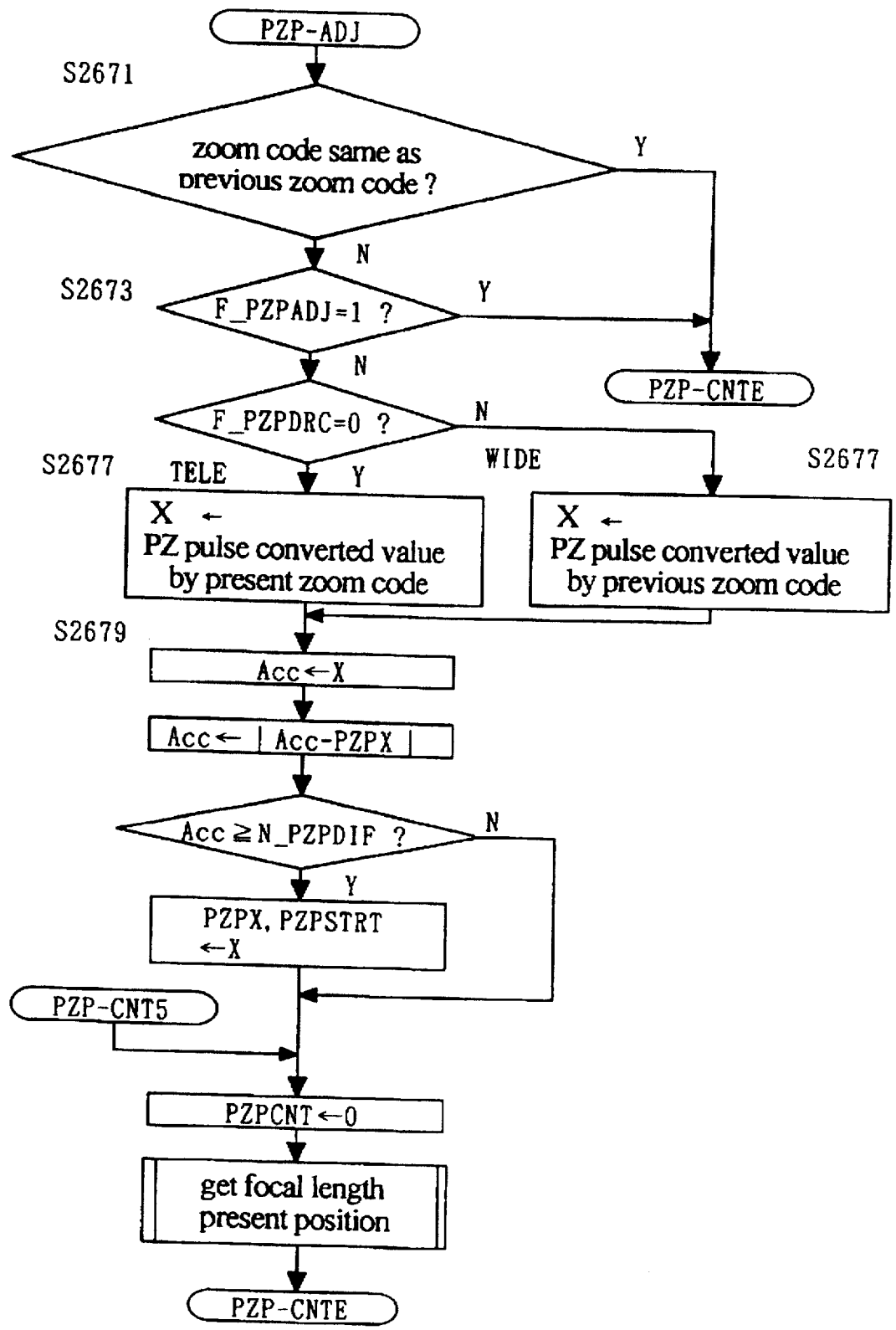
FIG. 89 is a flow chart regarding an operation for correcting the PZ pulse count.

The PZP-ADJ operation, shown in FIG. 89, is for calibrating calculation errors of the PZ pulse count.

The zoom code is first checked to see if it is the same as the previous code. If it is the same, the flow exits the PZP-ADJ operation because calibration is impossible. If it is different, the calibration operation continues, provided that the PZP calibration disabling flag F_PZPADJ has been cleared, i.e. waits until it exceeds the divisional region (border) of the code plate 71. In this operation, the PZP calibration disabling flag F_PZPADJ is for testing, and is usually cleared.

If the direction of the power zooming operation is toward the telephoto direction, the present pulse conversion value of the zoom code is stored in register X. If the direction is toward the wide-angle direction, the previous pulse conversion value of the zoom code is stored in register X, and the value in register X is stored in the accumulator to check if the absolute value of the difference between this value and the PZ pulse value is within the calibration limit (S2679 through S2683). If it exceeds the calibration limit, the value of register X is stored in the present PZ pulse value and in the PZ pulse count starting value to perform calibration. If it is within the calibration limit, no calibration is performed. The PZ pulse count value (PZPCNT) is cleared, and the number of the PZ pulses at the present focal distance is converted to the present focal distance (mm) based on table data, and it is then stored in FCLXL and H, after which the execution quits the PZP-CNT operation (S2685 through S2689 represent the foregoing operations)).

When the operation starts from PZP-CNT5, step S2687 is the first step in which the PZ pulse count value is cleared, the number of pulses of the present focal distance is converted to the present focal distance (mm), and then stored, after which the execution quits the PZP-CNTE operation (S2685 through S2689).

When there is an instruction to execute a PZ pulse initializing operation by the above mentioned PZ-INITPOS command from the body (i.e., when the body main power is turned on), the zooming operation is performed toward the telephoto side. The present position PZ pulse value (PZPX) and the start position (PZPSTRT) can be selected by detecting the absolute position from the border position of the divisional region when it exceeds the divisional region of the code plate 71. Furthermore, the original position can also be returned to after the present position has been detected.

While zooming, every time the border of the code plate 71 is exceeded, the absolute number of pulses at the border part is read-in from the table and compared with the count value. If the difference is greater than a predetermined value, calibration (alteration) is effected.

ISZMEMO OPERATION

Figure 90:
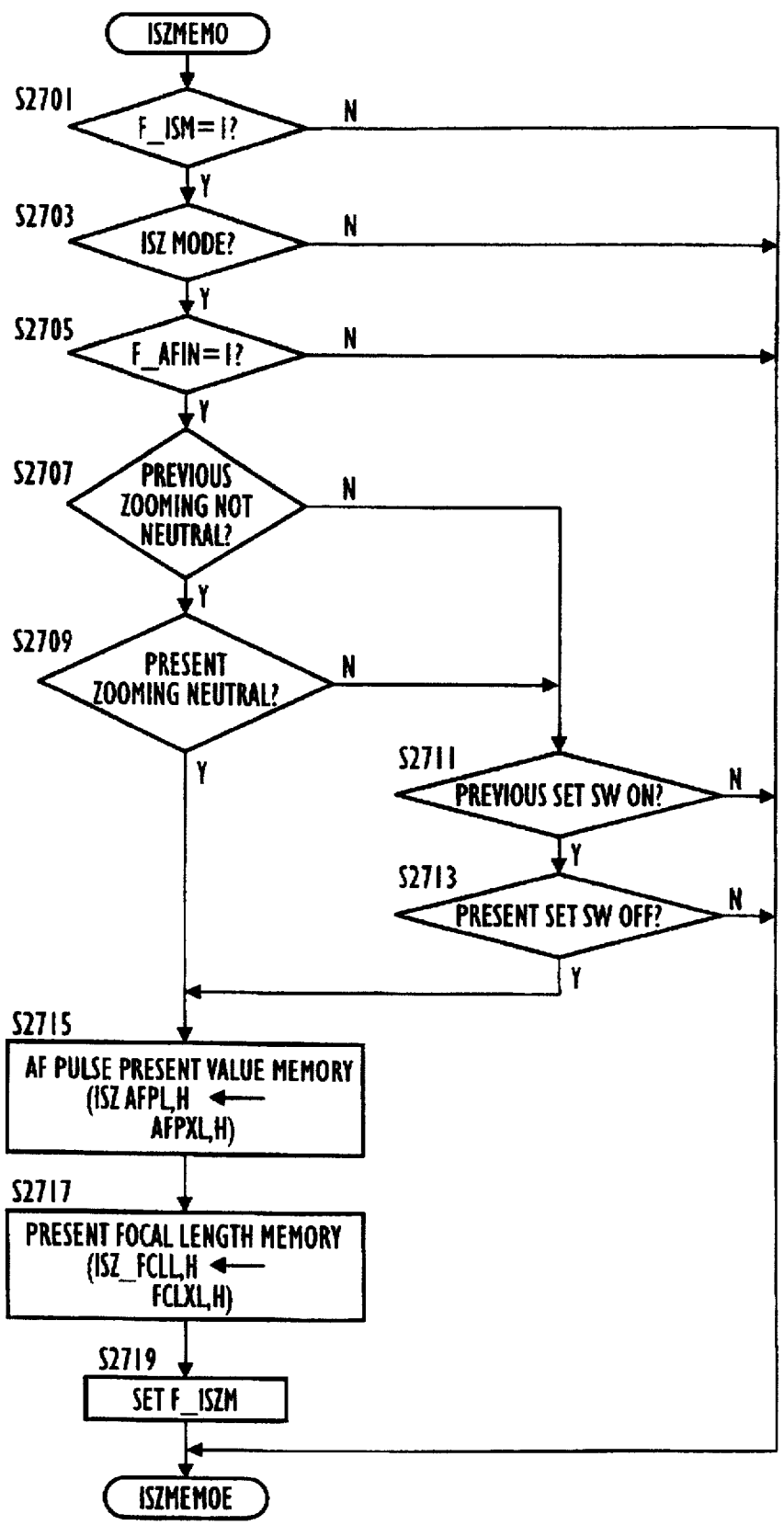
FIG. 90 is a flow chart regarding an operation for presetting a focal length.

The flow chart ISZMEMO shown in FIG. 90 is an operation for storing image magnification values. In other words, it is an operation whereby, the present AF pulse value (AFPX) and the present focal length (FCLXL and H) are stored by effecting the zoom speed changing switch 75 or the set switch (SL switch, SW) when in the constant image magnification zooming mode. This operation is the detail of S359 in the interrupting routine for a 2 ms timer shown in FIG. 10.

In the present case, the AF pulse value and the focal distance are stored at the time when the zoom ring is returned to the neutral position, provided an in-focus condition exists, or when the set switch is turned off, even if the zoom lens is not at the neutral position.

In the ISZMEMO operation, the image magnification lens memory flag F_ISM is set, and the constant image magnification mode is selected. The operation then proceeds to storing operations of step S2707 and beyond, provided that the in-focus flag F_AFIN has been set (S2701 through S2705). The image magnification lens memory flag F_ISM is transmitted from the body by command PZ-BSTATE(20) and is stored in PZ-BDST. The flag F_ISM is adapted to determine whether the memorization of the image magnification should be effected in accordance with the ISZ-MEMORY command from the camera body side or the judgement on the lens side.

The image magnification memory flag F_ISM is usually transmitted after being cleared. Storing of the image magnification memory for the present AF pulse value and the present focal distance is not performed by the lens alone, but is performed when the command ISZ-MEMORY(36) is transmitted from the body. Furthermore, the transmission of the command ISZ-MEMORY(36) takes place when the zoom speed switch 75 has returned to the neutral position or when the set switch SL is turned off after the body checks Bit 2 (SLSW) of the periodical communication POFF-STATE (11) and Bits 0 and 1 (PTSW and PWSW) of LENS-INF1 (13) to determine whether the set switch SL (SL switch) and the zoom speed switch 75 are turned on or off.

As explained above, when the flag F_ISM is set and transmitted, the image magnification is stored by the lens after determining whether the set switch SL and zoom speed switch 75 are on or off, not by the command ISZ-MEMORY from the body.

When the zoom switch 75 has just been returned to the neutral position, after being in some position other than the neutral position, or when the set switch, which was previously ON, has just been turned OFF, the present value of the AF pulse is stored at the address ISZ-AFPL and H. The present focal distance is then stored at the address ISZ-FCLL and H, and the image magnification calculation instruction flag F_ISM is set before the ISZMEMO operation is terminated (S2707 through S2719).

In other words, the image magnification is stored in the memory at the time when the zoom switch 75 has returned from the telephoto or wide-angle side to the neutral position, provided that an in-focus condition exists and the flag F_ISM has been set, or when the set switch is turned off.

MTR-CTL Operation

Figure 91:
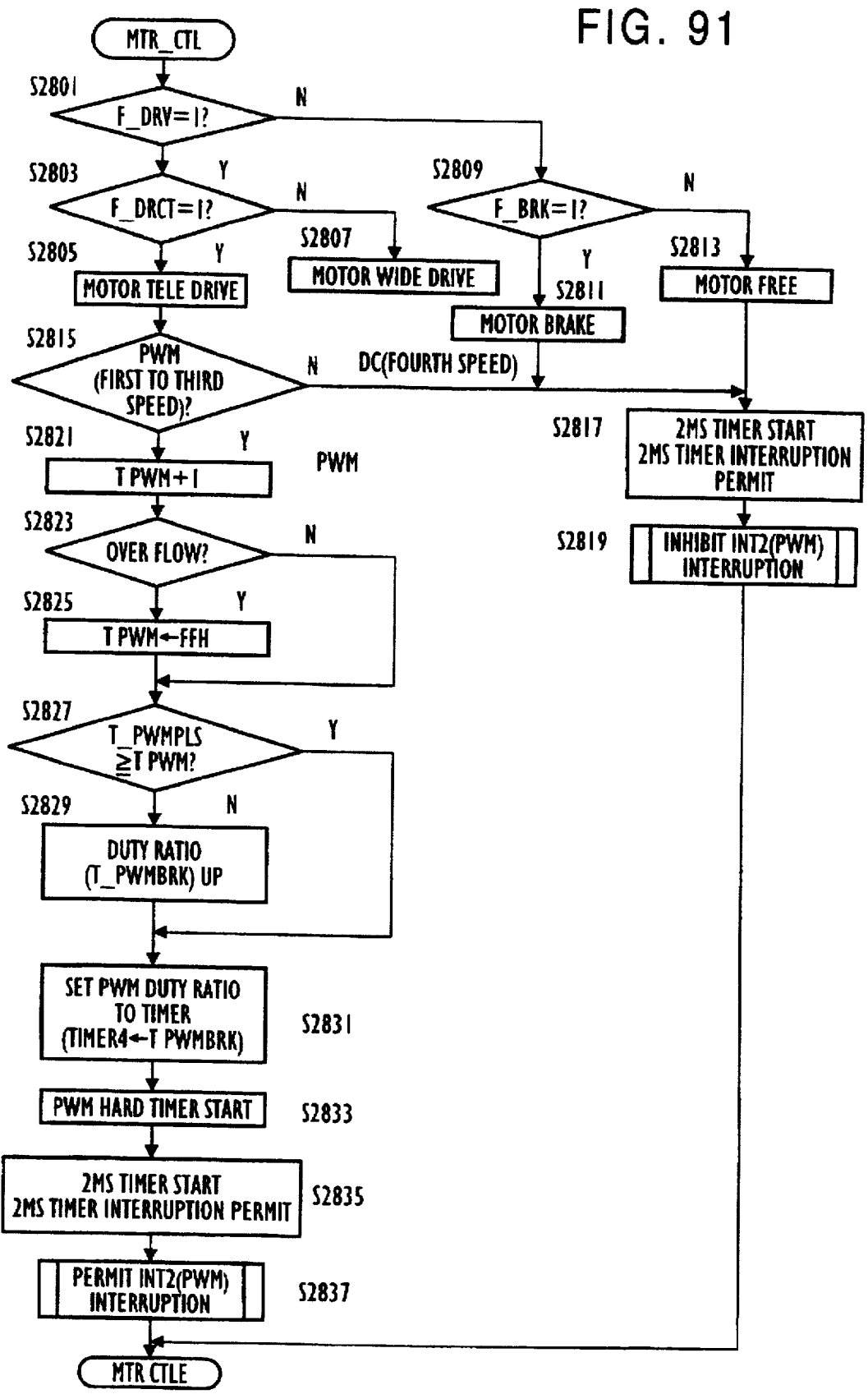
FIG. 91 is a flow chart regarding drive control for the zoom motor.

The MTR-CTL flow chart, shown in FIG. 91, is an operation that controls the driving operation of the zoom motor 65 corresponding to the zoom motor control flags (i.e., each flag of ZM-ST1) which have been set by the SET-ST operation. This operation is the detail of S363 in the interruption routine for the 2-ms timer shown in FIG. 10.

When the drive flag F_DRV has been cleared and when the brake flag F_BRK has been set, brake is applied to the zoom motor 65. When the brake flag F_BRK has been cleared, a 2-ms timer is started after the zoom motor 65 is released. Then, the interruption for the 2 ms timer is enabled, and the PWM interruption is disabled before completing the operation (S2801, S2809 through S2813, S2817 and S2819 represent the foregoing operations).

When the drive flag F_DRV has been set, and if it is set for telephoto, the zoom motor 65 drives the lens toward the telephoto end. If it is set for wide-angle, the zoom motor 65 drives the lens toward the wide-angle end (S2801 through S2807).

When the motor is actuated at the fourth speed (DC drive), the 2 ms timer is started, the 2 ms timer interruption is enabled, and the PWM interruption is disabled, before completing the operation (S2815, S2817 and S2819).

When the motor is driven at the first through fourth speeds, the PWM hard timer is incremented by 1. When the incremental value overflows, the maximum value (FFH) is assigned to the PWM hard timer. If overflow has not occurred, the incremental value is maintained (S2815, S2821 through S2825).

Next, whether or not the PWM hard timer value (T_PWM) has exceeded the PWM's PZ pulse cycle (T_PWMPLS) is determined (i.e., whether the PZ pulse is transmitted within the PZ pulse cycle time of PWM). If exceeded, the duty ratio (T_PWMBRK) is increased because the pulse has not been transmitted within the cycle time. If not exceeded, the duty ratio (T_PWMBRK) is set as it is in the hard timer for PWM control, and the hard timer for PWM control is started (S2827 through S2833). Then, the 2 ms timer is started, interruption for the 2 ms timer is enabled, and PWM interruption is enabled before the operation is completed (S2835 and S2837).

Release Operation

Figure 92A:
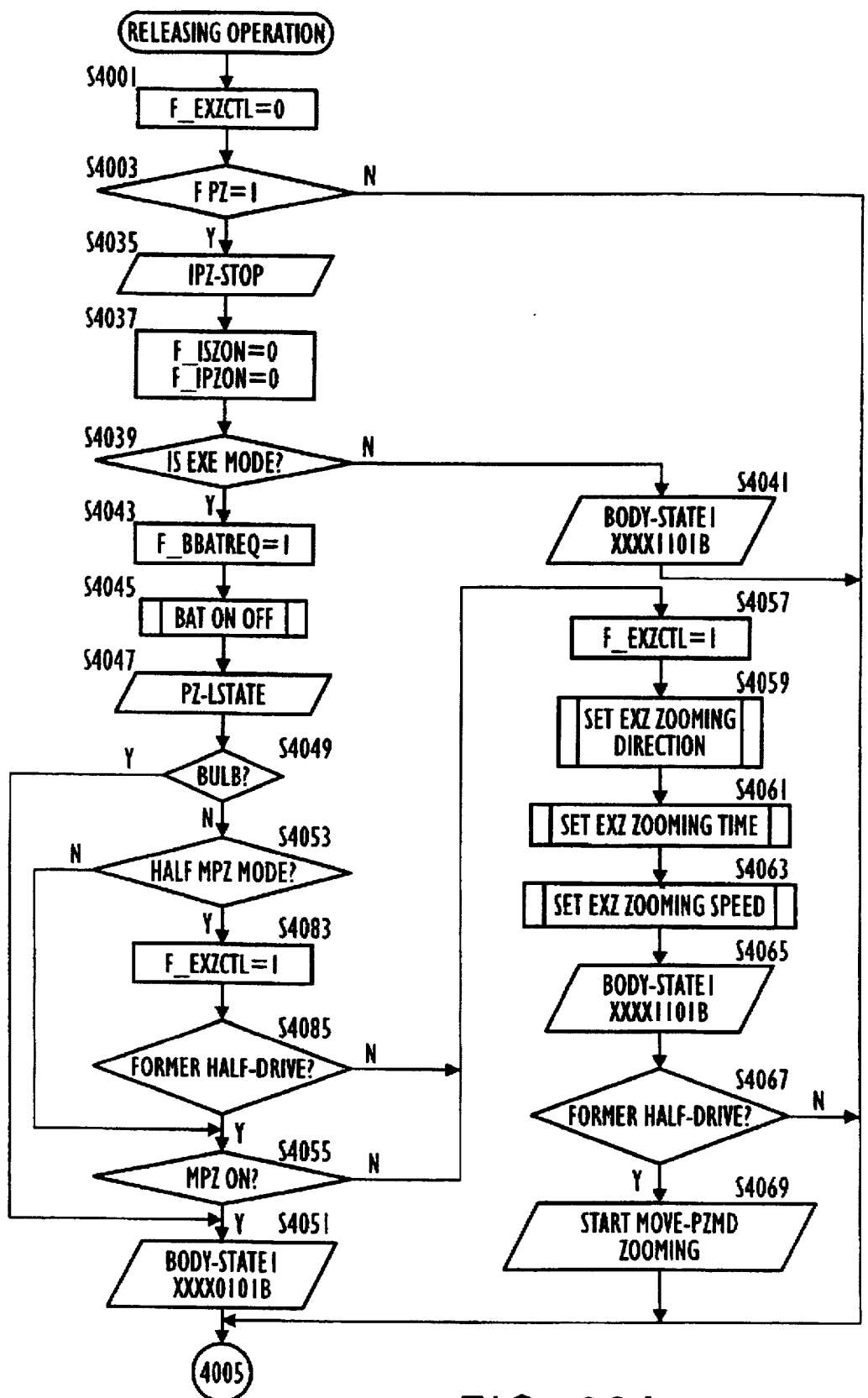
FIG. 92A, 92B, and 92C is a flow chart regarding a release operation on the camera body side.
Figure 92B:
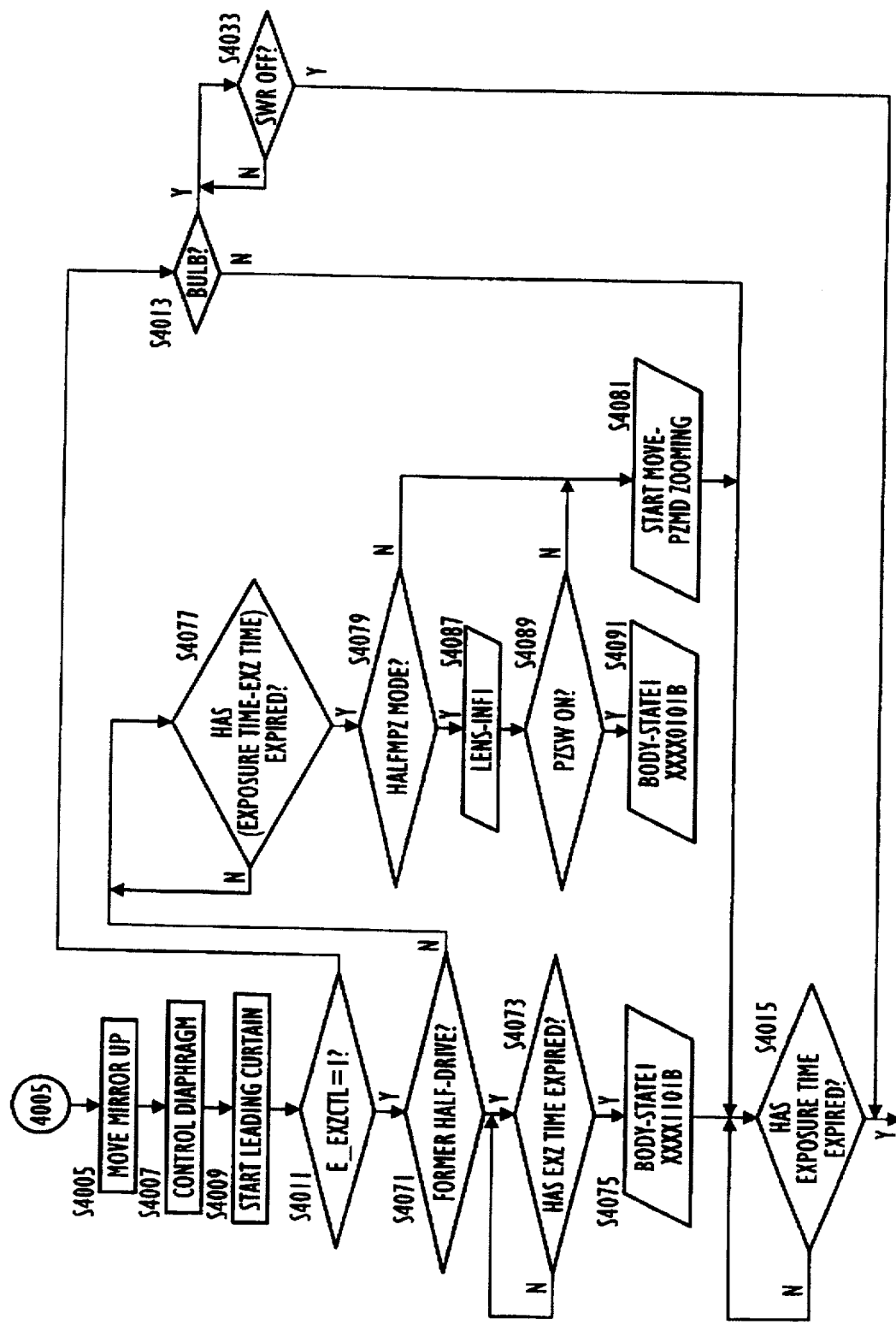
Figure 92C:
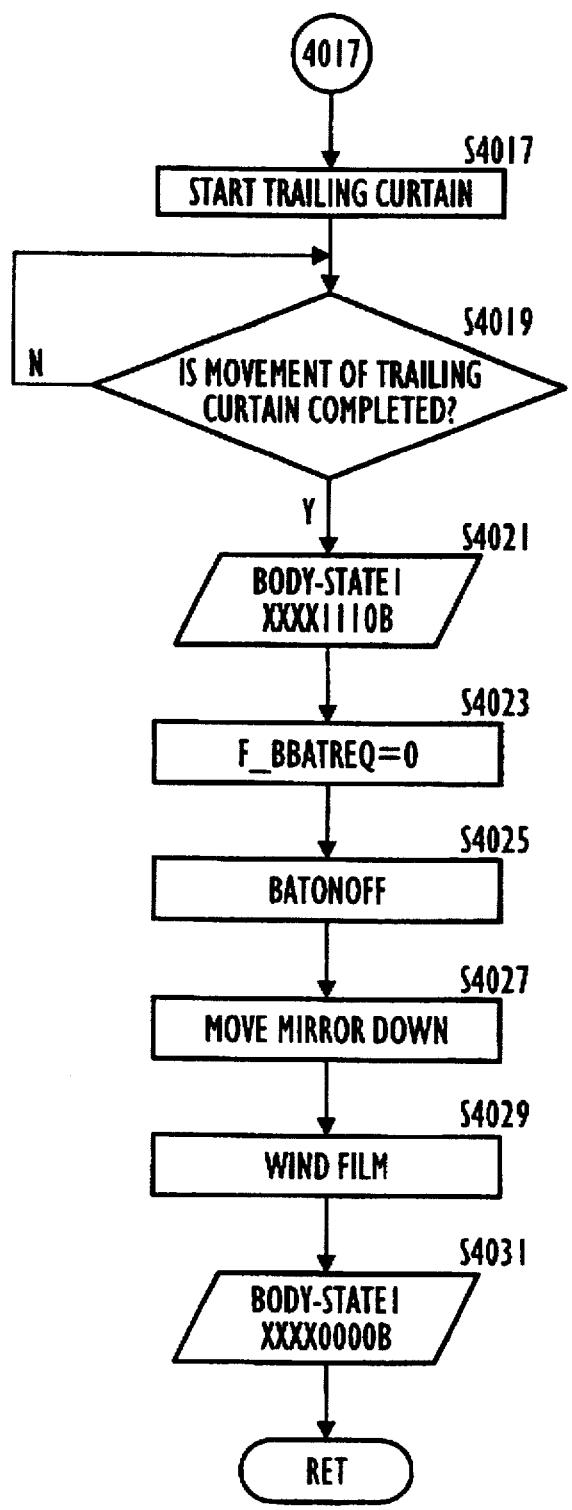

The following discussion will be directed to the release operation (step S1179 in FIG. 55) in the camera body 11 with reference to FIGS. 92A through 92C. The release operation is carried out by the main CPU 35 on the camera body when the release switch SWR is made ON at step S1176 and when it is judged that the releasing can be effected at step S1178.

When the release control operation is commenced, an in-exposure zoom control flag F_EXZCTL, which indicates the control of the zoom during the exposure is cleared at step S4001. The "in-exposure zoom" refers to a zooming operation effected during exposure for at least a part of the exposure time. It is a photographing technique which forms a picture having streaks extending radially and in which the image is partially extended or contracted. At step S4003, whether or not the power zoom lens 51 is mounted (i.e., whether the power zoom flag F_PZ is set) is checked. If no power zoom lens 51 is mounted (F_PZ=0), that is, if a manually driven zoom lens is mounted, no in-exposure zooming can be automatically carried out on the camera body side. Consequently, a regular release operation is carried out without effecting the in-exposure zooming.

Namely, the operations at steps S4005, S4007 and S4009 are successively effected to move the mirror upwards, control the diaphragm and move the leading curtain of the shutter, respectively. Thereafter, whether or not the in-exposure zoom control flag F_EXZCTL is set is checked at step S4011. When no power zoom lens 51 is mounted to the camera body at step S4003, the in-exposure zoom control flag F_EXZCTL is not set. Consequently, the in-exposure zoom control flag F_EXZCTL is 0 at step S4011, since it has been cleared at step S4001.

If F_EXZCTL=0 at step S4011, whether or not the shutter is in the bulb state is checked at step S4013. If the shutter is not in the bulb state, the control proceeds to step S4015 to check whether or not the predetermined exposure time has lapsed. After the lapse of the predetermined exposure time, the trailing curtain begins moving at step S4017. If the movement of the trailing curtain is completed at step S4019, the BODY-STATE1 communication is effected at step S4021. At the same time, the command to prohibit the manual power zooming and stop the in-exposure zoom is sent to the power zoom lens 51 so that the power supply from the battery is stopped. Namely, the battery request flag F_BBATREQ on the body side is cleared at step S4023, and the BATONOFF operation is carried out at step S4025.

Thereafter, the mirror motor 33 is driven to move the mirror downward at step S4027, and the film winding motor 25 is driven to wind the film at step S4029. Thereafter, the BODY-STATE1 communication is carried out again at step S4031. Data representing an absence of the release operation, an absence of the film winding operation, the permission of the IPZ operation (i.e., auto zoom operation other than the manual power zoom), and the permission of the manual power zoom operation is sent to the power zoom lens 51. Thereafter, the control is returned to the main routine shown in FIG. 52.

If the shutter is in the bulb state at step S4013, the control proceeds to step S4017 after the release switch SWR is made OFF at step S4033 to move the trailing curtain of the shutter and effect the subsequent operations.

If the power zoom lens 51 is mounted at step S4003, the IPZ-STOP command is sent to the lens 51 to prohibit the clip zoom operation and the constant magnification zoom operation before the release operation is commenced at step S4035. Thereafter, the flags F_ISZON and F_IPZON which indicate the constant magnification zoom operation and the preset zoom operation are cleared at step S4037. Thereafter, whether or not the in-exposure zoom (EXZ) mode is set is checked at step S4039. If no in-exposure zoom mode is set at step S4039, the BODY-STATE1 communication is carried out at step S4041. Accordingly, data representing the release operation, no film winding operation, the prohibition of the IPZ operation and the prohibition of the manual power zoom operation are sent to the power zoom lens 51. Thereafter, the control proceeds to step S4005 to move the mirror upward. In particular, since the in-exposure zoom control flag F_EXZCTL is cleared at step S4011, the regular release operation is carried out.

If the in-exposure zoom mode is set at step S4039, the battery request flag F_BBATREQ is set at step S4043 and the BATONOFF operation is carried out at step S4045 to supply the zoom motor 65 of the power zoom lens 51 with power. Thereafter, the PZ-LSTATE data communication is carried out at step S4047 so that the data indicating whether the manual power zoom is made ON or OFF is obtained from the power zoom lens 51.

Whether or not the shutter is set to be in the bulb state is checked at step S4049. If the shutter is in the bulb state, the BODY-STATE1 communication is carried out at step S4051 so that the data on the release operation, no film winding operation, the prohibition of the IPZ operation and the prohibition of the manual power zooming operation are sent to the power zoom lens 51. Thereafter, the control proceeds to step S4005 to move the mirror upward.

Namely, when the bulb is set, the exposure time can be optionally set by a photographer even if the in-exposure zoom operation is set. Consequently, since no information on the exposure time can be sent to the camera body side, it is impossible to define the time at which the automatic power zooming should be commenced after the start of the movement of the leading curtain, or how long the automatic power zooming should continue. Accordingly, the in-exposure zoom is usually prohibited. However, in the illustrated embodiment, the manual power zoom operation is permitted at step S4051 so that the photographer can optionally perform the zoom operation to effect the in-exposure zooming within a bulb opening time intended by the photographer, as mentioned above.

Consequently, the photographer can optionally carry out the in-exposure zooming by setting the bulb mode and the in-exposure zoom mode. Namely, the photographer rotates the zoom operation ring 78 about the center axis of the lens barrel from the neutral position thereof for a desired time in which he or she wants to effect the in-exposure zooming, while pressing the release switch SWR, i.e., performing the exposure operation. Consequently, the manual power zooming (in-exposure zooming) can be carried out at the zooming speed corresponding to the angular displacement of the zoom operation ring and in the zooming direction determined by the direction of the rotation of the zoom operation ring.

If no bulb mode of the shutter is set at step S4049, and a predetermined shutter speed is set instead, whether or not the in-half-exposure zooming (half MPZ) mode is set is checked at step S4053 prior to the regular in-exposure zooming (i.e., automatic in-exposure zooming which is automatically carried out on the camera body side). The in-half-exposure zooming mode refers to a zooming mode in which the in-exposure zooming is not automatically effected but manually effected by the manual power zooming for a time half the set exposure time. In other words, the in-half-exposure zooming mode can be considered an assist mode in which power zooming is automatically prohibited for a time half the exposure time in the in-exposure zooming operation by the manual power zooming operation so that the photographer can easily effect the in-exposure zooming by the manual power zooming which is manually effected by the photographer.

If no in-half-exposure zoom mode is selected in the manual power zoom, but the in-exposure zoom mode in which the zooming can be automatically effected on the camera body side is selected at step S4053, whether the manual power zoom is made ON or OFF in accordance with the data read through the PZ-LSTATE data communication at step S4047 is checked at step S4055. If the manual power zoom is made OFF, no in-half-exposure zoom mode is set and accordingly, the control proceeds to step S4057 to set the in-exposure zoom control flag F_EXZCTL to declare that the in-exposure zooming is being carried out.

Thereafter, the zooming direction (i.e., the wide-angle direction from the telephoto extremity towards the wide-angle extremity, or the telephoto direction from the wide-angle extremity towards the telephoto extremity) of the power zoom lens 51 in the in-exposure zooming is set at step S4059. Thereafter, the power zooming time and the zooming speed in the in-exposure zoom are set at steps S4061 and S4063, respectively. The control processes for setting the zooming direction at step S4059 and for setting the zooming speed at step S4063 will be described below with reference to the respective sub-routines.

After the operation at step S4063 is completed, the BODY-STATE1 communication is carried out at step S4065 to transmit the data on the release operation, no film winding operation, the prohibition of the IPZ operation and the prohibition of the manual power zoom operation to the power zoom lens 51. Thereafter, whether the power zooming operation in the in-exposure zooming is effected in the former half (referred to as a former half-drive) or latter half (referred to as a latter half-drive) of the exposure time is checked at step S4067.

The former half-drive and the latter half-drive in the in-exposure zooming can be optionally selected by a function selecting/setting switch (not shown) which is manually actuated by a photographer. If the former half-drive is selected at step S4067, the MOVE-PZMD command is sent to the power zoom lens 51 to move same in a designated direction by a predetermined displacement stored at a designated address of the memory to thereby perform the automatic power zoom operation of the power zoom lens. Thereafter, the control proceeds to step S4005 to move the mirror upward. Namely, the power zooming operation is commenced at the same time as the commencement of the exposure when the former half-drive mode is set in the in-exposure zoom.

If the latter half-drive mode is selected at step S4067, the control skips step S4069 to go directly to step S4005 to move the mirror upward. In other words, if the latter half-drive mode is selected in the in-exposure zooming operation, no automatic power zooming operation is commenced by the commencement of the exposure so that the regular exposure is effected.

As can be seen from the above discussion, the exposure operation is commenced when the in-exposure zoom mode is set whichever mode (former half-drive mode or latter half-drive mode) is selected. After the operations at steps S4005, S4007 and S4009 are successively completed, the in-exposure zoom control flag F_EXZCTL is checked at step S4011. Since the flag F_EXZCTL has been set to 1 at step S4057, whether the former half-drive or the latter half-drive is selected is checked again at step S4071. If the former half-drive is selected at step S4071, the control proceeds to step S4073 to check whether or not the power zoom drive time set at step S4061 has expired. After the lapse of the power zoom drive time, the BODY-STATE1 communication is carried out at step S4075 so that the data of the release operation, no film winding operation, the prohibition of the IPZ operation and the prohibition of the manual power zooming operation are sent to the power zoom lens 51. Thus, the manual power zoom operation and the automatic power zoom operation after the lapse of the power zooming time are prohibited, and then the control proceeds to step S4015 to check whether or not the exposure time has lapsed.

If the latter half-drive mode is selected at step S4071, the control proceeds to step S4077 to check whether or not the time corresponding to a difference between the set exposure time and the power zoom driving time has lapsed. After the lapse of the difference time, whether or not the in-halfexposure zooming mode (in-exposure manual power zooming mode) is selected is checked at step S4079. If no in-half-exposure zooming mode is selected at step S4079, the MOVE-PZMD command is sent to the power zoom lens 51 to move the same in a designated direction by a predetermined displacement stored at a designated address of the memory to thereby perform the automatic power zoom operation of the power zoom lens (step S4081). Thereafter, the control proceeds to step S4015 in which no control proceeds until the set exposure time lapses.

If the switch adapted to select the in-half-exposure zoom mode (half MPZ) is made ON at step S4053, the in-exposure zoom control flag F_EXZCTL has been set at step S4083, and thereafter, whether or not the former half-drive mode is selected is checked at step S4085. If the former half-drive mode is selected at step S4085, whether or not the MPZ is made ON, i.e., whether or not the zoom operation ring 78 is rotated is checked at step S4055. If the MPZ is made OFF, namely, if the zoom operation ring 78 is not rotated, the control proceeds to step S4057 to successively perform the operations subsequent thereto. Namely, even if the in-half-exposure zoom mode in the manual power zooming operation is selected, as long as the zoom operation ring 78 is not rotated, it is assumed that the photographer does not practically intend to commence the in-half-exposure zooming by the manual power zooming operation so that the regular in-exposure zooming is carried out.

If the MPZ is made ON at step S4055, namely, if the zoom operation ring 78 is rotated, the control proceeds to step S4051 to carry out the BODY-STATE1 communication so that the data of the release operation, no film winding operation, the prohibition of the IPZ operation and the permission of the manual power zooming operation are sent to the power zoom lens 51. Thus, when the zoom operation ring 78 has been rotated by the photographer at the commencement of the release operation, the automatic power zooming operation which is automatically carried out on the camera body side does not start, and the manual power zooming is carried out instead at the power zooming speed depending on the angular displacement of the zoom operation ring 78 and in the zooming direction corresponding to the direction of the rotation of the zoom operation ring. That is, the former half-drive in the in-half-exposure zooming operation by the manual power zooming is effected.

Thereafter, the operations at steps S4005, S4007, S4009, S4011 and S4071 are successively effected. After the lapse of the in-exposure zooming time in the former half-drive mode, the BODY-STATE1 communication is carried out at step S4075 so that the data of the release operation, no film winding operation, the prohibition of the IPZ operation and the prohibition of the manual power zooming operation are sent to the power zoom lens 51. Consequently, even if the rotation of the zoom operation ring 78 by the photographer continues after the lapse of the in-exposure zooming time, since a further manual power zooming operation is prohibited as mentioned above, the power zooming operation in the former half of the exposure time in the former half-drive mode in the in-half-exposure zooming operation is completed. Thereafter, the regular release operation is carried out in the latter half of the posure time, as discussed above with reference to step S4015 and steps subsequent thereto. Thus, the in-half-exposure zooming operation for the former half-drive mode throughout the whole exposure time is completed.

If the in-half-exposure zooming mode is selected at step S4053 and the latter half-drive mode is selected at step S4085, the control proceeds to step S4057. Namely, the zooming direction, the zooming time and the zooming speed of the in-exposure zooming operation by the manual power zooming operation to be carried out in the latter half of the exposure time are successively determined. Thereafter, if the latter half-drive mode is ascertained at step S4071, the control proceeds to step S4077 to check whether or not the time corresponding to a difference between the set exposure time and the power zoom driving time has lapsed. After the lapse of the difference time, whether or not the in-half-exposure zooming mode is selected is checked at step S4079. If the in-half-exposure zooming mode is selected at step S4079, the LENS-INF1 communication is carried out to send the variable data of the power zoom lens 51 to the camera body 11 at step S4087. Consequently, the ON/OFF state of the power zoom switch PSZ, which is made ON and OFF by the rotation of the zoom operation ring 78, and accordingly the data of the direction (telephoto direction or wide-angle direction) of the rotation of the zoom operation ring 78 are transmitted to the camera body 11.

Thereafter, at step S4089, whether or not the zoom operation ring 78 is rotated is checked in accordance with the data obtained at step S4087. If the zoom operation ring 78 is rotated, the control proceeds to step S4091 to effect the BODY-STATE1 communication so that the data of the release operation, no film winding operation, the prohibition of the IPZ operation and the permission of the manual power zooming operation are sent to the power zoom lens 51. Consequently, the manual power zooming is carried out at the zooming speed corresponding to the angular displacement of the zoom operation ring 78. Namely, the in-half-exposure zooming with the latter half-drive mode by the manual power zooming operation is effected.

In the illustrated embodiment, when the in-half-exposure zoom mode in the manual power zoom is selected, the manual power zooming is carried out at the zooming speed in accordance with the angular displacement of the zoom operation ring 78 rotated by the photographer, regardless of the selected drive mode (former half-drive mode or latter half-drive mode). After power zooming in the latter half of the exposure time for the latter half-drive mode is commenced in response to the permission of the manual power zooming at step S4091, the release operation is carried out, as discussed above with reference to step S4015 and steps subsequent thereto. Thus, the in-half-exposure zooming operation at the latter half-drive mode throughout the whole exposure time is completed.

If the zoom operation ring 78 is not rotated at step S4089, it is assumed that the photographer does not practically want to commence the in-half-exposure zooming by the manual power zooming even if the in-half-exposure zoom mode is set. Thus, similarly to the operation at step S4055, the control proceeds to step S4081 in which the MOVE-PZMD command to effect the power zooming to move the zoom lens in a predetermined direction to a predetermined focal length stored in the memory at a designated address is sent to the power zoom lens 51 so that the in-half-exposure zooming operation at the latter half-drive mode throughout the whole exposure time is completed.

Summary of In-Exposure Zoom In Release Operation

The control of the in-exposure zooming in the release operation as discussed above is summarized in Table 16.

As can be seen from Table 16, when the bulb mode of the shutter is set, the manual power zooming is carried out in an optional period of time determined by the photographer regardless of the drive mode (former half-drive or latter half-drive).

In the regular shutter mode in which a predetermined exposure time is set, if the zoom operation ring 78 is rotated when the in-half-exposure zooming with the former half-drive mode is set, the in-exposure zoom control flag F_EXZCTL is set to permit the manual power zooming only in the former half of the exposure time. Namely, no manual power zooming in the latter half of the exposure time is permitted, and the automatic in-exposure zoom is prohibited throughout the whole exposure time. If the zoom operation ring 78 is not rotated, the automatic power zooming is carried out only in the former half of the exposure time and no manual power zooming is permitted in the former half of the exposure time. Furthermore, in the latter half of the exposure time, no manual power zooming is permitted and the automatic power zooming is stopped.

If the zoom operation ring 78 is rotated when no in-half-exposure zooming with the former half-drive mode is set, the in-exposure zoom control flag F_EXZCTL is cleared so that the manual power zooming is permitted throughout the whole exposure time and the automatic power zooming is stopped throughout the whole exposure time. If the zoom operation ring 78 is not rotated, the in-exposure zoom control flag F_EXZCTL is set so that no manual power zooming is permitted throughout the whole exposure time and the automatic power zooming is effected in the former half of the exposure time. The automatic power zooming is stopped in the latter half of the exposure time.

If the in-half-exposure zooming with the latter half-drive mode is set and if the zoom operation ring 78 is rotated, the in-exposure zoom control flag F_EXZCTL is set so that the manual power zooming is permitted only in the latter half of the exposure time, and the manual power zooming is prohibited in the former half of the exposure time. Furthermore, the automatic in-exposure zooming is prohibited throughout the whole exposure time. If the zoom operation ring 78 is not rotated, the in-exposure zoom control flag F_EXZCTL is set so that the automatic power zooming is effected only in the latter half of the exposure time, and no manual power zooming is permitted in the former half of the exposure time. Furthermore, no manual power zooming is permitted and the automatic power zooming is prohibited in the former half of the exposure time.

If no in-half-exposure zooming for the latter half-drive mode is set and if the zoom operation ring 78 is rotated, the in-exposure zoom control flag F_EXZCTL is cleared so that the manual power zooming is permitted throughout the whole exposure time, and the automatic power zooming is prohibited throughout the whole exposure time. If the zoom operation ring 78 is not rotated, the in-exposure zoom control flag F_EXZCTL is set so that the manual power zooming is prohibited throughout the whole exposure time, and the automatic power zooming is permitted in the latter half of the exposure time and is prohibited in the former half of the exposure time.

Setting of Zooming Direction in In-Exposure Zooming

Figure 93A:
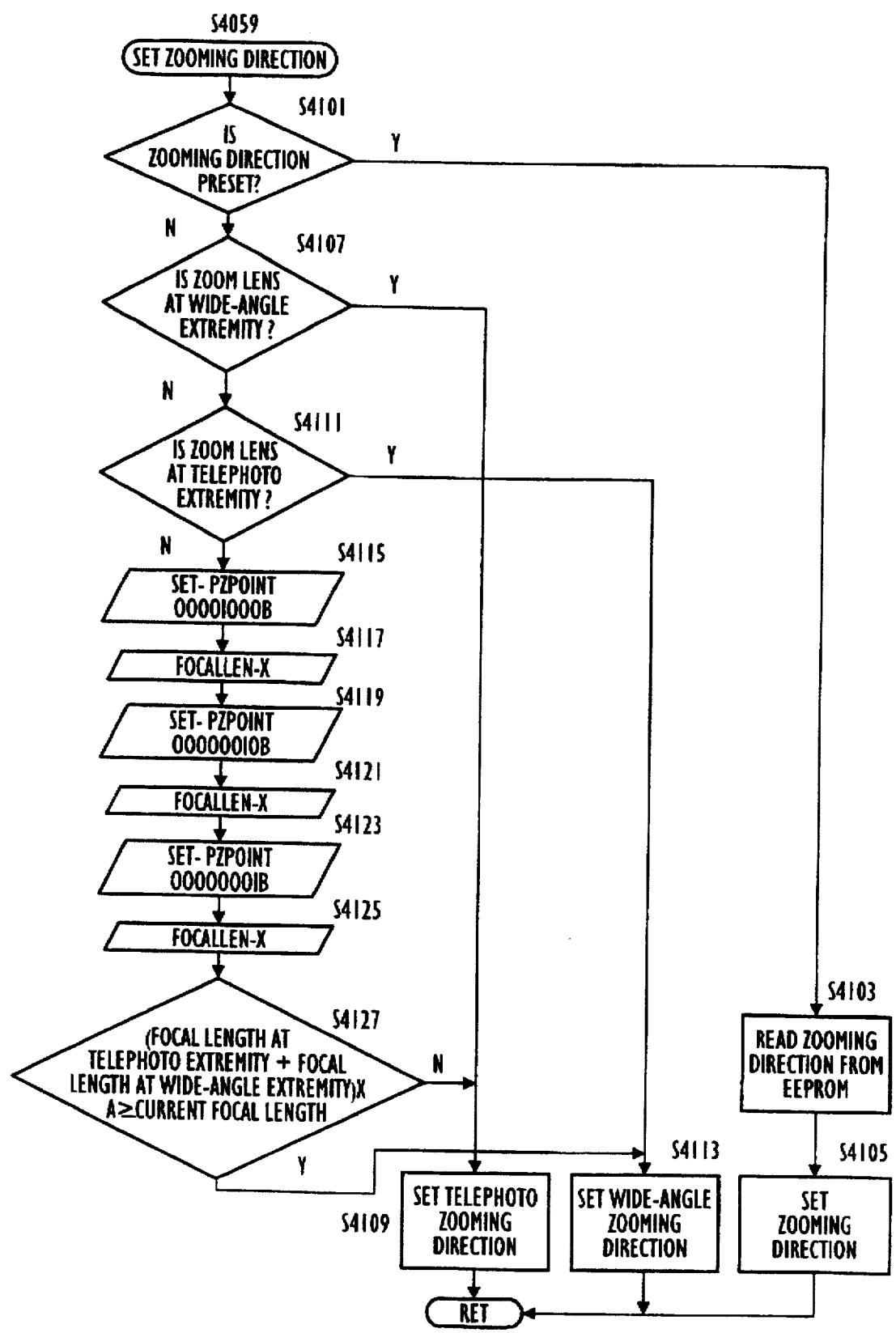
FIG. 93A, 93B, 93C, 93D, and 93E are flow charts of various operations associated with an in-exposure zooming.

The setting process (sub-routine of the release operation) of the zooming direction in the in-exposure zooming at step S4059 will be discussed below with reference to FIG. 93A.

In the illustrated embodiment, the zooming direction in the in-exposure zooming is determined in accordance with the current focal length set by the power zoom lens 51, as will become apparent hereinafter.

Namely, in the sub-routine beginning with step S4059, whether or not the zooming direction is predetermined is checked at step S4101. Namely, if the zooming direction has been set by the function setting means (not shown) and stored in the E²PROM, the control proceeds to step S4103 to read the zooming direction stored in the E²PROM. Thereafter, the zooming direction read at step S4103 is set in the bit B4 or B5 of the MOVE-PZMD command at step S4105. Thus, the control ends and is returned to the main routine.

That is to say, if the zooming direction stored in the E²PROM is the telephoto direction, the bit B4 of the MOVE-PZMD command is set to 1 and the bit B5 is cleared to be 0, respectively. Conversely, if the zooming direction stored in the E²PROM is the wide-angle direction, the bit B4 of the MOVEPZMD command is cleared to be 0 and the bit B5 is set to 1, respectively. Consequently, upon the in-exposure zooming, when the setting operation at step S4059 is carried out, the zooming direction is set at step S4105 so that the power zooming is effected in the set zooming direction.

If no zooming direction has been set at step S4101, the control proceeds to step S4107 to check whether the zoom position (i.e., focal length) of the power zoom lens 51 is located at the telephoto extremity or wide-angle extremity in accordance with the bit data of the bit B3 of the command PZ-LSTATE obtained at step S4047. If the zoom position is located at the wide-angle extremity, the control proceeds to step S4109 to set the zooming direction to be the telephoto direction in which the zoom lens is moved towards the telephoto extremity. Thus, the control ends and is returned to the main routine. If the zoom position is not located at the wide-angle extremity at step S4107, the control proceeds to step S4111 to check whether or not the zoom position of the power zoom lens 51 is located at the telephoto extremity in accordance with the bit data B2 of the command PZ-LSTATE. If the zoom position is located at the telephoto extremity, the control proceeds to step S4113 to set the zooming direction to be the wide-angle direction in which the zoom lens is moved towards the wide-angle extremity. Thus, the control ends and is returned to the main routine.

If the zoom position is not located at the telephoto extremity, namely, if the zoom position is located neither at the telephoto extremity nor at the wide-angle extremity and is located at an intermediate position there between, the bit B3 of the command SET-PZPOINT to instruct the data to be carried on the command FOCALLEN-X from the camera body to the lens is set 1 at step S4115 to demand the lens to feed the current focal length back to the camera body. Thereafter, at step S4117, the command FOCALLEN-X is performed to send the current focal lengthfrom the lens to the camera body.

At step S4119, the bit B1 of the command SET-PZPOINT, to instruct the data to be carried on the command FOCALLEN-X from the camera body to the lens, is set to 1 to demand the lens to feed the focal length at the wide-angle extremity back to the camera body. Thereafter, at step S4121, the command FOCALLEN-X is performed to send the focal length for the wide-angle extremity from the lens to the camera body. Thereafter, the bit B0 of the command SET-PZPOINT is set to 1 at step S4123 to demand the lens to feed the focal length for the telephoto extremity back to the camera body. Thereafter, at step S4125, the command FOCALLEN-X is performed to send the focal length for the telephoto extremity from the lens to the camera body.

Then, at step S4127, the sum of the focal length at the wide-angle extremity read at step S4121 and the focal length at the telephoto extremity read at step S4125 is multiplied by a constant "A" (e.g., ½) which is less than 1, so that whether or not the value thus obtained is larger than the current focal length X read at step S4117 is checked. If the calculated value is larger than the current focal length X at step S4125, namely, if the current focal length is closer to the telephoto extremity than the intermediate point between the telephoto extremity and the wide-angle extremity, the control proceeds to step S4113 to set the zooming direction to be the wide-angle direction in which the lens is moved towards the wide-angle extremity. Conversely, if the calculated value is smaller than the current focal length X at step S4125, namely, if the current focal length is closer to the wide-angle extremity than the intermediate point between the telephoto extremity and the wide-angle extremity, the control proceeds to step S4109 to set the zooming direction to be the telephoto direction in which the lens is moved towards the telephoto extremity.

In the illustrated embodiment, the zooming direction is determined so that the zoom lens is moved towards the wide-angle extremity or the telephoto extremity, when the current zoom position (focal length) is at the telephoto extremity or the wide-angle extremity, respectively. Furthermore, if the current zoom position is neither at the telephoto extremity nor the wide-angle extremity, the zoom lens is moved towards the wide-angle extremity or the telephoto extremity when the zoom position is closer to the telephoto extremity than the intermediate point between the telephoto extremity and the wide-angle extremity or is closer to the wide-angle extremity than the intermediate point, respectively. As can be understood from the above discussion, with the present invention, the zooming direction for the in-exposure zooming can be appropriately determined in accordance with the current focal length.

Although the constant "A" referred to at step S4127 is ½ in the illustrated embodiment, the present invention is not limited thereto. Namely, the constant "A" can be optionally selected to be any value smaller than 1, for example, ⅓.

Modified Embodiment of Setting Operation of Zooming Direction In In-Exposure Zooming In the control for setting the zooming direction mentioned above, if the current zoom position (i.e., focal length) is neither at the telephoto extremity nor at the wide-angle extremity, the zooming direction is determined in such a way that the zoom lens is moved towards the wide-angle extremity or the telephoto extremity when the zoom position is relatively closer to the telephoto extremity than the intermediate point between the telephoto extremity and the wide-angle extremity or is closer to the wide-angle extremity than the intermediate point, respectively. The present invention is, however, not limited to such a control. For instance, the control can be modified as shown in FIG. 93B wherein steps corresponding to those in FIG. 93A are designated with like reference numerals and no detailed explanation thereof will be given.

Figure 93B:
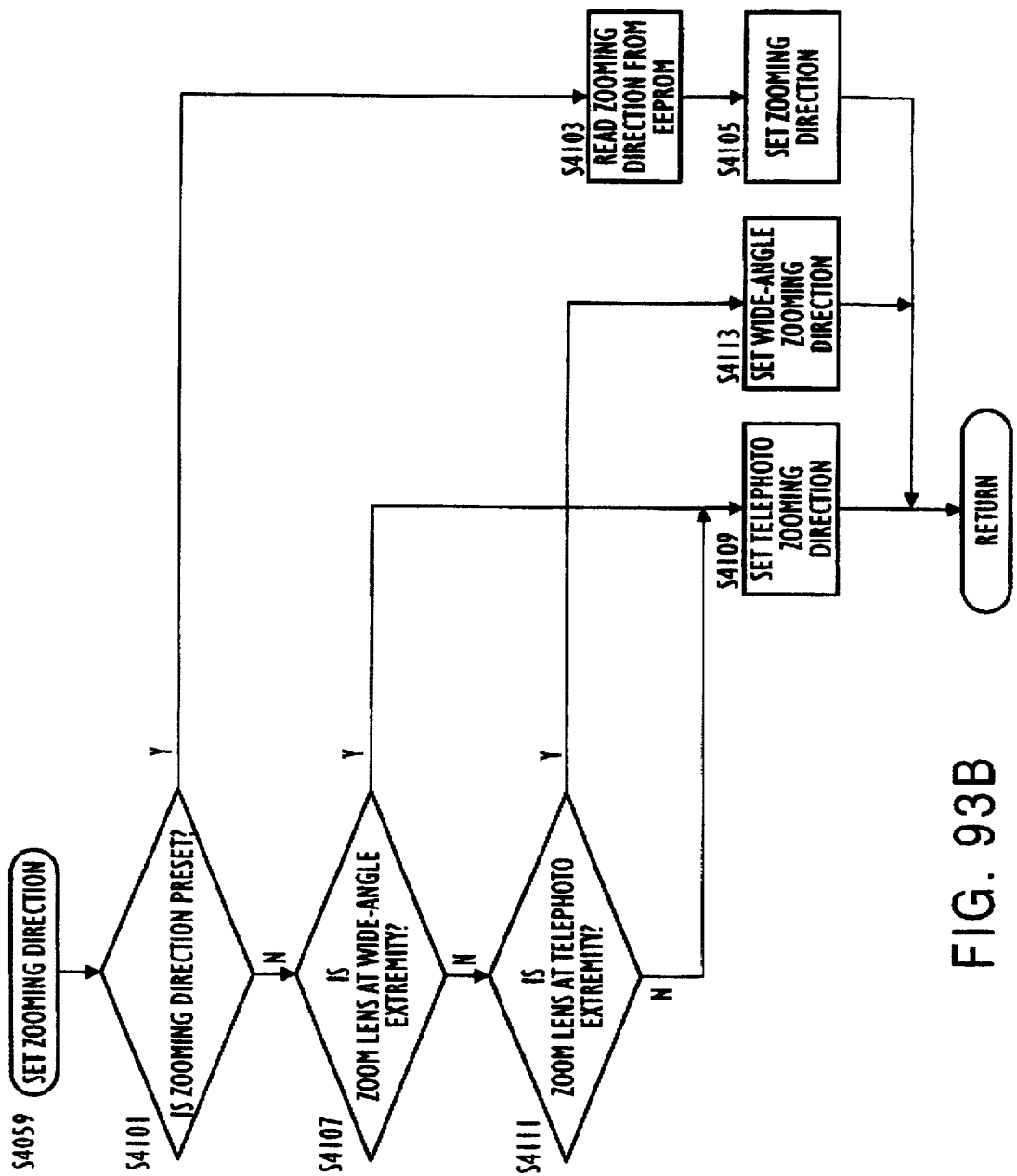

In the modified embodiment shown in FIG. 93B, if the current zoom position is not at the wide-angle extremity at step S4107, the control proceeds to step S4111' to check whether or not the power zoom lens 51 is located at the telephoto extremity or the wide-angle extremity in accordance with the bit data of the bit B2 of the command PZ-LSTATE, similarly to the aforementioned embodiment. If the zoom position is located at the telephoto extremity at step S4111', the control proceeds to step S4113 to set the zooming direction to be the wide-angle direction in which the zoom lens is moved towards the wide-angle extremity. When the control ends, it is returned to the main routine.

If the zoom position of the power zoom lens 51 is not at the telephoto extremity at step S4111', namely, if the zoom position is neither at the telephoto extremity nor the wide-angle extremity in connection with step S4107 and is in an intermediate position therebetween, the control proceeds to step S4109 to set the zooming direction to be the telephoto direction in which the lens is moved to towards the telephoto extremity. Thereafter, the control is returned to the main routine.

Namely, in the modified embodiment, only when the current zoom position of the power zoom lens 51 is located at the telephoto extremity, is the zooming direction set to be the wide-angle direction. In other cases, i.e., if the zoom position is located at the wide-angle extremity or at an intermediate position between the telephoto extremity and the wide-angle extremity, the zooming direction is always set to be the telephoto direction. This is because in the regular in-exposure zooming, the zooming direction is the telephoto direction in most cases. However, if the zooming direction was always the telephoto direction, no zooming would be effected when the zoom position is located at the telephoto extremity so that no in-exposure zooming would be practically carried out. To prevent this, the zooming direction is set to be the wide-angle direction only when the zoom position is at the telephoto extremity. Thus, the in-exposure zooming which is most frequently used can be easily effected by a simple control.

Setting Process of Zooming Speed In In-Exposure Zoom

Figure 93C:
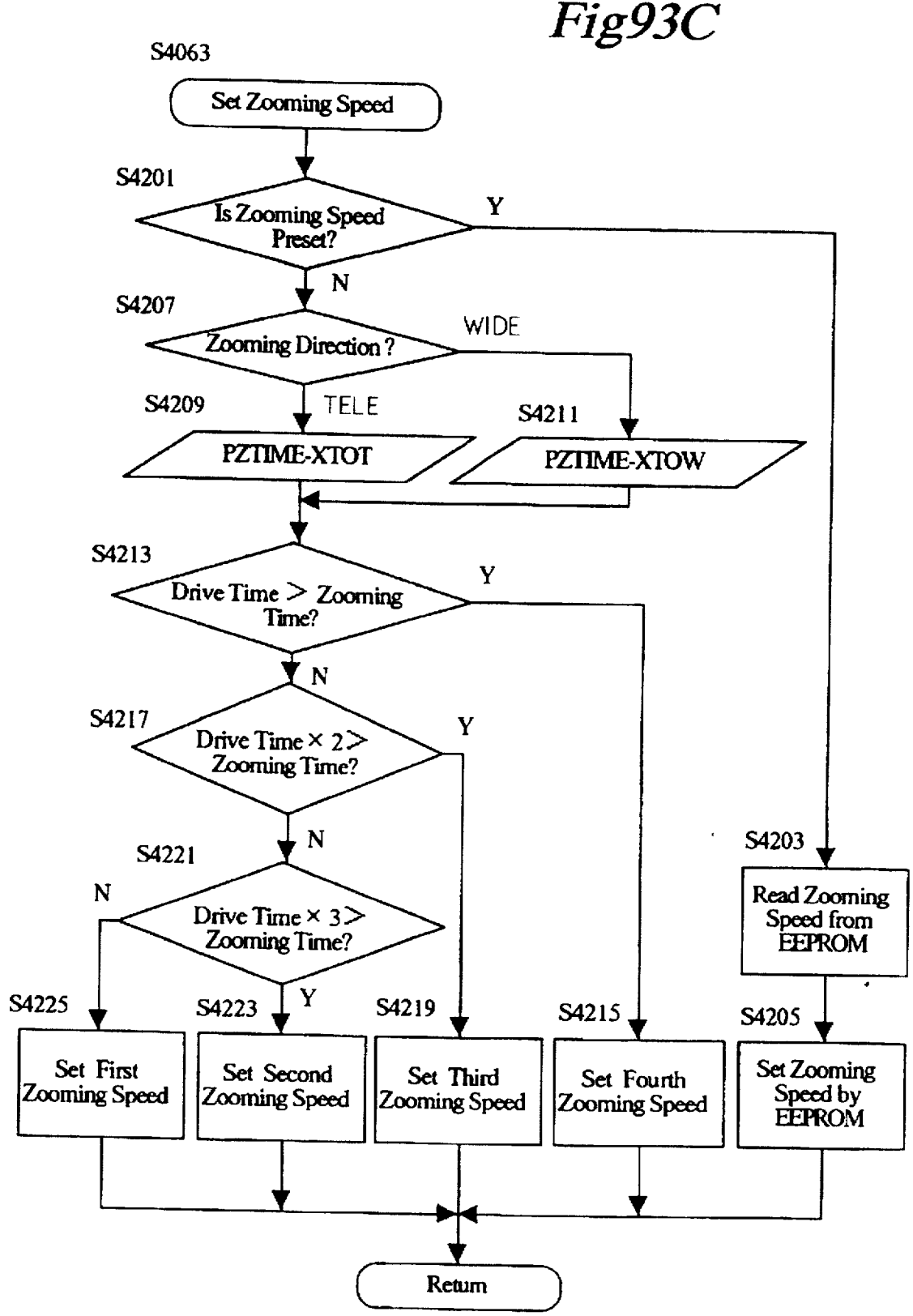

The process (sub-routine of the release operation) for setting the zooming speed in the in-exposure zooming operation at step S4063 will be described below with reference to FIG. 93C.

In the operation at step S4063, the zooming speed is predetermined taking into account the current focal length, the zooming direction in the in-exposure zooming and the shutter speed, so that when the exposure is completed, the zoom position does not reach at least the telephoto extremity or the wide-angle extremity whereby the zooming operation would not be completed.

Namely, if the zooming is completed before the exposure ends, two image cores will occur in a taken picture, a first image core formed by the exposure in the former half of the exposure time in which no zooming is effected and a second image core formed by the completion of the zooming operation prior to the completion of the exposure in the latter half of the exposure time. In particular, if the zooming speed is set in accordance with the angular displacement of the zoom operation ring 78 in the latter half drive of the zooming, the highest zooming speed would be set when the zoom operation ring is rotated through the largest angular displacement by the photographer. In this case, if a long exposure time is set, the zooming would be completed before the exposure ends, thus resulting in an occurrence of two image cores in the picture. To avoid this, in the illustrated embodiment, the zooming speed is automatically set on the camera body side so as not to form the two image cores. Consequently, there is no possibility that there are two image cores in a taken picture caused by the completion of the zooming operation prior to the completion of the exposure.

Furthermore, in the illustrated embodiment, there are four zooming speeds including the first lowest speed and the fourth highest speed, so that an optimum zooming speed can be selected from among them to prevent the occurrence of the two image cores. In an example, the fourth speed is twice the third speed, three times the second speed, and four times the first speed, respectively.

In the operation at step S4063, whether or not the zooming speed is predetermined is checked at step S4201. Namely, if the zooming speed has been set by the function setting means (not shown) and stored in the E²PROM, the control proceeds to step S4203 to read the zooming speed stored in the E2PROM. Thereafter, the zooming speed read at step S4203 is set in the bit B6 or B7 of the MOVE-PZMD command at step S4205. Thus, the control ends and is returned to the main routine. Namely, if the zooming speed stored in the E²PROM is the maximum speed, the bit B6 and bit B7 of the MOVE-PZMD command are cleared to 0. Conversely, if the zooming speed stored in the E²PROM is the minimum speed, the bit B6 and bit B7 of the MOVE-PZMD command are set to 1. Consequently, upon the in-exposure zooming, when the setting operation at step S4063 is carried out, the zooming speed is set at step S4205, so that the power zooming is effected at the set zooming speed.

If no zooming speed has been set at step S4201, the control proceeds to step S4207 to check whether the zooming direction set at step S4059 is the telephoto direction or the wide-angle direction. If the zooming direction is the telephoto direction, the control proceeds to step S4209 to perform the command PZTIME-XTOT to read the drive time if the power zooming was to be effected from the current zoom position to the telephoto extremity at the maximum speed (fourth speed). If the zoom direction is the wide-angle direction at step S4207, the control proceeds to step S4211 to perform the command PZTIME-XTOW to read the drive time if the power zooming was to be effected from the current zoom position to the wide-angle extremity at the maximum speed (fourth speed). The commands PZTIME-XTOT and PZTIME-XTOW will be discussed in detail below with reference to their respective sub-routines.

After the drive time corresponding to the telephoto or wide-angle zooming direction is read at step S4209 or S4211, the control proceeds to step S4213 to check whether or not the drive time that has been read is longer than the zooming time for the in-exposure zooming set at step S4061. If the drive time is longer than the zooming time at step S4213, the control proceeds to step S4215 to select the maximum zooming speed (fourth speed). Namely, even if the zooming speed is set to be the maximum fourth speed, the drive time in which the zoom motor 65 is actually driven is longer than the zooming time in which the zooming in the in-exposure zooming is carried out within the exposure time, and accordingly, the zooming will still be continuing when the in-exposure zooming is completed. Consequently, two-image cores will not appear in a taken picture, that is, there is a single image core in a picture. Control is then returned to the main routine.

If the drive time is not longer than the zooming time at step S4213, the control proceeds to step S4217 to check whether or not the doubled drive time is longer than the zooming time. If the doubled drive time is longer than the zooming time, the control proceeds to step S4219 to set the zooming speed to be the third speed which is identical to one-half the maximum speed. The control is then returned to the main routine.

Namely, if the maximum speed (fourth speed) were to be selected as the zooming speed, the drive time in which the zoom motor 65 is driven would expire before the expiration of the zooming time in which the zooming for the in-exposure zooming is effected within the exposure time. Thus, there would be two image cores in a taken picture, as mentioned above. However, if the zooming speed is set to be the third speed, slower than the fourth speed, the drive time becomes longer than the zooming time and the zooming operation will still be continuing when the in-exposure zooming has been completed. As a result, a taken picture is prevented from having two image cores.

If the doubled drive time is still not longer than the zooming time at step S4217, the control proceeds to step S4221 to check whether or not the triplicated drive time is longer than the zooming time. If the triplicated drive time is longer than the zooming time, the control proceeds to step S4223 to set the zooming speed to be the second speed which is one-third the maximum speed. Control is then returned to the main routine.

Namely, if the third speed were to be selected as the zooming speed, the drive time in which the zoom motor 65 is driven would expire within the zooming time in which the zooming for the in-exposure zooming is effected within the exposure time. Thus, there would be two image cores in a taken picture, as mentioned above. However, if the zooming speed is set to be the second speed, slower than the third speed, the drive time becomes longer than the zooming time and the zooming operation is still continuing when the in-exposure zooming is completed. As a result, a taken picture is prevented from having two image cores.

If the triplicated drive time is not longer than the zooming time at step S4217, the control proceeds to step S4225 to set the zooming speed to be the first speed which is one-fourth the maximum speed. Control is then returned to the main routine. Namely, if the second speed were to be selected as the zooming speed, the drive time in which the zoom motor 65 is driven would expire within the zooming time in which the zooming in the in-exposure zooming is effected within the exposure time. Thus, there would be two image cores in a taken picture, as mentioned above. However, if the zooming speed is set to be the first speed (minimum speed), the drive time becomes longer than the zooming time and the zooming operation will still be continuing when the in-exposure zooming is completed. As a result, a taken picture is prevented from having two image cores.

As can be seen from the above discussion, with the control for setting the zooming speed of the in-exposure zooming with the present invention, whichever zoom speed is selected, two image cores do not appear in a taken picture, that is, there is a single image core in a picture.

Operation of Command PZTIME-XTOT

Figure 93D:
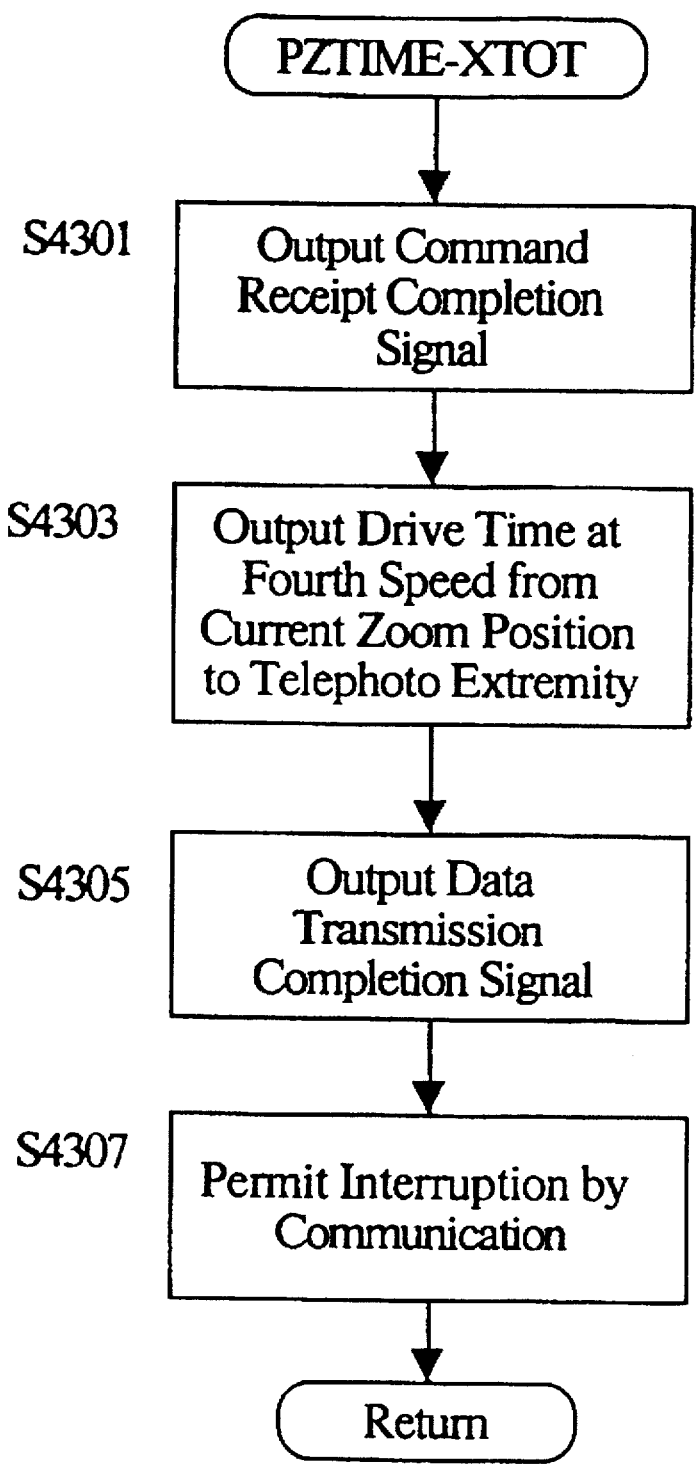

The operation of the lens CPU 61 of the power lens 51 when the command PZTIME-XTOT is output from the body CPU 35 of the camera body 11 at step S4209 mentioned above will be discussed below with reference to FIG. 93D.

When the command PZTIME-XTOT is output from the body CPU 35 of the camera body 11, the command receipt completion signal is output to the body CPU 35 on the camera body side from the lens CPU at step S4301. Thereafter, at step S4303, the drive time data is output on the assumption that the lens is moved to the telephoto extremity from the current zoom position (focal length) at the maximum speed (fourth speed). Thereafter, at step S4305, the data transmission completion signal is output, and after that, the communication by interruption is permitted at step S4307. Control is then returned to the main routine.

Operation of Command PZTIME-XTOW

Figure 93E:
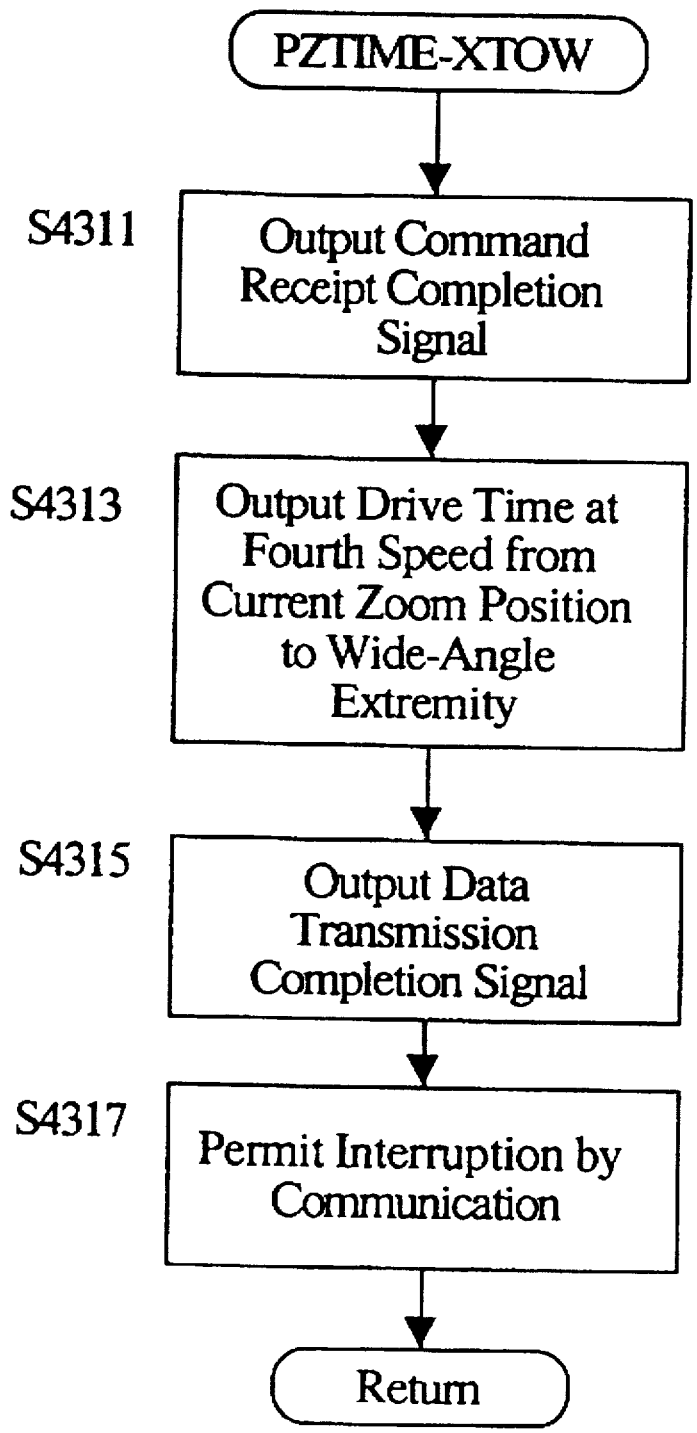

The operation of the lens CPU 61 of the power lens 51 when the command PZTIME-XTOW is output from the body CPU 35 of the camera body 11 at step S4211 mentioned above will be discussed below with reference to FIG. 93E.

When the command PZTIME-XTOW is output from the body CPU 35 of the camera body 11, the command receipt completion signal is output to the body CPU 35 on the camera body side from the lens CPU at step S4311. Thereafter, at step S4313 there is output the drive time data on the assumption that the lens is moved to the wide-angle extremity from the current zoom position (focal length) at the maximum speed (fourth speed). Thereafter, at step S4315, the data transmission completion signal is output, and after that, the communication by interruption is permitted at step S4317, and the control is then returned to the main routine.

PZ Mode Switching Operation

Figure 94:
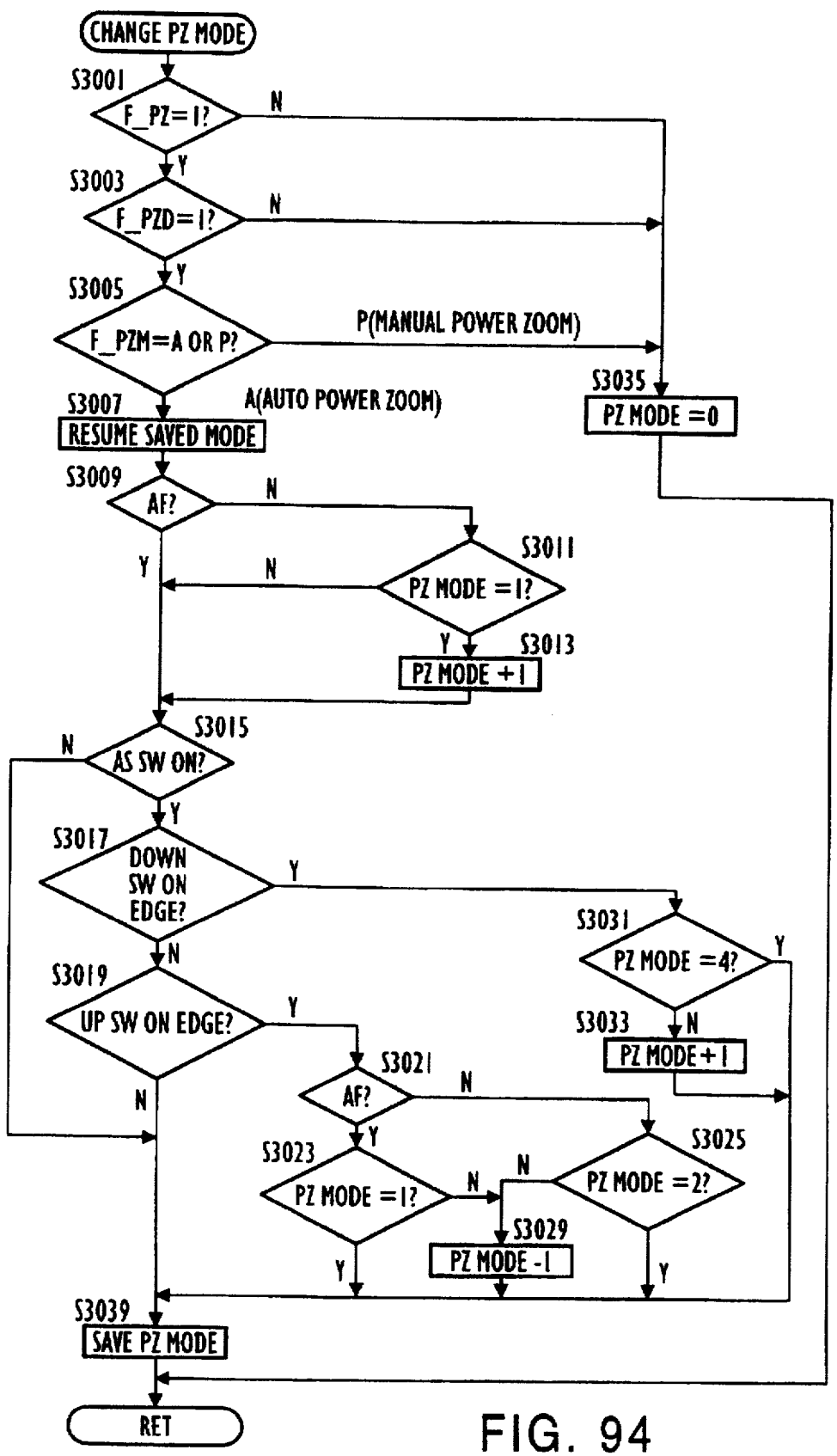
FIG. 94 is a flow chart regarding an operation for changing modes of a powered zooming operation.

The power zoom (PZ) mode switching operation of the camera body 11, as shown in FIG. 94, will be explained below. This PZ mode switching operation is executed in S1507 of the PZ loop operation shown in FIG. 60A, and the PZ mode changing operation is executed when the mode switch 77 of the photographing lens 51 is operated. In this preferred embodiment, there are five kinds of zooming modes; the manual zooming or manual-power zooming, constant image magnification zooming, preset zooming, preset zoom setting and mid-exposure zooming modes. In this flow chart, each mode has a number; No. 0 is the manual zooming or manual-power zooming mode, No. 1 is the constant image magnification zooming mode, No. 2 is the preset zooming mode, No. 3 is the preset zooming setting mode, and NO. 4 is the mid-exposure zooming mode.

First, it is determined if the mounted lens is a power zoom lens and if the zoom mode is a manual zoom mode or a power zoom mode. If it is determined to be a power zoom lens, it is determined whether it is a manual power zoom (i.e., electric motor driven zoom) or auto-power zoom. If the lens is not a power zoom lens, or power zoom lens but not an automatic power zoom, the power zoom lens mode flag is cleared. The operation maintains these conditions and control is returned (S3001, and S3035).

If the lens is an auto-power zoom lens, the already preserved mode is retrieved. If the lens is in the auto-focus mode, no processing takes place. However, if it is not in the auto-focus mode, a constant image magnification zooming cannot be performed. Therefore, if the retrieved PZ mode is the constant image magnification zooming mode (1), it is changed to an upper mode. If it is not the PZ mode, no operation takes place (S3009 through S3013).

Next, when the up and down switches SWUP and SWDN are turned on, a changing operation of the PZ mode is performed (S3015 through S3029) provided that the switch SWAS (i.e., zoom mode switch) of the power zoom lens 51 is turned on. For instance, when the down switch SWDN is turned on, the zoom mode is changed upward until it becomes No. 4 (S3017, S3031 and S3033). When the UP switch SWUP is turned on, the zoom mode is changed downward until it becomes No. 1. However, when not in the auto-focus mode, constant image magnification is not selected (S3019 through S3029).

Upon completion of the UP/DOWN operation, the selected mode number is preserved, control is then returned (S3039). The state of the switch SWAS is included in the data transmitted by the POFF-STATE communication.

The PZ Pulse Count Interruption Operation

Figure 95:
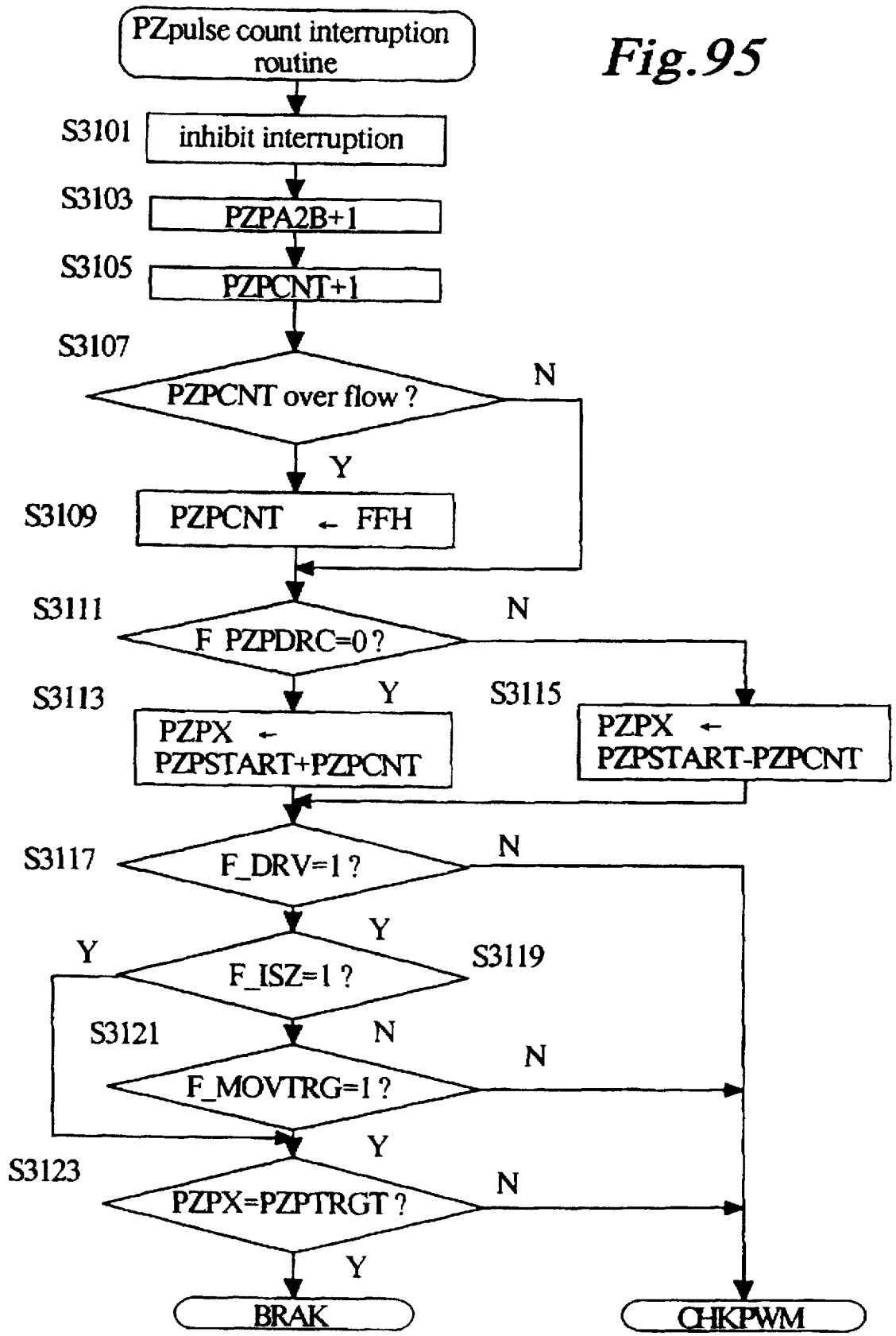
FIG. 95 is a flow chart regarding an interruption operation for the PZ pulse count.
Figure 96:
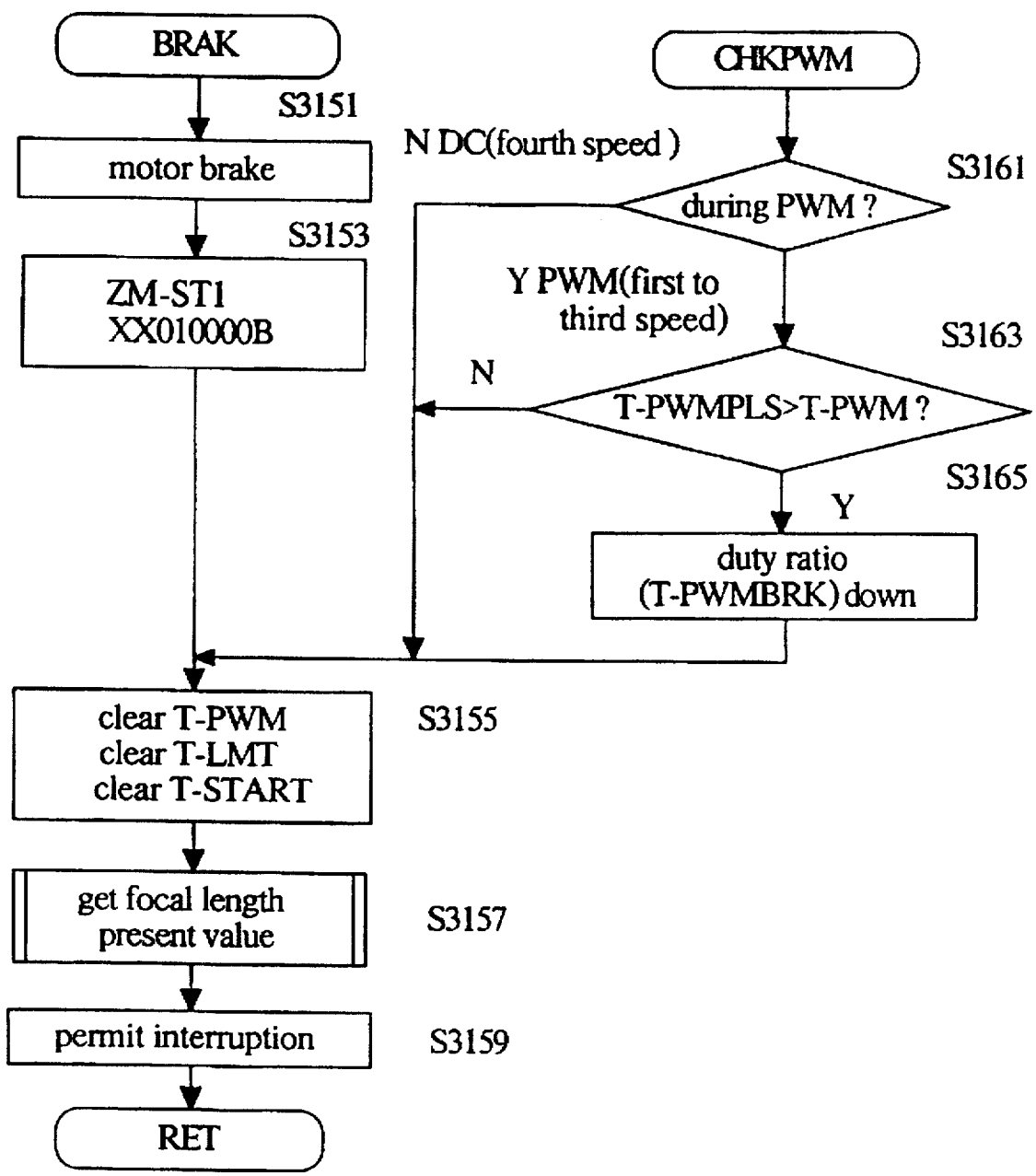
FIG. 96 is a flow chart regarding an operation for controlling PWM of the zoom motor.

The following explains the PZ pulse count interruption operation shown in FIGS. 95 and 96, which is executed in the photographing lens 51. This interruption takes on the rising side of a PZ pulse output, the counting of which is performed by software. The interruption may be performed at the downfall of a pulse, depending on the setting of the lens CPU.

First, interruption is disabled, and the PZ counter (PZPA2B), which counts the PZ pulses in the PZ initializing operation, and the PZ pulse count value (PZPCNT) are incremented by 1. When the PZ pulse counter value overflows, the maximum value is entered in the PZ pulse count value (S3101 through S3109).

Next, the driving direction of the power zoom lens is checked. If it is in the telephoto direction, the PZ pulse count starting value is added by the PZ pulse count value and entered into the present PZ pulse value. If it is the wide-angle direction, the PZ pulse count starting value is subtracted by the PZ pulse count value and entered into the present PZ pulse value (S3111 through S3115).

Then, when the driving operation is not being performed (F__DRV=0), the operation proceeds to the PWM control checking (CHKPWM) in S3117. When the driving operation is being performed, but constant image magnification zooming is being effected, or the lens is not being driven towards the targeted position, the operation proceeds to the PWM control checking operation (CHKPWM) in S3117 through S3121. When the constant image magnification zooming is being effected or the lens is being driven towards the targeted position, the number of the present PZ pulse and the number of the targeted PZ pulse are not equal, the operation proceeds to the PWM control checking (CHKPWM). If they are equal, the operation proceeds to the braking operation (BRAK) to immediately stop the zoom motor (S3117, S3119 and S3123).

The BRAK and CHKPWM Operations

FIG. 96 shows a flow chart regarding the braking operation (BRAK operation) of the zoom motor and the PWM checking operation. These operations are to reduce the speed of the PZ motor.

In the braking operation, the brake is first applied to the zoom motor (by closing the input terminal of the zoom motor), and the brake data is entered into ZM-ST1. For the brake data, F__BRK is set, flag F__LMTT and F__LMTW remain unchanged, and the others are cleared (S3151 and S3153 represent these operations).

The PWM timer, the limit timer, and the start timer are cleared. Data for the present focal distance is obtained from the present PZ pulse value (PZPX) and stored in FCLXL and H, after which interruption is enabled before control is returned (S3155 through S3159).

The CHKPWM operation is to reduce the duty ratio in the PWM control. When the PWM driving is not in operation, the operation proceeds to S3155 with the fourth speed (DC) unchanged. When the PWM driving is in operation, if the PWM timer (T-PWM) is less than the PWM pulse cycle (T-PWMPLS), the duty ratio is reduced because the power zooming speed is too high. The operation then proceeds to S3155. If the PWM timer is greater than the PWM pulse cycle, the operation proceeds to S3155 without any further processes (S3161 through S3165 represent the foregoing operations).

Many functions of this preferred embodiment were explained in the foregoing paragraphs. A part or all of these functions may be built in a single camera system (i.e., a camera body and a photographing lens).

With the present invention, it is possible to provide various kinds of controls in a power zoom lens and in closer coordination with the camera body because communication means, to communicate commands and data with the camera body, is built in both the camera body and the power zoom lens, which is detachably attached to the camera body.

With the present invention, in a single lens reflex camera having a power zoom lens, since the zoom motor 65 is driven for the in-exposure zoom mode to commence the zoom-up or zoom-back when around one-half the exposure time expires (or in the former half of the exposure time), as mentioned above, a clear still object image and a streaked object image which is partly extended or contracted in the radial directions can be obtained.

In addition, as can be seen from the foregoing, with the present invention, since the zooming direction of the zoom-up (telephoto direction) or zoom-back (wide-angle direction) is determined by the body CPU 35 in accordance with the current focal length, the zooming operation can be certainly carried out to ensure the in-exposure zooming. Consequently, it is not necessary for a photographer to set the zooming direction in the in-exposure zooming in the camera, and accordingly in-exposure zooming, which has hitherto required a high degree of photographing skill, can be easily effected. Furthermore, no special member for setting the zooming direction is necessary, thus resulting in a reduced manufacturing cost. In addition to the foregoing, since there is no possibility that a photographer sets a wrong zooming direction by mistake, the photographing reliability can be increased.

In the illustrated embodiment, the zoom operation ring 78 can be rotated in the clockwise or counterclockwise direction from the neutral position when the shutter is released in the in-exposure zoom mode so that the power zoom switch is made ON and the in-exposure zooming is not by the regular automatic power zooming, but can be effected by manual power zooming. Consequently, when the photographer wants to effect the in-exposure zooming under his or her intended conditions (the zooming direction, the zooming speed, etc.) different from those preset in the camera body, the intended conditions can be easily realized by manually rotating the zoom operation ring 78, the rotational direction and displacement of which determine the zooming direction and the zooming speed, respectively.

In the above-mentioned embodiments, when the in-exposure zoom mode is selected, the zooming speed can be set on the camera body side in accordance with the shutter speed (i.e., exposure time), the set current focal length, and the set zooming direction, etc., so that the zooming operation is still continuing when the exposure time expires. Consequently, a picture having a single image core and not two image cores can be obtained.

In the above-mentioned embodiments, when the in-exposure zoom mode is selected, if the bulb (open) mode of the shutter is set, manual power zoom is permitted. In the prior art, when the bulb (open) mode of the shutter was set, the in-exposure zooming was prohibited since no exposure time can be detected. However, with the present invention, since manual power zooming is permitted, the photographer can effect in-exposure zooming by the manual power zooming, using a part of the exposure time, even if the exposure time is unknown.

In the above-mentioned embodiments, when the in-exposure zoom mode is selected, the manual power zooming can be effected by rotating the zoom operation ring 78 during the exposure. Consequently, the photographer can effect the in-exposure zooming by the manual power zooming and not by the automatic power zooming, under his or her intended zooming conditions different from those preset in the camera body for the automatic power zooming operation.

In the above-mentioned embodiments, when the zoom operation ring 78 is rotated to vary the focal length without pressing the shutter button by half step, the focusing is automatically carried out. Consequently, when the photographer effects zooming for framing and also observes an object image through the view finder, a focused object image can always be viewed through the view finder, thus resulting in improved framing.

In the above-mentioned embodiments, the focusing is automatically carried out during the zooming in which the zoom operation ring 78 is rotated without pressing the shutter button by a half step. In that focusing, the focusing range (width) can be expanded or extended with respect to the focusing range for the focusing when the shutter button is pressed by a half step to actuate the photometering switch. Consequently, no fine focus adjustments which may be repeatedly effected are necessary.

In the above-mentioned embodiments, when the zoom set button is pressed at the preset zoom mode, the lens is moved to the stored focal length, and the focusing is effected. Consequently, a camera in which the operation, particularly at the preset zoom mode (clip mode), is simplified can be provided.

TABLE 1

| I | Instruction Name | Instruction Code |
|---|---|---|
| 0 | STANDBY | 30 |
| 1 | AF-INITPOS | 31 |
| 2 | PZ-INITPOS | 32 |
| 3 | RETRACT-PZ | 33 |
| 4 | RET-PZPOS | 34 |
| 5 | IPZ-STOP | 35 |
| 6 | ISZ-MEMORY | 36 |
| 7 | ISZ-START | 37 |

TABLE 2

| No | Instruction Name | Instruction Code |
|---|---|---|
| 0 | LROM 16 byte data | 40 |
| 1 | LROM first half 8 byte data | 41 |
| 2 | LROM second half 8 byte data | 42 |

TABLE 3

| BL | BL COMMAND | Command Code | | B7 | B6 | B5 | B4 | B3 | B2 | B1 | B0 | dimension |
|---|---|---|---|---|---|---|---|---|---|---|---|---|
| 0 | PZ-BSTATE | 20 | | ISM | AFif | Mobj | ovAF | toFm | toNm | endF | endN | — |
| | | | 1: | lens | yes | yes | yes | yes | yes | yes | yes | |
| | | | 0: | body | no | no | no | no | no | no | no | |
| 1 | BODY-STATE0 | 21 | | m AF | swAF | BATT | swS | Vdd | IPZC | IPZB | IPZA | — |
| | | | 1: | C | A | yes | off | on | 4 | 2 | 1 | |
| | | | 0: | S | M | no | on | off | | | | |
| 2 | BODY-STATE1 | 22 | | ISsp | ISsp | ISZD | AF-L | MPZD | IPZD | WIND | REL | — |
| | | | | | | pre | on | stop | stop | yes | yes | |
| | | | | SP B | SP A | APx | off | ena. | ena. | no | no | |
| 3 | SET-AFPOINT. | 23 | | ISZM | FM2 | FM1 | FM0 | X | | | | |
| 4 | SET-PZPOIN. | 24 | | ISZM | FM2 | FM1 | FM0 | X | | | | |

TABLE 3-continued

| BL | BL COMMAND | Command Code | | Data Bit | | | | | | | | dimension |
|---|---|---|---|---|---|---|---|---|---|---|---|---|
| | | | | B7 | B6 | B5 | B4 | B3 | B2 | B1 | B0 | |
| 5 | STORE-AFP | 25 | | ISZM | AM2 | AM1 | AM0 | 2048 | 1024 | 512 | 256 | |
| | | | | 128 | 64 | 32 | 16 | 8 | 4 | 2 | 1 | Pulse |
| 6 | STORE-DEFP&D | 26 | | SIGN | | | 4096 | 2048 | 1024 | 512 | 256 | |
| | | | | 128 | 64 | 32 | 16 | 8 | 4 | 2 | 1 | ×4 μm |
| | | | | | | | 4096 | 2048 | 1024 | 512 | 256 | |
| | | | | 128 | 64 | 32 | 16 | 8 | 4 | 2 | 1 | Pulse |
| 7 | STORE-PZP | 27 | | AFM | AM2 | AM1 | AM0 | PZM | FM2 | FM1 | FM0 | — |
| | | | 1: | memo | 4 | 2 | 1 | memo | 4 | 2 | 1 | |
| | | | 0: | no | | | | no | | | | |
| 8 | STORE-PZF | 28 | | ISZM | FM2 | FM1 | FM0 | | 1024 | 512 | 256 | |
| | | | | 128 | 64 | 32 | 16 | 8 | 4 | 2 | 1 | mm |
| 9 | STORE-IS | 29 | | | | | | 2 | 1 | 1/2 | 1/4 | |
| | | | 1/ | 8 | 16 | 32 | 64 | 128 | 256 | 512 | 1024 | times |
| A | MOVE-PZMD | 2A | | SP B | SP A | MD W | MD T | MD M | MvM2 | MvM1 | MvM0 | — |
| | | | 1: | | | wide | tele | memo | 4 | 2 | 1 | |
| | | | 0: | | | no | no | no | | | | |
| B | MOVE-PZf | 2B | | SP B | SP A | | | | 1024 | 512 | 256 | |
| | | | | 128 | 64 | 32 | 16 | 8 | 4 | 2 | 1 | mm |

TABLE 4

| LB | LB COMMAND | Command Code | | Data Bit | | | | | | | | dimension |
|---|---|---|---|---|---|---|---|---|---|---|---|---|
| | | | | B7 | B6 | B5 | B4 | B3 | B2 | B1 | B0 | |
| 0 | PZ-LSTATE | 10 | | MPZ | ISok | IPZI | IPZB | Wend | Tend | Wmov | Tmov | — |
| | | | 1: | on | ng. | int | busy | end | end | move | move | |
| | | | 0: | off | ok | ok | end | no | no | stop | stop | |
| 1 | POFF-STATE | 11 | | PH | AFsw | PZ D | PZ M | ASsw | SLsw | LBAT | Bdet | — |
| | | | 1: | Req. | AF | D | A P | ON | ON | Req. | on | |
| | | | 0: | no | M | M | | OFF | OFF | no | off | |
| 2 | POFFS-WSLEEP | 12 | | not avai labl | | | | | | | | — |
| 3 | LENS-INF1 (Continue) | 13 | | ISmW | ISmT | ISdC | ISdB | ISdA | Lens A | PWsw | PTsw | — |
| | | | 1: | wide | tele | | | | A | wide | tele | |
| | | | 0: | no | no | 1/2 | 1/4 | 1/8 | M | off | off | |
| 4 | LENS-INF2 | 14 | | exPZ | exAF | exAE | ex B | rePZ | reAF | verB | verA | — |
| | | | 1: | yes | yes | yes | yes | ok | ok | 2 | 1 | |
| | | | 0: | no | no | no | no | ng | ng | | | |
| 5 | LENS-AFPULSE | 15 | | | | | | 2048 | 1024 | 512 | 256 | |
| | | | | 128 | 64 | 32 | 16 | 8 | 4 | 2 | 1 | Pulse |
| 6 | FOCALLEN-X | 16 | | | | | | | 1024 | 512 | 256 | |
| | | | | 128 | 64 | 32 | 16 | 8 | 4 | 2 | 1 | mm |
| 7 | IMAGE-LSIZE | 17 | | | | | | 2 | 1 | 1/2 | 2/4 | |
| | | | 1/ | 8 | 16 | 32 | 64 | 128 | 256 | 512 | 1024 | times |

TABLE 5

| LC0 | | | | | | | | ADD_AEIA (LB4) | | | | | | | |
|---|---|---|---|---|---|---|---|---|---|---|---|---|---|---|---|
| | lens kind | | | version data | | | | | MTF | | VNT data (additional data) 1st | | | | |
| LC1 | | | | | | | | ADD_AEIA (LB4) | | | | | | | |
| | | | LENS data | | | | | | | circular flare | | data (additional data) 1st | | | |
| LC2 | | | | | | | | | | | | | | | |
| | | | DISTANCE data | | | | | | | | | | | | |
| LC3 | | | | | | | | | | | | | | | |
| | | | K-VALUE data | | | | | | | | | | | | |
| LC4 | | | | | | | | KSF_AL | | | (LBB) | | | | |
| | abberation correction, near distance abberation correction data | | | | | | | | K-VALUE new communication data LOW | | | | | | |
| LC5 | | | | | | | | KSF_AH | | | (LBB) | | | | |
| | | light color abberation correction data | | | | | | | K-VALUE new communication data HIGH | | | | | | |
| LC6 | | | | | | | | | | | | | | | |
| | | | open abberation data | | | | | | | | | | | | |
| LC7 | | | | | | | | | | | | | | | |
| | | AF minimum actuation condition | | | | | | | | | | | | | |
| LC8 | | | | | | | | CD_ZOOMN | | | | | | | |
| | | | focal length data | | | | | | | | for zoom code input | | | | |
| LC9 | | | | | | | | CD_ZOOMO | | | | | | | |
| | | nominal AVmin | | AVmax data | | | | | | | for zoom code input | | | | |
| LC10 | | | | | | | | CD_DISN | | | | | | | |
| | | | mv' nv' data | | | | | | | | for distance code input | | | | |
| LC11 | | | | | | | | CD_DISO | | | | | | | |
| | | | AVC 1/EXP data | | | | | | | | for distance code input | | | | |
| LC12 | | | | | | | | SW_ZOOM | | | | | | | |
| | | mv1 AVminsif data | | | | | | | | | for zoom SW input | | | | |
| LC13 | | | | | | | | SW_KVAL | | | | | | | |
| | | | AVmin | | | | | | | | for K-VALUE input | | | | |
| LC14 | | | | | | | | SW_ZMN | | | | | | | |
| | | | UNT_12 UNT_6 data | | | | | | DM | SL | PA1 | PA0 | | SPD2 | SPD1 | SPD0 |
| LC15 | | | | | | | | SW_ZMO | | | | | | | |
| | | | incorporated flash suited END data | | | | | | DM0 | SL0 | PA10 | PA00 | | SPD20 | SPD10 | SPD00 |

TABLE 6

| BD_ST0 (BL0) | | | | | | | | ST_PZPOI (BLA) | | | | | | | |
|---|---|---|---|---|---|---|---|---|---|---|---|---|---|---|---|
| MAF | SWAF | BATT | SWS | VDD | IPZ2 | IPZ1 | IPZ0 | for SET-PZPINT | | | | | | | |
| BD_ST1 (BL1) | | | | | | | | ST_AFPOI (BLB) | | | | | | | |
| IS SPB | IS SPA | ISZD | AFL | MOZD | IPZD | WIND | REL | for SET-AFPINT | | | | | | | |
| MOVE_PZFL (BL2) | | | | | | | | POFF_ST (LB0, 1) | | | | | | | |
| MOVE-pzf LOW | | | | | | | | PH REQ | AFSW | PZD | PZM | ASSW | SLSW | BAT REQ | BDET |
| MOVE_PZFH (BL2) | | | | | | | | LNS_INFI (LB2) | | | | | | | |
| MOVE-pzf HIGH | | | | | | | | ISMW | ISMT | ISDC | ISDB | ISDA | LENS | PWSW | PTSW |
| MOVE_PZMD (BL3) | | | | | | | | PZ_LST (LBA) | | | | | | | |
| | | | | MDM | | | | MPZ | ISOK | IPZI | IPZB | WEND | LEND | WMOV | TMOV |
| ST_PZP (BL4) | | | | | | | | SCRT_IN (BLF) | | | | | | | |
| for STORE-PZP | | | | | | | | for secret data input | | | | | | | |
| ST_DEFPL (BL5) | | | | | | | | SCRT_OUT (LBF) | | | | | | | |
| AF defocus pulse of body LOW | | | | | | | | for secret data output | | | | | | | |
| ST_DEFPH (BL5) | | | | | | | | BD_VER | | | | | | | |
| AF defocus pulse of body HIGH | | | | | | | | for BODY VERSION input | | | | | | | |
| ST_DEFL (BL5) | | | | | | | | FLG1 | | | | | | | |
| AF defocus amount of body LOW | | | | | | | | un- used | GET CMD | REC ALC | BNK | RLT ON | RLT BNK | OPON | OP BNK |
| ST_DEFH (BL5) | | | | | | | | FLG2 | | | | | | | |
| AF DRC | AF defocus pulse of body HIGH | | | | | | | unused | | | | | STN DBY | SCK NG | CMD NG |
| ST_PZFL (BL6) | | | | | | | | COMMAND | | | | | | | |
| STORE-pzf LOW | | | | | | | | BODY → LENS COMMAND | | | | | | | |
| ST_PZFH (BL6) | | | | | | | | TST_ADRH | | | | | | | |
| STORE-pzf HIGH | | | | | | | | test address data LOW | | | | | | | |
| ST_AFPL (BL7) | | | | | | | | TST_ADRL | | | | | | | |
| STORE-AFP LOW | | | | | | | | test address data HIGH | | | | | | | |
| ST_AFPH (BL7) | | | | | | | | TST_DATA | | | | | | | |
| STORE-AFP HIGH | | | | | | | | test WRITE data | | | | | | | |
| PZ_BDST (BL9) | | | | | | | | TST_FLG1 | | | | | | | |
| ISM | AFIF | MOBJ | OVAF | FARM | NEA RM | ENDF | ENDN | PZP CNT | AFP CNT | DM | LMT DTC | REV | PZI NIT | PZP ADJ | PZP ADJ |
| PZ_BDST0 | | | | | | | | TST_FLG2 | | | | | | | |
| ISM0 | IF0 | MOB J0 | OVA F0 | FAR M0 | NER RM0 | END F0 | END N0 | PUL LUP | PUL LDN | IO | ZMSW | ZMC | DISC | MTR CTL | SET ST |

TABLE 7

| Field | | | | | | | | Field | | | | | | | |
|---|---|---|---|---|---|---|---|---|---|---|---|---|---|---|---|
| R_ZOOM, ZM_ST1 | | | | | | | | AFPSTRTL | | | | | | | |
| LMTW | LMIT | DRV | BRK | SPD1 | SPD0 | DRCW | DRCT | \multicolumn{8}{l}{counter start position AF pulse LOW} |
| SPDDRC1 | | | | | | | | AFPSTRTH | | | | | | | |
| zoom speed direction register 1 | | | | SPD B1 | SPD A1 | WID E1 | TEL E1 | | | | | | | | HIGH |
| SPDDRC2 | | | | | | | | AFPSCNTL | | | | | | | |
| zoom speed direction register 2 | | | | SPD B2 | SPD A2 | WID E2 | TEL E2 | \multicolumn{8}{l}{AF pulse counter LOW} |
| TRNSSPD | | | | | | | | AFPSCNTH | | | | | | | |
| zoom speed SW transformed value | | | | SPDB | SPDA | WIDE | TELE | | | | | | | | HIGH |
| PZ_LST0 | | | | | | | | AFPXL | | | | | | | |
| MPZ0 | IS OK0 | IPZ I0 | IPZ B0 | WEN D0 | TEN D0 | WMO V0 | TMO V0 | \multicolumn{8}{l}{AF pulse present position LOW} |
| ZM_ST2 | | | | | | | | AFPXH | | | | | | | |
| un-used | MOV ZC | MOV TRG | MOV | ISZ | STA RT | PZP DRC | PZ POS | \multicolumn{8}{l}{AF pulse present position HIGH} |
| ZM_ST3 | | | | | | | | AFPA2BL | | | | | | | |
| \multicolumn{6}{l}{unused} | REVW | REVT | \multicolumn{8}{l}{AF pulse generic counter LOW} |
| T_LMT | | | | | | | | AFPA2BH | | | | | | | |
| \multicolumn{8}{l}{end point detecting timer (counter)} | | | | | | | | HIGH |
| T_BRK | | | | | | | | AFPCDL | | | | | | | |
| \multicolumn{8}{l}{zoom motor braking time timer (counter)} | \multicolumn{8}{l}{distance code AF pulse transformed value LOW} |
| T_PWM | | | | | | | | AFPCDH | | | | | | | |
| \multicolumn{8}{l}{PWM timer (counter)} | | | | | | | | HIGH |
| T_PWMPLS | | | | | | | | AFPDIFL | | | | | | | |
| \multicolumn{8}{l}{PWM PZ pulse period (interval)} | \multicolumn{8}{l}{difference between distance code transformed value and present LOW} |
| T_PWMBRK | | | | | | | | AFPDIFH | | | | | | | |
| \multicolumn{8}{l}{PWM brake timer value (PWM duty ratio)} | | | | | | | | HIGH |
| T_START | | | | | | | | PZPSTRT | | | | | | | |
| \multicolumn{8}{l}{zoom motor start-up timer (counter)} | \multicolumn{8}{l}{PZ pulse at counter start position} |
| T_REV | | | | | | | | PZPCNT | | | | | | | |
| \multicolumn{8}{l}{zoom motor reverse timer} | \multicolumn{8}{l}{PZ pulse counter} |
| ZM_MODE | | | | | | | | PZPX | | | | | | | |
| \multicolumn{8}{l}{zoom mode} | \multicolumn{8}{l}{present position PZ pulse} |
| ZM_DATA | | | | | | | | PZPA2B | | | | | | | |
| \multicolumn{8}{l}{zoom data} | \multicolumn{8}{l}{PZ pulse generic counter} |

TABLE 8

| Name | Description | Name | Description |
|---|---|---|---|
| PZPCD | zoom code PZ pulse transformed value | ISZ_AFPL | ISZ AF pulse LOW |
| PZPDIF | difference between target and present value | ISZ_AFPH | HIGH |
| PZPTRGT | target PZ pulse | ISZ_FCLL | ISZ focal length LOW |
| PZPF | target PZ pulse (present value calculate) | ISZ_FCLH | HIGH |
| PZPFPRE | target PZ pulse (predictor calculate) | ISZ_IMGL | ISZ image size LOW |
| FCLXL | present focal length LOW | ISZ_IMGH | HIGH |
| FCLXH | HIGH | FCLL | focal length for PZ pulse transform LOW |
| ISZ_ST (FPRE OK \| FPRE \| ISZ XOM \| ISZ FOM \| ISZ M \| STIS \| 1st AFP \| AF POS) | | FCLH | focal length for PZ pulse transform HIGH |
| CD_DSNEW | present distance code (remove chattering) | UNVCNTR | universal counter |
| CD_DSOLD | previous distance code (remove chattering) | REGC | generic register C (inhibited to be used other than MAIN) |
| CD_DSN | present distance code | REGD | generic register D |
| CD_DSO | previous distance code | REGE | generic register E |
| CD_ZMNEW | present zoom code (remove chattering) | R_BE | generic register R_BE |
| CD_ZMOLD | previous zoom code (remove chattering) | R_CE | generic register R_CE |
| CD_ZMN | present zoom code | SFT_L | generic register SFT_L |
| CD_ZMO | previous zoom code | SFT_M | generic register SFT_M |

TABLE 9

| | |
|---|---|
| R_DEFL | stack area |
| for calculation of FPRE X | |
| R_DEFH | |
| for calculation of FPRE X | |
| R_STO | |
| for serial communication timer-over | |
| R_DHEN | |
| for LSB → MSB data transform | |
| R_ROOP | |
| for AE AF all data comminucation | |
| R_VECTL | |
| for communication interrupt | |
| R_VECTH | |
| for communication interrupt | |
| R_LROML | |
| LROM first address LOW | |
| R_LROMH | |
| LROM first address HIGH | |
| R_LROMNL | |
| LCO first address LOW | |
| R_ROMNH | |
| LCO first address HIGH | |
| | |
| | |
| | |
| RCONCM | |
| for storing command during CHBNK | |
| R_INT | |
| generic register (for timer interrupt) | |
| DUMMY | |
| for code plate, SW input, WAIT | |

TABLE 10

| stack area | FCL0L |
|---|---|
| | FCL0H |
| | FCL1L |
| | FCL1H |
| | FCL2L |
| | FCL2L |
| | FCL2H |
| | FCL3L |
| | FCL3H |
| | FCL4L |
| | FCL4H |
| | FCL5L |
| | FCL5H |
| | FCL6L |
| | FCL6H |
| | FCL7L RETPOSL <br> RET focal length for PZPOS LOW |
| | FCL7L RETPOSH <br> HIGH |

60

TABLE 11

| AFP0L | X0F0L |
|---|---|
| | ISZ X0F0 LOW |
| AFP0H | X0F0M |
| | ISZ X0F0 MIDDLE |
| AFP1L | X0F0H |
| | ISZ X0F0 HIGH |
| AFP1H | ISZ_FPXL |
| | PRE operation X LOW |
| AFP2L | ISZ_FPXH |
| | PRE operation X HIGH |
| AFP2H | ISZ_FL |
| | ISZ F result LOW |
| AFP3L | ISZ_FLH |
| | ISZ F result HIGH |
| AFP3H | ISZ_FPL |
| | ISZ FPRE result LOW |
| AFP4L | ISZ_FPH |
| | ISZ FPRE result HIGH |
| AFP4H | |
| AFP5L | |
| AFP5H | |
| AFP6L | |
| AFP6H | |
| AFP7L | |
| AFP7H | |

TABLE 12

| | |
|---|---|
| F_AF | flag indicating that AF operation is being carried out |
| F_AFIF | flag indicating that image is focused |
| F_AFINIT | flag indicating that initialization of AF is completed |
| F_AFM | flag designating AF memory |
| F_AFPADJ | flag indicating that correction of AF pulses is prohibited |
| F_AFPOS | flag indicating that lens CPU correctly recognizes current position of focusing lens |
| F_AFSW | flag indicating AF switch data of of lens |
| F_ASSW | flag indicating AS switch data of lens |
| F_BATNG | flag set when battery voltage is not normally output |

TABLE 12-continued

| | |
|---|---|
| F_BATON | flag set when power is supplied to terminal VBATT |
| F_BATREQ | flag demanding power supply to power zoom lens |
| F_BATT | flag indicating that zoom motor is supplied with power from camera body |
| F_BBATREQ | flag demanding activation of power source of power zoom lens by camera body itself |
| F_BDET | flag detecting that power source of power zoom lens is activated |
| F_BPK | flag indicating brake of power zoom motor |
| F_CMDNG | flag indicating command NG |
| F_DRCT | flag indicating drive of power zoom motor in telephoto direction |
| F_DRCW | flag indicating drive of power zoom motor in wideangle direction |
| F_DRV | flag indicating drive of power zoom motor |
| F_ENDF | flag indicating infinite distance |
| F_ENDN | flag indicating closest distance |
| F_FARM | flag indicating movement towards infinite distance |
| F_FPRE | flag indicating calculation of target value of focal length using defocus pulses at ISZ mode |
| F_FPREOK | flag indicating that target value of focal length using defocus pulses at ISZ mode has been calculated |
| F_INFOCUS | flag indicating that image is in focus |

TABLE 13

| | |
|---|---|
| F_IPZB | flag set by auto zoom other than manual power zoom |
| F_IPZD | flag determining whether operation similar to IPZSTOP is carried out when BODY-STATE1 is output |
| F_IPZEND | flag indicating that auto zoom is completed |
| F_IPZI | flag indicating that manual power zoom has been effected during ISZ operation |
| F_IPZON | flag indicating that auto zoom is being driven |
| F_IPZSTOP | flag stopping drive of auto zoom |
| F_ISM | flag determining whether memorization of image magnification based on ISZ-MEMORY command from camera body or judgement on power zoom lens side |
| F_ISOK | flag indicating constant image magnification zoom |
| F_ISSPA | flag determining control speed of ISZ |
| F_ISSPB | flag determining control speed of ISZ |
| F_ISZ | flag indicating drive of power zoom motor at ISZ |
| F_ISZD | control flag at ISZ, which is set and cleared to indicate control of target value of focal length obtained using defocus pulses and control of target value of focal length obtained using current value of AF pulses, respectively |
| F_ISZFOM | flag indicating calculation of ISZ at focal length transferred from camera body |
| F_ISZFM | flag defined at bit 7 of STORE-PZF command |
| F_ISZMREQ | flag indicating memorization of image magnification at ISZ |
| F_ISZON | flag indicating ISZ operation |
| F_ISZSTOP | flag indicating stop of drive of ISZ |
| F_ISZXOM | flag indicating calculation of ISZ using AF pulses transferred from camera body |
| F_LBATREQ | flag demanding battery on power zoom lens side |
| F_LMTT | flag indicating pseudo-telephoto extremity |
| F_LMTW | flag indicating pseudo-wide angle extremity |

TABLE 14

| | |
|---|---|
| F_MDM | flag reading data from address designated by MYM0-MYM2 |
| F_MDT | flag instructing drive in telephoto direction to power zoom motor |
| F_MDW | flag instructing drive in wide-angle direction to power zoom motor |
| F_MOBJ | flag indicating AF operation in prediction of moving object. |
| F_MOV | flag indicating drive of power zoom motor in a designated direction |
| F_MOVTRG | flag indicating movement of zooming lens to target focal length set at address PZPTRG |
| F_MPZ | flag indicating manual power zooming |
| F_MPZD | flag indicating prohibition of manual power zooming |
| F_NEARM | flag indicating movement of power zoom lens towards closest distance direction |
| F_NEARMO | flag indicating previous near-movement |
| F_NEWCOM | flag indicating entrance into new communication after completion of old communication with taking lens |
| F_NGTIMER | flag indicating drive of NG timer |
| F_OVAF | flag indicating overlap integral |
| F_PZ | flag indicating attachment of power zoom lens as taking lens to camera body |
| F_PZAFREQ | flag demanding AF operation during power zooming |
| F_PZD | flag indicating selection of manual mode or power mode of switch of power zoom lens |
| F_PZINIT | flag indicating initialization of PZ |
| F_PZM | flag indicating selection of auto zoom mode or manual power zoom mode of slide switch of power zoom lens |
| F_PZPADJ | flag prohibiting correction of PZ pulses |
| F_PZPDRC | flag which is set and cleared to indicate drive in telephoto direction and wide-angle direction, respectively |
| F_PZPINIT | flag prohibiting return of initialization of PZ |
| F_PZPOS | flag indicating that lens CPU correctly recognizes current focal length of zooming lens group |
| F_PZWAIT | flag prohibiting commencement of power zooming |
| F_REL | flag indicating release operation |

TABLE 15

| | |
|---|---|
| F_SCKNG | NG flag of synchronization clock signal of serial communication |
| F_SIGN | flag indicating whether or not defocus pulses should be subtracted from current AF pulses |
| F_SLSW | flag indicating ON/OFF state of zoom set button of power zoom lens |
| F_SPA | flag designating zooming speed |
| F_SPB | flag designating zooming speed |
| F_SPD0 | flag indicating first zooming speed |
| F_SPD1 | flag indicating second zooming speed |
| F_SPDA2 | flag indicating zooming speed upon zooming to target focal length |
| F_SPDB2 | flag indicating zooming speed upon zooming to target focal length |
| F_START | flag indicating first drive of power zoom motor |
| F_STIS | flag indicating calculation of ISZ based on image magnification data transferred from camera body |
| F_STNDBY | flag indicating stop of operation caused by interruption by communication from camera body |
| F_SWAF | flag indicating selection of AF/MF switch of camera body |
| F_SWS | flag indicating operation of photometering switch |
| F_TELE1 | flag indicating drive in telephoto direction |
| F_TEND | flag indicating that zooming lens group is located at telephoto extremity |
| F_TIMEUP | flag indicating that set time of timer is up |
| F_TMOV | flag indicating drive of power zoom motor in telephoto direction |
| F_VDD | flag indicating that power source of body circuit is made ON |

TABLE 15-continued

| | |
|---|---|
| F_WEND | flag indicating that zooming lens group is located at wide-angle extremity |
| F_WIDE1 | flag indicating drive in wide-angle direction |
| F_WMOV | flag indicating drive of power zoom motor in wideangle direction |

TABLE 16

| Bulb or Regular | Drive Time of Zoom Lens | Absence or Presence of Half MPZ | Rotation/ Stop of Zoom Ring | State of flag F_EXZCTL | Zoom Control at Former Half-Drive Mode | | Zoom Control at Latter Half-Drive Mode | |
|---|---|---|---|---|---|---|---|---|
| | | | | | MPZ | In-Exposure Zoom | MPZ | In-Exposure Zoom |
| Bulb | — | — | — | 0 | Permission | Stop | Permission | Stop |
| Regular (i.e. a predetermined shutter speed is set) | Former Half | Half MPZ | Rotation | 1 | Permission | Stop | Prohibition | Stop |
| | | | Stop | 1 | Prohibition | Start | Prohibition | Stop |
| | | NO | Rotation | 0 | Permission | Stop | Permission | Stop |
| | | | Stop | 1 | Prohibition | Start | Prohibition | Stop |
| | Latter Half | Half MPZ | Rotation | 1 | Prohibition | Stop | Permission | Stop |
| | | | Stop | 1 | Prohibition | Stop | Prohibition | Start |
| | | NO | Rotation | 0 | Permission | Stop | Permission | Stop |
| | | | Stop | 1 | Prohibition | Stop | Prohibition | Start |

We claim:

1. A camera, comprising:
a motor driven zoom lens;
means for changing a focal length of said zoom lens to effect a power zooming of said zoom lens;
means for detecting a current focal length of said zoom lens;
zoom direction defining means for automatically defining a zooming direction for a movement of said zoom lens in response to said detected current focal length of said zoom lens; and
in-exposure zoom controlling means for controlling a zooming movement of said zoom lens during an exposure operation in accordance with said zooming direction defined by said zoom direction defining means, wherein said zoom direction defining means defines said zooming direction to be towards one of said telephoto extremity or said wide-angle extremity in accordance with a larger difference between said current focal length of said zoom lens and a focal length of said zoom lens at one of said wide-angle extremity and said telephoto extremity.

2. A camera according to claim 1, further comprising means for detecting a wide-angle extremity focal length and a telephoto extremity focal length of said zoom lens.

3. A camera according to claim 2, wherein said defined zooming direction is towards said wide-angle extremity when said detected current focal length corresponds to said telephoto extremity focal length, and towards said telephoto extremity when said detected current focal length corresponds to said wide-angle extremity focal length.

4. A camera according to claim 2, wherein said zoom direction defining means defines said zooming direction on the basis of differences between said detected current focal length and, one of said wide-angle extremity focal length and said telephoto extremity focal length.

5. A camera according to claim 2, wherein said defined zooming direction is towards said telephoto extremity when said detected current focal length is between said wide-angle extremity and said telephoto extremity.

6. A camera as claimed in claim 1, wherein said focal length changing means is mounted to an outer peripheral surface of said zoom lens so as to rotate about an optical axis, so that a zooming direction for a manual power zooming is determined in accordance with a direction of rotation of said focal length changing means from a neutral position.

7. A camera as claimed in claim 6, wherein a zooming speed for manual power zooming is determined in accordance with an angular displacement of said focal length changing means from said neutral position.

8. A camera as claimed in claims 7, wherein said zoom lens is detachably mounted to a body of said camera.

9. A camera as claimed as claim 8, wherein a motor for driving said zoom lens is located in a body portion of said lens.

10. A camera, comprising:
a motor driven zoom lens;
means for changing a focal length of said zoom lens;
means for detecting a current focal length of said zoom lens;
means for detecting a current shutter speed of said camera;
means for automatically defining a zooming direction of an in-exposure zoom operation; and
an in-exposure zoom controller that drives said zoom lens to effect a zooming during an exposure operation at a zooming speed determined in accordance with said detected current focal length, said detected current shutter speed and said detected zooming direction, wherein said zooming direction is towards one of a telephoto extremity or a wide-angle extremity based upon a comparison of said detected current focal length of said zoom lens to a focal length of said zoom lens at said wide-angle extremity, and a comparison of said detected current focal length to a focal length of said zoom lens at said telephoto extremity.

11. A camera according to claim 10, wherein said in-exposure zoom controller determines a zooming speed so that zooming is not completed prior to an expiration of an exposure time of said exposure operation.

12. A camera according to claim 11, wherein said zoom lens is driven by a motor at different zooming speed values so that an optimum determined zooming speed can be elected from among a plurality of different zooming speeds.

13. A camera, comprising:
a motor driven zoom lens;
means for changing a focal length of said zoom lens to effect a power zooming of said zoom lens; and
an in-exposure zoom controller that drives said zoom lens to effect said power zooming during an exposure operation, wherein at least one of an automatic power zooming and a manual power zooming is carried out, said automatic power zooming being carried out at a shutter release when said focal length changing means is not operated, said manual power zooming being carried out to drive said zoom lens at a predetermined zooming speed and in a predetermined zooming direction at said shutter release when said focal length changing means is manipulated, said predetermined zooming direction being towards one of a telephoto extremity or a wide-angle extremity in accordance with a larger difference between a current focal length of said zoom lens and a focal length at said wide-angle extremity or said telephoto extremity.

14. A camera, comprising:

a motor driven zoom lens;

means for changing a focal length of said zoom lens to effect a power zooming of said zoom lens; and an in-exposure zoom controller that drives said zoom lens to effect said power zooming during an exposure operation, wherein said in-exposure zoom controller carries out a manual power zooming for a predetermined time in at least one of a former half of an exposure time and a latter half of said exposure time when said focal length changing means is actuated upon effecting an in-exposure zooming.

15. A camera according to claim 14, wherein said predetermined time corresponds to one-half of a set exposure time.

16. A camera, comprising:

a motor driven zoom lens;

means for changing a focal length of said zoom lens to effect a power zooming of said zoom lens;

an in-exposure zoom controller that drives said zoom lens to effect said power zooming during an exposure operation; and bulb setting means for setting a shutter speed in a bulb state, wherein said in-exposure zoom controller permits a manual power zooming by said focal length changing means during an exposure operation in said bulb state.

17. A camera as claimed in claim 16, wherein said focal length changing means is mounted to an outer peripheral surface of said zoom lens so as to rotate about an optical axis so that a zooming direction for said manual power zooming is determined in accordance with the direction of rotation of said focal length changing means from a neutral position.

18. A camera as claimed in claim 17, wherein a zooming speed for said manual power zooming is determined in accordance with an angular displacement of said focal length changing means from said neutral position.

19. A camera as claimed in claim 18, wherein said zoom lens is detachably mounted to a body of said camera.

20. A camera as claimed as claim 19, wherein a motor for driving said zoom lens is located in a body portion of said zoom lens.

21. A camera, comprising:

a camera body;

a zoom lens;

a zoom drive for varying a focal length of said zoom lens;

focal length setting means for controlling said zoom drive to vary said focal length of said zoom lens;

mode selection means for setting an operation mode in which said zoom drive can be actuated during an exposure operation; and zoom control means for controlling said zoom drive during said exposure operation;

a switcher that switches said zoom drive between an automatic zoom effect mode, in which said zoom drive is controlled by said zoom control means during said exposure operation, and a semi-automatic zoom effect mode, in which said zoom drive is at least partially controlled by said focal length setting means during said exposure operation.

22. A camera according to claim 21, characterized in that said switch means is coupled with said focal length setting member in such a way that a switching is effected by moving said focal length setting member from a resting position to an active position.

23. A camera according to claim 22, wherein said focal length setting member is formed by a zoom ring rotatably arranged on an outer circumference of said zoom lens, coaxial to an optical axis thereof, in such a way that a setting direction of said zoom drive is defined by choosing a direction of rotation of said zoom ring from said resting position.

24. A camera according to claim 23, wherein a setting speed of said zoom drive is defined by a rotation angle of said zoom ring from said resting position.

25. A camera according to claim 24, wherein an exposure time selecting switch sets a B-mode (Bulb mode), in which an exposure time depends on a duration of actuation of a release button of said camera, wherein said zoom control means is designed in such a way as to allow an actuation of said zoom drive during a shutter release in said B-mode.

26. A camera according to claim 25, further comprising a first detector for detecting a current focal length at which said zoom lens is set wherein said zoom control means has a direction selecting means which, in said automatic zoom effect mode, defines said setting direction of said zoom drive depending on said detected current focal length.

27. A camera according to claim 26, further comprising a second detector for detecting said focal length of said zoom lens in a telephoto extremity and an wide-angle extremity of said zoom lens.

28. A camera according to claim 27, wherein said direction selecting means controls said zoom drive to move said zoom lens in a direction of said wide-angle extremity if said current focal length corresponds to said telephoto extremity, and that said direction selecting means controls said zoom drive to move said zoom lens in a direction of said telephoto extremity if said current focal length corresponds to said wide-angle extremity.

29. A camera according to claim 28, wherein said direction selecting device defines said setting direction of said zoom drive depending on a difference between said current focal length detected by said first detector and a focal length in one of said telephoto extremity or said wide-angle extremity of said zoom lens detected by said second detector.

30. A camera according to claim 29, wherein, said direction selecting device defines said setting direction of said zoom drive in such a way that said zoom lens is moved in the direction of the extremity which provides a greater difference between focal lengths.

31. A camera according to claim 30, wherein said direction selecting device controls said zoom drive to move said zoom lens in said direction of said telephoto extremity if said current focal length detected by said first detector lies between focal lengths corresponding to said telephoto extremity and said wide-angle extremity of said zoom lens.

32. A camera according to claims 31, further comprising a third detector for detecting a predetermined exposure time, wherein said zoom control device defines said setting speed of said setting drive depending on said current focal length detected by said first detector, said setting direction of said zoom drive defined by said direction selecting device, and said exposure time detected by said third detector device.

33. A camera according to claim 32, wherein said zoom control device defines said setting speed of said zoom drive in such a way that said setting operation mode is still being executed at the end of said exposure time.

34. A camera according to claim 33, wherein a memory device stores a plurality of different setting speed values, from which said zoom control device selects a value.

35. A camera according to claim 34, wherein a time selecting device defines a time period during which said zoom drive is actuated.

36. A camera according to claim 35, wherein said time period starts upon an opening of said shutter and ends before a closing of said shutter.

37. A camera according to claim 36, wherein said time period starts after said opening shutter and ends upon said closing of said shutter.

38. A camera according to claim 37, wherein said time period corresponds to half said predetermined exposure time.

39. A camera, comprising:

a zoom lens;

a photometering switch;

a focal length changing mechanism that changes a focal length of said zoom lens by driving said zoom lens towards one of a telephoto extremity or a wide-angle extremity in accordance a larger difference between a current focal length of said zoom lens and a focal length at said wide-angle extremity or said telephoto extremity; and means for effecting a focusing of said zoom lens in response to a change in said focal length of said zoom lens regardless of an operational state of said photometric switch.

40. The camera of claim 39, wherein said focal length changing mechanism comprises a zoom ring elastically biased to a neutral position, said zoom ring being rotated from said neutral position in one of a clockwise or counterclockwise direction to effect said change in said focal length of said zoom lens.

41. The camera of claim 39, further comprising:

a photometric mechanism that obtains data representing a relative distance between an object to be photographed and said camera;

an image magnification mechanism that calculates an image magnification of an object image in accordance with said distance data obtained by said photometric mechanism and a current focal length when said focusing operation is completed.

42. The camera of claim 39, wherein said focal length changing mechanism is mounted to an outer peripheral surface of said zoom lens.

43. The camera of claim 39, further comprising a focusing range limiter that limits a focusing range of said zoom lens between a first focusing range and a second focusing range.

44. The camera of claim 39, further comprising means for selectively attaching said zoom lens to said camera.

* * * * *